United States Patent
Perea-OcHoa

(10) Patent No.: US 12,346,554 B2
(45) Date of Patent: Jul. 1, 2025

(54) METHOD AND SYSTEM FOR GESTURE AND DISPLAYING SIDELINE OPERATION

(71) Applicant: Jesus Perea-OcHoa, Montebello, CA (US)

(72) Inventor: Jesus Perea-OcHoa, Montebello, CA (US)

(*) Notice: Subject to any disclaimer, the term of this patent is extended or adjusted under 35 U.S.C. 154(b) by 0 days.

(21) Appl. No.: 17/847,151

(22) Filed: Jun. 22, 2022

(65) Prior Publication Data

US 2023/0152961 A1    May 18, 2023

Related U.S. Application Data

(60) Provisional application No. 63/281,065, filed on Nov. 18, 2021.

(51) Int. Cl.
| | |
|---|---|
| *G06F 3/04847* | (2022.01) |
| *G06F 3/04842* | (2022.01) |
| *G06F 3/04845* | (2022.01) |
| *G06F 3/04883* | (2022.01) |
| *G06F 3/04886* | (2022.01) |

(52) U.S. Cl.
CPC ...... *G06F 3/04883* (2013.01); *G06F 3/04845* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 2004/0189691 | A1* | 9/2004 | Jojic | G11B 27/005 715/838 |
| 2011/0185297 | A1* | 7/2011 | Reid | G06F 3/04845 715/833 |
| 2013/0106707 | A1* | 5/2013 | Chen | G06F 3/04883 345/173 |
| 2013/0187874 | A1* | 7/2013 | Nettamo | G06F 3/0488 345/173 |
| 2014/0208262 | A1* | 7/2014 | Huang | G06F 3/0486 715/800 |
| 2015/0350533 | A1* | 12/2015 | Harris | H04N 23/73 348/362 |
| 2016/0026371 | A1* | 1/2016 | Lu | G06F 3/04842 715/768 |
| 2018/0058877 | A1* | 3/2018 | Andrew | G01C 21/3682 |
| 2018/0324567 | A1* | 11/2018 | Mao | H04M 1/725 |
| 2019/0098190 | A1* | 3/2019 | Hosoe | G06F 3/04847 |

* cited by examiner

*Primary Examiner* — Tuyetlien T Tran
*Assistant Examiner* — Samuel Shen
(74) *Attorney, Agent, or Firm* — David & Raymond Patent Firm; Raymond Y Chan

(57) ABSTRACT

A system for gesture operation on one or more display screens of one or more electronic devices includes a computer usable medium having computer-readable program code embodied in the medium to perform executable operations. The computer-readable program code includes a first executable portion for managing one or more adjusters for providing one or more adjusting operations of one or more displaying contents corresponding to one or more programs on the one or more display screens, a second executable portion for analyzing one or more touch point information and retrieving one or more display screen information from the one or more display screens, and controlling the one or more adjusters generated based on the one or more touch point information for displaying on the one or more display screens.

5 Claims, 27 Drawing Sheets

Computer Usable Medium (Cloudy Server) 100

First executable portion 1 (Adjuster module 10)

Detect executable portion 11
- Adjuster(s) 13
- Pressure indicator 15
- Adjuster indicator(s) 14
- Numeric indicator(s) 16

Guider executable portion 12 — Graduation(s) 120

Second executable portion 2 (Display screen controller module 20)
- Display screen controller 22
- Artificial intelligence module 25
- Adjuster interface(s) 21
  - Gesture control 211
- Distance tracker module 27
- Module of analyzable factor(s) 26

Third executable portion 3 (Sideline module 30)
- Sideline element(s) 31
- Reservation area(s) 33
- Reservation sideline element(s) 32
- Pop-up sideline element(s) 37

Fourth executable portion 4 (Interactive module 40)
- Interacting portion(s) 41
- State-off program 48
- Interacting program(s) 42
- Time tracker program 49
- Keyboard element program 43
- Operating area program 401
- Gesture and cursor program 44
- Gesture dictionary 402
- Program dictionary 45
- Scrolling program 46
- Display content adjustment 403
- Zooming program 47
- Verbal command program 404

FIG. 3

| TOOL PROGRAM | GESTURE SYMBOL | OPERATING GESTURE |
|---|---|---|
| Power Off | ∧ |  |
| Sleep Mode | ∧ |  |
| Zoom In | / | 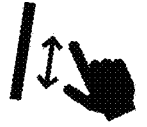 |
| Zoom Out | / |  |
| Dictionary | •\| |  |
| Internet | •\| |  |
| Text | ! |  |
FIG. 7

METHOD AND SYSTEM FOR GESTURE AND DISPLAYING SIDELINE OPERATION

CROSS REFERENCE OF RELATED APPLICATION

This application is a non-provisional application that claims the benefit of priority under 35 U.S.C. § 119(e) to a provisional application, application No. 63/281,065, filed Nov. 18, 2021, which is incorporated herewith by reference in its entirety.

BACKGROUND OF THE PRESENT INVENTION

Field of Invention

The present invention relates to computer-implemented method and system for operating display screen and the like, and more particularly to a method and system for gesture operation on one or more display screens and/or images for one or more programs of an electronic device, including but not limited to, one or more individually electronic devices, two or more joined electronic devices, and/or one or more foldable display screens. In addition, the one or more display screens and/or images for the one or more programs can be divided by one or more sidelines to be operable by one or more gestures on one or more electronic devices, such as computer, notebook, tablet, and/or augmented reality, mix reality, or extended reality or virtual reality (AR/MR/XR/VR) apparatus.

Description of Related Arts

The most commonly used gesture in operating a program on a display screen is, for example, the zoom-in gesture and zoom-out gesture. The zoom-in and zoom-out gestures on the display screen can respectively help to zoom in and zoom out an object, such as a picture, a document or a figure, displayed on the screen which can be the same display screen or another displaying screen. The zoom-in gesture or the zoom-out gesture is simply executed through two fingers of a user touching on the display screen of an electronic device. When a distance between the two fingers of the user is increased by gradually moving the two touching fingers away from each other on the display screen (zoom-in gesture), the picture is enlarged in size (zoom in) on the focal center of the displaying screen. For example, if the distance between the two fingers of the use is reduced by gradually moving the two touching fingers toward each other (zoom-out gesture), the picture focal display magnification is decreased (zoom-out) and the displaying screen reduces magnification and increasing panoramic viewing. The zoom-in gesture and the zoom-out gesture are easy to operate on the display screen. However, there are still some drawbacks of such zoom-in and zoom-out gestures. For example, the user doesn't know the scale of that the picture focal magnification to be zoomed-in or zoomed-out. All programs have an available maximum and minimum magnification option. When the two-fingers gesture like the thumb and the index finger are used to produce a gesture, the gesture has an initial limited magnification capacity. Therefore, if the user attempts to maximize or minimize the magnification to the full available range of the program and if the available magnification range is 10 times more than the current magnification, the user will have to move the thumb and the index finger multiple times to achieve the desire maximum or minimum magnification, because the two-fingers gesture generates one or more times magnification range and cannot provide the full magnification range available in the program. In other words, the user is required to repeat the zoom-in gesture or zoom-out gesture for multiple times in order to zoom in or zoom out the picture displayed to the desired scale. In addition, there is no information regarding the current magnification scale, state and size of the picture zooming in or zooming out being displayed before or during the zoom-in or zoom-out gesture operation. Such multiple operations of the gesture on the display screen repeatedly substantially bother the user very much and are not efficient, especially to a professional user such as a photographer editing the picture or a drafter working on a figure or document.

In addition, zoom-in gesture cannot show the state of the picture or figure size during zooming in or zooming out, such as what percentage of the enlarged picture or figure is larger than the original picture or figure. This is not the same as scrolling where the documents or pictures are not a function of magnification, while scrolling is a convenient way of searching and following a display in a pre-arranged manner backwards and forwards.

Another drawback is that the conventional gesture such as zoom-in gesture or zoom-out gesture requires the user's finger(s) placing on the picture, document or drawing displayed the display screen that blocks the picture, document or drawing at the same time and affects the accuracy of the gesture operation too. In other words, when a relatively small scale picture is required to zoom in, the whole picture may be fully blocked by the user's hand until the user removes his or her hand out of line of sight.

Currently in the market, there is no organization for program operating gesture that can control the operating program while inputting at the same time. However, it is a great demand to the user for operating one or more programs and/or on one or more display screens of an electronic device such as a notebook computer, a tablet, a smart phone, or a slot machine. However, multiple programs or applications are developed and installed in an electronic device and two or more programs or applications (APPs) are able to be opened at the same time to function in two or more different windows but, generally, only one program is operational for physical control while the other programs or applications may merely display without the capacity to be operated at the same time. These programs or applications share a single input device (one to one input capacity), that is only one inputting can control one of the display screen programs. The user is forced to shift the physical activities of inputting between two programs or APPs, that substantially increases the workload by having to alternate from one program to the other program, decreases productivity with numerous (back and forth) physical control movements for each separated program, and increases time consumption when multitasking under current operation system. In other words, the mere input device only controls one primary display program or only one primary display application at one time.

Conventionally, if the user requires to operated two different computer language programs at the same time, the user requires two independent electronic devices to operate two different programs, wherein each electronic device has its own display monitor and inputting panel control for each program. Therefore, the user must consider the available workspace, finances, and time.

Furthermore, if the user requires to input on two similar or two different computer programs with the same computer language at the same time, the user also requires two independent electronic devices to input on the two similar programs or on the two different computer programs even when the programs have the same computer language, and where each electronic device has its own display monitor and inputting panel control. Therefore, the user must consider the available workspace, finances, and time.

However, if a display screen is installed with two or more programs or two or more applications on the same screen and is required to display both programs or APPs applications at the same time, the screen is not capable of operating both programs at the same time. When the screen has two programs, the programs will share unequal percentage of displaying area of the screen. The program without displaying the inputting capacity is minimized and the program with the entire screen or most of the screen space is providing the inputting controls for the specific program or application being controlled, at that time.

Furthermore, in most cases, the user cannot designate the arrangement of various locations of the programs or applications respectively on the same screen. If one of the programs or applications is changed in displaying location on the display screen, the location on the other programs or applications will also change correspondingly on the screen display layout, thereby affecting the other programs or applications being displayed. For example, the primary program or application may be partially or fully blocked by other secondary program if the program location on the screen is changed. The user needs to take time to manually move or delete other programs or applications in order to achieve the display and control for the desire program or application that such physical demand is not convenient for the user. This type of multi-tasking consumes more time, especially when the user needs to perform additional alternations to controls one or more programs or applications on one display screen.

In addition, current laptops or notebook computers are structurally limited by the built-in physical control device like the keyboard. Additionally, the computer industry continues to develop limiting digital options on the electronic devices to conform to the existing physical accessories market, like the physical keyboard, trackpad and mouse/pad. This computer industry hybrid approach with the partial display screen and touch control is self-limiting by only being able to control one function at a time. The conventional physical keyboard also has its limitations that the user cannot select the placement of the letters, numbers, symbols, keyboard and mouse pad, on the control panel. The mouse pad, on the control panel in the physical laptops, cannot bet repositioned. Additionally, many users of laptop or notebook computers continue to use external and duplicated accessories like the mouse pad, trackpad because the digital display/control capacity of the original purchase electronic device inputting is inherited limiting. Therefore, the physical demands continue to plague the computer developer and the consumer, and while most consumers adapt to endure the additional workload, most users overlook the time it takes to make corrections back and forth with a physical mouse and a physical keyboard or other combination. The rise in upper extremity injuries is directly proportion the problems mentioned above. It is important to realize that our current inputting system in the computer industry for multitasking of controlling only one single program display with one inputting option, at a time, fails to meet the substantial need of the users.

On the other hand, identification recognition, such as fingerprint or face recognition, is commonly equipped in computer, tablet and smart device instead on typing a long and complicated password to securely log in the user's personal data information in a much speedy manner. However, both the fingerprint recognition and face recognition are biological biometrics of humans, which greatly depends on the recognition software installed in the device that may not really provide desired security. There are many complaints that, for some electronic devices, even a picture of a similar face or similar fingerprint may be recognized to pass the identification recognition log-in process to access the owner's personal data, or wherein the owner of the device may not be recognized by the software when attempting to log in when his or her fingerprint is wet or too dry or when he or she changes his or her glasses, wears a hat or after makeup. Therefore, there is a great desire in the market to have an innovative method for security log in of an electronic device based on personal identifiable features rather than the conventional biological biometrics or inputting password that can allow other unwanted the users to log in automatically without the knowledge of the proper user or owner of the electronic device.

With the development of metaverse (meta universe/simulate environment), virtual reality (VR), mixed reality (MR), extended reality (XR), and augmented reality (AR) technologies are able to be interacted with the reality world through the VR, MR, XR or AR apparatus that the virtual reality and the reality, the reality and the augmented reality, or multiple virtual realities are being displayed at the same time via a displaying apparatus (such as VR/AR/XR/MR glasses or goggles) of the user. Current physical input devices, such as keyboard and mouse, are not practical and effective to the user while he or she is wearing the displaying apparatus or his or her eyes are limited to be focusing on the displaying screen. In addition, the virtual reality scene and reality scene may be displayed side by side or overlapped with each other. For example, when a user needs to conduct a presentation in a displaying portion or scene of virtual reality, the user may require to open the user's PPT file from the user's database of physical hard drive or cloud drive through a reality display portion or scene to select the desired PPT file, operate the PPT file and control an interaction between the reality scene and the virtual reality scene. An advance and efficient operation system and method are desired to operate directly with one or more display screens and one or more control portions accordingly.

In the conventional market, there is no organization arrangement for program operating gesture in the electronic device equipped with the Brain Control Interface System Technology, wherein the brain or extremities neuromuscular signal acquisition is performed or imagining gestures. The electrical impulse signals of any imagined or performed gesture are measured simultaneously or independently from the brin or from the extremities during the creation of the gesture, wherein the electrical impulses are translated in the Brain Computer Interface (BCI) device for the operation of the electronic device. In addition, the physical properties and performance of the performed gestures, for example the points of finger touching on the touch screen, are also measure, analyzed and learned. For pairing with other programs, for imputing, for the operations of a security system, and for the interoperability within any software of any electronic device.

SUMMARY OF THE PRESENT INVENTION

The invention is advantageous in that it provides a method and system for gesture operation on display screen, wherein the system allows the user to operate one or more programs through predetermined pattern of gestures on one or more display screens according to the user's personal habit, size and shape of hand, characteristic of gestures, and etc.

The invention is advantageous in that it provides a method and system for gesture operation on one or more display screens, wherein the system is configured to allow the user to develop and designate his or her personal gestures for the operation of one or more electronic devices, such as counter-top computer, stationary computer, notebook, laptop, smart device, tablet, AR/MR/XR/VR apparatus, and/or slot machine.

The invention is advantageous in that it provides a method and system for gesture operation with one or more electronic device at the same time, wherein the system is configured to allow the user to develop designated gestures and his or her personal gestures for the operation process between one or more electronic devices, such as counter-top computer, stationary computer, notebook, laptop, smart device, tablet, and/or AR/MR/XR/VR apparatus.

The invention is advantageous in that it provides a method and system for gesture operation on display screen, wherein the system also provides an artificial intelligence module to save and authenticate the patterns of the designated gesture (performed or imagined) corresponding to a predetermined function that a specific user repeats the designated gesture every time so as to learn to recognize the specific user's gesture habit and characteristic, so that the electronic device equipped with the system of the invention recognizes the identification of the specific user through his or her personal gesture pattern for logging in the programs as well as during the operation of the programs. In other words, the system of the invention will lock the electronic device from operation and accessing personal data once the operating gesture pattern on the display screen is not recognized by the system.

The invention is advantageous in that it provides a method and system for gesture and sideline operation on one or more display screens, wherein the system provides one or more adjusters for adjusting displaying contents on one or more display screens or one or more displaying portions divided by one or more sideline elements of a display screen respectively and simultaneously.

The invention is advantageous in that it provides a method and system for one or more gesture and sideline operation on one or more display screens for one or more programs of an electronic device, wherein the one or more programs of the electronic device are able to be controlled by one or more adjustors for adjusting displaying contents of the one or more programs in the one or more displaying portions divided by one or more sidelines of one or more display screens while the one or more programs are controlling and running at the same time on the one or more displaying portions of the display screen or on the one or more display screens.

The invention is advantageous in that it provides a method and system for gesture operation on one or more display screens, wherein the system provides one or more guiders corresponding to one or more touch points on one or more display screens. In one embodiment, the guider may be positioned between two touch points on the display screen or on any display medium, at a preselected location.

The invention is advantageous in that it provides a method and system for gesture operation on one or more display screens, wherein the system provides one or more guiders each having one or more graduations for indicating a current state of the displaying contents corresponding to the one or more programs on the one or more displaying portions of the one or more display screens. In one embodiment, the guider with the graduations may be positioned between two touch points on the one or more displaying portions of the one or more display screen or on any display medium, at a preselected location.

The invention is advantageous in that it provides a method and system for gesture operation on one or more display screens for one or more programs of one or more electronic devices, wherein the system provides one or more graduations for indicating one or more adjusting scales thereof while one or more programs are controlling and running at the same time on one or more displaying portions of the one or more display screens.

The invention is advantageous in that it provides a method and system for gesture operation on one or more display screens, wherein the system provides one or more adjusters for indicating a current adjuster state of one or more displaying contents on the one or more display screens or on any display medium, at a preselected location.

The invention is advantageous in that it provides a method and system for gesture operation on one or more display screens, wherein the system provides one or more placement for the one or more adjusters anywhere on the one or more display screens or any display medium for indicating a current adjuster state of one or more displaying contents on the one or more display screens or any display medium, at a preselected location.

The invention is advantageous in that it provides a method and system for gesture and sideline operation on one or more display screens for one or more programs of one or more electronic devices, wherein the system provides one or more adjusters for indicating the current adjuster state of one or more displaying contents on the one or more display screens while the adjuster is adjusting and the one or more programs are controlling and running at the same time on one or more displaying portions and controlling portions of the one or more display screens or on any display medium, at a preselected location.

The invention is advantageous in that it provides a method and system for gesture and sideline operation on one or more display screens, wherein the system is configured to designate one or more interacting portions corresponding to one or more displaying portions on one or more display screens or on any display medium, at a preselected location.

The invention is advantageous in that it provides a method and system for gesture and sideline operation on one or more display screens for one or more programs of one or more electronic devices, wherein the system is configured to designate one or more interacting portions on one or more programs on the one or more display screens while one or more other programs are controlling and running at the same time on the one or more displaying portions of the one or more display screens or on any display medium, at a preselected location.

The invention is advantageous in that it provides a method and system for gesture and sideline operation on one or more display screens of an electronic device, wherein the system provides one or more sideline elements to enable one or more programs to displaying contents for additional more programs on one or more displaying portions divided by the one or more sideline elements on the one or more display screens. In one embodiment, the guider is able to be generated along the sideline element when the touch point is located along the sideline element.

The invention is advantageous in that it provides a method and system for gesture and sideline operation on one or more display screens for one or more programs of one or more electronic devices, wherein the system provides one or more sideline elements to divide the one or more display screens into two or more displaying portions while two or more programs are controlling and running on the displaying portions respectively at the same time.

The invention is advantageous in that it provides a method and system for gesture and sideline operation on one or more display screens for one or more programs of one or more electronic devices, wherein the system provides one or more sideline elements to organize two or more programs on the two or more displaying portions of the one or more display screens.

The invention is advantageous in that it provides a method and system for gesture and sideline operation on one or more display screens for one or more programs of one or more electronic devices, wherein the system provides one or more sideline elements to organize two or more programs on the two or more displaying portions of the one or more display screens while two or more programs are being controlled and running at the same time on the two or more displaying portions.

The invention is advantageous in that it provides a method and system for one or more gesture operation on one or more display screens for one or more programs of one or more electronic devices, wherein the system provides one or more pop-up sideline elements to separate one or more in-coming operations on one or more display screens or one or more displaying portions of a display screen, at the same time or in a timely manner, of an electronic device.

The invention is advantageous in that it provides a method and system for gesture and sideline operation on one or more display screens for one or more programs of one or more electronic device, wherein the system provides one or more reservation sideline elements to separate one or more reservation areas from one or more other programs, at the same time or in a timely manner.

The invention is advantageous in that it provides a method and system for gesture and sideline operation on one or more display screens for one or more programs of one or more electronic devices, wherein the system provides one or more sideline elements to separate one or more touch points from one or more other programs, at the same time or in a timely manner.

The invention is advantageous in that it provides a method and system for gesture and sideline operation on one or more display screens for one or more programs of one or more electronic devices, wherein the system provides one or more sideline elements, reservation sideline elements, pop-up sideline elements, and/or reservation areas which are individually operated by one or more touch points from one or more programs on the one or more displaying portions of the one or more display screens, at the same time or in a timely manner.

The invention is advantageous in that it provides a method and system gesture and sideline operation on one or more display screens for one or more programs of one or more electronic devices, wherein the system provides organization minimize display of one or more programs without closing said programs on one or more display screens while one or more other programs are controlling and running at the same time on the one or more displaying portions of a display screen or on the two or more display screens.

The invention is advantageous in that it provides a method and system for gesture and sideline operation on one or more display screens, wherein the system provides at least one sideline element to divide the corresponding display screen into two or more displaying portions.

The invention is advantageous in that it provides a method and system for gesture and sideline operation on one or more display screens for one or more programs of one or more electronic devices, wherein the system provides one or more adjuster interfaces, divided by one or more sideline elements, to adjust the contents of one or more programs in one or more portions while the one or more programs are controlling and running at the same time on the one or more displaying portions or the one or more display screens of the one or more electronic devices.

The invention is advantageous in that it provides a method and system for gesture and sideline operation on one or more display screens for one or more programs of one or more electronic devices, wherein the pop-up sideline notifications provide one or more additional program menu options while one or more programs are controlling and running at the same time on the one or more displaying portions or the one or more display screens.

The invention is advantageous in that it provides a method and system for gesture and sideline operation on one or more display screens for one or more programs of one or more electronic devices, wherein the system provides one or more sideline element controls, from one or more other sideline elements on the one or more displaying portions of the one or more display screens.

The invention is advantageous in that it provides a method and system for gesture and sideline operation on one or more display screens for one or more programs of one or more electronic devices, wherein the system provides one or more continuous elongated sideline elements on the two or more display screens, at the same time.

The invention is advantageous in that it provides a method and system for gesture and sideline operation on one or more display screens for one or more programs of one or more electronic devices, wherein the system provides one or more continuous elongated sideline elements to control one or more sideline elements on two or more folded display, slidable display, collapsible display, rollable display, and/or screen portions.

The invention is advantageous in that it provides a method and system for gesture operation on one or more display screens for one or more programs of one or more electronic devices, wherein the gesture operation is to be selected from a list of gesture dictionary to be paired with a selected program from a list of program dictionary, wherein the system provides the personal customization of the user performing the gesture selection to pair the gesture and program together, thereby controlling one or more programs at the same time, or in a timely manner on the one or more display screens.

The invention is advantageous in that it provides a method and system for gesture operation on one or more display screens for one or more programs of one or more electronic devices, wherein the system is arranged for providing gestures which are scalable in the gesture dictionary for pairing with a program from the program list.

The invention is advantageous in that it provides a method and system for gesture operation on one or more display screens for one or more programs of one or more electronic devices, wherein the system is arranged to provide programs that are scalable in the program dictionary for pairing with one or more gestures from the gesture list.

The invention is advantageous in that it provides a method and system for gesture operating one or more programs on one or more display screens of an electronic device, wherein the system provides an interacting portion for operations on one or more display screens for one or more programs of one or more electronic devices on which comprises digital displays such as a keyboard portion, a pad portion, a mouse portion, a state-off portion, a zoom portion, a gesture portion, a scrolling portion, a state-off portion, a cursor portion, and/or an operation portion, which are all examples of scalable programming portions.

The invention is advantageous in that it provides a method and system for gesture operation on one or more display screens for one or more programs of one or more electronic devices, wherein the system provides an interacting portion which comprises a keyboard portion, a pad portion, a mouse portion, a state-off portion, a zoom portion, a gesture portion, a scrolling portion, a state-off portion, a cursor portion, and/or an operation portion, which are interchangeably gesture programmed portions controlling and running at the same time or in a timely manner on the one or more display screens.

The invention is advantageous in that it provides a method and system for gesture operation on one or more display screens for one or more programs, wherein the state-off portion when activated provides superimposed gesture capacity on one or more pre-existing programs on the one or more display screens.

The invention is advantageous in that it provides a method and system for gesture operation on one or more display screens for one or more programs of one or more electronic devices, wherein if the state-off is in the lock mode to eliminate erroneous inputting by providing minimal superimposed gesture capacity on one or more pre-existing programs, on one or more display screens, allowing for physical manipulation and handling or grabbing of the display screen surface area of the electronic device.

The invention is advantageous in that it provides a method and system for gesture operation on one or more display screens for one or more programs of one or more electronic devices, wherein the system is arranged to re-designate a gesture operation portion according to the changed position of a touchpoint on one or more portions of the one or more programs on the one or more display screens.

The invention is advantages in that it provides a method and system for gesture operation on one or more display screens for one or more programs of one or more electronic devices, wherein the system is arranged to recognize similar gesture separated by sideline boundaries as different gestures to generate different responses when the operation portion programs are different and divided by one or more sidelines accordingly.

The invention is advantageous in that it provides a method and system for gesture operation on one or more display screens for one or more programs of one or more electronic devices, wherein the system may or may not re-designate the one or more gestures operation portions according to the state-off lock mode while one or multiple programs are controlling and running at the same time on the one or more display screens.

The invention is advantageous in that it provides a method and system for gesture operation on one or more display screens for one or more programs of one or more electronic devices, wherein the system may or may not have gesture operation according to the superimposed state-off lock mode while one or more programs are being controlled and running at the same time on the one or more display screens.

The invention is advantageous in that it provides a method and system for gesture operation on one or more display screens for one or more programs of one or more electronic devices, wherein the system may or may not re-designate the one or more gesture operation portions according to the sideline reservation boundary while one or more programs are being controlled and running at the same time on the one or more di splay screens.

The invention is advantageous in that it provides a method and system for gesture and sideline operation on one or more display screens for one or more programs of one or more electronic devices, wherein the system provides a reservation area for one or more programs on the one or more display screens to provide additional displaying contents for one or more other programs.

The invention is advantageous in that it provides a method and system for gesture and sideline operation on one or more display screens for one or more programs of one or more electronic devices, wherein the system provides a reservation area for one or more programs on one or more display screens to provide additional displaying contents for one or more other programs, while minimizing the programs within the reservation area.

The invention is advantageous in that it provides a method and system for gesture and sideline operation on one or more display screens for one or more programs of one or more electronic devices, wherein the system provides a pop-up sideline superimposed on one or more programs on one or more display screens to provide additional display available menu for one or more other programs.

The invention is advantageous in that it provides a method and system for gesture and sideline operation on one or more display screens for one or more programs of one or more electronic devices, wherein the system provides a superimposed state-off lock to any program including the reservation area on one or more physical edges on one or more display screens to provide manual control surface area without inputting erroneous information during physical manipulation of the one or more display screens.

The invention is advantageous in that it provides a method and system for gesture and sideline operation on one or more display screens for one or more programs of one or more electronic devices, wherein the system provides a superimposed state-off lock to any program including the reservation area on one or more physical edges on one or more display screens to provide manual control surface area without inputting erroneous information during physical manipulation of the electronic device while the superimposed programs may or may not continue to run without affecting the continuation of the superimposed programs.

The invention is advantageous in that it provides a method and system for gesture and sideline operation on one or more display screens for one or more programs of one or more electronic devices, wherein the system allows any program outside the reservation area to be able to switch with any program inside the reservation area of one or more physical edges of the one or more display screens.

The invention is advantageous in that it provides a method and system for gesture and sideline operation on one or more display screens for one or more programs of one or more electronic devices, wherein the system allows the primary program outside the reservation area to have a large display area. Additionally, both programs are fully operational, while the one or more programs inside the reservation area are positioned along the physical edge of the one or more display screens.

The invention is advantageous in that it provides a method and system for gesture operation on one or more display screens for one or more programs of one or more electronic devices, wherein the system allows any program to be closed in a timely manner customized by the user.

The invention is advantageous in that it provides a method and system for gesture operation on one or more display screens for one or more programs of one or more electronic devices, wherein the system allows any program to be activated in a timely manner customized by the user.

The invention is advantageous in that it provides a method and system for gesture operation on one or more display screens for one or more programs of one or more electronic devices, wherein one or more gestures are built-in for operating the one or more programs on the one or more displaying portions or the one or more display screens.

The invention is advantageous in that it provides a method and system for gesture operation on one or more display screens for one or more programs of one or more electronic devices, wherein one or more gestures can be undone, not only the produce gesture action, also including the generated response, and thereby returning previous action in a chronological order for operation on the one or more programs on the one or more displaying portions or the one or more display screens or display mediums.

The invention is advantageous in that it provides a method and system for gesture operation on one or more display screens for one or more programs of one or more electronic devices, wherein one or more gestures are customizable and analyzable by the display screen module and the artificial intelligence module of the one or more display screens.

The invention is advantageous in that it provides a method and system for gesture operation on one or more display screens for one or more programs of one or more electronic devices, wherein one or more gestures have module of analyzable factors for location, pressure, thickness, acceleration, time, right or left hand, direction, angle, size, and interruptions, by one or more touch points on the one or more display screens, at the same time or in a timely manner.

The invention is advantageous in that it provides a method and system for gesture operation on one or more display screens for one or more programs of one or more electronic devices, wherein one or more gesture touch points have module of analyzable factors where the information is learned, processed and recorded by the artificial intelligence module on the one or more display screens, at the same time or in a timely manner.

The invention is advantageous in that it provides a method and system for gesture and sideline operation on one or more display screens for one or more programs of one or more electronic devices, wherein the adjuster and sideline elements work together to sort-out and customize the size and location of one or more displaying contents on the one or more displaying portions or the one or more display screens.

The invention is advantageous in that it provides a method and system for gesture and sideline operation on one or more display screens for one or more programs of one or more electronic devices, wherein the gesture re-adjusts one or more positions of one or more sideline elements where a gesture on one or more touch points on the one or more display screens without direct contacting on the one or more sideline elements, in order to move the sideline elements according to function, on the one or more display screens.

The invention is advantageous in that it provides a method and system for gesture operation on one or more display screens for one or more programs of one or more electronic devices, wherein the gesture information generates one or more programs in the display of the one or more display screens and one or more sideline elements are displayed for organization on the one or more display screens.

The invention is advantageous in that it provides a method and system for gesture operation, performed or imagined, on one or more display screens for one or more programs of one or more electronic devices, wherein the display screen controller and the gesture/program interacting element oscillate information as means for analyzing and providing corrected information to the artificial intelligence module.

The invention is advantageous in that it provides a method and system for imagining gesture operation on one or more display screens or display medium for one or more programs of one or more electronic devices, wherein the display screen controller and the gesture/program interacting element oscillate information as a means for analyzing and providing corrected information to the artificial intelligence module in the Brain Computer Interface for the signal acquisition.

The invention is advantageous in that it provides a method and system for gesture operation on one or more display screens for one or more programs of one or more electronic devices, wherein the artificial intelligence module learns, records and anticipates gesture/program based on the past program selections, module of analyzable factors from the touch point selections, gesture selections, sideline element display selections, and adjuster interface selections. In other words, the current displaying content layouts will give the artificial intelligence module the true abilities to assist the user to complete customary work and to distinguish from atypical work or performance The invention is advantageous in that it provides a method and system for gesture operation on one or more display screens for one or more programs of one or more electronic devices, wherein the artificial intelligence module learns, records and anticipates gesture/program based on the past program selections, module of analyzable factors from the touch point selections, gesture selections, sideline element display selections, and adjuster interface selections. In other words, atypical work or performance will be recognized by the artificial intelligence module wherein the system requests verification of user and without the corrected gesture and the security system will lock all actions in the electronic device pending proper gesture control inputting.

The invention is advantageous in that the security system can be customize from a low precession for typical activity to an extremely high precession for atypical activity per individual. In other words, the system recognizes multiple users and the device has high sensitivity performance for some users and not others, for example children will not have access to adult material.

The invention is advantageous in that it provides a method and system for gesture operation on one or more display screens for one or more programs of one or more electronic devices, wherein every closure of all past display programs has customizable time for user to retrieve past desire program back on the one or more display screen to display.

The invention is advantageous in that it provides a method and system for gesture operation on one or more display screens for one or more programs of one or more electronic devices, wherein every past gesture performed by the one or more touch points can be undone in an orderly manner.

The invention is advantageous in that it provides a method and system for displaying contents, programs responses and generated sideline operations on one or more display screens for one or more programs of one or more electronic devices, wherein every past displaying contents, program response and generated sideline performed by said past gesture on the one or more touch points can be undone in an orderly manner.

The invention is advantageous in that it provides a method and system for gesture and sideline operation on one or more display screens for one or more programs of one or more electronic devices, wherein one or more past programs split by one or more sideline elements, adjusted by one or more adjuster interfaces and performed by one or more touch points, can be undone in a sequentially orderly display manner.

The invention is advantageous in that it provides a method and system for gesture operation on one or more display screens for one or more programs of one or more electronic devices, wherein the adjuster module has time customizable options on one or more adjuster interface through the adjuster, with one or more graduations, one or more adjuster indicators, one or more numeric indicators, and one or more adjuster indicators.

The invention is advantageous in that it provides a method and system for gesture and sideline operation on one or more display screens for one or more programs of one or more electronic devices, wherein one or more pop-up sideline elements, one or more notifications and one or more menu options in the one or more pop-up sideline elements have time customizable options for display.

The invention is advantageous in that it provides a method and system for gesture and sideline operation on one or more display screens for one or more programs of one or more electronic devices, wherein one or more reservation sidelines providing one or more reservation area boundaries have time customizable options for display to notify the user of current positions thereof.

The invention is advantageous in that it provides a method and system for gesture and sideline operation on one or more display screens for one or more programs of one or more electronic devices, wherein one or more reservation sidelines, one or more reservation areas, one or more sideline elements, and one or more pop-up sideline elements are re-adjusted accordingly when one or more programs are closed-out.

The invention is advantageous in that it provides a method and system for gesture and sideline operation on one or more display screens for one or more programs of one or more electronic devices, wherein one or more reservation sidelines, one or more reservation areas, one or more sideline elements, and/or one or more pop-up sideline elements are re-adjusted accordingly when one or more programs are selected for display or to close.

The invention is advantageous in that it provides a method and system for gesture and sideline operation on one or more display screens for one or more programs of one or more electronic devices, wherein one or more displaying contents split by the reservation sideline elements, one or more displaying contents of the reservation areas, one or more displaying contents split by said sideline elements, and/or one or more displaying contents split by the pop-up sideline elements are re-adjusted accordingly when one or more programs are selected for re-adjustment display.

The invention is advantageous in that it provides a method and system for gesture and sideline operation on one or more display screens for one or more programs of one or more electronic devices, wherein one or more reservation sidelines, one or more reservation areas, one or more sideline elements, and/or one or more pop-up sideline elements are re-adjusted accordingly when one or more past programs and or one or more past gestures are undone.

The invention is advantageous in that it provides a method and system for gesture and sideline operation on one or more display screens for one or more programs of one or more electronic devices, wherein one or more displaying contents of the reservation sidelines, one or more displaying contents of the reservation areas, one or more displaying contents split by said sideline elements, and/or one or more displaying contents of the pop-up sideline elements are re-adjusted accordingly when one or more past programs and or one or more past gesture are selected to be undone.

The invention is advantageous in that it provides a method and system for gesture and sideline operation on one or more display screens for one or more programs of one or more electronic devices, wherein one or more reservation sidelines, one or more reservation areas, one or more sideline elements, and/or one or more pop-up sideline elements are re-adjusted accordingly when one or more current displaying contents are adjusted by one or more adjusters.

The invention is advantageous in that it provides a method and system for gesture and sideline operation on one or more display screens for one or more programs of one or more electronic devices, wherein one or more past reservation sidelines, one or more past reservation areas, one or more past sideline elements, and/or one or more past pop-up sideline elements are re-adjusted accordingly when one or more past displaying contents adjusters are undone by one or more gestures.

The invention is advantageous in that it provides a method and system for gesture and sideline operation on one or more display screens for one or more programs of one or more electronic devices, wherein one or more interacting portions, one or more interacting programs, one or more keyboard element programs, on or more mouse and curser programs, one or more program dictionaries, one or more scrolling programs, one or more zooming programs, one or more state-off programs, one or more time tracker programs, one or more operating area programs, one or more gesture dictionaries, and one or more displaying content adjustment programs are re-adjusted accordingly when one or more current displaying contents are adjusted by one or more adjusters interface.

The invention is advantageous in that it provides a method and system for gesture and sideline operation on one or more display screens for one or more programs of one or more electronic devices, wherein one or more interacting portions, one or more interacting programs, one or more keyboard element programs, on or more mouse and curser programs, one or more program dictionaries, one or more scrolling programs, one or more zooming programs, one or more state-off programs, one or more time tracker programs, one or more operating area programs, one or more gesture dictionaries, one or more displaying content adjustment programs, and etc. are re-adjusted accordingly when one or more gestures to display a program are performed.

The invention is advantageous in that it provides a method and system for gesture and sideline operation on one or more display screens for one or more programs of one or more electronic devices, wherein the one or more past interacting portions, one or more past interacting programs, one or more past keyboard element programs, on or more past mouse and curser programs, one or more past program dictionaries, one or more past scrolling programs, one or more past zooming programs, one or more past state-off programs, one or more past time tracker programs, one or more past operating area programs, one or more past gesture dictionaries, and one or more past displaying content adjustment programs are re-adjusted accordingly when one or more past display program are undone by one or more gestures.

The invention is advantageous in that it provides a method and system for gesture and sideline operation on one or more display screens for one or more programs of one or more electronic devices, wherein one or more display screens displaying contents are rearranged when one or more programs are interchanged between one or more reservation areas, one or more sideline elements, or one or more pop-up sideline elements accordingly.

The invention is advantageous in that it provides a method and system for gesture operation on one or more display screens for one or more programs of one or more electronic devices, wherein one or more executive instructions are shared and processed with or without one or more processors of the one or more electronic devices.

The invention is advantageous in that it provides a method and system for gesture operation on one or more display screens for one or more programs of one or more electronic devices, wherein one or more executive instructions are shared and processed with or without one or more processors, within the internet, in private cloud servers, in public cloud servers, with the assistance or without the assistance of the internet of things (IOT) of the one or more electronic devices.

The invention is advantages in that it provides a method and system for multitask with Brain Computer Interfaces (BCI) devices for multitasking with sideline and gestures on a display screen 52, wherein the arrangement and organizational process for pairing gestures with programs, pairing gestures with gestures, pairing gestures with verbal commands, pairing gestures with optical/retinal inputting controls, and etc. are introduced. In other embodiments, one or two rigid processes for interfacing with an electronic devices without reaching optimal multitasking options are introduced. In addition, the invention further provides an organizational arrangement and interoperability flexibility of operating electronic devices without creating completely new technologies or without much deviating from existent current technologies like head control or eyeball movement control, and another technologies not mention but imply in the invention.

Additional advantages and features of the invention will become apparent from the description which follows and may be realized by means of the instrumentalities and combinations particular point out in the appended claims.

According to the present invention, the foregoing and other objectives and advantages are attained by a system for gesture operation on one or more display screens of at least one electronic device, which comprises computer executable instructions executed and processed by one or more display screens to perform various functions, actions and steps described in detail according to the preferred embodiments of the invention, wherein the term computer is intended to include any data processing device, such as stationary computers, AR/MR/XR/VR, counter-top computer, kiosk, slot machine, mechanical simulator, booth, server, mainframe computer, portable notebook computer, motion control programs, holographic sensor inputting, laptop, mobile smart device (phone), tablet, personal digital assistant, and/or Brain Computer Interface, extremities neuromuscular sensory inputting, optical motion control, retinal inputting control apparatus etc., or any other computer with touch surface screen or trackpad device able to process, manage, or transmit data, whether implemented with electrical, magnetic, optical, biological components or otherwise.

According to the present invention, the foregoing and other objects and advantages are attained by a system for gesture operation on one or more display screens, wherein the display screen components are not limited to sensory tactile. The display screen provides immediate sensory information back to the operator. It is possible to control nonstructural electronic devices with the used of cameras, camera sensors. laser/light guided sensors, hologram sensor, and projection medium sensor, wherein the nonstructural displays, screens or projections are generated immediate and therefore informing the operator as to the ongoing status in the program, or task, just like in the physical electronic devices.

Computer software is implemented in the system of the invention to fulfill the perceived objects and advantages described above. Such software commonly utilizes multiple related functions and data structures. To encapsulate these related functions and data structure, the software often, for example, utilizes a standard object oriented programming (OOP) language approach.

Furthermore, the implementation of the camera programs for additional analyzation of the gesture with the module of analyzable factors program, the artificial intelligence program and the object oriented programming (OOP) language on a touch screen with interoperability of other non-structured control mediums like, light hologram programs, light sensors controls programs, radio frequency programs, passive infrared detector programs, motion detector programs, or any other wireless sensor control synergistically digitized to interact with the camera program, the module of analyzable factors program, the artificial intelligence program, and the object orientation programming language (OOP).

Computer software and hardware are also implemented in the system of the invention to fulfill the perceived objects and advantages described above, such as built-in software emulators or Hypervisor, computer application programs APP emulators or Hypervisor, and/or build-in hardware emulators or Hypervisor including attachable or detachable emulators or Hypervisor that commonly utilize multiple related functions and data supported structures to encapsulate these related functions and data structure in the software and hardware, including any server emulator or server hypervisor. Where one or multiple programs may control and run at the same time, or in a timely manner on one or more display screens, with the same computer language or different computer languages.

The combination of software or hardware, detachable or attachable and or build-in emulator and/or hypervisor in any form or degree of one or of both (emulator/hypervisor) may also implemented in the system of the invention to fulfill the perceived objectives and advantages described above and/or any other similar interactive digital software and/or firmware system that provides a virtual machine and allows it to operate directly on underling hardware or software programs.

In accordance with one aspect of the invention, a system for gesture operation on one or more display screens of one or more electronic devices is provided, wherein the system comprises:

a computer usable medium having computer-readable program code embodied in the medium to perform executable operations, the computer-readable program code comprising:

a first executable portion for managing one or more adjusters for providing one or more adjusting operations of one or more displaying contents corresponding to one or more programs on the one or more display screens, wherein the first executable portion is operable to:

generate the one or more adjusters for adjusting notification of the one or more displaying contents corresponding to the one or more programs on the one or more display screens;

generate one or more adjuster indicators for adjusting the one or more displaying contents corresponding to the one or more programs that require a predetermined function on the one or more display screens; and allow one or more touch points to be moved along the one or more adjusters, each of which is an interface, for adjusting the one or more displaying contents corresponding to the one or more programs on the one or more display screens; and a second executable portion for analyzing one or more touch point information (module of analyzable factors) and retrieving one or more display screen information from the one or more display screens and controlling the one or more adjusters generated based on the one or more touch point information for displaying on the one or more di splay screens.

According to the one or more preferred embodiments of the present invention, the display screen can be a touch screen such as tablet or monitor, a projecting display screen from a projector, a display screen of an AR/MR/XR/VR apparatus such as glasses or goggles, or holographic projection.

Furthermore, the display screen can interface with other technologies, like Brain Computer Interface (BCI) electrical impulses sensor inputting, human extremities neuromuscular electrical impulses sensor inputting, voice command programs, eyeball movement inputting, head motion control inputting, retinal control inputting, and etc.

In one embodiment, the first executable portion is further operable to generate the one or more adjusters for controlling and customizing one or more gestures, the one or more programs, and/or one or more sideline elements that are dependent on the location, pressure, thickness, acceleration, time, right or left hand, direction, angle, size, and interruptions, by one or more touch points on the one or more display screens, at the same time or in a timely manner, as a function of the one or more programs on the one or more display screens.

In one embodiment, the computer-readable program code of the computer usable medium further comprises:

a third executable portion for designating one or more sideline elements on the one or more display screens, wherein the one or more sideline elements divide the one or more display screens into two or more portions, wherein if the one or more touch points are positioned at the one or more sideline elements, the one or more adjusters are generated at the one or more sideline elements for controlling movement of the one or more sideline elements on the one or more display screens.

In one embodiment, the third executable portion is configured for designating one or more sideline element programs to separate one or more of gesture program, keyboard program, trackpad program, mouse program, state-off program, and cursor program, wherein the one or more sideline element programs divide the one or more display screens into two or more displaying portions on one or more display screens.

The third executable portion interchanges information with the first, second and fourth executable portions, wherein if the one or more touch points are a gesture for adjusting and are positioned at the one or more sideline elements, the one or more adjusters are generated at the one or more sideline elements for controlling movement of the one or more sideline elements, and the displaying contents generated by the fourth executable portion.

In one embodiment, the second executable portion is configured for analyzing the one or more touch point information, including location, pressure, thickness, acceleration, time, right or left hand, direction, angle, size, and interruptions, by one or more touch points on the one or more display screens, at the same time or in a timely manner (aka the module of analyzable factors), in relation to one or more gestures.

In one embodiment, the second executable portion further comprises of an artificial intelligence module to provide information for customization for editing, to not duplicated a current gesture with a past gesture, and to be able to have similar looking gestures with different module of analyzable factors for every different program.

In one embodiment, the second executable portion further comprises of an artificial intelligence module to acquire information from the module of analyzable factors, from the displaying contents, from the interacting portions, from the sideline elements, from the display programs, and from the past algorithm activities for anticipation and assistance with customarily inputting, and to detect atypical gesture performance and programs interactions selection.

In one embodiment, the second executable portion further comprises of a distance tracker module to provide information of the distance of one or more touch points from one or both hands, in one or more display portions, in one or more displaying contents, and to interacting with the module of analyzable factor and the artificial intelligence module with the first executable portion, the third executable and the fourth executable portion, wherein the information is received thereafter generates a function accordingly.

In one embodiment, the first executable portion further allows the one or more touch points to be moved along the one or more adjusters for adjusting one or more customizable location, pressure, thickness, acceleration, time, right or left hand, direction, angle, size, and interruptions, by one or more touch points on the one or more display screens, at the same time or in a timely manner, corresponding to the one or more programs, corresponding to the one or more programs, on one or more sideline elements through one or more gestures corresponding to customization.

In one embodiment, the first executable portion further allows the one or more touch points to be moved within one or more sideline elements containing one or more adjusters for adjusting on one or more sideline elements to split one or more programs according to one or more gestures.

In one embodiment, the first executable portion is operable to generate one or more graduations for indicating a total range of the displaying content, wherein the one or more graduations are attached corresponding to one or more adjusters, in order to provide the total available adjustable state of each of the displaying contents on display corresponding to the one or more display screens.

In one embodiment, the first executable portion is operable to generate one or more adjuster indicators indicated the current status of the displaying content, wherein the one or more graduations are highlighted corresponding to the touch point movement and the status of the displaying contents to one or more adjusters.

In one embodiment, the first executable portion is operable to generate one or more graduations for indicating a state of displaying content, wherein the one or more graduations are attached corresponding to one or more adjusters, in order to provide the available adjustable state of each of the displaying contents on display corresponding to the one or more display screens, and/or the total current field of display minus the available adjustable state of each of the displaying contents not being displayed corresponding to the one or more display screens.

In one embodiment, the first executable portion is operable to generate one or more numeric indicator with or without graduation or adjuster indicators, wherein a total percentage of the non-displaying content is numerically labeled and/or the total current field of display minus the available adjustable state of each of the displaying contents not being displayed corresponding to the one or more display screens, in order to inform the total available adjustable state of each of the displaying contents on display corresponding to the one or more display screens.

In one embodiment, the first executable portion is operable to generate one or more pressure indicator to indicate a selected displaying content, wherein the one or more superimposed displays contents are stacked on top of each other, for example the touch pressure point with the lightest pressure reflects that the gesture is intended for the most superficial displaying content and the hardest touch pressure points is intended for the deepest displaying contents. Furthermore, the pressure indicator is highlighted corresponding to the touch pressure point produced by the user and, additionally, similar gestures can be produced with different pressures to differentiate from different selected functions.

In one embodiment, the computer-readable program code of the computer usable medium further comprises a fourth execution portion for designating one or more programs on one or more interacting portions on the one or more display screens, wherein the one or more interacting portions interact with the one or more programs displayed on the one or more display screens, wherein when the one or more interacting portions are activated, the one or more interacting portions are superimposed or displayed on the one or more display screens according to one or more positions of the one or more touch points acquired from the second executable portion.

In one embodiment, the one or more interacting portions of the fourth executable portion includes a keyboard portion, a pad portion, a mouse portion, a state-off portion, a cursor portion, and a gesture operation portion, wherein the keyboard portion, the pad portion, the mouse portion, the curser portion, and the state-off portion are able to display together and interchange with each other, wherein the state-off portion superimposes on the other interacting portions when the state-off program is triggered and activated, the state-off portion provides superimposed gesture operational capacity so as to prevent erroneous inputting while the user is operating or handling the electronic device on a mobile surface, wherein the state-off portion will lock most gesture operations.

In one embodiment, the fourth executable portion further comprises a gesture list dictionary for selection from one or more gestures options with the one or more touch points of information, where one or more gestures, independently or in combination, have the one or more touch point information based on the module of analyzable factors of information from the second executable portion.

In one embodiment, the fourth executable portion further comprises a program list dictionary for selection from numerous program options to pair with the one or more touch point information, where one or more gestures, independently or in combination, have the one or more touch point information based on the module of analyzable factors of information from the second executable portion.

In one embodiment, the fourth executable portion further comprises a program list dictionary for selected programs and gestures paired together, which is verified by the artificial intelligence to produce and to generate the correct response from one or more touch points of information, where one or more gestures, independently or in combination, have been physically performed on the touch screen in the process of pairing a program with a gesture together and customized by the user to provide distinguishable information based on the module of analyzable factors, wherein the information is learned and stored after the information has been analyzed of no duplication of the touch points performances for similar gesture and pair with different programs together once being verified by the artificial intelligence from the second executable portion.

In one embodiment, the fourth executable portion further comprises a program list dictionary for selected programs and gestures paired together, which is verified by the artificial intelligence in the Brain Computer Interface to produce and to generate the correct response from one or more touch points of information, wherein one or more gestures, independently or in combination, have been physically performed or imagined on the touch screen or on a projection medium display in the process of pairing a program with a gesture together and customized by the user to provide distinguishable information based on the module of analyzable factors, wherein the information is learned and stored after the information has been analyzed of no duplication of the touch point performances or imagined for similar gesture and pair with different programs together once being verified by the artificial intelligence from the second executable portion or by the artificial intelligence in the Brian Computer Interface.

The touch points performance is analyzed by the second executable portion from the first touch point to the end of last touch point in the pairing with a program and in the operations of the electronic device. For example, a vertical line gesture may be done by touching the screen and moving the touch point upwards or downwards with or without interruptions of releasing contact with the touch screen, with one finger or with more than one finger for thickness, with a small distances or a large distance, in a specific location or general location, with pressure or without pressure, with acceleration or without acceleration, with direction north, south, east, west, in a short time or in a long time, with angels or no angels, a smaller size, by the right fingers or the left fingers, or in a larger size at the same time or in a timely manner.

Additionally, the distance tracker module in the second executable portion analyzes a distance of the touch points. For example, two touch points at the same time with a distance of greater than 10 inches is customized as a two hand touch point for the gesture. This type of gesture information is shared with module of analyzable factors that it is ideal for pairing with a program that interferes with other programs like the state-off program superimposed on a running program. This gesture is difficult to be recreated with a single hand. For example, the gesture is produced with two hands, at the same time, two 5 finger touch points (thickness), at opposite corner (locations), 10 inches or greater (distance), wherein other module of analyzable factors are also analyze like no angle, no interruption, no direction, no acceleration, no pressure.

In one embodiment, the fourth executable portion further comprises a program and gesture pair information, wherein the information is run by the module of analyzable factors and the distance tracker module in the second executable portion.

In one embodiment, the second executable portion further comprises an artificial intelligence module to provide information, for customization for editing and to not duplicated a current gesture with a past gesture, to be able to have similar looking gestures with different module of analyzable factors for every different program pair selected from the numerous program dictionary options in the fourth executable portion.

In one embodiment, once the information from the fourth executable portion and the user personal customization of the one or more touch point information is established as one or more recognizable gestures, they are analyzed by the artificial intelligence module to learns, records, and delivers anticipating actions to the processor of the electronic device or the processor in the cloud.

In one embodiment, once the information from the fourth executable portion and the user personal customization of the one or more imagined touch point information is established as one or more recognizable gestures, they are analyzed by the artificial intelligence in the Brain Computer Interface module to learns, records, and delivers anticipating actions to the processor of the electronic device or the processor in the cloud.

In one embodiment, the second executable portion further comprises a contact area on the one or more display screens corresponding to the one or more touch point information, which is run by the module of analyzable factors recorded by the artificial intelligence module, processed by the processor, delivered to the first executable portion for adjustment, and separated by the third executable portion with the on one or more sideline elements corresponding to one or more programs from the fourth executable portion on the one or more display screens.

In one embodiment, after the gesture operation portion is activated, the second execution portion and the third executable portion monitor the operation area in the fourth executable portion, wherein if a position of a touch point is out of the operation area, the fourth execution portion re-designates the operation area to the position of the touch point so that the operation area is able to follow the movement of the touch point of each gesture or gestures.

In one embodiment, the second executable portion further comprises a time module tracker for analyzing, editing and customizing a desire time performance of each gesture. In other words, a time of contact from the one or more touch points, a time between a first point of contact and a second point of contact with one or more interruptions, up to the last touch point of contact on the one or more display screens, as selected from the gesture list dictionary for a particular program are utilized for customizing the time of similar gestures with different time performances to pair with different programs.

Furthermore, the same example provided for the time module tracker in the module of analyzable factors can be implemented for operations of the programs and functions in the electronic device, wherein all other module of analyzable factors have time criteria's and characteristic for differentiation of one or more touch points. For example, distance from one or more touch points can be edited and customized at a desire performance of each gesture. In other word, distance from one or more touch points between a first point of contact and the second point of contact point of contact with one or more interruptions, up to the last touch point of contact on the one or more display screen, are selected and performed in the process of pairing said gesture with said program.

In one embodiment, the second executable portion further comprises an adjuster interface control for time for customizing a desire time performance, wherein the adjuster interface control can be generated for any of the other module of analyzable factors in the process of customization of a gesture. For example, the time of contact from the one or more touch points, the time between first point of contact and the second point of contact with one or more interruptions up to the last touch point of contact on the one or more display screens, as selected from the gesture list dictionary with a particular program from the program list, for customizing the time of similar gestures with different times to pair with different programs and where the adjuster interface is used for said customization. The adjuster interface characteristics and criteria can also be applied to all of the other module of analyzable factors, where the totality characteristic and criteria of the module of analyzable factors is to distinguish similar gestures and to produce scalable gesture controls different from other similar gestures.

It is important to mention that the personalize gesture controls are portable and the user can download the gesture controls on to other communal electronic device with the used smartphone device, computer app, or other similar devices, for interfacing within the internet, cloud network private or public servers, wherein the selected biological biometric, the selected serious of symbols, the selected letters, and the selected numbers and or the selected gestures, of any combination, are the identification markers.

Furthermore, the communal electronic devices can have costume build-in gestures for communal electronic devices usage, where the gestures cannot be customized nor recorded in the build-in communal gesture controls and where the user has the option to interface with the communal electronic device to download the users personal gesture programs for operating the communal electronic devices.

It is important to mention that the adjuster interface is not limited to controlling gestures and displaying contents. The adjuster interface may also control programs and functions of a program like volume and brightness, additionally the adjuster interface can be used to control sideline elements while operating multiple programs running at the same time.

In one embodiment, the adjuster further comprises a first end, a second end and an adjuster body, wherein the first end and the second end are positioned at two opposing ends of the adjuster body respectively, wherein the second executable portion obtains one or more touch points controlling with an adjuster interface in the adjuster, in relation to the positions of the one or more touch points on the one or more display screens to adjust the displaying contents, of the one or more touch points on the one or more sideline elements to adjust the one or more sideline elements, and of the one or more touch points on each of the one or more display screens to customize the time on one or more gestures with a program from the program dictionary in the fourth executable portion.

In one embodiment, the second executable portion further comprises an adjuster interface, a numeric indicator and an adjuster display to be customized anywhere throughout one or more display screen pre-selected locations, for example at a top or a bottom of a touch point, on the sideline element, at a horizontal, vertical, oblique, an angle, or parallel to the displaying contents, with customizable size, color, watermark style, time of display, font and etc.

In one embodiment, the computer usable medium having the computer-readable program code is embodied to perform executable operations, the third executable portion of the computer-readable program code further designating one or more split programs for separating one or more programs with the one or more sideline elements on the one or more display screens, wherein the one or more sideline elements may further divide a display area of one of the one or more display screens into two or more portions, wherein if the one or more touch points are positioned over one or more split programs divided by a visual boundary, where one or more adjuster interfaces are generated on one or more split programs, providing the user the percentage of the hidden program or the percentage of the current display on one or more display screens.

In one embodiment, the computer usable medium having the computer-readable program code is embodied to perform executable operations, and the third executable portion of the computer-readable program code further designates one or more split programs for separating one or more programs with the one or more sideline elements on the one or more display screens, wherein the one or more sideline elements may further divide a display area of one of the one or more display screens into two or more portions, wherein if the one or more touch points are positioned over one or more split programs divided by a visual boundary, where one or more gestures can generate a different response on one or more split programs, one or more sideline elements with specialized programs like the reservation sideline element, the pop-up sideline element, and each with its own customizable color, thickness, symbol, design add texture.

In the third executable portion for designating of one or more sidelines elements on the one more display screen, the one or more sideline elements are configured for dividing the one or more programs on the one or more display screens into two or more portions like a reservation area, wherein the selected programs are reserved at a lesser scale while maintaining full operation, and with a gesture, the user can return them to full size or closure, wherein the one or more touch points can be positioned over one or more sideline reservation areas independently or dependently on the sideline element for controlling the movements of the one or more sideline elements and the one or more split programs.

In one embodiment, the fourth executable portion generates the one or more adjuster interface programs within the one or more sideline elements of the third executable portion for controlling the movement of one or more sideline elements.

In one embodiment, the first executable portion generates the one or more adjuster interfaces within the one or more programs divided by one or more sideline elements of the third executable portion for controlling the magnification of one or more displaying contents.

In one embodiment, the third execution portion is configured to provide one or more reservation areas on the one or more display screens, the one or more reservation areas are configured for positioning at edges of the one or more display screens, wherein the one or more sideline elements that reserve the one or more programs are known as reservation sidelines, with the edges of the one or more display screens produce one or more reservation areas, wherein the programs are positioned for organization and can be returned to a main screen display.

In one embodiment, the system allows the user to select from multiple inputting apparatus for pairing a gesture with a program or a program function divided by the sideline for multitasking on a physical device or through a sensory nonphysical display medium.

In one embodiment, the system allows the user to select from various gestures for pairing with a program or a program function divided by the sideline for multitasking on a physical device or through a sensory nonphysical display medium.

In one embodiment, the system allows the user to select the electronic device in combination with other inputting apparatus to provide gesture signal acquisition to pair a performed or imagining gesture with a program or a program function with or without the sideline for multitasking on a physical device or through a sensory nonphysical display medium.

In one embodiment, the system allows the user to select the infrared camera for sign language recognition, to paired a gesture with a program or a program function with or without the sideline for multitasking on a physical device or through a sensory non physical display medium.

In one embodiment, the system allows the user to select the Brain Computer Interface (BCI) with the (EMG) or with the (EEG/EcoG) signal acquisition to pair a performed or imagining gesture with a program or a program function with or without the sideline for multitasking on a physical device or through a sensory nonphysical display medium.

In one embodiment, the system allows the user to select more than one Brain Computer Interfaces (BCI) for the (EMG) or for the (EEG/EcoG) signal acquisition to pair a performed or imagining gesture with a program or a program function with or without the sideline for multitasking on a physical device or through a sensory nonphysical display medium.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 3 is a schematic view illustrating the portions of the cloud server for operating one or more gestures on one or more display screens according to the above preferred embodiment of the present invention.

FIG. 7 is a schematic view illustrating portion of a gesture dictionary of various gestures for operating the programs of the electronic device according to the above preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
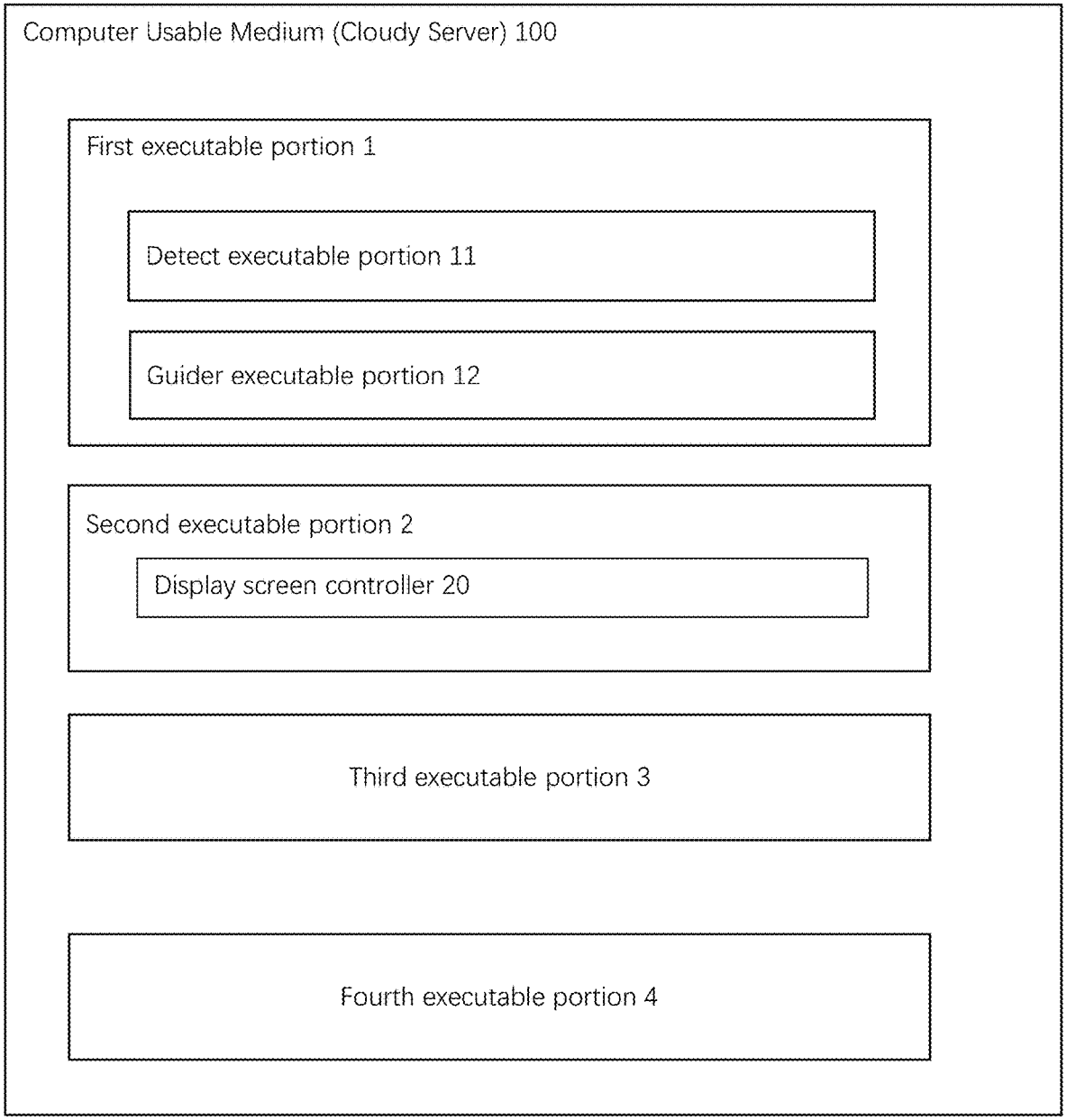
FIG. 1 is a schematic view of the computer usable medium illustrating portions of the cloud server for operating one or more gestures on one or more display screens according to a preferred embodiment of the present invention.
Figure 2:
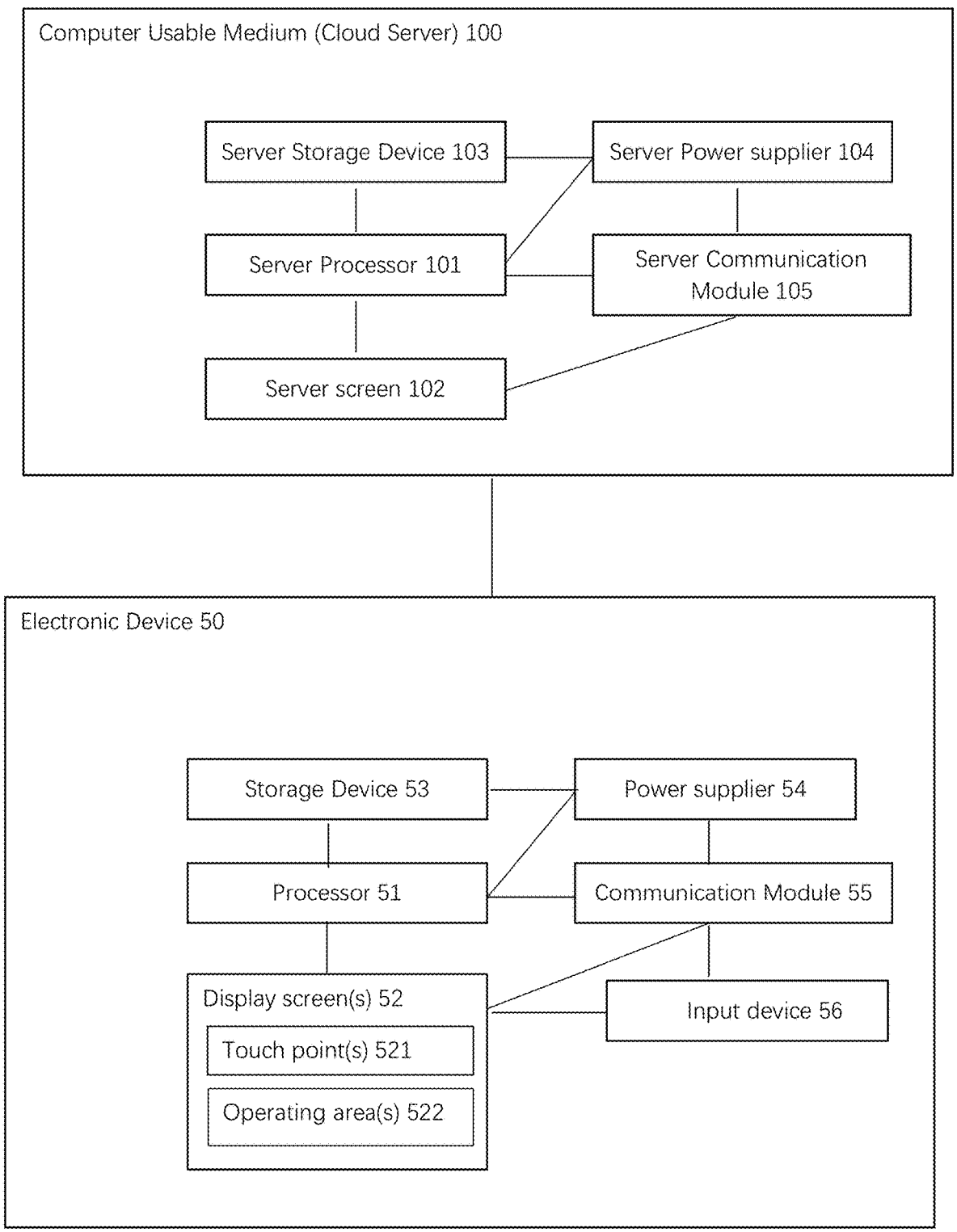
FIG. 2 is a schematic view illustrating the system of the computer usable medium for operating one or more gesture on one or more display screens and the electronic device according to the above preferred embodiment of the present invention.

Referring to FIGS. 1 to 3, a preferred embodiment of the present invention is illustrated. A cloud server comprising at least a computer usable medium 100 is communicatively connected with one or more electronic devices 50 such as, but not limited to, computer, stationary computer, notebook computer, smart device, tablet, and/or VR, MX, XR, or AR apparatus. According to the preferred embodiment of the present invention, the display screen 52 can be a touch screen such as tablet or monitor, a display medium, a projected screen from a projector, a screen of a VR/MR/XR/AR glasses or goggles, or holographic projection, which is supported by programs, camera, light/hologram sensors, projection, hand finger software detection program, and radio motion sensors to detect and response accordingly to hand(s) or finger(s) movement of the user touching on the physical touch screen, or through a virtual display screen, sensors control projections, and/or motion sensors.

The electronic device 50 comprises one or more display screens 52 each configured to be operated by one or more gestures, wherein each gesture produces one or more touch points 521 to operate one or more programs which can be divided by one or more sideline elements 31. The computer usable medium 100 having computer-readable program code to perform executable operations, wherein the computer-readable program code comprises at least a first executable portion 1, second executable portion 2, third executable portion 3, and a fourth executable portion 4.

In the preferred embodiment, referring to FIGS. 1 and 2, the electronic device 50 comprises a processor 51, one or more display screens 52, a storage device 53, a communication module 55, and a power supplier 54. The power supplier 54 is electronically connected with the processor 51, the one or more display screens 52, the storage device 53, and the communication module 55 commutatively. The power supplier 54 is arranged for supplying electrical power to the process 51, the one or more display screens 52, the storage device 53, and the communication module 55. The processor 51 is communicatively connected with the one or more display screens 52, the storage device 53, the communication module 55 and the power supplier 54. The processor 51 arranges one or more adjusters 13 configured to selectively display on the one or more display screens 52, so that the one or more adjusters 13 are able to assist the operation on the one or more display screens 52. The communication module 55 is communicatively connected with the second executable portion 2. The one or more display screens 52 detect an operation information such as a touch of a finger of a user thereon, a touch point 521 corresponding to the operation information is detected on the corresponding display screen 52 through the communication module 55 and sent to the second executable portion 2 which comprises a display screen controller 22 configured to analyze the operation information regarding the touch point 521. Therefore, one or more predetermined touch points 521 configured a gesture of the user on the display screen to control the one or more programs to operate the electronic device 50.

The communication module 55 is communicatively connected with the one or more display screens 52 and the one or more display screens 52 are interacted with the second executable porting 2 to display and generate corresponding programs as the interfacing and inputting changes from the touch points 521 and are analyzed by the second executable portion 2 based on one or more display adjustment from the first executable portion 1 of the one or more display screens 52. The one or more display screens 52 are interacted with the second executable portion 2 for analyzing the touch points 521 (gestures) from one or more portions on the one or more display screens 52. The one or more display screens 52 are interacted with the first executable portion 1 to adjust the displaying contents on one or more displaying portions 523 of the one or more display screens 52. The one or more display screen 52 are interacted with the third executable portion 3 to provide all the sideline elements 31 available for the user on one or more displaying portions 523 of the one or more display screens 52.

In other words, for example, the electronic device 50 can be a stationary device such as a desktop computer, slot machine, kiosk, or a portable device such as a notebook computer, a tablet computer, a smart device such as a mobile phone, a PDA, or the like, and etc., that comprises the computer usable medium 100 programmed with the computer-readable program code. Alternatively, the computer usable medium 100 is a cloud server having the computer-readable program code that the electronic device 50 is communicating with the cloud server (computer usable medium) 100 through the communication module 55 of the electronic device 50 wirely or wirelessly through, for example, Internet, cloud servers (private or public), quantum computing, 5G, internet of things (IOT), satellite communication, or other wireless communication network.

It is worth mentioning that the electronic device 50 may or may not have a physical processor 51, wherein in the event it does not have a physical processor 51, the server processor in the cloud server 100 will carry out the functions of computing mentioned in this invention.

It is appreciated that the display screen 52 is not limited to a resistance type or capacitance type LCD or LED panel, but also defines any viewable display screen, including but not limited to, projecting screen for projector, virtual screen of virtual reality (VR) headset or goggles, augmented screen of augmented reality (AR) glasses or goggles, mix reality (MR) glasses or goggles, or the likes of extended reality (XR), which is supported by programs and sensors to detect and response accordingly to the hand(s) or finger(s) movement of the user touching with the physical or virtual display screen, or through a virtual display screen, sensor control projections, or motion sensors.

Referring to FIG. 3, the first executable portion 1 is configured for managing the one or more adjusters 13 for providing one or more adjusting operations of one or more displaying contents corresponding to one or more programs on the one or more display screens 52. The first executable portion 1 is operable to generate one or more adjusters 13 adjusting the one or more displaying contents corresponding to the one or more programs on the one or more display screens 52, generate one or more adjuster indicators 14 for adjusting the one or more displaying contents corresponding to the one or more programs on the one or more display screens 52 and a pressure indicator 15 at each adjuster indicator 14 on each touch point 521 to illustrate the touching pressure applied the display screen 521, and allow the one or more touch points 521 to be moved along the one or more adjusters 13 for adjusting the one or more displaying contents corresponding to the one or more programs on the one or more display screens 52.

The first executable portion 1 comprises a detection executable portion 11 configured to control display adjustments and generate the one or more adjusters 13 according to the operation information received from the second executable portion 2, the third executable portion 3, and the fourth executable portion 4. Furthermore, the first executable portion 1 further comprises a guider executable portion 12 configured to generate one or more graduations 120 with respect to the one or more adjusters 13 respectively. According to each of the graduations 120, on the corresponding adjuster 13, the graduation 120 provides a precise guide for controlling the one or more displaying contents, one or more split programs, one or more sideline elements 31, one or more reservation sideline element 32, one or more reservation areas 33, and a time frame of each of the one or more programs on the one or more display screen 52.

According to the preferred embodiment, the detection executable portion 11 of the first executable portion may also be operable to generate at least a numeric indicator 16 illuminating as a watermark where the value is a percentage of the current viewing page and or a percentage of the hidden area, wherein the user customizes the numeric indicator 16 for size, time, color, location and type of pages or programs. It is worth mentioning that the adjusters 13 and the numeric indicator 16 have time customizable delivery in conjunction to pre-program screen display locations.

The second executable portion 2 is configured for analyzing one or more touch point information, such as module of analyzable factors 26 including location, pressure, thickness, acceleration, time, right or left hand, one hand or both hands, direction, angle, size, interruptions, and etc., and retrieving one or more display screen information from one or more operating areas 522 of the one or more display screens 52 or on one or more displaying portions 523 of the one or more display screens 52, wherein the one or more adjusters 13 are generated based on the one or more touch point information. The second executable portion 2 is operable to control the one or more adjusters 13 for displaying on the one or more operational areas 522 of the one or more display screens 52 or on the one or more displaying portions 523 of the one or more display screens 52.

The second executable portion 2 is also configured for analyzing one or more touch point information, including but not limited to module of analyzable factors 26 (location, pressure, thickness, acceleration, time, right or left hand, direction, angle, size, and interruptions) by one or more touch points 521 on the one or more display screens, at the same time or in a timely manner.

In addition, one or more sidelines 31 are generated based on the one or more touch points information, wherein the second executable portion 2 is operable to control the one or more sidelines 31 for dividing on the one or more operational areas 522 of the one or more display screens 52 or the one or more displaying portions 523 of the one or more display screens 52.

Further, one or more programs are generated based on the one or more touch point information, wherein the second executable portion 2 is operable to control the one or more programs divided by the one or more sidelines 31, on the one or more operational areas 522 of the one or more display screens 52 or on the one or more displaying portions 523 of the one or more display screens 52.

The third executable portion 3 is operable to designate one or more sideline elements 31 on the one or more display screens 52, wherein the sideline element 31 is arranged to divide the corresponding display screen 52 into two or more portions allowing the original displayed program to be displayed and controlled in one portion of the two or more portions and one or more additional programs to be displayed and controlled in another portion of the one or more portions on the respective display screen 52, wherein if the one or more touch points 521 are positioned at the one or more sideline elements 31, the one or more adjusters 13 are generated at the one or more sideline elements 31 for controlling movement of the one or more sideline elements 31. Also, if the one or more touch points 521 are positioned at one or more programs split by the one or more sideline elements 31, the one or more adjusters 13 are generated for controlling a size of the displaying content on the displaying electronic device 50 and/or within the VR/MR/XR/AR apparatus.

According to the preferred embodiment, the one or more sideline elements 31 generated by the third executable portion 3 is for adjusting one or more reservation areas 33 on the one or more display screens 52, wherein the one or more reservation areas 33 are configured at one or more edges of the one or more display screens 52, wherein the one or more sideline elements 31 and the one or more programs of the fourth executable portion 4 are moved from center stage to the edge into the one or more reservation areas 33 while the third executable portion 3 controls the movements of the one or more sideline elements 31 providing the additional displaying area of one or more additional programs.

The third executable portion is also operable to designate one or more programs to be separated with one or more sideline elements 31 on the one or more display screens 52, wherein each of the one or more sideline elements 31 further divides a surface area of the corresponding display screen 52 into two or more portions for one or more programs displayed respectively, wherein each of the programs displayed in the divided portion of the display screen 52 is referred as a split program. Further, when the one or more touch points are positioned over one or more split programs divided by the sideline element 31 which may be shown on the display screen 52 as a visual boundary, the one or more adjuster interfaces 21 are generated on the one or more split programs to provide the user a percentage of hidden program or a percentage of the current display on the one or more display screens 52.

According to the preferred embodiment, the one or more interacting portions 41 include a keyboard portion, a pad portion, a mouse portion, a cursor portion, a gesture dictionary portion, a zooming portion, a scrolling portion, an off state element portion, and a gesture operation portion, wherein all the interacting portions 41 and/or interacting element programs 42 of the fourth executable portion 4 are able to switched between each another and with other programmable elements, wherein all the gestures on the gesture dictionary 402 are scalable while the programs for joining the gestures are also scalable. Further, each of the interacting portions 41 is a state-off portion, when a state-off program is triggered, the interacting portion 41 provides gesture operations. When the state-off portion is in a lock option, the state-off has limited gesture options. Further, the interacting programs 42 and the interacting portions 41 can be superimposed by the state-off program 48, wherein when the state-off program 48 is triggered, the one or more interacting portions 41 and the one or more interacting programs 42 are provided with additional gesture capacity, and that when the state-off program 48 is in the lock option, the state-off program has limited for any gesture option. It is worth mentioning that the superimposed state-off program 48 does not re-adjust the displaying contents.

The fourth executable portion 4 is operable to designate one or more programs on one or more interacting portions 41 on the one or more display screens 52, wherein the one or more interacting portions 41 interact with the one or more programs displayed on the one or more display screens, wherein when the one or more interacting portions 41 are activated, the one or more interacting portions 41 are superimposed or displayed on the one or more display screens 52 according to one or more positions of the one or more touch points 521 acquired from the second executable portion 2.

In addition, when the one or more interacting programs 42 are activated, the one or more interaction programs 42 may be superimposed or displayed on the one or more display screens 52 according to one or more positions of the one or more touch points 521 acquired from the second executable portion 2.

According to the preferred embodiment, the fourth executable portion 4 further provides a gesture dictionary 402 and a program dictionary 45 in combination with the gesture dictionary 402. The gesture dictionary 402 is arranged for customizing a gesture operation with a program according to the information of the module of analyzable factors 26 for the one or more touch points 521, wherein each gesture is selected from the gesture dictionary 402 and matched with a selected function of a program or set program function to enable the user to control the respective program by implementing the selected function through the one or more gestures. The program dictionary 45 is arranged in combination with the gesture dictionary 402 for pairing the one or more gestures with a selected program, according to a paired information delivered to the respective display screen 52 for personal and customizing re-production of the gesture, wherein once the gesture is customized, the artificial intelligence module 25 records, learns and delivers the information to the processor 51 or a server processor 101 of the cloud server 100 where the processer delivers the information to the one or more display screens 52 for display. It is worth mentioning that the cloud server may also deliver the information to the one or more display screens 52 for display.

According to the preferred embodiment, the third executable portion 3 generates one or more pop-up sideline elements 37 for providing immediate superimposed alerts and menu options on the one or more reservation areas 33 on the one or more display screens 52, wherein the one or more pop-up sideline elements 37 and the one or more programs of the fourth executable portion 4 are acquired from in relation to the available menu program options from the fourth executive portion 4, wherein the third executable portion 3 controls the customization of the one or more pop-up sideline elements 37 providing the alerts and computer menu selection displaying while superimposed of one or more additional programs.

In other words, according to a preferred embodiment, the present invention provides a system for gesture operating on one or more interactive portions 41 of one or more display screens 52 of an electronic device, comprising:

the computer usable cloud medium 100 having computer-readable program code to perform executable operations, the computer-readable program code comprising:

the first executable portion 1 for managing the one or more adjusters 13 for providing one or more adjusting operation of the one or more displaying contents corresponding to the one or more programs on the one or more display screens 52, wherein the first executable portion 1 is operable to:

generate the one or more adjusters 13 for adjusting the one or more displaying contents corresponding to the one or more programs on the one or more display screens 52; and generate the one or more adjuster indicators 14 for notifying of the current status of the one or more displaying contents and/or program function corresponding to the one or more programs that require a predetermined function such as zooming on the one or more display screens 52;

allow the one or more touch points 521 to be moved along one or more adjuster interfaces 21 for adjusting the one or more displaying contents corresponding to the one or more programs on the one or more display screens 52; and a second executable portion 2 for analyzing the one or more touch point information, retrieving the one or more display screen information from the one of more display screens 52, and controlling the one or more adjusters 13 and the adjuster interface 21 generated based on the one or more touch point information for controlling on the one or more display screens 52.

The first executable portion 1 is configured for analyzing the one or more touch point information, retrieving the one or more touch point information from the one or more display screens 52 and/or from one or more interacting portions 41, and displaying the one or more adjusters 13 generated based on the one or more touch point information for displaying on the one or more display screens 52.

According to the preferred embodiment, the first executable portion 1 is further operable to generate the one or more adjusters 13 on display for customizing one or more gestures and the one or more sideline elements 31 that can be dependent on time as a function of the one or more programs on the one or more display screens 52 and allow the one or more touch points 521 to be moved along the one or more adjuster interfaces 21 for adjusting one or more time-dependent contents corresponding to the one or more programs on the one or more display screen 52. Also, the second executable portion 2 is also operable to allow the one or more touch points 521 to be moved along the one or more adjuster interfaces 21 for controlling the one or more sideline elements 31 corresponding to the one or more programs from the fourth executable portion 4 on the one or more display screens 52.

According to the preferred embodiment, the second executable portion 2 is operable to analyze the one or more touch points 521 including, but not limited to, a location, a thickness, a pressure, a size, an acceleration, a time, and a direction of each of the one or more touch points 521. The second executable portion 2 is also operable to analyze whether the one or more touch points 521 on the one or more display screens 52 are operated by a right or left hand of the user, the angle of the touching finger of the user, and interruptions of the touching of the user's finger. The analyzed information is retrieved from the one or more programs on the one or more display screens 52, wherein the one or more adjuster interfaces 21 are generated base on the information analyzed by the display screen controller 22 and deliver to the first executable portion 1 to display and to adjust the displaying contents 212 with the one or more adjuster interfaces 21 for controlling the size of each of the one or more displaying contents on the one or more display screens 52 from the second executive portion 2. Also, the information may be recorded and verified by the artificial intelligence 25 and the informational is further analyzed by the display screen controller 22 and delivered to the first executable portion 1 to display and to adjust the displaying contents 212 with the one or more adjuster interfaces 21 for controlling the size and program function of each of the one or more displaying contents on the one or more display screens 52 from the second executive portion 2.

It is worth mentioning that the artificial intelligence 25 in the controller module 20 is a module configured to learn, store and verify various activities of the one or more touch points 521 from the one or more display screens 52, the sideline module 30, the adjuster module 10, and the interacting module 40, wherein the gesture actions are anticipated and therefore the artificial intelligence 25 may deliver customary sequential customary information to the display screen control 22 as a form of assistance of the artificial intelligence module 25.

According to the preferred embodiment, the analyzed information is also retrieved from the one or more sideline elements 31 on the one or more display screens 52, wherein the one or more adjuster interfaces 21 are generated base on the information analyzed by the display screen controller 22 and delivered to the first executable portion 10 to initiate and adjust the display with the one or more adjuster interfaces 21 for controlling the one or more sideline elements 31 for the controlling movements of the sideline elements 31 corresponding to the one or more programs on the one or more display screens 52 with inputting of one or more touch points 521.

In addition, the information is retrieved from the one or more display screens 52 to pair the one or more gestures with one of the one or more programs, wherein the one or more adjuster interfaces 21 are generated base on the information from the module of analyzable factors 26, analyzed by the display screen controller 22 for organization and delivered to the first executable portion 1 to initiate and adjust the display with the one or more adjuster interfaces 21 for controlling, editing, and customizing the time or any of the other module of analyzable factors 26 of the one or more gestures in the process of pairing with different programs.

According to the preferred embodiment, the first executable portion 1 is operable to generate the one or more graduations 120 for indicating a total range in divided levels of the one or more displaying contents respectively, wherein the one or more graduations 120 are attached corresponding to the one or more adjusters 13, such that the available adjustable state of each of the displaying contents is displayed corresponding to the one or more programs on the one or more display screens 52.

According to the preferred embodiment, the third executable portion 3 is operable to control splitting of programs of the same language or the different computer languages. The programs can be displayed on the one or more display screens 52 and separated vertically or horizontally, with mirror image, mirror image inversion, axis of symmetry, or non-axis of symmetry. It is important to mention that the first executable portion 1 and the third executable portion 3 work together where the fourth executive 4 organizes multiple programs in the one or more display screens 52, and provides sideline boundaries for program selection in relation to gesture controls, while the first executable portion 1 provides the customization for the displaying content 523 of the programs and location of each of the one or more sideline elements 31 controlled by the one or more touch points 521 when creating a gesture. The first executable portion 1 sets a location for adjustment and the one or more adjusters 13 for every separated program selected by the user. The information is acquired from the one or more touch points 521 from the second executable portion 2 to provide one or more adjuster interfaces 21 on the one or more display screen 52 for the user to control.

According to the preferred embodiment, the fourth executable portion 4 is operable to receive the one or more touch point information from the second executable portion 2, wherein the fourth executable portion 4 is operable to pair the touch point information with a computer program. The fourth executable portion 4 is a location where a program is selected from a program dictionary 45 and where one or more gestures are selected from a gesture dictionary 43. One or more gestures are selected for a program, then the information is provided to the second executable portion 2 where the user performs personal customization of one or more gestures of the selected gestures one the display screen 52 or any other touch medium or sensory inputting surface or light-wave medium compatible technology. The information is analyzed and recorded by module of analyzable factors 26 and an artificial intelligence module 25 for pressure, thickness, time, acceleration, direction, angle, interruptions, distance, size, one hand or both hand, and location, wherein the information allows the artificial intelligence module 25 to differentiate from past, current and future gesture selections of the one or more touch points 52 in the creation of new gestures for future artificial intelligence assistance.

It is worth mentioning that, not all touch points, once associated with touching of the one or more display screens 52, the one or more split programs, the one or more sideline elements 31, the one or more adjuster interface 21, the one or more sideline reservations 32, one or more time tracker, and one or more reservation areas 33, will generate the same response for every identical or similar touch point 521. For example, one touch point 521 in the reservation area 33 may generate the program in the reservation area 33 to close, while the similar one touch point on the sideline element 31 may move the sideline element 31 accordingly. In other words, the differentiation of gestures also depends on the independency and codependency of the displaying programs in the display screen 52. For example, the identical gesture, that was first generated in the reservation area 33 with a sideline border and an edge of the electronic device 52 thereby providing the display screen controller 20 an ability to recognize the intended gesture, is only for the reservation area. Also, in a second example, the user specifically touches the sideline element 31 to produce the gesture allowing the sideline module 30 to recognize the operator's intentions.

According to the preferred embodiment, the second executable portion 2 is operable to manage the one or more touch point information produced by the user on the one or more display screens 52. Furthermore, the second executable portion 2 is operable to receive, record and analyze the one or more touch point information with the module of analyzable factors 26 and the artificial intelligence module 25, and then to deliver or acquire from the information to the other three executable portions 1, 3 and 4. After the one or more touch point information have been identify and recorded, the one or more touch point information oscillates from the other executive portions such as the first, third and fourth executable portions 1, 3 and 4 accordingly. In the second executable portion 2, the one or more touch point information is produced on the one or more display screens 52 and received by a display screen controller 22 of the second executable portion 2, as they are analyzed for pressure, thickness, time, acceleration, direction, angle, interruptions, size, one hand or both hands, and location in the module of analyzable factors 26. The one or more touch point information is also analyzed by the module of analyzable factors 26 and reviewed by the artificial intelligence module 25 to differentiate from past, current and to learn for future selections of the touch points 521 gesture creations and program assistance anticipation.

According to the preferred embodiment, the first executable portion 1 is operable to generate the one or more adjusters 13 and the one or more graduations 120 according to the operation information of the one or more touch points 521. The one or more adjusters 13 and the one or more graduations 120 are sent to the second executable portion 2. The second executable portion 2 is operable to generate the adjuster interface 21 according to the one or more adjusters 13 and the one or more graduations 120. In the adjuster interface 21, each of the one or more adjusters 13 is arranged to a position that suitable for operation. The adjuster interface 21 is sent to the processor 51 through the communication module 55. The processor 51 configures the one or more display screens 52 to display the adjuster interface 21 in the corresponding display screen 52. After the adjuster interface 21 is displayed in the corresponding display screen 52, the user is able to interact with the electronic device 50 through a gesture control 211 on the adjuster interface 21.

According to the preferred embodiment, the first executable portion 1 is embodied as an adjuster module 10, the second executable portion 2 as a display screen controller module 20, the third executable portion 3 is embodied as a sideline module 30, the fourth executable portion 4 is embodied as an interactive module 40. In other words, the display screen controller module 20 is communicatively connected with the one or more display screens 52 while the one or more display screens 52 are connected with the communication module 55, the processor 51, the storage device 53, the inputting device 56 and the power supply 54 of the electronic device 50. The display screen controller 20 is configured to receive the operation information from the one or more display screens 52, that is the information regarding the operation of the user on the one or more display screens 52. The display screen controller 20 sends the operation information to all the other modules 10, 30 and 40 accordingly. One or more of the adjuster module 10, the sideline module 30 and the interactive module 40 generate a response where the information is analyzed by one or more control modules 20 and processed thereby at the same time and then sends the analyzed information to the processor 51. The processor 51 sends the information for displaying on the corresponding touch screen 52, where the one or more adjuster interfaces 21 are manipulated to operate the desire controls on the one or more display screens 52.

The adjuster module 10 is operable to generate a change in display according to the information provided by the one or more adjuster interfaces 21. The sideline module 30 is operable to generate one or more divisions in the number of program display according to the information provided by the one or more display screens 52 from the one or more touch points 521. The interacting module 30 generates one or more existing programs and pairs one or more new gestures with a program or program function, to display on one or more display screens 52 and operational by one or more touch points 521 of the user.

The display screen controller 20 is operable to receive the one or more touch point information, wherein the module of analyzable factors 26 differentiates one or more touch point information and the artificial intelligence module 25 is configured to learn, verify, record and anticipate a response. Then, the one or more touch point information are sent through the communication module 55 to the processor 51 to generate on the one or more display screens 52 as one or more of the following: the one or more adjuster interfaces 21, the one or more adjusters 13, the one or more adjuster indicators 14, the pressure indicator 15, the numeric indicator 16, the one or more graduations 120, the one or more sideline elements 31, the one or more sideline reservations 32, the one or more reservation areas 33, the one or more pop-up sideline elements 37, an interacting program 42, a keyboard element program 43, a gesture and cursor program 44, the program dictionary 45, a scrolling program 46, a zoom program 47, a state-off program 48, a time tracker program 49, an operating area program 401, the gesture dictionary 402, a displaying contents adjustment 403, and/or etc.

The one or more interface portions 41 are displayed in the one or more displaying portions 523 of the one or more display screens 52 throughout the screen in directed correlation of the information provided by the adjuster module 10 in relation to the number of programs split by the one or more sideline elements 31, the one or more sideline reservation(s) 32, the one or more reservation areas 33, and/or the one or more pop-up sideline elements 37 configured by the sideline module 30. Additionally, for every sideline element 31, sideline reservation 32, reservation area 33, pop-up sideline element 37, there are respective programs from the interacting program module 40 with one or more gesture commands associated with each program and where all existing programs are pair with one or more gestures corresponding from the interactive module 40. The one or more touch points 521 are performed on the one or more display screens 52 in the electronic device 50, where the gesture dictionary 402 and the program dictionary 45 are scalable by up-grades provided in the internet and or private or public cloud server 100.

The adjuster interface 21 can be control in various options, for example on a display screen 52 for sizing displayed contents, on a time dependent gesture for customizing, on a sideline element 31 for controlling one or more of the sideline elements 21. Through the adjuster interface 21, the user can control the time customization, contents viewing adjustments, one or more programs arranged and displayed on the one or more display screens 52, the sideline elements 31, and the display viewing adjustments on the page for one or more programs and on one or more locations of the program through the control on the adjuster interface 21 on the corresponding adjuster 13 of the adjuster module 10 on the corresponding display screen 52.

Each of the one or more display screens 52 requires the interactive program module 40 to deliver one or more program responses from one or more gestures, wherein each of the one or more gestures which is selected for pairing with the corresponding program and the one or more touch point information, is delivered to the processor 51 by the display screen controller module 20 for the purpose of generating a program response from the program module 40, but not identical, in the processes of paring gesture and program together the artificial intelligence 26 recorders. Combination of these particular steps are important to acquire various levels of precision for the customization of a gesture with the respective one or more programs because it allows the one or more programs to be displayed with one or more similar gestures with one or more different levels of complexity from each of the criteria from the module of analyzable factors 26. As mentioned above in respect to the time factor and the adjuster interface 21 customization.

The artificial intelligence module 25 may learn, verify, record, and anticipate when the one or more gestures are differentiated or similar from the module of analyzable factors 26, and then the information is processed by the processor 51 and delivered to the corresponding modules, that is the adjuster module 10, the display screen control module 20, the sideline module 30, and the interactive module 40, and finally stored in the storage device 53 of the electronic device 50 and/or in the server storage device 103 of the private or public cloud server 100.

A brain-computer interface (BCI), sometimes called a brain-machine interface (BMI), is a direct communication pathway between the brain's electrical activity and an external device, most commonly a computer or robotic limb. BCIs are often directed at researching, mapping, assisting, augmenting, or repairing human cognitive or sensory-motor functions. Implementations of BCIs range from non-invasive (EEG, MEG, EOG, MM) and partially invasive (ECoG and endovascular) to invasive (microelectrode array), based on how close electrodes get to brain tissue. Due to the cortical plasticity of the brain, signals from implanted prostheses can, after adaptation, be handled by the brain like natural sensor or effector channels. The first neuroprosthetic devices implanted in humans appeared in the mid-1990s.

According to one embodiment, the artificial intelligence 25 in the electronic device 50 may provide the computing and algorithm programs for assisting the operations of the Brain Computer Interface (BCI), wherein the Brain Computer Interface (BCI) is implemented as an attachable interface device or a built-in system within the electronic device 50. Furthermore, the artificial intelligence 25 (algorithms) for computing on the Brain Computer Interface (BCI) may not come from the built-in artificial intelligence 25 of the electronic device 50. Alternatively, the computing Artificial Intelligence for the Brain computer Interface (BCI) may get deliver to the electronic device 50 or any other capable computing system via internet or cloud servers, for example, artificial intelligence servers from the cloud for the process of operating the Brain Computer Interface.

The user can have one or more gestures similar for various paired programs, while the user is difficult to identically produce the one or more gestures, where the module of analyzable factors 26 and the artificial intelligence module 25 are unable to distinguish one from the other, Therefore, when pairing one or more gestures with a program, the user should perform the selected gesture for multiple times for records and recognition since everyone has different individualizable variants for making one or more gestures.

Two or more different programs may function with one similar gesture. In addition, similar gestures may be distinguished from other similar gestures with time and any of the other module of analyzable factors 26, mentioned in the display screen controller 22, in conjunction with the artificial Intelligence module 25. Further, any of the module of analyzable factors 26 and any of the above mentioned modules can be pre-programed to display the respective adjuster interface 21 for customization of pressure, thickness, time, acceleration, direction, angel, interruptions, size, from both hand or one hand, at the same time or in a timely manner, from the one or more touch points and etc.

According to the preferred embodiment of the present invention, the one or more adjuster interfaces 21 can be generated by the second executable portion 2 for controlling a state of the displaying content and/or gestures, wherein the one or more adjuster interfaces 21 are configured to operate the one or more module of analyzable factors 26 independently simultaneously for customization of pressure, thickness, time, acceleration, direction, distance, angle, interruption, size, from both hand or one hand, concurrently or in a timely manner, from the one or more touch points, etc.

According to the preferred embodiment of the present invention, the one of more graduations 120 generated by the first executable portion 1 is for indicating a state of the displaying content, wherein the one or more graduations are attached along a body of the adjuster corresponding to the one or more adjusters 13 and a current state of a viewing field of each of the displaying contents as displayed corresponding to each of the split programs on the one or more display screens 52.

In one embodiment, the one or more graduations 120 generated by the first executable portion 1 may also be arranged for:
(i) indicating a state of the time and speed or any other factors provided in the module of analyzable factors 26, wherein the one or more graduations 120 are attached along the body of the adjuster corresponding to the one or more adjusters 13 so as to illustrate a current state of the time on a time dependent program for each of the time dependent contents that are displayed corresponding to the one or more programs on the one or more display screens 52;
(ii) indicating a location of the controls for the one or more sideline elements 31 to move the sideline elements 31 accordantly, wherein the one or more graduations 120 are attached along the body of the respective adjuster 13 while the adjuster 13 is located along the sideline element 31 corresponding to provide ergonomic controls on the one or more sidelines elements 31, wherein the sideline elements 31 are displayed in correspondence to the one or more programs on the one or more display screens 52; and
(iii) indicating a state of displaying content, a state of display of the sideline elements 31, and a time for the one or more touch points 521, wherein the one or more graduations 120 are attached along the body of the respective adjuster 13 and, where the adjuster indicator 14 illuminates/notifies on the graduation 120, the level the user is currently manual controlling, corresponding to the one or more adjusters 13, a current state of the viewing field, the sideline location, and the time editing on one or more programs on the one or more display screens 52.

According to the preferred embodiment, the first executable portion 1 is also operable to generate the one or more numeric indicators 16 with or without the graduations 120 for indicating the state of displaying content, wherein the one or more numeric indicators 16 are adjacent to the one or more adjusters 13, wherein each of the numeric indicators 16 illuminates/notifies the level the user is currently manual controlling, corresponding to the one or more adjusters 13, the current state of the viewing field, and for time editing on the one or more programs on the one or more display screens 52. It is worth mentioning that the numeric indicator 16 can appear on any location throughout the display screen 52 and can also be customized for one or more selected programs with or without the adjuster 13.

Figure 4A:
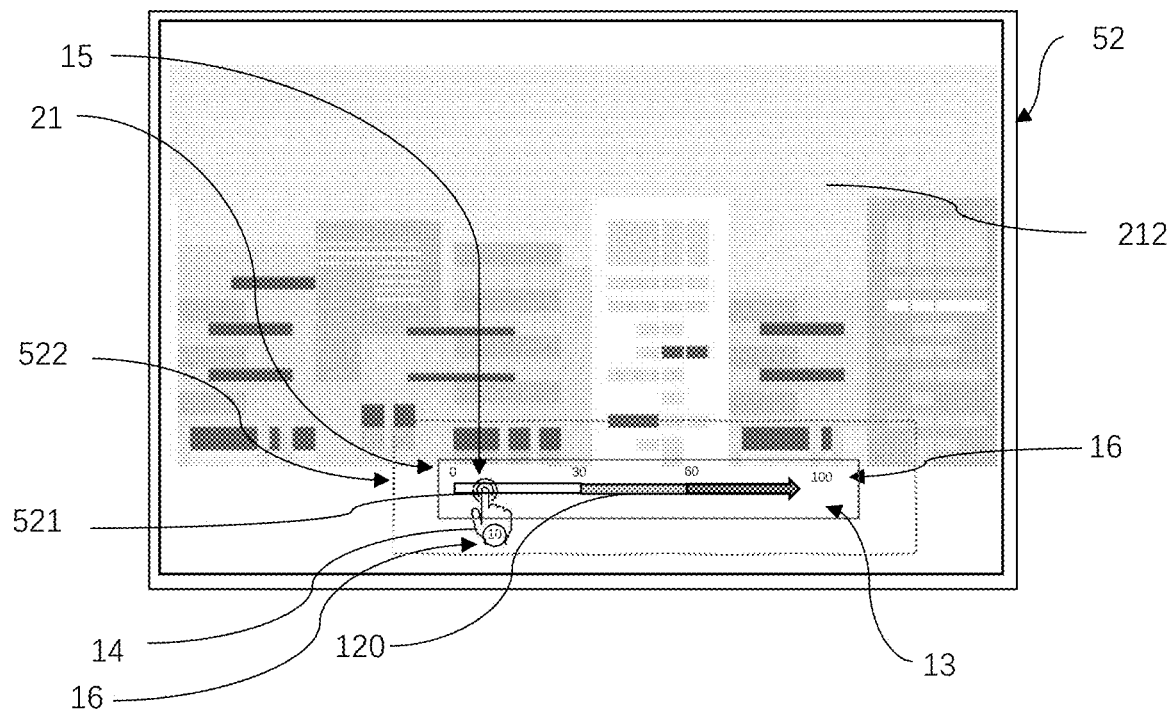
FIGS. 4A-4B are schematic views illustrating an adjuster guiding an operation of gesture for moving on the electronic device according to the above preferred embodiment of the present invention.

For purpose of further illustration of the preferred embodiment of the present invention, operation examples are provided with reference to FIGS. 4A to 9. Referring to FIG. 4A-4B, the adjuster interface 21 is illustrated, wherein a displaying content 212, such as a picture or a text file, is displayed on the display screen 52. Considering the displaying contents 212 to automatically displaying and providing watermark of the adjuster 13 with the adjuster interface 21, the adjuster indicator 14, the pressure indicator 15, and/or the numeric indicator 16 on any available displaying contents 212 with available scrolling capacity. In the preferred embodiment, the adjuster 13 with the adjuster interface 21, the adjuster indicator 14, the pressure indicator 15, and/or the numeric indicator 16 are conveniently illustrated when the user produces a gesture to generate a scrolling program on the desire location of the display screen 52. A left portion of the displaying content is hidden on the page. The hidden content refers to the content that is not currently being displayed on the display screen 52 as shown in FIG. 4A. The user makes a one touch gesture at a desire location, a desired touch point 521, on the touch screen 52, and then continuously moves the screen touching finger towards a right side on a linear vector or segment on the display screen 52, such that the left hidden displaying content is now displayed one the display screen 52 according to the user gesture movement from one or more touch points 521. In this process, the displaying content 212 is moved towards the right side of the display screen 52. When the display screen 52 detects one or more fingers of the user touching the display screen 52, the display screen 52 defines the location and (in this case) the one or more touch points 521 as a "gesture for moving", a "gesture for zooming" or the like and detects the moving direction of each touch point 521 as an input gesture. When the touch point 521 is continuously moving towards the right side in a linear vector on the display screen 52, the display screen 52 detects such input gesture as a touch point information and sends the touch point to the display screen controller module 20. The display screen controller module 20 analyzes the module of analyzable factors 26, for example one touch point, light pressure, no interruptions, no thickness, unspecified location, with direction, short time, one hand, no angle, and etc. of the touch point information and sends to the artificial intelligence module 25 for recording and learning the gesture format of the particular user to anticipate a desire outcome of gesture information, such as "gesture for moving" or "gesture for zooming" or etc., which is then sent to the interacting program module 40. For example, if the user continues to move the finger on the display screen 52 towards the right side on a linear vector or segment on the display screen 52, such that the left hidden displaying content 212 is now displayed on the display screen 52 according to the user gesture movement from one or more touch points 521. In this process, the displaying content 212 is moved towards the right side of the display screen 52. When one or more fingers of the user is detected touching the display screens 52, the display screen 52 defines the location and the one or more touch points 521 as a "gesture for moving", a "gesture for scrolling", or etc.

Figure 4B:
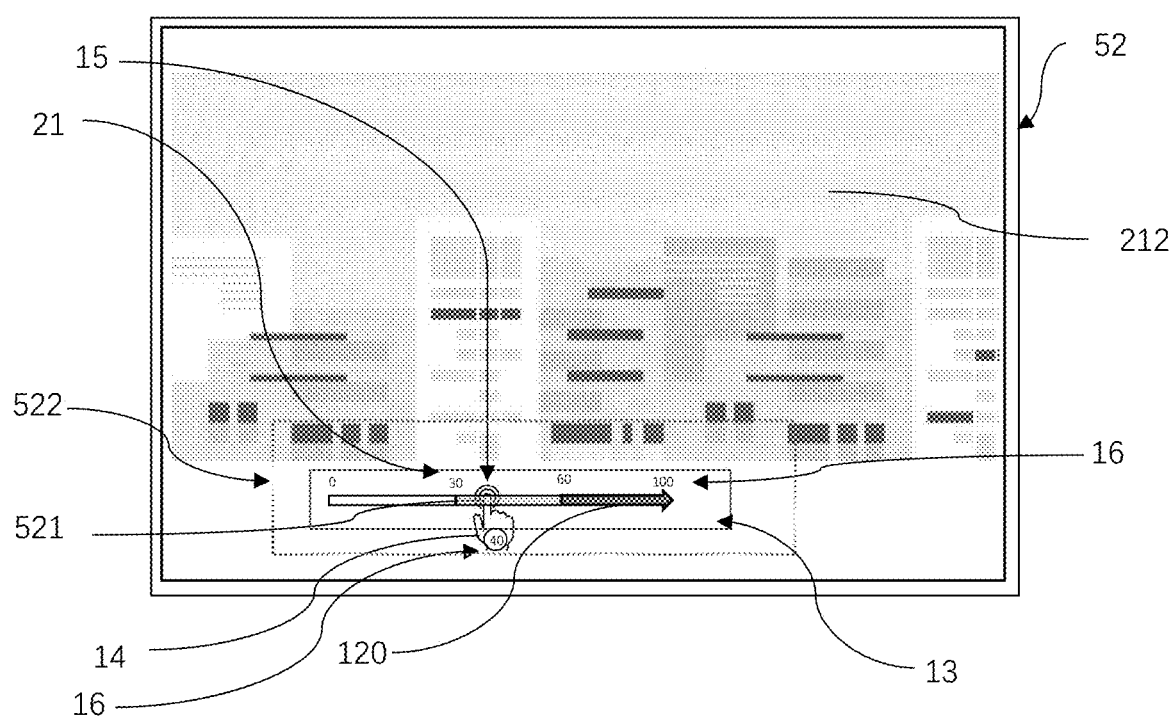
Figure 4C:
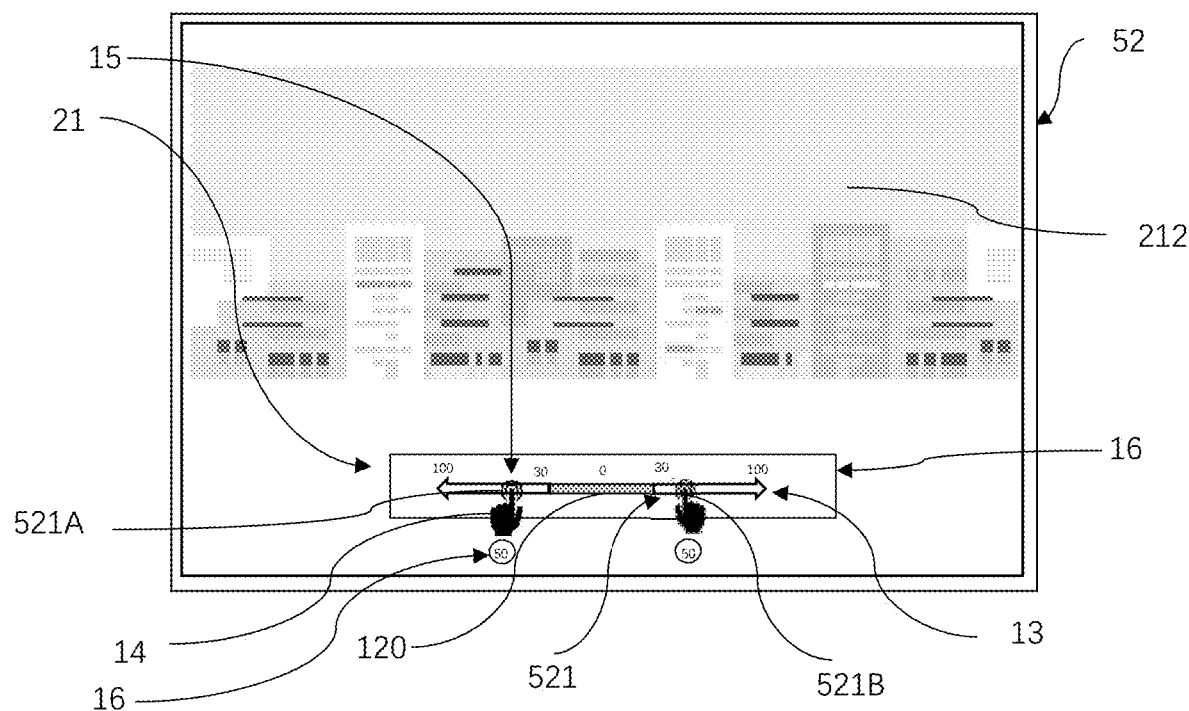
FIGS. 4C-4D are schematic views illustrating the adjuster for guiding an operation of gesture for zooming on the electronic device according to the above preferred embodiment of the present invention.

Additionally, referring to FIGS. 4B to 4C, the image can be initially displaying at a customary magnification range and the images with available magnification automatically provides the adjuster 13 with the adjuster interface 21, the adjuster indicator 14, pressure indicator 15, and or the numeric indicator 16. According to the preferred embodiment, the adjuster 13 as well as the adjuster interface 21, the adjuster indicator and the pressure indicator 15, and or the numeric indicator 16 are conveniently illustrated when the user produces a gesture with one single finger with exerted pressure or the like, a moving direction of each touch point 521 is detected as an input gesture. When the one touch point 521 is continuously moving towards the right side or the left side in a linear vector on the display screen 52, such input gesture on the display screen 52 is detected as a touch point information sending to the display screen controller module 20. The display screen controller module 20 analyzes the module of analyzable factors 26, for example one touch point, severe pressure, no interruptions, not thick, location being identified, with direction, short time, one hand, no angle, and etc. It is worth mentioning that the gesture generates the adjuster 13 with the adjuster interface 21, the adjuster indicator 14, pressure indicator 15, and or the numeric indicator 16 accordantly to the touch point 251 based on the current display conditions of the displaying contents 212. Then the touch point information is sent to the artificial intelligence module 25 for recording and verification and the gesture is formatted to the particular usage to anticipate a desire outcome of gesture information, such as "gesture for scrolling" or "gesture for zooming" or etc., which is then sent to the interacting program module 40.

The interacting program module 40 (fourth executable portion 4) receives the gesture information and then activates a corresponding gesture program accordingly. In addition, the touch point information and the gesture information are further sent to the adjuster module 10 (first executable portion 1) for an adjustment of the adjacent displaying contents in relation to the touch point 521, wherein the display screen controller 20 generates the adjuster 13 with the adjuster interface 21 accordingly.

The display screen controller 22 of the display screen controller module 20 (second executable portion 2) is configured to acquire the analyzed touch point information from the corresponding adjuster interface 21 after the respective display screen 52 displays the corresponding adjuster interface 21. The adjuster module 10 (first executable portion 1) generates at least one adjuster 13 according to the analyzed touch point information in the adjuster interface 21 on the corresponding display screen 52, wherein the user's starting gesture position over the adjuster 13 actives the adjuster interface 21 to display on the display screen 52 and is managed as a starting point of the adjuster 13. The touch point information acquired by the module of analyzable factors 26 and the artificial intelligence module 25 is shared with the processor 51 and/or servers processor 101 with the other modules, including the adjuster module 10, the sideline module 30, and the interactive module 40. The adjuster 13 is displayed at the adjuster interface 21 to reflect the user's gesture moving location and direction as the means to controlling and customizing the programs according to the touch points 521 of the user. It is worth mentioning that the adjuster 13 is possible to pre-program to any other specific locations on the one or more display screens 52. The touch point information is sent to the adjuster module 10 so that the adjuster interface 21 is also moved accordingly to the location of the adjuster 13 to assist in the operations of the display screen 52.

According to the preferred embodiment, referring to FIGS. 4A-4D, the adjuster 13 is embodied as a line segment having one or more graduations 120 to inform the operating user of the current level as it pertains to the available levels of function. Preferably, the adjuster 13 is displayed adjacent to the current location of the touch point 521, as shown in FIG. 4A. The adjuster 13 can be predetermined or customized by the user with any color, size, watermark shape, and length to be visually displayed on the display screen 52. The adjuster 13 comprises a body having the graduations 120 illustrating multiple levels as scales facilitating the user to control his or her selected programs with respect to his or her available levels of function within the program. The length of the adjuster 13 is the size of the body from a first (left) end to a second (right) end or vice versa from the second end to the first end, proportional to the number of graduations 120 that can be customized by the user in inches, centimeters or millimeters through the adjustable module 10. The graduation 120 orientates the user as to the multiple levels of function on the adjuster interface 21. According to the preferred embodiment, the graduation 120 further comprises one or more numeric indicators 16 with or without one or more adjuster indicators 14 where the numbers fluctuated in the numeric indicator 16 in relation to the touch point gesture movement by the user on the adjuster interface 21 so as for notifying the user as to the current level for the desire operation function, for example the portion of the image as shown in FIG. 4A or the size of the image as shown in FIG. 4C, in relation to the touch point location on the particular graduation 120 of the adjuster 13. In other words, the numeric indicators 16 can be provided with or without the adjuster 13 to continue informing the user of the current numeric number value in relation to the available and current function of the location or scale/size or of any other control function for any other program on the display screen 52 allowing the user to accurately perform precision required operations.

The adjuster indicator 14 can be a customizable watermark spot or mark, for example, provided at the location where the finger touching on the display screen 52 (or where the fingertip be detected by the displaying screen when the display screen 52 is formed by a projector or a VR goggle) and is able to move along the body of the adjuster 13 throughout the multiple graduations 120 with various scale sizes and are limited by the length of the body of the adjuster 13 with or without the numeric indicator 16. Preferably, the adjuster indicator 14 is moved between the first and second ends of the adjuster 13. In other words, the length of the adjuster 13 refers to the adjusting range between the first and second ends. It is worth mentioning that when the touch point 521 is moving towards the second end of the adjuster 13 on the display screen 52, the adjuster indicator 14 as well as the numeric indicator 16 are following the movement of the touch point 521. In other words, with the movement of the touch point 521, the adjuster indicator 14 changes location in the adjuster 13 and the numeric indicator 16 changes numeric value in relation to the current position of the touch point 521 on the adjuster 13 controlling the adjuster interface 21.

In an alternative embodiment, the numeric indicator 16 can also display the current function of the program, wherein at least one display screen 52 can have multiple numeric indicator 16 being displayed at the same time for multiple program functions, such as one the numeric indicator 16 for the display screen contents percentage size, the other for the display brightness, the other for the display screen speed, etc. In other words, the numeric indicators 16 are customizable for shape, color, size, locations, selected programs and are not limited.

The adjuster indicator 14 is able to move along the body of the adjuster 13 with the graduations 120 in scale and has the same fluctuation length as the body of the adjuster 13 with or without the numeric indicator 16. Preferably, the adjuster indicator 14 is moved between the first and second ends of the adjuster 13. In other words, the length of the adjuster 13 refers to the adjusting range between the first and second ends. It is worth mentioning that when the touch point 521 is moving towards the second end of the adjuster 13 on the display screen 52, the adjuster indicator 14 as well as the numeric indicator 16 are following the movement of the touch point 521. In other words, with the movement of the touch point 521, the adjuster indicator 14 together with the numeric indicator 16 are also moving towards the right side of the display screen 52. It is worth mentioning that the same applications mentioned above are applicable to the adjuster 13, the adjuster indicator 14, the numeric indicator 16, and the graduation 120 while the adjuster 13 may be positioned vertically from top to bottom or vice versa and/or obliquely.

The pressure indicator 15 is provided at the adjuster indicator 14, for example, as one or more ring marks around the adjuster indicator 14, wherein one ring mark represents a low pressure, two ring marks represent middle pressure and three ring marks represent high pressure applied to the display screen 52 by the one or more touch points 521. In other words, the number of rings produced illustrated how hard the touching finger pressing on the display screen 52. Of course, the pressure of touching finger can also be illustrated by other ways such as the darkness of the spot mark of the adjuster indicator 14 and/or the that is the lighter the spot mark, the less finger pressure be applied, and that the darker the adjuster 13 that is the lighter the spot mark, the less finger pressure is being applied, and that the darker the spot mark, the heavier the one or more finger pressure is being applied. It is worth mentioning that the pressure indicator 15 can be activated throughout the display screen 52 accordingly of an AR/MR/XR/VR apparatus.

When only one finger of the user touches the display screen 52, the one finger touch point 521 is a "gesture for moving" that the displaying content 212 such as the image as shown in FIG. 4A is moving along with the movement of the one finger touch point towards the direction of the movement according to the scaling as indicated in the adjuster indicator 14 as well as the numeric indicator 16 of the adjuster 13. For example, when the one finger touch point 521 is moving towards the second (right) end of the adjuster 13, at the same time, the displaying content 212 is moved to the right side of the display screen 52 accordingly and the hidden content is moved towards the right side of the display screen 52 and displayed on the display screen 52, while the adjuster indicator 14 and numeric indicator 16 are fluctuated to represent the new percentage of the total image not being seen and or to represent the total percentage of the image currently in the field view at the same time, as shown in FIG. 4B. When the one finger touch point 521 is stopped, the adjuster indicator 14 and the numeric indicator 16 illustrated on the adjuster 13 also stop and so does the displaying contents 212 stop from moving. As shown in FIG. 4A, the current state of the displaying contents 212, the adjuster indictor 14 shows a more left position on the scale diagram and the numeric indictor 16 is showing a numeric value and, at the same time, the displaying contents 212 is not moving. In comparison, as shown in FIG. 4B, the current state of the displaying contents 212 has moved more to the right, the adjuster indictor 14 shows a more to the right position on the scale diagram and the numeric indictor 16 shows a numeric value and, at the same time, on the display screen 52.

Referring to FIG. 4C, when two touch points 521, one from one hand or from two fingers of one hand being in contact with the display screen 52, are detected, the adjuster 13 is displayed on the display screen 52, for example, the two finger touch points 521 is a "gesture for zooming" that the displaying content 212, such as the image as shown in FIG. 4C is activated to zoom-out when the two touching fingers are moving closer with each other that more panoramic field of view on the display screen 52 is delivered, or is activated to zoom-in when the two touching fingers are moving apart with each other that an enlargement in magnification is delivered on the display screen 52. The adjuster interface 21 is provided on the display screen 52, controlled by the two touch points 521 and a linear segment of the adjuster 13 is provided between the two touch points 521, such that when the two touching fingers of the user are moving closer with each other along the adjuster 13, the displaying content 212 is enlarged in panoramic field of view (zoom-out) accordingly at the same time and the two adjuster indicators 14 are moving closer in relation to each other on the adjuster 13. At the same time, the numeric indicator(s) shows the change percentage value to 50% of enlargement for the panoramic field of view (zoom-out) of the displaying content 212 from the original image size.

Figure 4D:
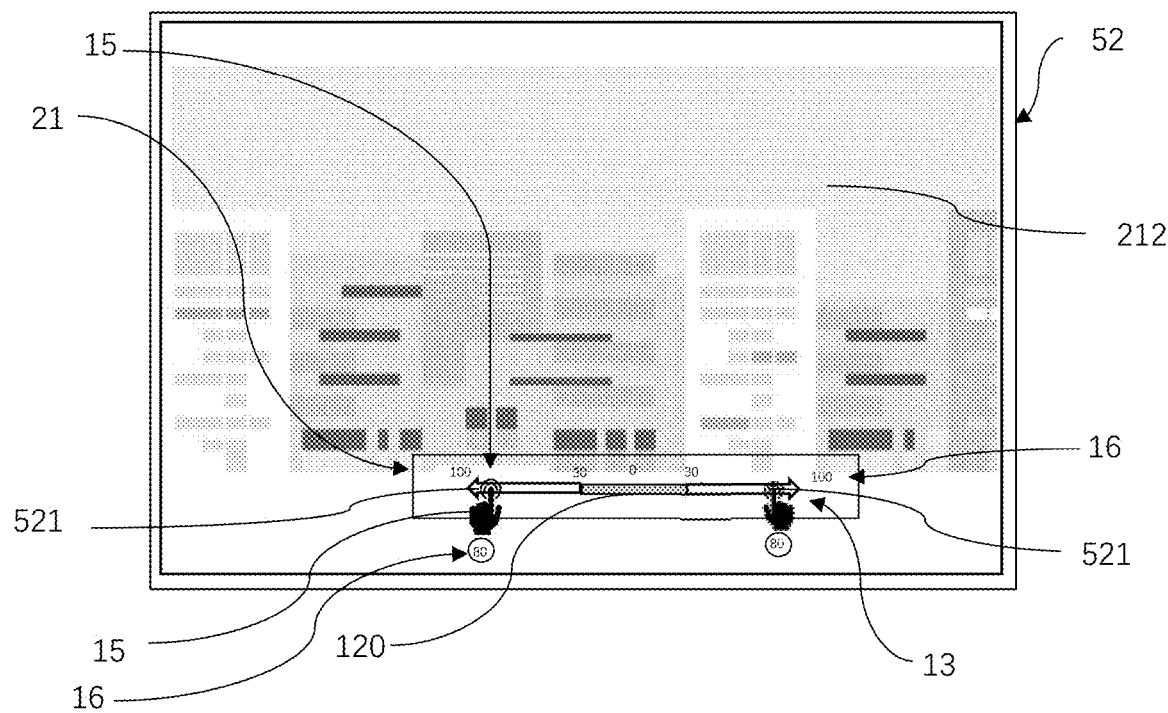

Referring to FIG. 4D, when the two touching fingers of the user are moving apart from each other along the adjuster 13, the displaying content 212 magnification is increased (zoom-in) and, at the same time, the two adjuster indicators 14 are moving apart from each other. The two touch points 521 and the numeric indicator(s) show the percentage of magnification increased (zoom-in) of the displaying content 212 from the original image size thereof. A left or right movement of the two finger touch points 521 towards the direction of the movement according to the scaling as indicated in the adjuster indicator 14 as well as the numeric indicator 16 of the adjuster 13. When the moving of the two finger touch points 521 has stopped, the adjuster indicator 14 is repositioned and the numeric indicator 16 is illustrated as the new numeric number value on the adjuster 13 and also stopped at the same time as the displaying content 212 stops from zooming in too.

It is appreciated that the present invention provides the adjuster interface 21, the adjuster 13, the adjuster indicator 14 and/or the numeric indicator 16, so that the gesture for zooming can be any other gesture customized by the service provider or the user, for example a two-fingers gesture that when the user use his or her two fingers, such as index finger and middle finger, side by side touching on the display screen 52, the corresponding touch point(s) 521 is detected by first executable portion 1 (adjuster module 10) and controlled by the second executable portion 2 (display screen controller module 20).

According to the preferred embodiment of the present invention, other gestures can also be similarly customized and operated for the processes of operating various different programs, for example, in the task of editing a music video sound can be controlled with one finger and the brightness on the display video can be controlled with a two-finger touch point gesture, as illustrated in FIGS. 4C-4D, providing the user, additional adjusters operated with a different gesture, wherein the two-finger gesture can be performed by the index finger and middle finger, and etc., side by side touching on the display screen 52. The corresponding touch point(s) 521 are analyzed by the module of analyzable factor 26 and the artificial intelligence 25 in the second executable portion 2, and then the information is delivered by the processor 51 and/or the server processor 101 to the first executable portion 1 (adjuster module 10) to generate the adjuster 13. At the same time, the fourth executable portion 4 receives the current displaying content information and the displaying content adjustment 403 delivers the information to the adjuster module 10 through the processor 51 and/or the server processor 101, wherein the information is provided to the second executable portion 2 to generate the adjuster interface 21 on the corresponding display screen 52 to be displayed and be controlled by the touch point 521 through gestures, as the user desires, through the display screen controller module 20.

According to the preferred embodiment of the present invention, the program control is directly proportional to the manipulation of one or more gestures of one or more adjuster interfaces 21. The one or more adjuster indicators 14 and the one or more numeric indicators 16 are controlled directly proportional to the scale or size of the manipulation on the adjuster interface 21 by the user. For example, the range of a function of a program availability or lack of availability is directly proportional to the location of the adjuster indicator 14 and to the display of the numeric indicator 16 on the display screen 52 in relation to the gesture of the one or more touch points 521. In other worlds, as illustrated in FIG. 4C, a shorter distance between the two touch points 521 and a smaller numeric number value by the numeric indicator 16, and that, as illustrated in FIG. 4D, a larger display distance between the two touch points 521 and a larger numeric number value by the numeric indicator 16. In other words, the FIG. 4D demonstrates that the user has 80% magnification with only an additional 20% availability, and therefore the two fingers have less available space for separation (zoom-in). The two touch points 521 have more available space to come together from the zoom-in to the zoom-out gestures respectively.

According to the preferred embodiment of the present invention, an image viewing field is directly proportional to the gesture manipulation on the adjuster interface 21. The display and control of the one or more adjuster indicators 14 and the one or more numeric indicators 16 are directly proportional to the scale or size of the manipulation on the adjuster interface 21 by the user. Also, the image viewing field availability or lack of availability is directly proportional to the location of the adjuster indicator 14 and to the display of the numeric indicator 16, on the screen or program. In other worlds, FIG. 4C illustrates a smaller scale/size display of the buildings (zoom-out) and FIG. 4D illustrates a larger scale/size display of the buildings (zoom-in). In other words, the two FIG. 4C and FIG. 4D demonstrate from the zoom-in to zoom-out respectively. As disclosed above, the same process can be accomplished for scrolling on an image as illustrated on FIGS. 4A and 4B.

It is understood that the adjuster 13 may or may not have the adjuster indicator 14 provided nor the graduation 120 in relation to the controlling of the adjuster interface 21 on the adjuster 13. The numeric indicator 16 can visually notify the user of the level for the selected function on the adjuster interface 21, where the degree of manipulation is control accordingly by the user with one or more touch gestures side to side, up and down or diagonal without the adjuster indicator 14 nor the graduations 12 on the adjuster 13. It is appreciated that it is possible to only have the numeric indicator 16 displayed on the display screen 52 of the electronic device 50.

The image viewing field is directly proportional to the user manipulation on the adjuster interface 21 that the numeric indicator 16 is always displaying the current numeric value, and directly proportional to the touch point 521 positioning on the adjuster interface 21 in relation to the state of manipulation by the user with respect to the display screen 52 and may or may not be displayed on the electronic device 50 when it is an AR/MR/XR/VR apparatus. The numeric indicator 16 is preferred to represent the current state of the program being control, whether it is an image, viewing field, time, sound brightness, or any other functions. The availability or lack of availability control is directly proportionately shown by the numeric indicator 16 as the currently program function provides the available program capacity to the user.

In other words, since the image viewing field is directly proportional to the user manipulation on the adjuster interface 21, the numeric indicator 16, displaying a current numeric number, is directly proportional to the adjuster interface 21 at the state of manipulation by the user and is the current representation of the image viewing field availability or lack of availability viewing field directly proportional to the numeric indicator 16 of the current percentage being displayed on the display page in any electronic device 50 including the AR/MR/XR/VR apparatus.

In other embodiments, the user may elect to have a dual foldable touch screen apparatus where the user may operate the VR on the control panel of the electronic device 50, wherein the display screen of the electronic device 50 is utilized by other individuals for viewing and experiencing the metaverse environment together with the operator who is wearing the VR/MR/XR/AR goggles as a means of sharing the experience together.

In one embodiment, the user may operate the AR/MR/XR/VR through the use of any other electronic device 50 where other users may participate or only observe in the sharing of the experience for the process of the communal experience, wherein the user have options for interacting or not.

It is worth mentioning that an adjusting range of the adjuster 13 is capable of being preconfigured for zooming. For example, the adjuster module 10 configures the adjusting range of each of the one or more adjusters 13 according to a pre-set percentage of a movable distance of the hidden portion and/or of the displaying content. In such a manner, the user doesn't need to move actual or long distance to let the desired hidden portion of the displaying content to display. The user just needs to move a relatively short distance along the adjuster 13 of the adjuster interface 21 according to the desire display on the display screen 52. Furthermore, the adjuster module 10 generates the one or more graduations 120 on the adjuster 13 according to the percentage of the hidden portion of the displaying content and or a percentage of the displaying contents that further facilitates the user to fast and efficiently determine the display portion or percentage of the displaying content on the display screen 52. The one or more graduations 120 could be provided from the first (e.g. left) end to the second (e.g. right) end of the adjuster 13. The one or more graduations 120 notify the user as to the current displaying content accuracy. For example, if a total displaying content such as an image of buildings as shown in FIGS. 4A and 4B, 0-100% is the percentage of portion of the total displaying content from right to left, wherein as shown in FIG. 4A, it is about 10% of right portion of the total displaying content being displayed as the current displaying content 212 on the display screen 52 and 90% hidden portion from the left of the total displaying content not being displayed on the display screen 52, and, as shown in FIG. 4B, the current displaying content 212 is about a 40% portion of the total displaying content, from right to left, being displayed on the display screen 52, i.e. the previously hidden portion on the left portion of previously current display portion as shown in FIG. 4A is moved to be the current displaying content 212 to be displayed on the display screen 52 as shown in FIG. 4B. Three graduations 120 may be provided to display 0-30%, 30-60% and 60-100% along the adjuster 13. In another example, the adjuster 13 may only have one graduation 120, not including the maximum and minimum end points on the adjuster 13, wherein the graduation 120 is located at the 50% graduation marker of the adjuster 13.

As illustrated in FIG. 4B, the current displaying content 212 has about a 40% used magnification or about 40% scrolling used capacity of the total displaying content, from right to left, being displayed on the display screen 52. That is the previously hidden portion on the left portion of previously current display portion as shown in FIG. 4A is moved to be the current displaying content 212 to be displayed on the display screen 52 as shown in FIG. 4B. Four graduations 120 may be provided to display 0%, 30%, 60%, and to 100% along the adjuster 13. In another example, the adjuster 13 may only have one graduation 120, not including the maximum and minimum end points on the adjuster 13, wherein the graduation 120 is located at the 50% graduation marker of the adjuster 13.

Similarly, the adjuster module 10 may configure the adjusting range of each of the one or more adjusters 13 according to a pre-set percentage of a scale or size of the displaying content 212. In such a manner, the user doesn't need to repeatedly move his or her two fingers (index finger and thumb or any other two touch points 521) closer or apart from each other so as to achieve the desire scale the image to be displayed on the display screen 52. The user just selects the distance of the two touch points 521 between any two fingers and moves his or her two fingers closer or apart for a relatively short distance along the adjuster 13 of the adjuster interface 21 according to the desire display scale on the display screen 52. Furthermore, the adjuster module 10 generates the one or more graduations 120 on the adjuster 13 according to the percentage of the scale or size of the displaying content that further facilitates the user to fast and efficiently determine the scale percentage of the displaying content on the display screen 52. The one or more graduations 120 could be provided from the first (e.g. left) end to the second (e.g. right) end of the adjuster 13. For example, the center of the adjuster 13 is 0% referring a minimum scale of the displaying content and both left and right ends of the adjuster 13 are 100% referring a maximum scale of the displaying content. For example, as shown in FIG. 4C, it is about 50% displaying scale or size of the image of the displaying content being displayed as the current displaying content 212 on the display screen 52, and, as shown in FIG. 4D, the current displaying content 212 is about an 80% displaying scale of the image of the displaying content being displayed on the display screen 52.

It is worth mentioning that, as shown in FIGS. 4C-4D, one or more adjusters 13 for two touch points 521 are generated when the user is adjusting any scalable program and the user may select a two-touch-point gesture for controlling such functions. Alternatively, the user can produce the same gesture without the adjuster 13, the adjuster indicator 14, the numeric indicator 16, or any graduation 120, to generate the same response, wherein the distance tracker module 27 on the display screen controller module 20 provides the information to the adjuster module 10 and the first executable portion 1 produces a response accordantly to the user gesture selection and movement.

It is appreciated that the user is allowed to customize the one or more gestures. For example, a simultaneous two finger touch point pre-program gesture from one hand, wherein the two touch points 521 are not limited to the two finger gesture (pinching or depinching) to activate zooming. The two touch points 521 have a programmable two touch point separation distance to generate a percentage display of a program, photo, web page, screen, and/or other displaying contents on the corresponding display screen 52 of the electronic device 50, wherein the two touch point separation distance between the user's fingers may be in millimeters, centimeters or inches. For example, one inch space separation of the gesture of two finger touch points 521 can be programmed to display 25 percent magnification of the displaying content; two inches space separation can be programed to display 50 percent magnification of the displaying content; three inches finger space separation can be programmed to display 75 percent magnification of the displaying content; four inches space separation can be programmed to display 100 percent magnification of the displaying content; etc. or vice versa that four inches space separation between the two fingers is a zero magnification providing the user with a full panoramic view of the displaying content without any magnification on the display screen 52. After the initial gesture is produced and the response is generated, the user's two finger space separation can continue to zoom-in or zoom-out in a continuously contact pinching or depinching motion on the display screen 52, wherein the user may decrease the panoramic view to increase the magnification proportional to the two touch point separation control distance between the two touch points 521, as mentioned above or vice versa. Such that the user doesn't need to repeatedly produce the two fingers to pinch or depinch gesture apart or together so as to achieve the desire range of the image for displaying on the display screen 52. The user merely needs to move his or her two fingers closer or more apart for a relatively short distance along the adjuster 13 on the adjuster interface 21 according to the desire display scale or size on the display screen 52. Furthermore, the adjuster module 10 generates the one or more graduations 120 on the adjuster 13 according to the percentage of the scale or size of the displaying content 212 that will further facilitate the user to a fast and efficiently determinant of the scale percentage of the displaying content 212 on the display screen 52.

For example, in another embodiment, the center of the adjuster 13 is 0% referring a minimum scale of the displaying content 212 and both left and right ends of the adjuster 13 are 100% referring a maximum scale of the displaying content 212. For example, as shown in FIG. 4C, it is about 50% displaying scale or size of the image of the displaying content 212 on the display screen 52. For example, as shown in FIG. 4D, the current displaying content 212 is about 80% displaying scale of the image of the displaying content 212 being displayed on the display screen 52.

Figure 5A:
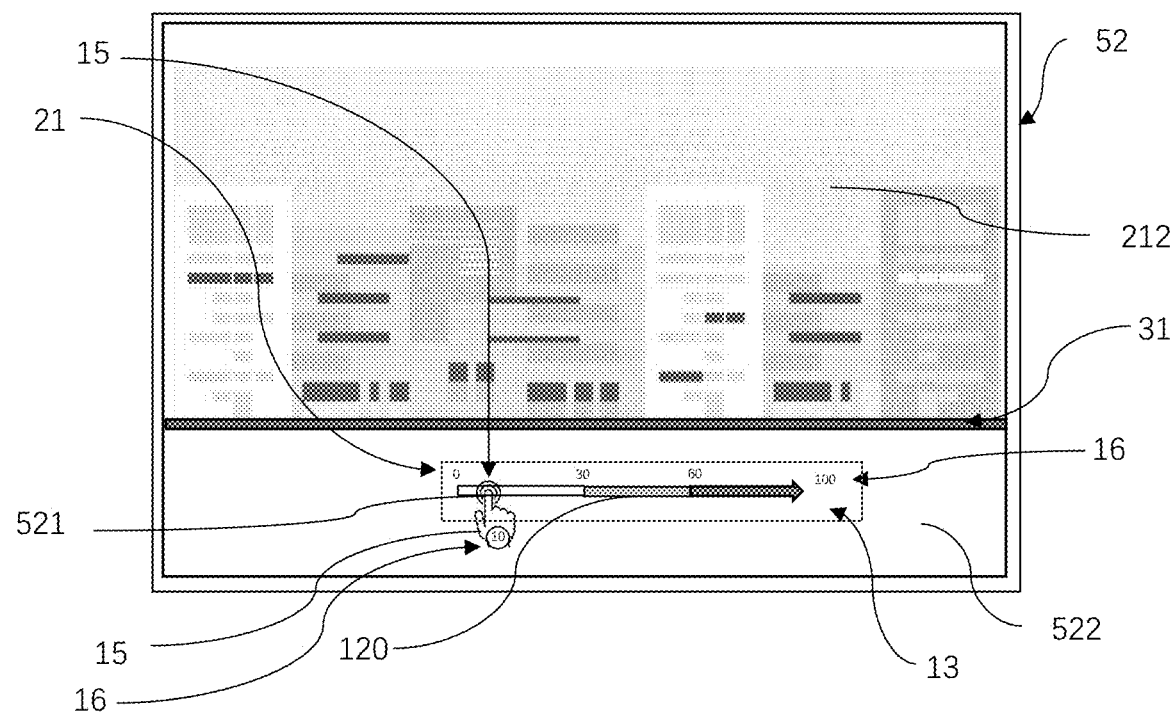
FIGS. 5A-5B are schematic views illustrating the operating area divided on the display screen by the sideline element to display the adjuster thereon for assisting the operation on the electronic device according to the above preferred embodiment of the present invention.
Figure 5B:
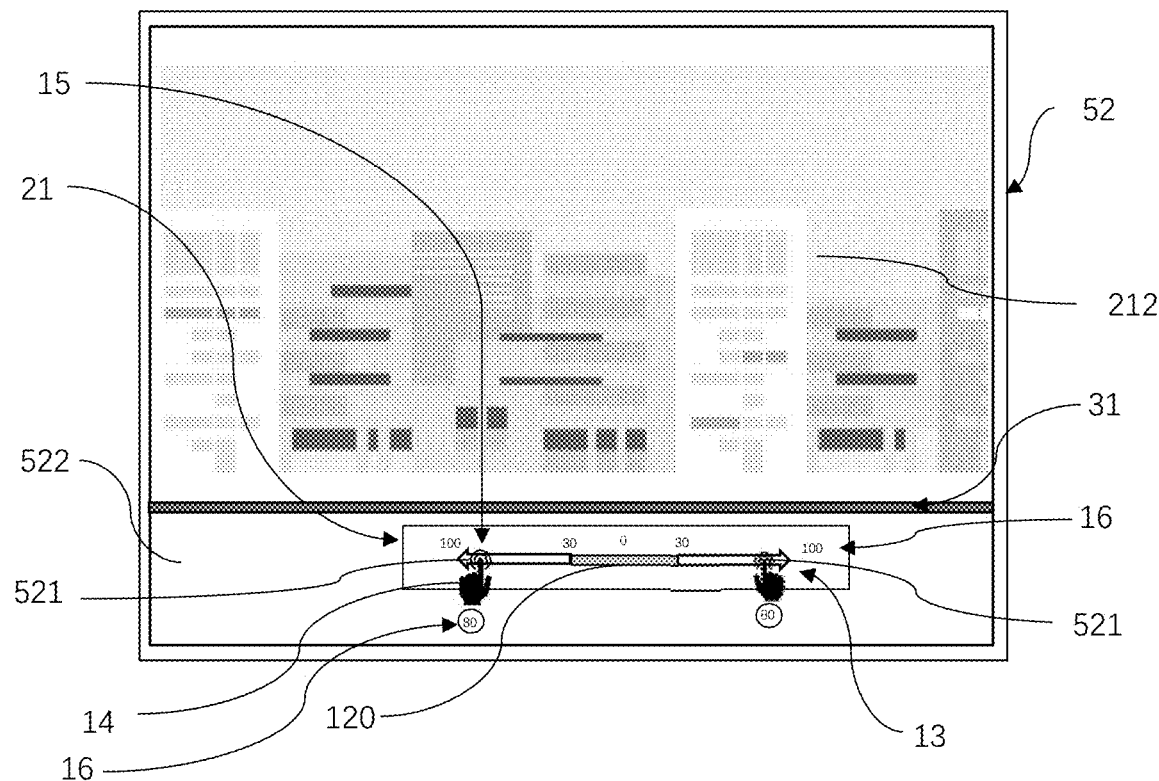

Referring FIGS. 5A-5B, alternative modes of the adjuster interfaces 21 (as shown in FIG. 4A and FIG. 4C) according to the preferred embodiment of the present invention are illustrated respectively, wherein at least one sideline element 31 is generated by the third executable portion 3 (the sideline module 30) on the display screen 52 to divide the display screen 52 into an upper portion and a lower portion, or alternative a left portion and a right portion, allowing the displaying content 212 of the image to be displayed on the upper portion while the adjuster interface 21 and the adjuster 13 to be displayed on the lower portion of the display screen 52, wherein when the user uses at least one finger touching on the sideline element 31, the display screen 52 detects and the third executable portion is activated to detect the movement of the touch point 521 touching on the sideline element 31. The user is allowed to move his or her finger, moving the touch point 521, up and down so as to move the sideline element 31 up and down accordingly so as to adjust the relative sizes of the upper portion and the lower portion to enlarge or reduce the size the displaying content 212 displayed on the upper portion of the display screen 521 and the size of the adjuster interface 21 displayed on the lower portion of the display screen 521. Therefore, for user who has a larger hand and fingers, before the user would like to operate "gesture for moving" as shown in FIG. 5A, "gesture for zooming" as shown in FIG. 5B, or other gesture operations, the user may enlarge the size of the adjuster interface 21 and the adjuster 13 for ease of operation, and then after the corresponding adjustment, the user may reduce the size of the adjuster interface 21 and the adjuster 13 by touch moving the sideline element 31 downwards or simply double or triple touch (depending on the gesture customization by the service producer or the user) the sideline element 31 to remove the displayed sideline element 31 as well as the adjuster interface 21 and the adjuster 13 from the display screen 31. The using of sideline element 31 is also convenient to user who needs to adjust the portion of the displaying content 212 to be displayed or the scale/size of the displaying content 212 very often during operation of the displaying content 212 to avoid the system to automatically remove the adjuster interface 21 and the adjuster 13 from the displaying content 212 as shown in FIGS. 5A and 5B after a predetermined of time, such as five seconds (more or less), when there is no detection of any touching and touch point 521 on the adjuster interface 21 and/or the adjuster 13 that is preconfigured by the system of the invention. It is worth mentioning that the system of removing functions as mentioned above can be applied to all computer programs mentioned in the invention. For example, the keyboard control may also be removed if the display screen 52 stops sensing the touch point 521 on the display screen 52, the interacting portion 41, the interacting program 42, the sideline element 31, the panel and/or display, and etc.

The adjuster 13 is generated according to the touch point 521 that is the location the user's finger touches on the display screen 52. More specifically, the adjuster 13 is configured as a starting end at the current location of the touch point 521 and the adjuster 13 extended for a predetermined time and length to form a linear segment, or that the adjuster 13 can also be configured to extended from both sides of the touch point 521 for a predetermined length to form the linear segment.

Figure 5C:
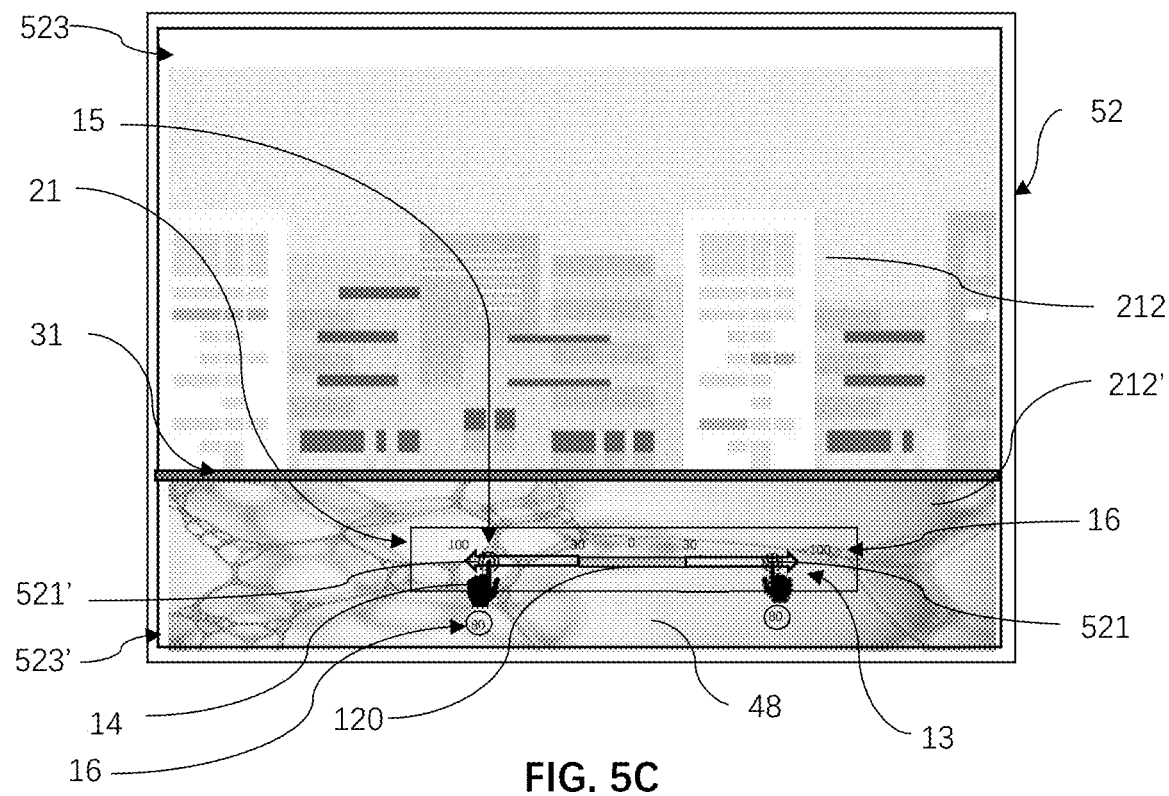
FIG. 5C is schematic views illustrating the display screen divided by the sideline element to display two or more displaying portions for two or more displaying contents respectively according to the above preferred embodiment of the present invention.

Referring to FIG. 5C, the state-off program 48 is illustrated to be superimposed on an existing program 523' when two or more programs are operating and divided by the sideline element 31. For example, a two-finger touch point pressure gesture can be produced by the user to generate the state-off program 48 where one touch point 521 comes from the right hand and the other touch point 521' comes from the left hand, providing the distance tracker module 27, the module of analyzable factor 26 and the artificial intelligence module 25 the required information to activate the state-off program 48. In the state-off program 48, other operating program currently operating are superimposed by the state-off program 48, wherein the user can make multiple gestures to generate additional response that are not pertaining to the original superimposed program. In other words, the programs that is superimposed by the state-off program 48 continues to run without any inputting capacity. Additionally, the gestures that are made on the state-off program 48 are for other function options and interactive portion(s) 41 or interactive program(s) 42. Further, the operating state-off program 48 may be separated by the horizontal sideline element 31. Also, the superimposed state-off program 48 can have a lock option to have minimal gesture capacity where the display screen 52 displaying the operational area 522 and/or the displaying content 212 is blank or illuminating any selected color to notify the user the state-off lock mode as demonstrated in FIG. 5B, wherein the state-off program 48 is in lock mode and is shown as a blank or translucent display while merely showing the adjuster 13 and the adjuster interface 21 with or without inputting capacity. The advantage to this program option is the user can physically grab that portion of the display screen 52 and the physical electronic device 50 without any worries of inputting erroneous information in the electronic device 50.

Figure 6:
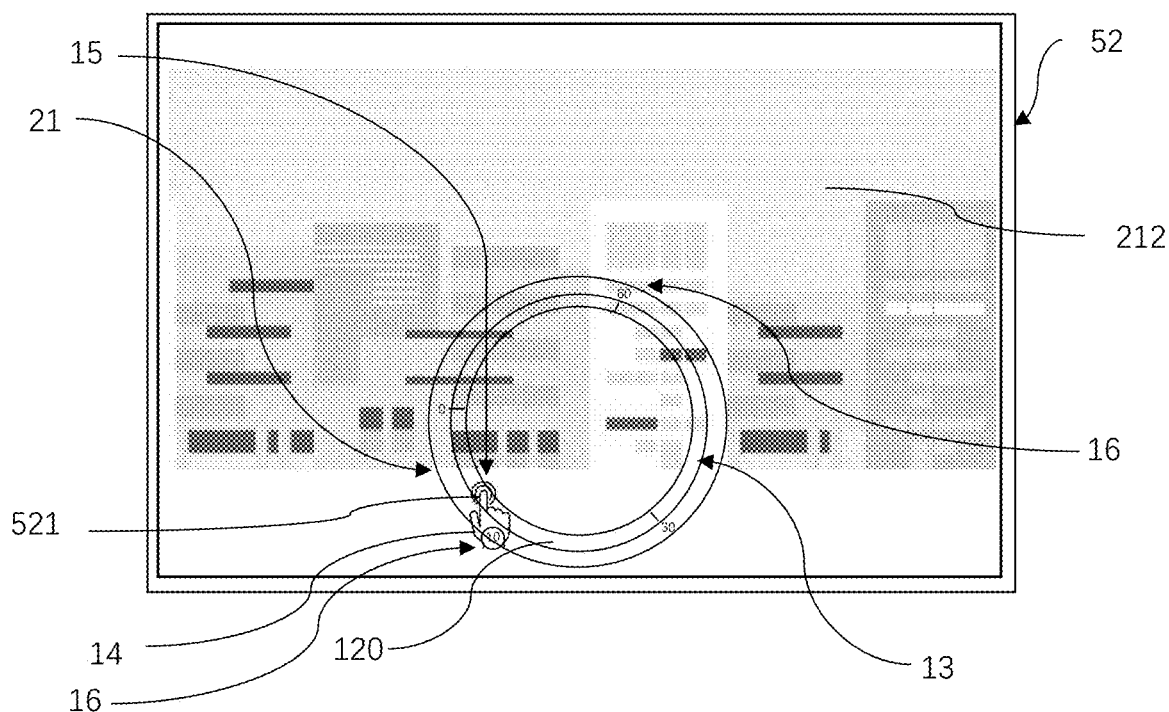
FIG. 6 is a schematic view illustrating an alternative mode of the adjuster interface an the interface for guiding gesture operations on the electronic device according to the above preferred embodiment of the present invention.

Referring to FIG. 6, an alternative mode of the adjuster interface 21 and the adjuster 13 is illustrated, wherein the adjuster interface 21 and the adjuster 13 are in generated in form of circular segment for guiding of the user to touch and slide his or her touch point 521 circularly for various gesture operations, such as gesture for moving and gesture for zooming. the adjuster interface 21 and the adjuster 13 are preferred to be illustrated to have a predetermined percentage of transparency, such as a watermark form, that can be preset by the system or customized by the user through, for example, the first executable portion 1. The user is able to move the one or more fingers along the watermarked adjuster 13. In such a manner, the touch point 521 can be the starting point and moved along the adjuster 13 for adjusting the displaying content on the one or more programs on the one or more display screens 52. Preferably, the adjuster module 10 configures the adjusting range of the adjuster 13, wherein the length of the adjuster 13 refers to a customizable range of the displaced viewing field or of the hidden not view field while the adjuster 13 is configured for "gesture of moving". As shown in FIGS. 4A and 4B, the touch point 521 is capable of moving along the adjuster 13 to the right for moving the left hidden displaying content to move to the right accordingly to be displayed on the display screen 52. It is worth mentioning that the adjuster 13 can also be pre-program by the lack of the total viewing field identify by the adjuster module 10. Where the adjuster module 10 recognizes the total viewing field is hidden on the left side of a program or display screen 52, where the adjuster 13 will be display horizontal automatically from left to right or from right to left and with increment on the graduations 120 toward the right for right hand users or left for left hand users. The same when the total viewing field is hidden by the top side of the program and or display screen 52, the adjuster 13 in form of watermark is automatically display from top to bottom. Similarly, as shown in FIGS. 4C and 4D, the two touch points 521 are capable of moving along the adjuster 13 closer or more apart from each other for zooming in (shrinking) or zooming out (enlarging) the displaying content on the display screen 52.

According to the preferred embodiment of the present invention, in particular, referring to FIGS. 4C and 4D, the user is capable of operating the adjuster interface 21A for operation with gestures to control the one or more programs and displaying content 212 on the one or more display screen 52. The "gesture for zooming", including zooming in and zooming out, is described as an example as follows while it is not intent to limit the scope of gesture control of the present invention. Additionally, the one or more circular type gesture can be superimposed on other prior display screen 52 generated responses gesture and vice versa.

The present invention teaches the adjuster 13, the adjuster indicator 14, the adjuster interface 21, and the numeric indicator 16 which are all able to be customized to display on the one or more displaying contents 212 of the one or more displaying portions 523 or the one or more display screens 52 at pre-selected locations, through the corresponding displaying portion 523 or the display screen 52. The present invention also teaches dedicated gestures for specific programs in this case circular for adjusting displaying contents 212, wherein triangular customization can be used for controlling two or more programs at the same time, wherein the Y-axis and X-axis in relation to a corresponding program, for example lighting and volume, in relation to battery energy transfer. Additional dedicated square gestures can be dedicated to the transferring or up-loading of information within the programs or from and to other external programs and electronic devices 50. In other words, the shapes for the adjuster 13 can be also customized by the user as the means to specific functions, with various colors for further differentiation.

With respect to the displaying content 212 displayed in the display screen 52, when the user uses one or more fingers to touch the display screen 52 at the same time for performing the operation of zoom-in or zoom-out, the display screen 52 provides information of the one or more touch points 521 at the locations where the two fingers of the user touch on the display screen to the touch control module 40, wherein the module of analyzable factors 26 are activated along with the artificial intelligence module 25. The information of the one or more touch points 521 can be transmitted by the communication module 55 to the processor 51 to receive the information. The information of the one or more touch points 521 is sent to the interacting program module 40 (fourth executable portion 4) where the touch points 521 are recognized as the "gesture for zooming" and then the information of the two touch points 521 is send to the adjuster module 10 (first executable portion 1) to generate the corresponding adjuster 13 for adjusting the displaying content 212 to zoom in or zoom out. The display screen controller module 20 (second executable portion 2) generates the adjuster interface 21 according to the adjuster 13. In one embodiment, the processor 51 arranges the adjuster interface 21 to display on the display screen 52 while the adjuster 13 is displayed on the display screen 52 too. The adjuster 13 is pre-configured by the adjusting range of zoom in or zoom out. The user changes a distance between the two fingers touching on the display screen 52, i.e. the distance between the two touch points 521, so as to adjust the scale/size of the displaying content 212 through the adjuster interface 21. The adjuster indicator 14 provided in the adjuster interface 21 is preferred to be positioned on the adjuster 13 for indicating a current display state of the displaying content 212. The adjuster indicator 14 is able to be moving along the adjuster 13. In other words, when the distance between two fingers (touch points 521) are changed, the positions of the two corresponding adjuster indicators 14 and a number value on the numeric indicator 16 are changed accordingly to reflect the concurrent change on the adjuster interface 21 for any shape adjuster 13 whether it is linear, circular, triangular, or etc.

Additionally, the adjuster 13 may or may not have the adjuster indicator 14 in relation to the graduation(s) 120 on the adjuster interface 21. The adjuster 13 may merely provide the numeric indicator 16 that can visually notify the user of the level for the selected function in the adjuster 13, where the adjuster interface 21 can be customized and manipulated accordingly by the user to provide or not provide the adjuster 13, graduation 120, the adjuster indicator 15, and/or the numeric indicator 16. Alternatively, the adjuster 13 may simply show a decreasing peak and/or an increasing peak while the gesture movement can in any direction, such as vertically, horizontally or obliquely, corresponding to the customization.

More specially, when the display screen 52 is touched by the one or more fingers of one hand or both hands of the user, the display screen controller module 20 detects the two locations of the two fingers of the same hand of the user touching the display screen 52. In one embodiment, the communication module 55 is configured to transport the information of the touch points 521 (the two locations of the two fingers touching on the display screen 52) produced on one or more display screens 52 to the display screen controller module 20 from the one or more display screen 52 and sends the information of the touch points 521 (locations of the two fingers) through the communication module 55 to the processor 51 and from the processor 51 to the other auxiliary modules for additional information. Before the information of the touch points 521 is send to the communication module 55 from the display screen controller module 20, the information of the touch points 521 is defined as the first location of the first finger as the first touch point 521A, and the other location of the other finger as the second touch point 521B. Furthermore, the distance between the two touch points 521A, 521B is measured and analyzed by a distance tracker module 27 of the display screen controller module 20 and the module of analyzable factors 26 are activated along with the artificial intelligence module 25. The display screen controller module 20 further obtains a state of the selected displaying content 212 to be displayed on the of the display screen 52 and the adjuster module 10 generates the corresponding adjuster 13 according to the state of the displaying content 212 of the display screen 52. If the state of the displaying content 212 has been enlarged, for example to a 80% of the maximum state, the adjuster module 10 generates the adjuster 13 and the adjuster indicator 15 accordingly and/or the numeric indicator 16 showing 80%, as illustrated on FIG. 4D.

The adjuster indicator 14 is preferred to but not limited to be provided at the position of the touch point 521 on the adjuster 13. For example, the adjuster indicator 14 is preconfigured in scalable position to indicate the currently state of the displaying content 212. Furthermore, the adjuster 13 may be displayed with the one or more graduations 120 generated along the adjuster 13 with respect to the adjuster indicator 14. The one or more graduations 120 are formed on the adjuster 13 for displaying and to notify the available adjustable range of the adjuster 13. The adjuster indicator 14 is configured to indicate the current displaying content 212 from the maximum through the minimum in the adjuster 13. In one embodiment, the screen controller module 20 generates the adjuster interface 21 and sends the adjuster interface 21 to the processor 51 through the communication module 55. The processor 51 receives the adjuster interface 21 through the communication module 55. The processor 51 arranges the adjuster interface 21 to display in the display screen 52. When the distance between the first touch point 521A and the second touch point 521B is reduced, the displaying content 212 zooms-out, e.g. by the processor 51, on the display screen 52. At the same time, the adjuster indicator 14 is adjusted and the position of the lessor graduation 120 displays the current state of the displaying content 212 on the display screen 52. When the distance between the two touch points 521A, 521B is changed, the adjuster indicator 14 moves directly proportional to reflex the current state of the displaying content 212 on the display screen 52 and is illustrated on the adjuster 13. Preferably, the adjuster 13 is arranged to pass through the first touch point 521A and the second touch point 521B. In other words, the first touch point 521A and the second touch point 521B are able to move along the adjuster 13 in such a manner that the adjuster 13 is able to guide the user to zoom-in or zoom-out as a timely watermark popup displaying contents.

In an alternate computer cloud medium, the screen controller module 20 can generate the adjuster interface 21 and send the information of the adjuster interface 21 to the server processor 101 through the sever communication module 105. The server processor 101 receives the adjuster interface 21 through the server communication module 105. The server processor 101 arranges the adjuster interface 21 to display in the display screen 52. When the distance between the first touch point 521A and the second touch point 521B is reduced, the displaying content 212 zooms-out, for example by the server processor 101, on the display screen 52. At the same time, the adjuster indicator 14 is adjusted and the position of the lessor graduation 120 displays the current state of the displaying content 212 on the display screen 52. When the distance between the two touch points 521A, 521B is changed, the adjuster indicator 14 moves directly proportional to reflex the current state of the displaying content 212 on the display screen 52 and is illustrated on the adjuster 13. Preferably, the adjuster 13 is arranged to pass through the first touch point 521A and the second touch point 521B. In other words, the first touch point 521A and the second touch point 521B are able to move along the adjuster 13 in such a manner that the adjuster 13 is able to guide the user to zoom-in or zoom-out as a timely watermark popup displaying content.

Furthermore, the user is able to pre-configure a plurality of touch points 521 with respect to the gestures of the user for operating the one or more programs of the system on the display screen 52. The user is able to pre-configure gestures by programing two or more touch point 521A and the touch point 521B. For example, when the two touch points 521A, 521B corresponding to the two fingers touch on the physical display screen 52 or the touch points 521A, 521B are detected with respect to the virtual display screen, the information of the touch points 521A, 521B is transported by the communication module 55 to the display screen controller module 20 to be analyzed and recorded by the display screen controller module 20, where the distance of the two touch points 521A, 521B has being preprogramed on the distance tracker module 27, without additional movement by the two fingers of the users moving apart with each other (separation), the zooming percentage is immediately provided on the image. For example, the user selects a single gesture with two touch points 521 from the gesture dictionary 402 and the zooming program from the program dictionary 45 in the interacting module 40, the display screen controller module 20 receives the information from the user and pairs the gesture with the respective program. Also, the display screen controller module 20 would analyze the user's gesture and the user's performance(s) as criteria in the pairing of a gesture with a program for the selected touch points 521 to become a gesture.

The user is further provided with additional options to program by the system of the present invention. For example, a two-inch space separation between the two fingers can be program to automatically zoom the image at 50 percent capacity and a four-inch space separation between the fingers automatically zooms the image to maximum capacity 100 percent. The advantage is a gesture of two touch points 521, pre-program from one to eight inches long ergonomically selected and programmable to generate displaying contents 212 at set percentages based on the users two finger distance selection. Therefore, the distance between the two touch points 521 immediate provides the image resolution at the preselected percentage. In addition, the user may further control the image accordingly by maintaining continuous contact on the display screen 52 from the initial two touch points 521 distance gesture selection, such that with the same two fingers, the user may reduce or increase the space between the two fingers from two inches to one inch providing the user faster control time for zooming, no matter if the user is at the maximum zooming capacity of four inches space separation with the two fingers of the user can zoom-out, or if the user is at the 50% image zoom of two inch space separation between the touch point 521A and the touch point 521B. Based on the user hand size, finger deformities, and/or finger injuries selection, the percentage of zooming for selected space between the two touch points 521 is parameters a preprogram gesture control. It is important to mention that the user may preconfigure similar zooming capacities for every inch, for example 1 inch for 25%, 2 inches for 50%, 3 inches for 75%, and etc. Once the user has completed all the available programmable options, the artificial intelligence module 25 reviews and records all the module of analyzable factors 26 selected or available and then delivers the information to the interacting module 40 to be recorded in the gesture dictionary 402 and in the program dictionary 45. This process is essential to provide gesture and program pairing information to the user, such as for editing, reminder, and to prevent duplication of program and gestures pairing, as illustrated in FIGS. 4C and 4D. It is worth mentioning that the two-finger touch point space separation gesture with immediate zooming gesture capacity is provided by the display screen controller module 20 after the module of analyzable factors 26, the distance tracker module 27 and the artificial intelligence module 25 verification, and then the information is delivered to the processor 51 to displaying content 212 of the selected two finger space separation on the display screen 52. Where the display screen 52 may have the adjuster 13, the adjuster indicator 14 and/or the numeric indicator 16 in a watermark form customizable and throughout the screen display 52, as illustrated in FIGS. 4C to 4D.

In other words, through the process of pre-programing characteristics of the user's gestures, such as touching pressure of each finger of the user, a size of the touch point where the user touches the display screen 52 with his or her generally used touching finger(s), a space between two fingers from one hand or two hands of the user, and the like, the gesture operating on the display screen 52 according to the present invention can be customized. It is also an alternative method for security to the system and the electronic device 50. Conventionally, the electronic device 50 may merely log in through password or biological security code such as fingerprint or facial recognition with camera which is not actually identification and determination of the owner of the electronic device since the password may be broken and fake fingerprint or facial image may be produced to log in the electronic device 50. To record and learn the personal operation gestures of the owner of the electronic device 50 through the module of analyzable factors 26 and the artificial intelligence module 25 according to the preferred embodiment of the present invention, the electronic device 50 may also provide a security protection from operation (selection) by a non-owner or unauthorized user by detecting the gesture operating on the one or more display screens 52, including how is the performance of the gestures of the user and what gesture is performed for the program on the one or more display screens 52. It is worth mentioning that the monitoring of the gesture production and gesture and program selection for pairing are not limited to the touch-type display screen 52 of the electronic device 50 that the same applications would be applied to non-touch inputting operational controls like extremities neuromuscular wearable sensors inputting and brain electrical impulse sensors inputting interfaces.

According to the preferred embodiment of the present invention, the processor 51 can be configured to adjust the displaying content 212 to the maximum state or to a predetermine two finger separation inch indicator for the zooming percentage. Also, the adjuster indicator 14 is adjusted to indicate in form of watermark of the selected state of the displaying content 212. The user may not always produce the perfect inches of separation. The adjuster 13 is displayed on the display screen 52 to operate the display screen controller module 40 with the adjuster interface 21 to select precision options of the gestures on the two-finger inch percentage separation and/or approximation. Also, the adjuster indicator 14 is adjusted to indicate in form of watermark of the selected state of the displaying content 212. Once defining as suitable distance of the two touch points gesture for adjusting the displaying content 212 displaying on the display screen 52, the preprogram displaying content percentage is acquired by the distance tracker module 27 and is delivered to the processor 51 and then displayed on the display screen 52. In other words, when the distance between two fingers of the user is identify as suitable distance and the two fingers of the user are touching on the display screen 52, the displaying content 212 is adjusted to the pre-program display percentage in the display screen 52, wherein the adjustor indicator 14 indicates the watermark displayed proportional to the state of the current display 212, as to the current state of the displaying content 212. In such a manner, the preconfigure distance between the two fingers is able to be defined and continuously operate the displaying content zooming capacities. Furthermore, the artificial intelligence module 25 is configured to record and analyze each gesture operation of the authorized user of the electronic device 50 so as to learn and determine the distance between the two fingers of the user and the corresponding displaying contents 212 to anticipate the users' operational needs.

For example, the display screen controller module 20 determines the separation of the two touch points 521A, 521B to be over four inches and that equates to the adjuster module 10 to display maximum display capacity or the lease zoom display capacity on the one or more programs on the one or more display screens 52. Similarly, the separation of the two touch points 521A, 521B to be over two inches is determined to equate to the adjuster module 10 to display 50% and/or half of the full display screen display capacity, vice versa, etc.

In addition, for a two touch point gesture under an inch of separation, the adjuster 13, the one or more graduations 120, the adjuster indicator(s) 14 and/or the numeric indictor(s) 16 are generated by the adjuster module 10 between the two touch points 521 at a predesignated location not adjacent to the two touch points 521 with respect to the one or more programs on the corresponding display screen 52. Where a distance of the two touch point gesture separation has been pre-programmed to display the respective displaying content(s) 212 of the one or more programs on the one or more display screens 52 specifically or in close proximity to a degree of the pre-programed two touch point gesture, without an initial physical movement of the two touch points 521, based on the degree of the distance between the two touch points 521. For example, the display screen controller module 20 determines the separation of the two touch points 521 to be under an inch and equates to the adjuster module 10 to display 0% and/or minimal zoom-out display capacity on the corresponding display screen 52. Also, the two inches of separation of the two touch point gesture can also represent to the adjuster module 10 to display 50% and/or half of the full display screen capacity, vice versa, etc.

The two touch points 521 not only provide the user an immediate image percentage display of the displaying content 212 within a window on the one or more display screens with respect to the one or more programs, but also allow the user to have additional control capacity for, for example, zooming in or zooming out. When a separation between the two touch points 521 from under an inch, to one inch, to two inches and so on. Similarly, two touch points 521 coming together from four inches or more, the user may pinch bring together the two touch points to three inches or two inches space between the two fingers, or vice versa, etc., so as to manipulate the size of the displaying content 212 with respect to the one or more programs on the one or more display screens at the same time or in a timely manner, while the scale or size of the adjuster 13, the one or more graduations 120, the adjuster indicator(s) 14, and the numeric indicator 16 provided between the two touch points 521 would be adjusted correspondingly.

The two touch points 521, for example between the thumb and the index finger, may provide the user the immediate image percentage for resizing a displaying content 212. In an alternative pinching or de-pinching inputting gesture of one or more programs divided by one or more sideline elements 31 may provide alternative functions when a similar but different gesture is paired with other programs like the program for volume or the program for brightness to operation within the operation areas 522 divided by one or more sideline elements 31. In other words, according to the present invention, one or more programs divided by one or more sideline elements 31 may have different volume controls and/or different brightness display controls on the same display screen 52 at the same time or on one or more display screens 52 with respect to the one or more programs, and may allow the user to maintain the same capacity for, zoom-in or zoom-out program with similar pinching and de-pinching gestures where the module of analyzable factor(s) 26 along with the artificial intelligence module(s) 25, identifying the pinching or depinching gesture as a different gesture paired with zoom program when the pinching and depinching gesture is done with the thumb finger as one touch point 521 and the other touch point 521 is done with the index finger and the middle finger. In other words, the program would recognize the extra middle finger in the performance of the two touch points 521 pinching and depinching gesture for zooming. In addition, the gesture for volume or brightness may differentiate when one touch point 521 is done with the thumb and the other touch point 521 is done with the index finger, the middle finger and the ring finger. It is worth mentioning that it is essential for pairing a gesture with a program and for performing the desire gestures on the display screen 52 with auxiliary tools like the adjuster 13 and the adjuster interface 21, and etc., for the customization of the gestures when pairing a gesture and a program together.

It is worth mentioning that the adjuster 13 is a tool provided not only for gesture for moving and gesture for zooming, but also for other gesture operations of the one or more programs, including controlling displaying contents 212, controlling and editing preset or customized gestures, controlling display brightness, controlling audio, controlling the sideline elements 31, and etc. In other words, the adjuster 13 is a visual aid to the one or more touch points and gestures for controlling any and all programs of the system and the examples provided in this application is not intended to limit scope of the invention. In addition, the adjuster 13 can have various shapes as mentioned above with the one or more graduations 120 or without graduation 120. Programs and gestures paired with each other may also provide corresponding adjusters 13 and adjuster interfaces 21 to control the module of analyzable factors 26 of the one or more gestures with respect to the one or more programs. For example, when typing a document, the user may want the popup sideline element 37 to be generated faster that the user will have the option to control that feature with the corresponding adjuster 13 for time control of that program through the use of the adjuster 13 and the adjuster interface 21 while the module of analyzable factors 26 help to optimization the user's controls. The user may control the one or more programs on one or more display screen 52 through his or her gestures and the adjuster 13 with the adjuster interface 21.

Referring to FIGS. 2-3 and FIGS. 5A-5B, the third executable portion 3 (sideline module 30) is communicatively connected with the first executable portion 1 (adjuster module 10) and the second executable portion 2 (display screen controller module 20). According to the preferred embodiment of the present invention, the third executable portion 3 is configured to further provide one or more sideline elements 31 defining one or more operating areas 522 on the display screen 52. When the one or more touch points 521 are detected as the gesture for operating the operating area 522 on the display screen 52, wherein the display screen control module 20 (second executable portion 2) identifies the gesture as adequate and compatible. The interactive module 40 (fourth executable portion 4) receives the touch point information and the operating area 522 is activated on the display screen 52. In the preferred embodiment, the fourth executable portion 41 operates the operating area program 401 thereof to control the operating area 522 to be displayed on the display screen 52 to allow the user to control the operating area program 401 for operating any concurrent operating programs on the display screen 52. The touch point information, including the location of the one or more touch points 521, detected by the display screen controller module 20 is sent to the adjuster module 10 to coordinate the one or more touch points 521 with or without the adjuster 13, with or without the adjuster indicator(s) 14, with or without the pressure indicator(s) 15, and/or with or without the numeric indicator(s) 16 provided by the adjuster module 10 in the operating area 522 in relation to the displaying contents 212, wherein any movement of the one or more touch points 521 in the operating area 522 is determined as gesture inputting taking place by the user to operate the displaying contents 212 on the display screen 52.

In one embodiment, the interactive module 40 may send the touch point information to the processor 51 through the communication module 55 to display the operation area 522 on the display screen 52. For example, the user is able to use double tap gesture to activate and display the operation area 522 at the location where the user double taping and the adjuster 13 is formed at the location where the user fingers touching the display screen 52 while the finger touching points on the display screen 52 are detected as the touch points 522 on the adjuster 13, as shown in FIGS. 5A and 5B.

It is worth mentioning that when the operation area 522 is activated, the operation area 522 is capable of following the continuous touch point as operating gesture performed by the user. More specifically, the operating area 522 is provided with touch point information according to the module of analyzable factor(s) 26 and the artificial intelligence module 14 in relative to the continues motion and selected gestures. For example, the current module of analyzable factors 26 determine gesture acceleration and direction and deliver the touch point information to the adjuster module 10 for contents display then to the interactive module 40 to reposition the operating area 522 based on the projected direction of the one or more touch points 521 on the one or more display screen 52.

It is important to mention that the interactive module 40 houses most if not all of the operating programs, such as the interacting program 42, the keyboard element program 43, the gesture and cursor program 44, the scrolling program 46, the zooming program 47, the state-off program 48, the time tacker program 49, the operating area program 401, as well as the gesture dictionary 402. In the program dictionary 45, all the available programs for gestures pairing are found like the keyboard element program 43, the gesture and cursor program 44, the state-off program 48, the scrolling program 46, the zooming program 47, and the time tracker program 49, wherein future programs are scalable as new functions to be updated. Additionally, every program may have additional gesture within the initial gesture like the gesture for the mouse to move the cursor is a specific gesture, plus the right and left gesture controls can be imbedded within the same gesture, wherein the additional gestures are also customizable and distinguishable from the mouse gesture movement option, wherein additional gestures are also available for pairing and to be performed while controlling the primary gesture, for example left tap with the index finger and right tap with the middle finger, as the five finger touch point controls the movement of the digital mouse. Furthermore, the left hand or the right hand gestures are interchangeable, wherein the gestures are collectively produced by both hands, where one hand controls the gesture for the movement of the cursor and the other hand controls the gesture of the right and left click/tap, etc.

Referring to FIG. 5C, according to the preferred embodiment, the user can triple tap on a desired location of the screen display 52 and then slide towards a direction, such as horizontally or vertically, to activate the sideline module 30 (third executable portion 3) to form a sideline element 31 on the screen display 52 dividing the screen display into two displaying portions 523, 523' to provide two windows, wherein the sideline element 31 is a horizontal sideline element 31 (as shown in FIG. 5C) extended from the triple taping location if the user performs a triple tapping and then a horizontally sliding, or alternatively the sideline element 31 will be a vertical sideline element 31 if the user performs a triple tapping and then a vertical sliding. The original displaying content 212 is automatically displays in one of the two displaying portions 523, and the other displaying portion 523' provides a reservation area 33 available for the user to as a new window to open another program to display thereon as the second displaying content 212'.

Further, for displaying two displaying contents 212, 212', the user simply performs a sideline gesture, such as triple tap, on the display screen 52 generating a sideline touch point information which is recognized by the display screen controller module 20 (second executable portion 2) and sent to the sideline module 30 (third executable portion 3) to generate the sideline element 31 to split the display screen 52 into the two displaying portions 523, 523. Then, when an operating gesture is operated by the user on each of the displaying contents 212, 212' on the two displaying portions 523, 523', the touch point information detected by the display screen controller module 20 is sent the adjuster module 10 to generate an adjuster 13 on that displaying portion 523 or 523' for adjustment operating of the displaying content 212, 212' on that displaying portion 523, 523' touched by the user.

The touch point information provided to the adjuster module 10, the sideline module 30 and the interactive module 40 are analyzed touch points 521 to be produced in more than one way on the display screen 52, wherein the display screen controller module 20 activates the module of analyzable factors 26 for distinguishing pressure, thickness, time, acceleration, direction, angle, interruptions, size, one hands or both hands, and/or location from one or more touch points and where the information is further reviewed and learned by the artificial intelligence module 25 to differentiate from past, current and for future touch points selections. In other words, the operating gestures according to the present invention can be interpreted as 4-Dimensional gesture in comparison to the convention control gesture which is generally 2-Dimensional gesture produced according to the number of fingers used and direction of the finger moved. According to the preferred embodiment of the present invention, the pressure of the one or more fingers, the movement of one or more fingers and the time duration of gesture contributed four dimensional touch point information for the adjuster module, the display screen controller module 20, the sideline module 30, the interactive module 40 for better sensation and control to better operate the programs of the electronic device 50 on the one or more display screens 52.

Furthermore, referring to FIGS. 3 to 6, the adjuster module 10 generates a graduation indicator 14 and/or a numeric indicator 16 according to the current state of the displaying content, wherein the parameters of the display screen 52 and the preset proportion of the touch point 521 on the adjuster 13 are indicated on the adjuster indicator 14 through the use of the adjuster interface 21 on the adjuster 13. The graduation 120 is provided on the adjuster 13 to show the moving scale of the displaying content 212. Through the graduation 120, the user understands the various available distance for display and the current distance of one or more displaying contents 212 of one or more programs on one or more display screens 52 for one or more program functions. The scales provide a customize percentage through the adjuster 13. Where the finger of the user requires significant less physical demands to move a displaying content 212 in the display screen 52 in relation to the size of the physical display screen 52 and/or the size of the program/document being larger or smaller to the display area of the physical display screen 52, wherein the user can easily manipulate the size of the displaying content 212 in any display medium.

Referring to FIG. 7, an example of portion of the gesture dictionary is illustrated, wherein those operating gestures can be predesignated in the gesture dictionary 402 of the system such as the interactive module 40. In addition, each operating gesture can be redesignated to any customized gesture by the user of the system or the owner of the electronic device 50, facilitating the operation and control of the programs for the user as well as providing an innovative way to log in the system and/or the electronic device as authentication gesture password. For example, when a user has to log in the system or a program of the electronic device, the log in window may provide a function box for the user to select a specific function, such as ON/OFF, ZOOM IN, DICTIONARY, TEXT, and etc., and a gesture box for the user to execute the corresponding customized gesture personally designated and preset in the gesture dictionary 402 of the system by the user.

In addition, in the Metaverse technology with the usage of electronic device 50 such as AR/MR/VR devices, the user is provided with a work, home, or any immersive environment when the user must perform tasks as the means for user verification, through the use of gestures, wherein the performance and information of the touch point 521 in the gesture are analyze by the module of analyzable factor(s) 26 and the artificial intelligence module 25, wherein the task selection and the gesture selection are analyzed and the order of the tasks is quantified by the artificial intelligence module 25. For example, the user can make the verification immersive environment a library with hundreds of book to pick from where the order of picking up books and the performance of the gestures for the task are analyzable by the module of analyzable factor(s) 26 and the artificial intelligence module 25.

Figure 8A:
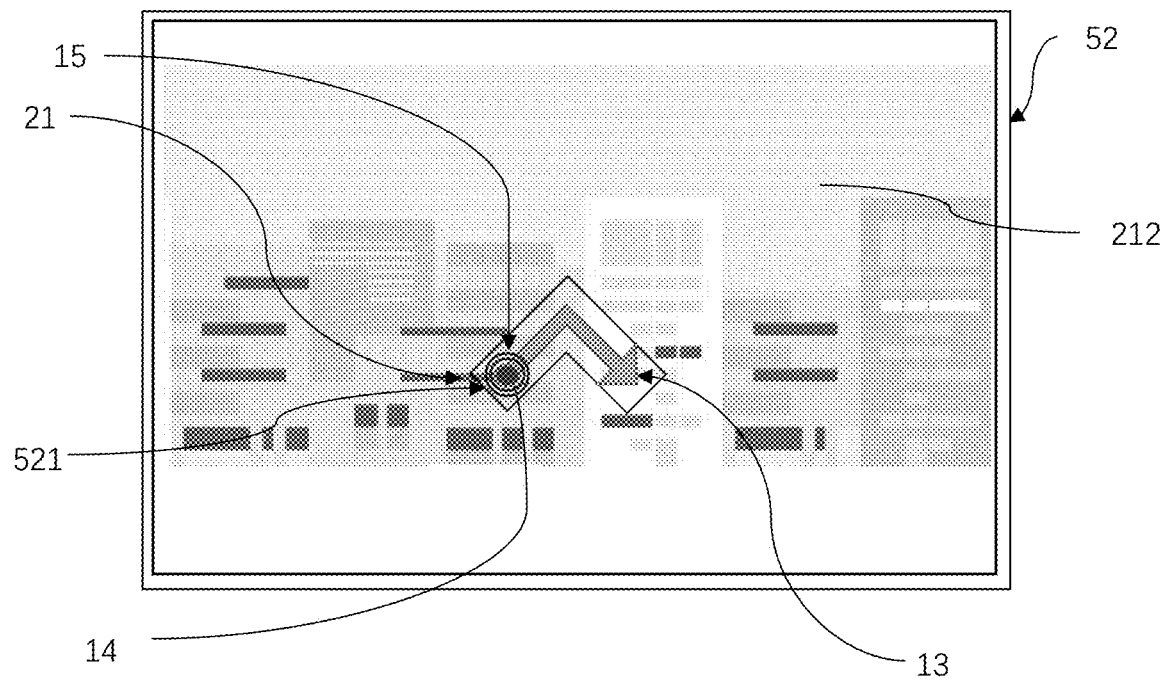
FIGS. 8A-8B are schematic views illustrating the adjuster for guiding an operation of gesture for power off of the electronic device according to the above preferred embodiment of the present invention.

After operation of a program on the display screen 52, when the user likes to have the electronic device 50 being power off, as shown in FIG. 8A, the user may simply use his or her finger to perform the power off gesture on the display screen 52, the adjuster 13 will show at the touching location of the touch point 521 on the display screen 52 to guide the movement of the finger. When the touching finger moves inclinedly upwards and then inclinedly downwards to produce a reverse V gesture, the electronic device 50 will be operated to power off correspondingly after confirmation with the user. If the operating area 522 has already been provided on the display screen 521 by the sideline element 31, the user may simply perform the operating gestures on the operating area 522, as shown in FIG. 8B.

Similarly, when the user likes to operate the electronic device 50 to a sleep mode, the user may use his or her index and middle fingers perform the sleep mode gesture on the display screen 52 in a close together manner to produce two closed together touch points 521, the adjuster 13 will show at the touching location of the touch points 521 on the display screen 52 to guiding the movement of the fingers. If the two fingers move inclinedly upwards and then inclinedly downwards to produce a reverse V gesture, the electronic device 50 will be operated to sleep mode correspondingly after confirmation with the user. In an alternative example, the extra finger touch point may be programmed for sleep mode of the electronic device 50.

Another example is that when the user working on an image displaying content 212 and request to type in some texts on the display image, the user may activate the text program by using one finger to touch and slide on the display screen 521 or the operating area 522 of the display screen 521 downwardly and then promptly press on an adjacent spot with a predetermined pressure to produce an exclamation mark form as the text gesture, as illustrated in FIG. 7, to activate a text program correspondingly for the user to input texts. It is appreciated that the adjuster 13, as well as the adjuster indicator 14, the pressure indicator 15, the numeric indicator 16, and/or the graduation 120 can be provided or not at the same time with the adjuster 13 to facilitate and guide the user to effectively perform his or her operating gesture to operate and control the one or more operating programs from the module of analyzable factor(s) 26 precisely.

Figure 8B:
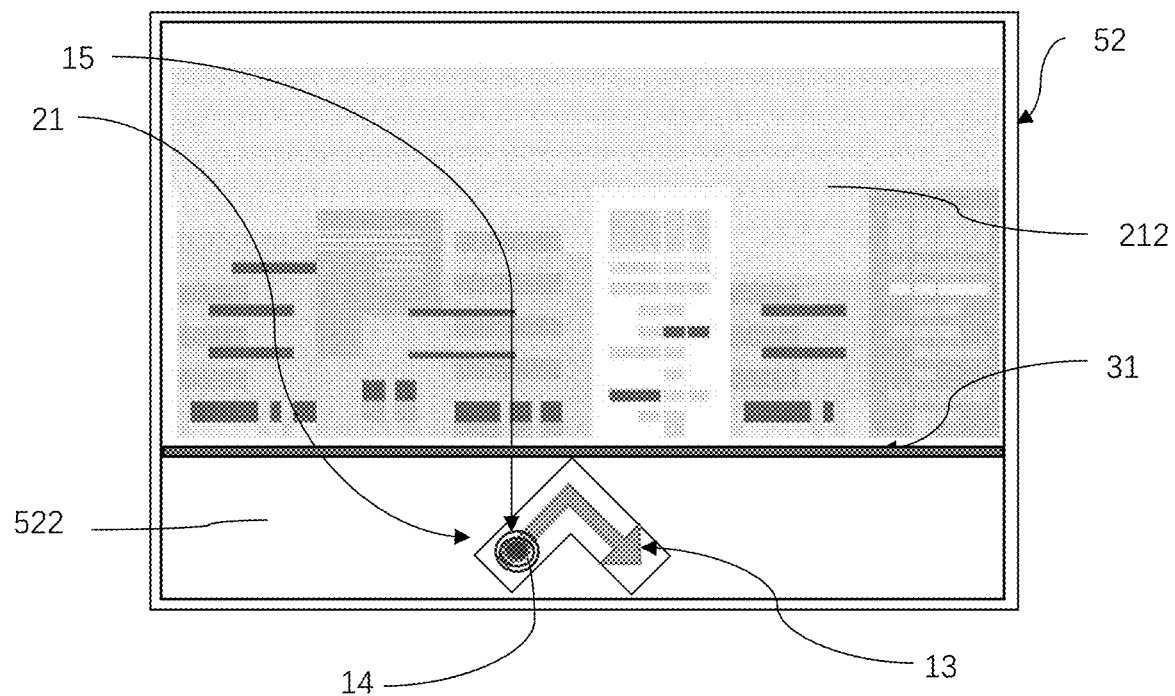

In order to demonstrate the updated features of the invention, the sliding gesture for moving, as shown in FIGS. 4A-4B and FIG. 5A, the pinching and de-pinching gesture for zooming, as shown in FIGS. 4C-4D and FIGS. 5B-5C, and the arrow gesture for power off, as shown in FIGS. 8A-8B, are illustrated as examples, wherein the above examples are only for demonstrating the operations of programs through designated or customized operating gestures but not intending to limit the scope of the claimed invention. Numerous programs available through one gesture with multiple module of analyzable factors and the computation of the artificial intelligence module 25 are workable in the present invention, where one gesture does not have to be bounded to only zooming-in or zooming-out that the pinching and de-pinching gesture with different pressing pressure or with two or more fingers may also be assigned to the operation of other functional programs according to the designation of the user. It is appreciated that in consideration of the module of analyzable factors 26 for each operating gesture, every module of analyzable factor can be program to an individual program from the program dictionary 45 in the interactive module 40.

More specifically, the display screen controller module 20 detects the pressure, thickness, time, acceleration, direction, angle, interruptions, size, one hand or both hands, and the location of one or more touch points which are module of analyzable factors 26 being reviewed and learned by the artificial intelligence module 25 for differentiating from past, current and for future touch points selections of the touch point 521 on the display screen 52, so that the first gesture and the second gesture are identified as one or two different gestures and etc. The display screen controller module 20 also identifies the touch points 521 of one or more split programs displayed on one or more displaying portions 523 divided by the one or more sideline elements 31 respectively.

In other words, the display screen controller module 20 activates the module of analyzable factors 26 from the one or more touch points 521 on one or more display screen 52, so that the first gesture and the second gesture are distinguished as one complete gesture or two different gestures, and etc. The display screen controller module 20 analyzes the touch points 521 for whether each of the one or more split programs requires the adjuster 13, the adjuster indicator 14, the pressure indicator 15, the numeric indicator 16, the graduation 120 as well as whether the split programs require the one or more sideline elements 31 to divide the display screen 52 into two or more displaying portions 523 and relocation of the displaying contents 212 in the displaying portions 523 respectively. The display screen controller module 20 is also configured to analyze the one or more touch points 521 for one or more superimposed operating areas 522 being operated by the state-off program 48 through the interactive module 40 on one or more programs. For example, as shown in FIGS. 4A-4B, when the touch point 521 is created by the touching finger of the user of the display screen 52, the adjuster 13 is provided on the display screen 2 under controlled by the adjuster interface 21 that the area of the original displaying content 212 on the display screen 52 and the adjuster 13 form the superimposed operating area 522 for operation through the operating area program 401 of the interactive module 40. In particular, when the operating area program 401 is activated and superimposed on an existing program (i.e. a state-off program 48), the portion of the program displayed on the display screen 52 may be locked to prevent that portion of the original running program and the original displaying content 212 from getting erroneous misleading information accidentally inputted while a gesture is being performed and created on the operation area 522 while the adjuster 13 is provided for illustration and guidance of the operating gesture performed by the user and created in the display screen controller module 20. That portion of the program cannot be operated with touch points 521 or may have very limited touch points 521 operation capacity, while the operation area 522 is operational and furthermore the existing program has options to continue running or to pause on one or more display screen 52.

The artificial intelligence module 25 learns from the display screen controller module 20 for touch point variants, as well as from the program's selections and task performances, of the selected programs on the sideline module 30. The artificial intelligence module 25 is also learning from sideline module 30 for splitting of various programs and the programs selection for positioning into the reservation areas 33 and from the adjuster module 10 for recognizing and repositioning of displays contents 212. In one embodiment, the artificial intelligence module 25 is configured to learn from the display screen controller module 20 by analyzing the one or more touch points 521 from the one or more module of analyzable factors 26 on one or more operating programs such as the reservation area 33 requiring the adjuster 13 being requested, the adjuster indicator 14 being manipulated, and the numeric indicator 16 being requested, and etc. In other words, the artificial intelligence module 25 learns the layout to the adjuster module 10, to the sideline module 30 and to the interactive module 40 on the one or more display screens 52 to better assisted the user with repetitive task.

It is worth mentioning that the present invention is intended to operate independent or with other inputting existing control options such as voice command, external auxiliary touch device like physical track pad, retinal computer-controlled device, eye movement tracking control, AR/MR/XR/VR devices, and etc. It is an objective to demonstrate the numerous options for an all-digital touch point control system and to illustrate a hybrid option for other existing and future inputting systems in the computer industry, or furthermore, in combination with more than one inputting computer systems.

The computer usable medium 100 can be the processor of the electronic device programmed to have computer-readable program code to perform executable operations of the first to fourth executable portions 1, 2, 3, 4. According to the preferred embodiment, as shown in FIGS. 1 and 2, the computer usable medium 100 is embodied as the cloud server configured to have computer-readable program code to perform executable operations of the first to fourth executable portions 1, 2, 3, 4 such that the electronic device 50 communicatively linked therewith wirely or wirelessly, especially through 5G or above communication network, to run the programs in the cloud server and transmit the output to the electronic device 52 to display the output information through the communication between the server communication module 105 of the cloud server 100 and the communication module 55 of the electronic device 50. It is appreciated that the cloud server may merely installed with some of the executable portions while the other executable portions, such as the adjuster module 10, the display screen controller module or the sideline module 30) can be preinstalled in the electronic device 50 to collaboratively operate with the cloud server 100.

According to the preferred embodiment of the present invention, the third executable portion 3 is configured to generate the one or more sideline elements 31 for organizing two or more applications on the display screen 52. More specifically, a sideline element 31 divides one or more programs on the display screen 52 into two or more displaying portions 523, 523', as shown in FIGS. 5A-5C, such as a first displaying portion 523 for displaying the displaying content 212 and a second displaying portion 523' for displaying the adjuster 13 as the operating area 522 as shown in FIGS. 5A-5B, or the first displaying portion 523 for displaying the original displaying content 212 and the second displaying portion 523' for displaying another displaying content 212' as shown in FIG. 5C. Once the sideline element 31 is activated to be provided on the display screen 52, the application is able to display and operate on each displaying portion 523 of the display screen 52.

It is appreciated that, through the sideline element 31, the user is able to control displaying contents 212 in the first displaying portion 523 and the second displaying portion 523'. For example, the user is able to use one finger to produce a touch point on the sideline element 31, and another finger to touch the first displaying portion 523, that is a two-touch point gesture with two touch points 521, wherein the distance tracker module 27 of the display screen controller module 20 predetermines the touch point distance in relation to one hand or two hands, then the artificial intelligence module 25 sends the touch point information to the adjuster module 10. The display screen controller module 20 with the module of analyzable factors 26 and the artificial intelligence module 25 recognize the gesture for zooming program 47, wherein the touch point information is also sent to the adjuster module 10. The adjuster module 10 send the touch point information to the processor 51 through the communication module 55. The processor 51 sends the touch point information to display the adjuster 13 between the two touch points 521. Furthermore, the one or more graduations 120 may or may not be displayed with the adjuster 13. In other words, the user controls the displaying content size of one or more programs and one or more display screens with one or more fingers on the adjuster interface 21 and in the adjuster 13.

Figure 9A:
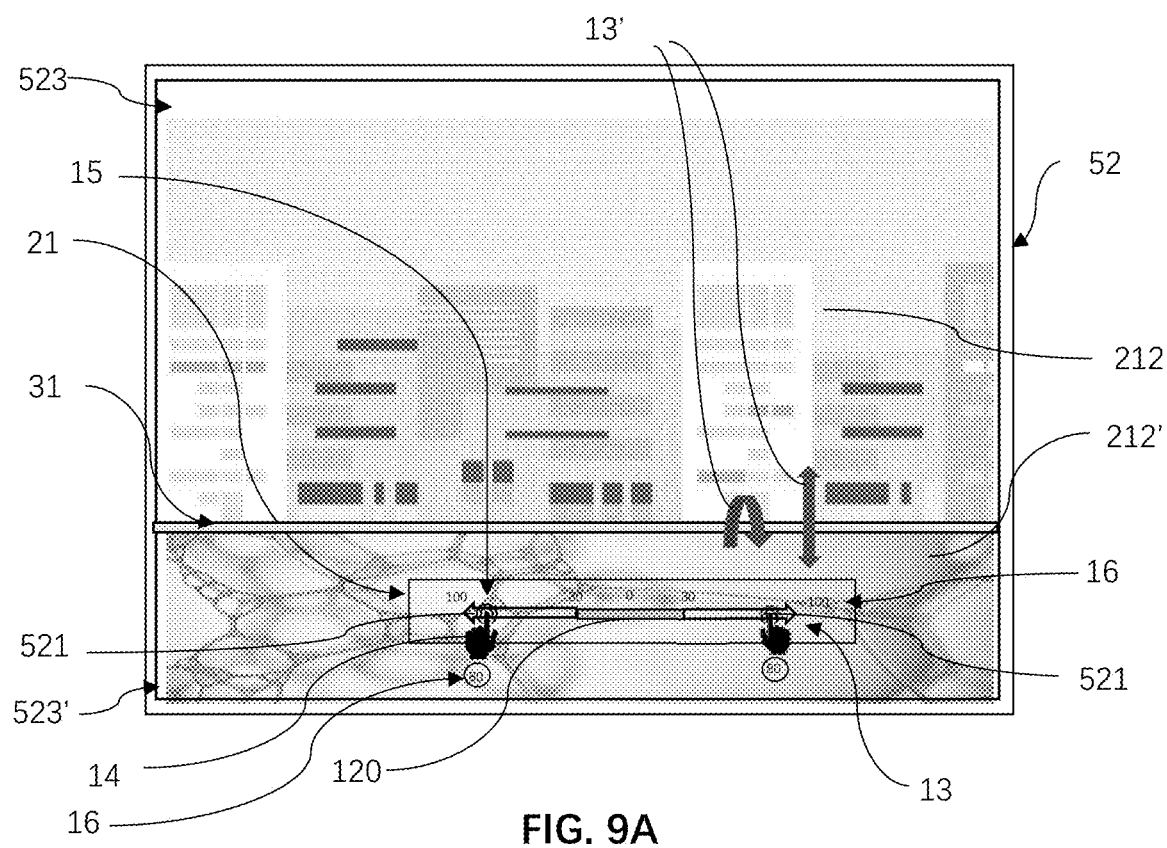
FIGS. 9A-9C are schematic views illustrating an operation of a sideline element on the display screen of the electronic device according to the above preferred embodiment of the present invention.
Figure 9B:
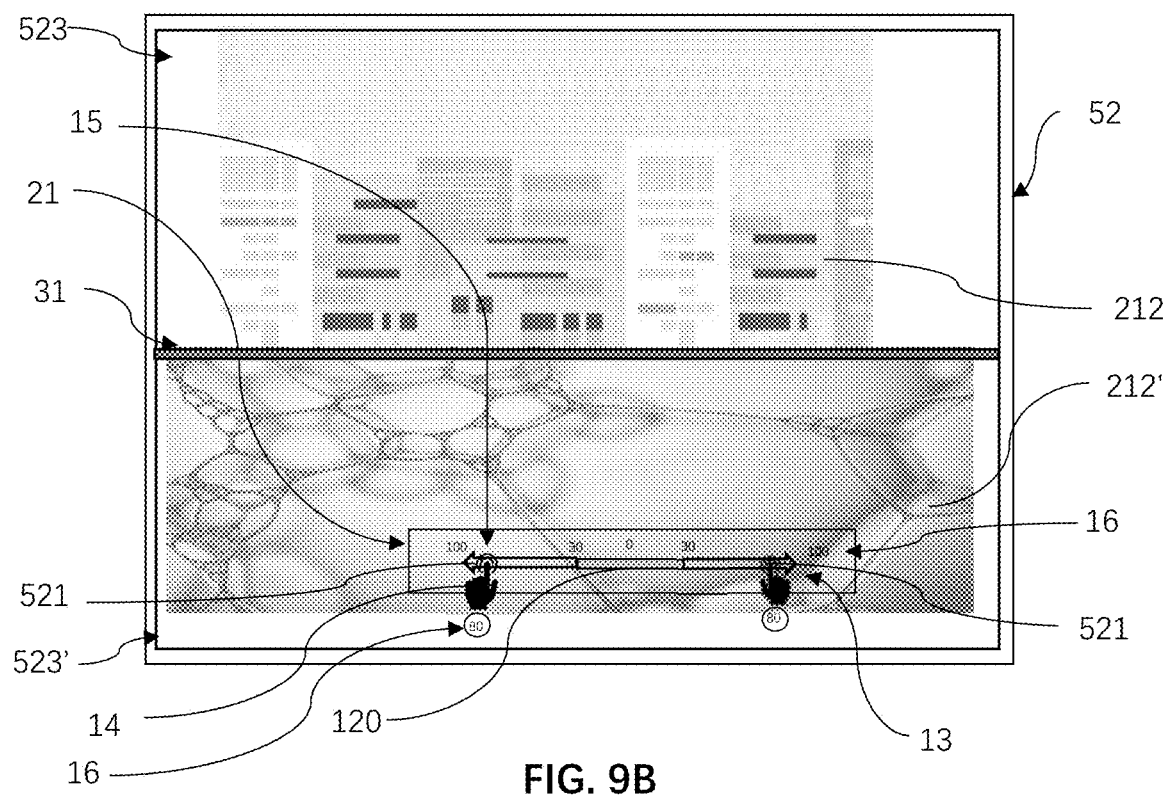
Figure 9C:
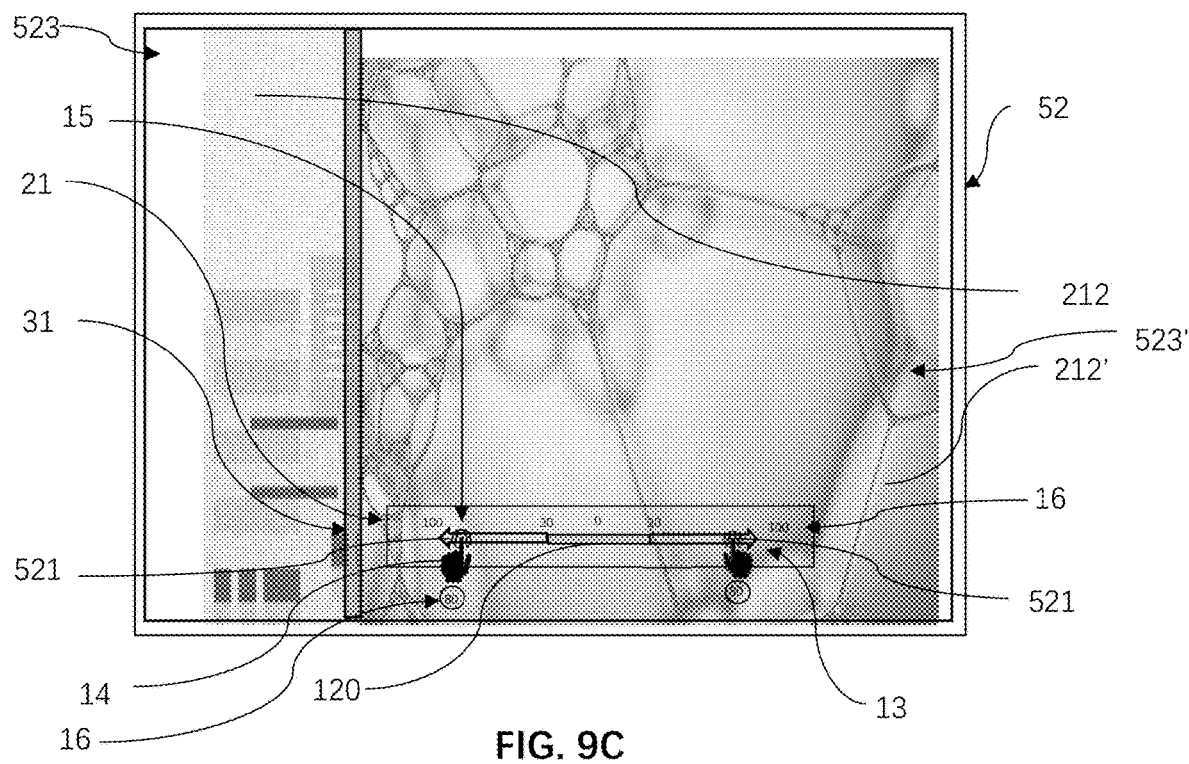

Referring to FIGS. 9A-9C, when two fingers of the user touches the sideline element 31 together at the same time, the display screen controller module 30 detects such sideline operating gesture and change a color of the sideline element, for example, and the user may simply slide the two touching fingers upwardly or downwardly together to move the sideline element 31 to an upper position or a lower position correspondingly to where the two touching fingers stop, as shown in FIG. 9B, when compared with FIG. 9A, or to rotate the two touching fingers with one of them as a center clockwise or anticlockwise to move the sideline element 31 from the horizontal position to a vertical position or vice versa correspondingly, as shown in FIG. 9C, wherein the displaying contents 212, 212' displayed on the displaying portions 523, 523' change positions accordingly. Similarly, to a vertical sideline element 31 as shown in FIG. 9C, the user may also move it leftwards or rightwards by the sideline operating gesture with the two touching fingers touching at the vertical sideline element 31 together to move leftwards or rightwards.

In addition, the sideline operating gesture detected by the display screen controller module 30 may generate the corresponding touch point information that is sent to the adjuster module 10 to generate one or more sideline adjusters 13' for sideline element 31 provided adjacent to the sideline element 31, as shown in FIG. 9A, to guide the user to operate and control the positioning of the sideline element 31.

It is worth further mentioning that, in one embodiment, through the motion of the touching fingers (and the touch points 521 generated correspondingly) on the sideline element 31, the user may also able to zoom-in or zoom-out the displaying content 212 in one of the displaying portions 523', for example the second displaying portion 523', of the display screen 52 without affecting the other first displaying portion 523 on the display screen. As shown in FIG. 9C, if the user wants to adjust the displaying content 212 in the second displaying portion 523' of the display screen 52, the user may simply use, for example, one finger to touch the sideline element 31 and another one finger to touch on the second displaying portion 523', wherein two touch points 521 are generated at the sideline element 31 and the second displaying portion 523' respectively and the locations of the two touch points 521 and the distance between the two touch points 521 determined by the distance tracker module 27 generate a sideline and zooming touch point information. Then, when the user move the vertical sideline element 31 leftwards to enlarge the second displaying portion 523', the sideline element 31 is moved leftwards and the second displaying content 212 displayed on the second displaying portion 523' enlarges at the same time proportional while the magnification of the displaying content 212' displayed remains no change. At the same time, the size of first display portion 523 is reduced and the magnification of the display contents 212 remains unchanged. It is appreciated that the adjuster 13 provided on the second displaying portion 523' will change accordingly to illustrate the scale and size of the enlarged displaying content 212' on the second displaying portion 523' of the display screen 52. Alternatively, reducing or enlarging the displaying portion 523 or 523' with the sideline element 31 can increase or reduce the display content magnification 212 or 212' accordingly.

More specifically, when the display screen controller module 20, in combination with the sideline module 30 and the adjuster module 10, detects a touch point 521' located at the sideline element 31, the display screen controller module 20 will further detect whether any touch point 521 is located on the first displaying portion 523 of the display screen 52 or the second displaying portion 523' of the display screen 52. If another touch point 521 is located on the second displaying portion 523' of the display screen 52, the touch point 523' located at the sideline element 21 is defined as a sideline touch point 523' and the touch point 521 located in the second displaying portion 523' of the display screen 52 is defined a first touch point 521. The touch point information of the sideline touch point 521' and the touch point information of the first touch point 521 are sent to the adjuster module 10. Furthermore, the adjuster module 10 retrieves the displaying content information displayed distance from the second displaying portion 523' of the display screen 52 and the information of the second displaying portion 523' of the display screen 52 from the display screen controller module 20. The adjuster module 10 further generates one or more graduations 120 for the adjuster 13 according to the displaying content information displayed on the second displaying portion 523' of the display screen 52, the information of the second displaying portion 523' of the display screen 52 and the information of the adjuster 13. The one or more graduations 120 are displayed with the adjuster 13. Preferably, the adjuster 13 is a bar segment arranged horizontally between the sideline touch point 521' and the first touch point 521 and the one or more graduations 120 are displayed at the adjuster 13, as shown in FIG. 9C.

As shown in FIG. 9C, alternatively, the adjuster interface 21 displays the adjuster 13 with the one or more graduations 120 which is displayed starting at any position of the sideline element 31 or near the sideline element 31, or one of the sideline elements 31 when there is more than one sideline elements 31. The user moves the finger on the sideline element 31 to adjust the size of the displaying content in the second portion 523 of the display screen 52. The display screen 52 detects the sideline touch point 521' is moving, the adjuster module 10 obtains the current graduation location from the corresponding graduation 120 from the sideline element 31. The sideline module 30 sends the sideline information corresponding to the sideline element 31 and the current graduation 120 to the process 51 to adjust the displaying content 212' in the second displaying portion 523' of the display screen 52, the current state of the displaying content 212', and the state of the second displaying portion 523' of the display screen 52. If the sideline touch point 521' or the first touch point 521 is moved from a smaller graduation 120 to a larger graduation 120, the displaying content 212' displayed in the second displaying portion 523' is zooming in. If the sideline touch point 521' or the first touch point 521 is moved from a larger graduation 120 to a small graduation 120, the displaying content 212' displayed in the second displaying portion 523' is zooming out. In such a manner, the display size of the displaying content 212' displayed in the second displaying portion 523' of the display screen 52 is adjusted. It's worth mentioning the adjuster 13 can also be arranged vertically for display on the body of the sideline element 31 to control the second displaying portion 523' of the display screen 52, where the displaying content 212, including the display magnification thereof, of the first displaying portion 522 of the display screen 52 is not affected.

Alternatively, the touch point 521 with pressure over any sideline module 30 will activate the pressure indicator 15 where the information is received by the display screen controller 22 and by the module of analyzable factors 26, verifying by the module of artificial intelligence 25 and delivering to the communication module 55 then to the processor 51 to activate the sideline module 30 to move according to the user's movements.

More specifically, the current position of the sideline touch point 521' refers to the current state of displaying content 212' displayed in the second displaying portion 523' of the display screen 52. In other words, the current graduation of the one or more graduations 120 displays the current display state of the displaying content 212' of the second displaying portion 523' of the display screen. 52. When the sideline touch point 521' is moved to a larger scale, the display screen 52 detects the current position of the sideline touch point 521' at the sideline element 31. According to the current position of the sideline touch point 521', the adjuster module 10 sends the current scale of the sideline touch point 521' to the display screen controller module 20. If the adjuster interface 21 is manipulated, the sideline information is sent through the communication module 55 to the processor 51, and the processor 51 sends the sideline information to be displayed on the display screen 52 through the communication module 55. The displaying contents 212, 212' of the display screen 52 are adjusted by the adjuster module 10 which further controls the second displaying portion 523' of the display screen 52 to be adjusted to the current scale of the graduation 120. If the current adjuster interface 21 on the graduation 120 is manipulated by, for example, the first touch point 521 from largest number to smallest number on the original scale of the graduation 120, the displaying content 212' of the second displaying portion 523' is zoomed out, though the same process as mentioned in this embodiment, earlier. The second displaying portion 523' of the display screen 52 is zoomed out according to the current scale of the graduation 120. The size of the displaying content 212' of the second displaying portion 523' is adjusted according to the current scale of the graduation 120.

Figure 10A:
FIG. 10A is a schematic view illustrating the display screen viewed from a goggle embodied as the electronic device according to the above preferred embodiment of the present invention.
Figure 10B:
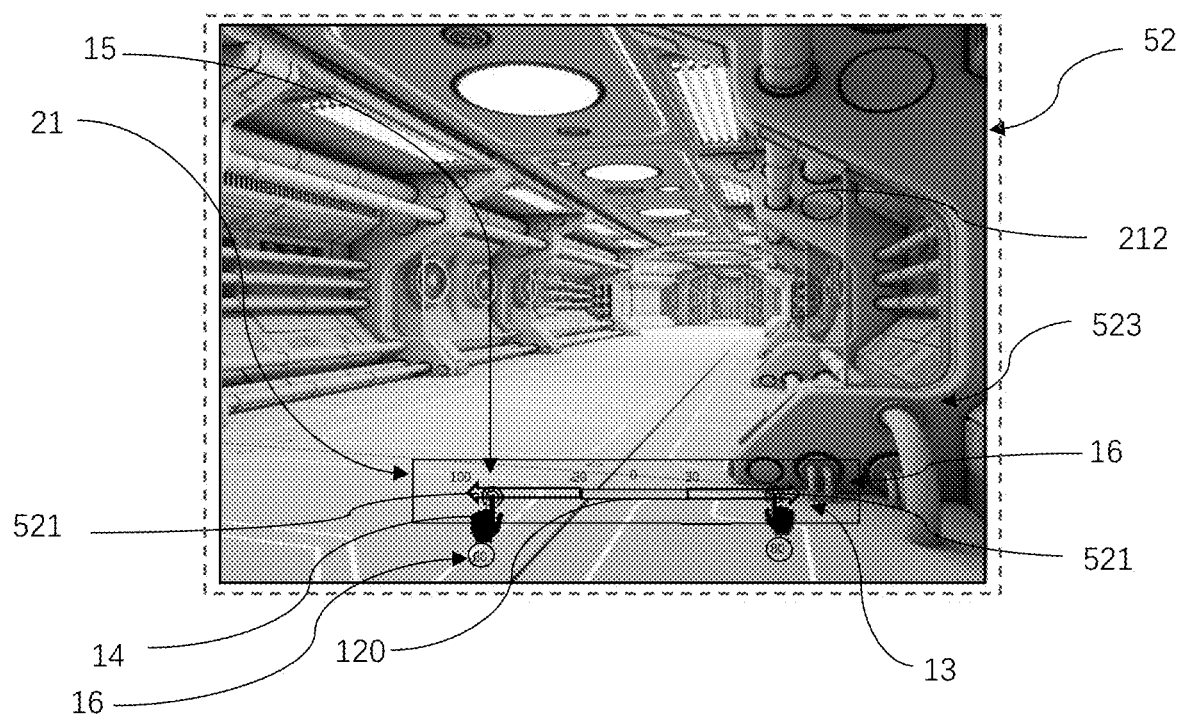
FIGS. 10B-10D are schematic views illustrating the display screen of a VR/MR/XR/VR apparatus according to the above preferred embodiment of the present invention.
Figure 10C:
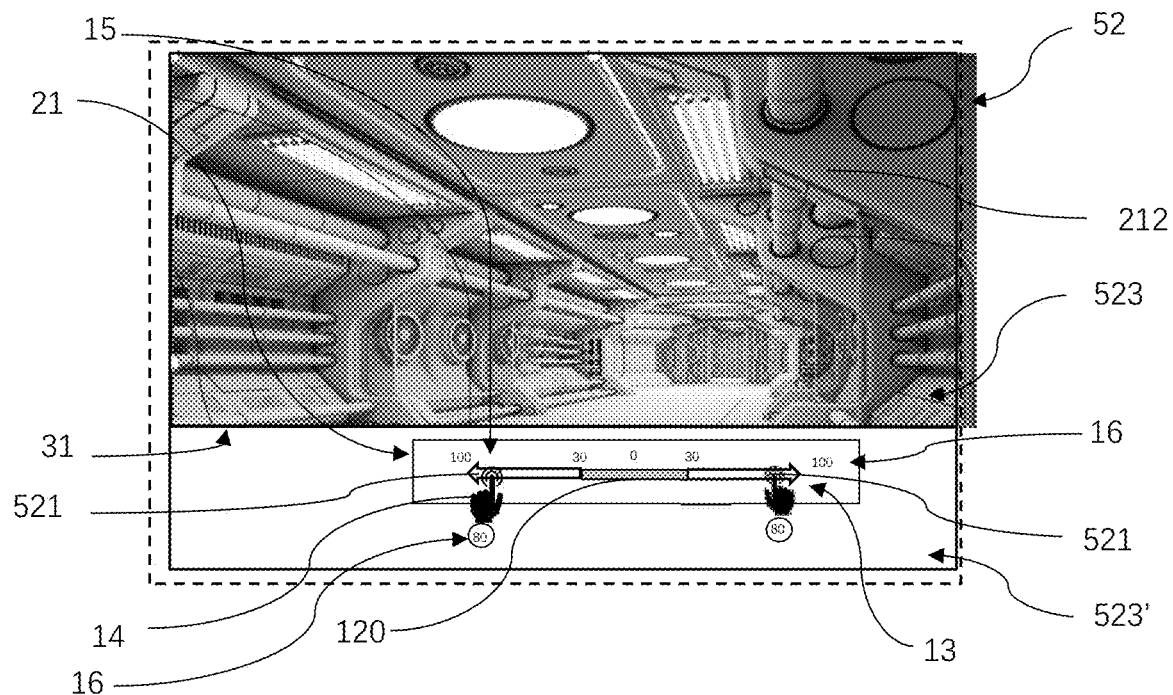

It is appreciated that the electronic device 50 would be embodied as a VR/MR/XR/AR apparatus that the display screen 52 can be a projection screen displaying through projecting device such as a helmet or a goggle as shown in FIG. 10A or other projecting device such as projector, optical display device, augmented reality display device, goggle headset, AR/MR/XR/VR headset or glasses, and etc. Through such headset, the user may view a virtual reality and/or the real reality via one or more cameras of the goggle 52. Through the goggle type electronic device 50, the user could view a full display screen 52, referring to FIG. 10B, wherein the displaying content 212 is fully displayed within the displaying portion 523. The adjuster 13, the adjuster interface 21, the graduation(s) 120, pressure indicator(s) 15, the numeric indicator(s) 16 can be activated to display and overlay on top of the displaying content 212 within the displaying portion 523. The user may also divide the display screen 52 into two or more displaying portions 523, 523', including one displaying portion 523 for the original displaying content 212 and the other displaying portion 523' for displaying the adjuster 13, the adjuster interface 21 and etc., as shown in FIG. 10C. The boundaries of the displaying portion 523 and/or the boundary between the two displaying portions 523, 523' forms the sideline element 31 which can be controlled and operated by the one or more touch points 521 produced through the user's gestures.

In other words, the display screen 52 of the present invention can be embodied as a screen of a tablet, smart device, laptop, a monitor of computer or notebook that is responsive and sensorial to a physical touch thereon by an object such as finger or touch pen, as well as a viewable screen through a headwear, such as glasses or goggle, or a projecting screen through a projector, voice command computer system, hologram or a 3D holography apparatus. The term 'touch' recited in the present invention generically refers sensory touch that when a movement of a finger of the user is sensed by the input device 56 of the electronic device 50, such as a mouse, a touch pad, a touch panel, a resistance-type or capacitance-type touch screen, one or more cameras, laser/light sensor manipulation, hand/finger software detection program, one or more motion sensors, and etc., so as to determine the gesture of the user applied and operated.

Figure 10D:
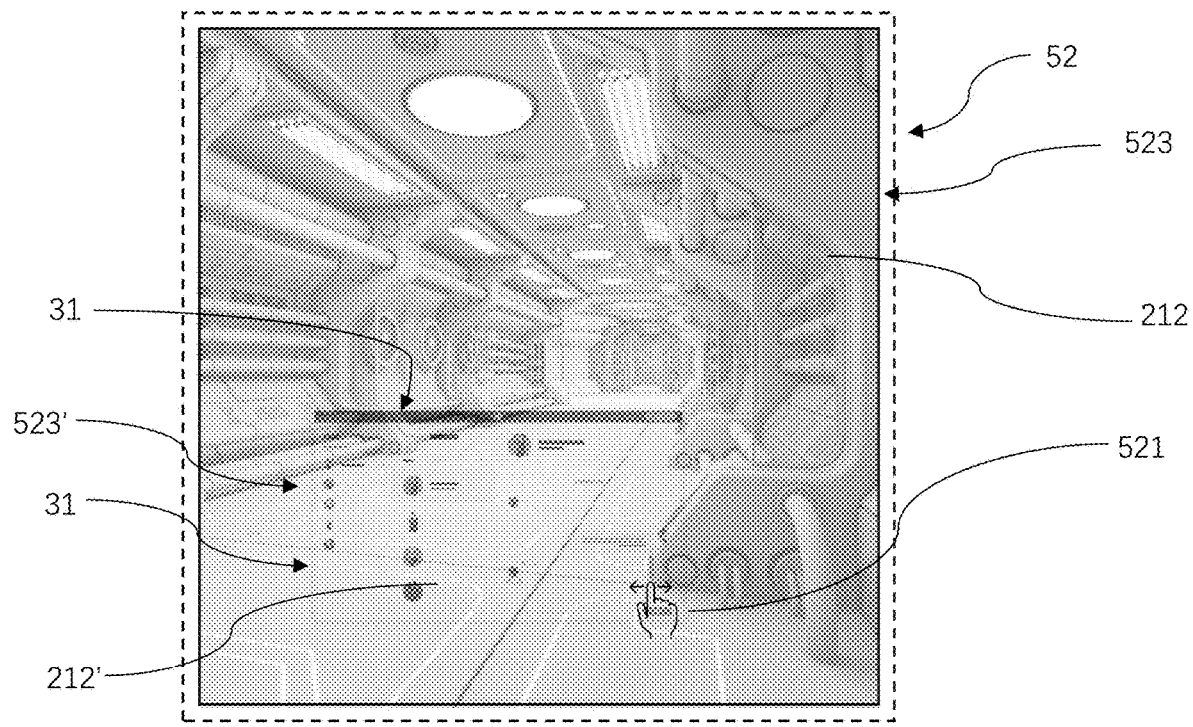

Referring to FIG. 10D, the displaying portions 523, 523' can be overlaid in a superimposed manner, wherein the user may activate another displaying portion 523' overlaying on top of the original displaying portion 523, which can be a control panel to display the adjuster 13 and the adjuster interface 21 or, for example, a communication or chatting window that the user may execute communication while viewing and continuing the operation of the program displayed in the original displaying portion 523. The overlaying displaying portion 523' can be 100% overlaid on top of the original displaying portion 523 or, alternatively, having less than 100% transparency to enable the user to view both displaying portions 523, 523' at the same time as illustrated in FIG. 10D. The user may utilize a touch pad or touch panel to input gestures that generates one or more touch points 521 displayed on the corresponding displaying portion 523, 523' to control and operate the program displayed in that displaying portion 523, 523'. For example, the user may double tap on the overlaying displaying portion 523' and then use one finger to move the entire overlaying displaying portion 523' to another desired position on top of the original displaying portion 523. The user may also double tap the overlaying displaying portion 523' and use two fingers to move towards each other or apart from each other to zoom in or zoom out the displaying content 212' of the overlaying displaying portion 523'.

For purpose of illustration on the figures, FIGS. 10B to 12B, although the display screen 52 may have no boundary to the displaying content 212 being viewed through the projecting device such as goggle headset, the broken lines surrounding frame merely illustrates such AR/MR/XR/VR display screen 52 with headset and does not means there are actual borders for the displaying content 212.

Figure 11:
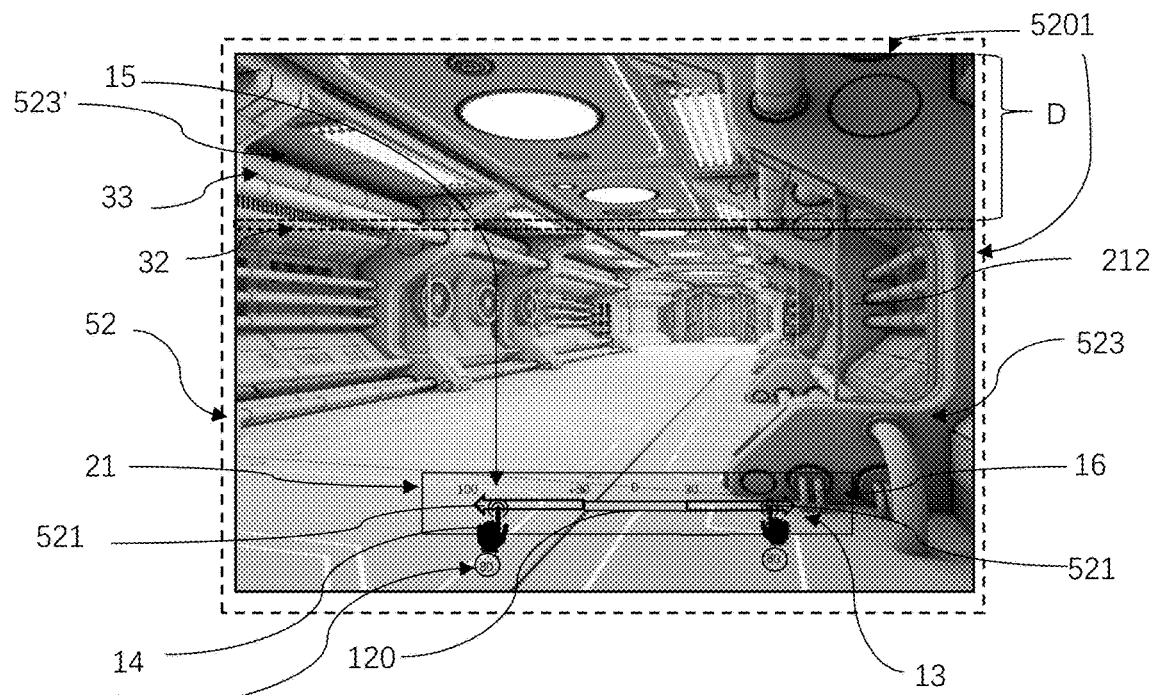
FIG. 11 is a schematic view illustrating the projecting display screen of the VR/MR/XR/VR apparatus according to the above preferred embodiment of the present invention.

As shown in FIG. 11, the sideline module 30 (the third executable portion 3) is able to provide one or more reservation sideline elements 32 with respect to at least the physical edges of the display screen 52 or each displaying portion 523 of the display screen 52 respectively. The reservation sideline element 32 is a virtual sideline element defaulted by the system or customized by the authorized user of the display screen 52 through the sideline module 30 that may merely be illustrated as hidden lines (as shown in FIG. 11) or elongated transparent bar segment. The reservation sideline element 32 can be set as the respective edge of the display screen 52, the respective edge of the displaying portion 523 or the sideline element 31 which divides the two displaying portions 523, 523' and forms the boundary edge two adjacent displaying portions 523, 523'. Accordingly, upon the activation of the one or more reservation sideline elements 32 through the sideline module 30 on the display screen 52, when the user moves his or her touching finger on the display screen 52 to perform a gesture to operate the displaying content 212, such as a picture, to move accordingly toward a direction for viewing different portion of the picture, the picture will not be replaced by the next picture on the display screen 52 within even though the user simply move his or her touching finger all the way to the edge of the display screen 52 or the displaying portion 523 and the movement of the picture will stop at the edge of the display screen 52 or the displaying portion 523, i.e. the reservation sideline element 32. It is appreciated that the reservation sideline element 32 is preferred to be defaulted or customized to have a distance D from a corresponding side edge 5201 of the display screen 52, wherein the portion between the reservation sideline element 32 and the corresponding edge 5201 defines a reservation area 33.

It is appreciated that when the sideline element 31 is operated with a sideline conversion gesture with one or more touch points 521, for example swiping the sideline element 31 to a side edge 5201, such as top, bottom, right or left, from a middle portion of the display screen 52, a sideline conversion is activated that where the sideline element 21 is converted into a reservation sideline element 32 and produce the reservation area 33 between the side edge 5201 where the sideline element 31 swiping to and the converted sideline element 31 on the display screen 52. In other words, the reservation sideline element 32 is preferred to divide the displaying content 212 into two displaying portions 523 and 523', wherein the user may separately operate and control the two divided displaying portions 523, 523' of the same displaying content 212 independently. For example, the adjuster 13, the adjuster indictor 14, the adjuster interface 21, the pressure indicator 15, the numeric indicator 16, and/or the graduation 120 can be activated to be displayed in the displaying portion 523 that merely enables operation and control of the portion of the displaying content 212 displayed in the displaying portion 523, such as zooming in or out, while the portion of the displaying content 212 displayed in the displaying portion 523' being unchanged.

Alternatively, the displaying portion 523' displayed in the reservation area 33 can be activated and controlled by the second executable portion 2 (display screen controller module 20) and the fourth executable portion 4 (interactive module 40), such that the user may operate and control the displaying portion 523' in the reservation area 33. In addition, the user may expand the portion of the displaying content 212 on the displaying portion 523' to the entire displaying screen 52 when the user taps on the reservation sideline element 32 and move the reservation sideline element 32 away from the side edge 5201 of reservation area 33 to enlarge the reservation area 33. Also, if the user taps on the reservation sideline element 32 and move the reservation sideline element 32 toward the side edge 5201 of the reservation area 33, the reservation area 33 as well as the portion of the displaying content 212 in the displaying portion 523' are reduced correspondingly.

According to the preferred embodiment of the present invention, the reservation area 33 is an area that may also be programmed to run and operate a scale down function at the same time or in a timely manner. Preferably, the reservation area 33 may be reserved at the side edges 5201 of the display screen 52, such that the reservation sideline element 32 is able to move from left-to-right, right-to-left, top-to-bottom, or bottom-to-top according to the user selection on the display screen 52. For example, if the reservation sideline element 32 is moved towards the top side edge 5201 of the displaying portion 523' on the display screen 52 and the displaying portion 523' inside the reservation area 33 reduces its area and becomes smaller. If the reservation sideline element 32 is moved toward a middle of the display screen 52, i.e. away from the top side edge 5201, the displaying portion 523' in the reservation area 33 enlarges its area and becomes bigger, and at the same time, the size of the displaying portion 523 reduces correspondingly. It is appreciated that when a sideline element 31 is swiped to one of the side edges 5201 of the displaying screen 52, the sideline element 31 is converted to a reservation sideline element 32 and becomes a boundary to the reservation area 33 between the corresponding side edge 5201 and the reservation sideline element 32 on the display screen 52. In other words, the sideline element 31 can be converted by a gesture swiping toward one of the side edges 5201 on the display screen 52. It is worth mentioning that one or more touch points 521 on the reservation sideline element 33 can be moved to the middle of the display screen 52 or more toward the side edge 5201 of the display screen 52 without producing a conversion once the reservation sideline element 33 has been established.

The portion of the displaying content 212 displayed in displaying portion 523' of the display screen 52 is fully operational when it is positioned in the reservation area 33. Either the sideline element 31 or the reservation sideline element 32 is able to adjust a size of the displaying portion 523' and the size of the displaying portion 523 at the same time. More specifically, when the display screen controller 40 detects the touch point 521 located in the reservation area 23, the touch point 521 produces a gesture for the state-off program 48, wherein the information of the one or more touch points 521 is transported by the communication module 55 from the display screen 52. The display screen controller module 20 may activate the module of analyzable factors 26 and the artificial intelligence module 25. After the information of the one or more touch points 521 is send to the adjuster module 10 for displaying contents and the interacting module 40, the state off program 48 is requested and then the information of the one or more touch points 521 is deliver to the processor 51 by the communication module 55 and is displayed on the display screen.

Figure 12A:
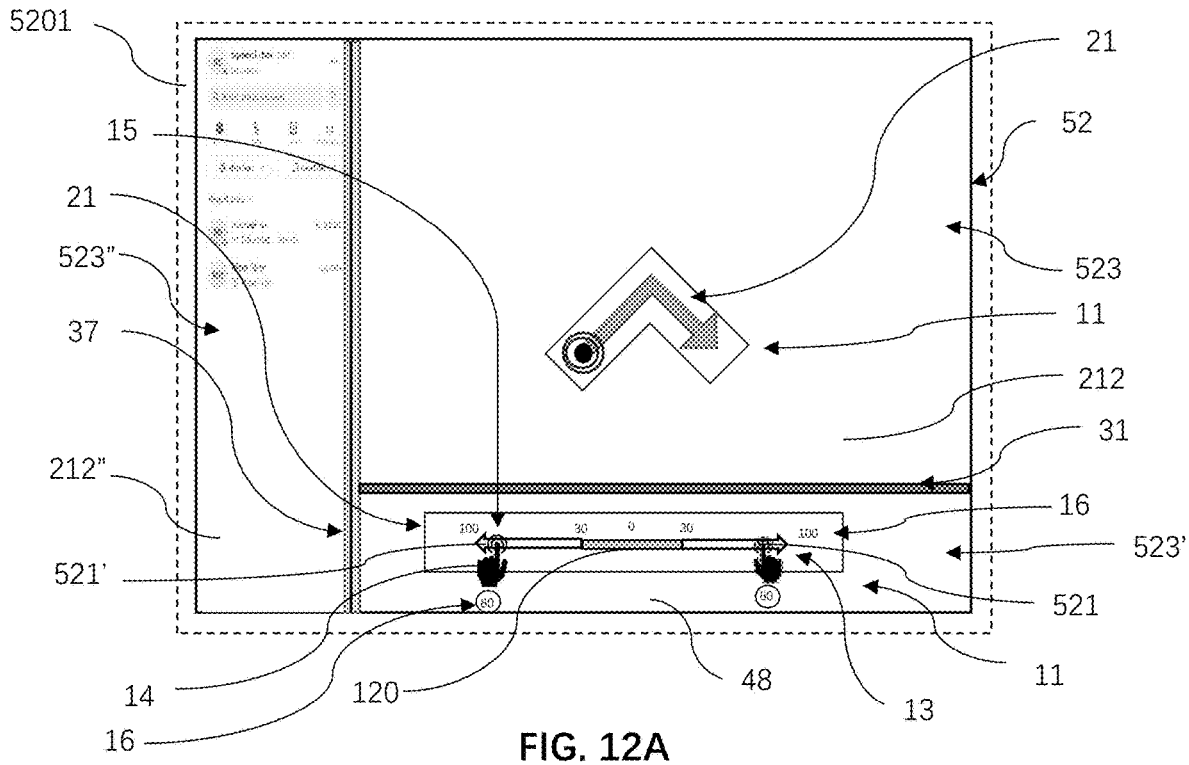
FIGS. 12A to 12C are schematic views illustrating the display screen of the VR/MR/XR/VR apparatus according to the above preferred embodiment of the present invention.

During an operation of one or more programs on one or more displaying portions 523 of the display screen 52, an email, message, notification, voice call and/or the like may be incoming to the electronic device 50 of the user. Instead of the conventional notification in the toolbar of the display screen 52 to notify the current user of a conventional electronic device, the present invention distinctively allows the user to selectively activate the sideline module 30 (the third executable portion 3) to provide the pop-up sideline element 37. Referring to FIGS. 3 and 12A, when the function of pop-up sideline element 37 is activated, an incoming call or message detected will trigger the pop-up sideline element 37 to display at a default location, such as a left side portion of the display screen 52 as shown in FIG. 12A, a third displaying portion 523" is divided at a left portion of the displaying screen 52 while, for example, the first displaying portion 523 for the displaying content 212 is positioned in a right upper portion of the display screen 52 and the second displaying portion 523' for the adjuster 13, adjuster indicator 14, the adjuster interface 21, and etc. are positioned in a right lower portion of the display screen 52, wherein a pop-up displaying content 212", such as a messenger dialog, is displayed in the third displaying portion 523" allowing the user to timely take an incoming phone call or responding to an incoming message or chat. Of course, the user may also select to deactivate the pop-up sideline element 37 and no pop-up displaying portion 523" will pop-up. After the responsive action taken on the pop-up displaying content 212" on the pop-up displaying portion 523", the user may simply execute a swiping gesture to swipe the pop-up sideline element 37 to the closer side edge 5201 of the display screen 52 and the pop-up sideline element 37 to clear away the pop-up displaying portion 523" and the displaying portion 523, as well as the second displaying portion 523''', if any originally, will return to its original size and location. It is worth mentioning that the shape, size, color, and/or form of the pop-up sideline element 37 is preferred to be different from the sideline element 31 as well as the reservation sideline element 32, such as the three-lines form for the pop-up sideline element 37 and the two-lines form for the sideline element 31.

In addition, as described above, the interacting portion 41 and/or interacting element programs 42 of the fourth executable portion 4 (interactive module 40) can be switched between each other with other programmable elements, wherein one or more of the keyboard portion, the pad portion, the mouse portion, the cursor portion, the gesture dictionary portion, the zooming portion, the scrolling portion, the off state element portion, and the gesture operation portion of the interacting portions 41 displayed on the displaying portions 523, 523' and the pop-up displaying portion 523" split by the pop-up sideline element 37 respectively can be operated and controlled independently and all the gestures on the gesture dictionary 402 are scalable while the programs for joining the gestures are also scalable. Also, when the state-off program 48 is triggered to an activation option, each of the interacting portions 41 becomes a state-off portion and provides gesture operations. When the state-off portion is in a lock option, the state-off portion has limited gesture options. Further, the interacting programs 42 and the interacting portions 41 can be superimposed by the state-off program 48, wherein when the state-off program 48 is triggered, the one or more interacting portions 41 and the one or more interacting programs 42 are provided with additional gesture capacity, and that when the state-off program 48 is in the lock option, the state-off program has limited for any gesture option. It is worth mentioning that the superimposed state-off program 48 does not re-adjust the displaying contents.

It is appreciated that the fourth executable portion 4 (interactive module 40) is operable to designate one or more programs on one or more interacting portions 41 on the one or more displaying portions 523 of the display screen 52, wherein the one or more interacting portions 41 interact with the one or more programs displayed on the one or more displaying portions 523, 523', 523" of the display screen 52, wherein when the one or more interacting portions 41 are activated, the one or more interacting portions 41 are superimposed or displayed on the one or more displaying portions 523, 523', 523" of the display screen 52 according to one or more positions of the one or more touch points acquired from the second executable portion 2. In addition, when the one or more interacting programs 42 are activated, the one or more interaction programs 42 may be superimposed or displayed on the one or more displaying portions 523, 523', 523" of the display screen 52 according to one or more positions of the one or more touch points 521 acquired from the second executable portion 2.

Figure 12B:
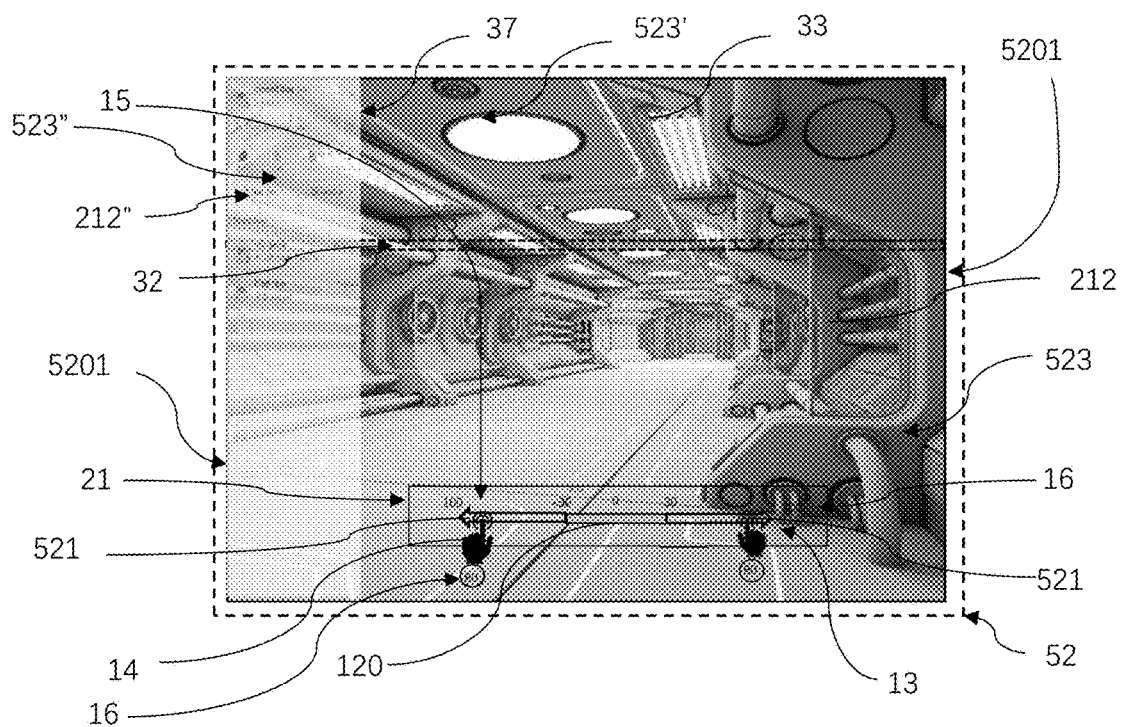

It is worth mentioning that, as shown in FIG. 12B, the pop-up displaying portion 523" displayed between the pop-up sideline element 37 and the side edge 5201 of the display screen 52 can be superimposed on the displaying portion 523, wherein the pop-up sideline element 37 can be simply a boundary side of the pop-up displaying portion 523". In other words, the pop-up displaying content 212" of the pop-up displaying portion 523" is superimposed on a portion of the displaying portion 523 that can be accomplished by the state-off program 48 to superimposed on the notification existing program and can be accomplished with the same gestures from the reservation area 33 or with different gestures as mention in this invention.

Once the display for the state-off program 48 is accomplished and superimposed on the pop-up displaying portion 523" and/or on the reservation area 33. The user has limited gesture controls over the side edges 5201 of the display screen 52, allowing the portions or areas with the superimposed state-off by the state-off program 48 to be grabbed and manipulated without inputting erroneous data accidentally. Preferably, the gestures for the state-off are gestures with two touch points 521 transported by the communication module 55 where the information is reviewed by the module of analyzable factors 26, the artificial intelligence module 25 and the distance tracker module 27 inside the display screen controller 22 where the separations between the two touch points 521 are measured to be too great and unable to come from one hand to turn on or off the state-off program 48 in the reservation area 23 and/or in the pop-up displaying portion 523". Lastly, the information is sent to the processor 51 through the communication module 55, where the processor 51 sends the information to the display screen 52 to superimpose on the existing program with the state-off program 48. As illustrated, the reservation sideline element 32 and the pop-up sideline element 37 may be always provided at the side edges 5201 of the display screen 52 where are the ideal locations for the user to have structural physical area for control and handling of the electronic device 50 that the user may simply tap on the corresponding side edge 5201 and swipe towards a middle portion of the display screen 52 to drag down the reservation sideline element 32 or the pop-up sideline element 37 to function. It is appreciated to consider the reservation areas 33 and the pop-up displaying portion 523" already have programs operating, therefore holding or manipulating the display screen 52 by the side edges 5201 is difficult to control the electronic device 50 and can produce erroneous accidental inputting without the aid of the state-off program 48. Additionally, the state-off program 48 can allow the program to continue running or can pause the existing programs when the state-off is activated, preferably the state-off program 48 when operating is a watermark superimposed illumination of any selected color over the selected programs or at the side edges 5201 in combination with the reservation sideline 32 and or the pop-up sideline element 37. It is noted that the sideline element 21, the pop-up sideline element 37 and the reservation sideline element 32 can have the same color or different colors.

According to the present invention, the operation of one or more functions of a program is able to be processed through one or more gestures. For example, one or more touch points 521 on the reservation sideline element 32 with a continuous gesture crossing the sideline element 31 and the last portion of the gesture ending on the displaying contents 212 in the displaying portion 523 or vice versa, wherein the touch points 521 can be recognized as a gesture by the display screen controller 40 and that the module of analyzable factors 26 and the artificial intelligence module 25 understand the information which is delivered through the communication module 55 to the processor 51 to switch the program in the reservation area 33 and the displaying contents 212 in the corresponding displaying portion 523 on the display screen 52.

It is worth mentioning that the one or more sideline elements 31 ensure the display screen 52 to provide two or more displaying portions 523, 523' to display two or more displaying contents 212 of two or more programs respectively while the user is capable of controlling and operating the two or more programs displaying on the two or more displaying portions 523, 523' divided by the sideline elements 31 with the support of the adjusters 13 and gestures respectively at the same time.

In particular, as illustrated in FIGS. 2-3 and 12A-12B, the processor 51 is programmed to send a notification or incoming message information to the sideline module 20 (the second executable portion 2) when the notification or an incoming call or message is received. The sideline module 30 (the third executable portion 3) generates a pop-up information and sends to the display screen 52. The pop-up sideline element 37 is provided in display screen 52 dividing the display screen 52 into the displaying portion 523 and the pop-up displaying portion 523" displaying the notification or message. Preferably, the popup sideline element 37 is arranged to be positioned between one side edge 5201 and the displaying portion 523 of the display screen 52. As described above, the pop-up sideline element 37 and the pop-up displaying portion 523" of the notifications or messages are arranged to display in a superimposed manner, wherein the popup sideline element 37 can be controlled by a superimposed program with time display customization on an existing program as illustrated in FIG. 12B.

It is worth mentioning that the reservation area 33 is formed by splitting the existing program with the reservation sideline element 32, as shown in FIG. 11, wherein the reservation sideline element 32 can be moved to enlarge and minimize the reservation area 33, allowing for more than one program to operate completely including the inputting controls. In addition, the smaller display portion 523' on the reservation area 33 can interchange with the current enlarge display portion 523, wherein a continues gesture with one or more touch points 521 starting on one program/display portion 523' and finishes at another program/display portion 523 and the crossing of one or more sideline element 31 or reservation sideline element 32 is required.

It should be noted that the alternating of the two programs/display portions 523 is between the first touch program/display portion 523 and the last touch program/display portion 523 and that the continuous gesture may cross over the sideline element 31, the popup sideline element 37, or the reservation sideline element 32. For example, the first touch point 521 may be located inside the reservation area 33 of the display screen 523' and the last touch point 521 is moved and located on the displaying contents 212 in the displaying portion 523 as a complete gesture on one or more programs. As shown in FIGS. 12A-12B, on the left side the popup sideline element 37 is a time display customizable notification display. As shown in FIG. 12B, on the left side of the pop-up sideline element 37 is the pop-up displaying portion 523" superimposed on the original displaying portion 523 to be displayed for as long as the user desires to have more than one programs on one or more displaying portions 523, 523" at the same time or in a timely manner. Additionally, the user can interchange two programs or displaying contents 212 without crossing one or more displayed sideline elements 31 by customizing one or more gestures in the interacting module 30 by selecting one or more gestures in the gesture program dictionary 402 and selecting the program in the program dictionary 45 for switching two programs.

According to the preferred embodiment of the present invention, the display screen 52 is showing the motions and options of the touch points 521 to produce gestures for switching two programs operating at the same time on one or more displaying portions 523 of the display screen 52. For example, the displaying content 212 running by the first program displays on the first displaying portion 523 as a more condensed size while larger displaying content 212' can be displayed on the second displaying portion 523'. The user may produce a continuous gesture or a separate but similar gesture for the two programs being selected for switching, wherein either method crosses a sideline element 31 and/or any other physical or digital barrier/separation. The gestures for switching the two programs are preferred to be pre-programmed. For another example, one or more touch points 521 can be initiated inside the reservation area 33 as one of the selected programs to be switched, wherein the initial touch point 521 is a continuous parabola and/or segmented gesture crosses any sideline element 31 and/or any other physical or digital barrier/separation, such that the last portion of the gesture is produced on the other program intended to be switched with, such as three fingers are recognized as a three touch points gesture for switching programs that the initial three fingers are recognized by the display screen controller module 20, including the module of analyzable factors 26, the artificial intelligence module 25, the adjuster module 10, and the interacting module 40, wherein the final three fingers are recognized by the same process on another program divided by a sideline element 31 and/or on one or more display portions 523 on the display screen 52 of the electronic device 50. The information is transferred to the processor 51 by the communication module 55 to process and be displayed on the display screen 52.

It is appreciated that the one or more touch points 521 can become a gesture for closing programs. Gestures can also work with other programs like the reservation sideline element 32, such that a total swiping or dragging of the reservation sideline element 32 towards the side edge 5201 of the display screen 52 closer to the reservation sideline element 32 will close the reservation area 33 and the program and displaying content 212 in the reservation area 33 will be closed too while, at the same time, the displaying contents 212 in the main displaying portion 523 is completely enlarged to take over the space of the previous reservation area 33 without affecting the placement and displaying content 212 of the pop-up displaying portion 523" divided by the pop-up sideline element 37 (if any).

It is worth to further mention that all closures of programs can be customized for time where the undo gesture can return any past closed programs back to full displacement in a chronological orderly manner on the display screen 52, no matter if it was closed by a gesture or by the sideline module 30. The display screen controller module 20 recognizes a program closing gesture through the module of analyzable factors 26 and the artificial intelligence module 25 as the sideline module 30 is activated and then the information is provided and delivered to the adjuster module 10, display screen controller module 20 and sideline module 30 which recognize and close the corresponding displaying portion 523, 523' or 523" and eliminate and remove the sideline element 31, the reservation sideline element 32 or the pop-up sideline element 37 from the display screen 52. Also, the information is delivered to the processor 51 by the communication module 55 and processor 51 delivers the information to the display screen 52 to expand the leftover displaying content 212 completely in the current displaying portion 523 of the display screen 52.

On the other hands, the display screen 52 may provide instruction and/or display of designated options and motions of touch points 521 for closing a program so as to increase the viewing capacity of other display programs and to increase the number of other programs operating at the same time. The user may select the gesture for forming touch points 521 on the display screen 52 for closing programs on the one or more display screens 52 from the program dictionary 45 and one or more gestures from the gesture dictionary 402 in the interacting module 40 for pairing the gesture or gestures. The information of the program and gesture to be paired is preferred to be performed and customized by the user on the display screen 52. After the user performs the individualized and selected gesture, the display screen controller module 20 runs the module of analyzable factors 26 along with the artificial intelligence module 25 to produce an information of the respective touch points 521 of the selected gesture, that is confirmed by the processor 51 before displaying the selected function on the display screen 52 and stored in the storage device 53 at the same time. Also, the information may also send to server storage device 103 in the cloud server 100. The closed program is immediately stored on the storage device 53 for immediate return capacity and/or by the server storage device 103 for prolong return capacity. It is worth mentioning that the electronic device 50 may have similar functional features as described above without a built-in processor in the electronic device 50 in which the cloud server processor 101 takes over all the related function required in the electronic device 50.

The cloud server 100 can be configured to operate all functions of the electronic device 50, including the moving the sideline element 31 right, left, up or down to the nearest side edge 5201 of the displaying portion 523 on the display screen 52. The sideline module 30 (the third executable portion 3) acquires the sideline information from the display screen 52 through the server communication module 105. The sideline module 30 adjusts the sizes of the first displaying portion 523 and the second displaying portion 523'. The sideline module 30 generates the adjusted information regarding to the sizes of the first displaying portion 523 and the second displaying portion 523'. The adjust information is sent to the display screen controller module 20 (the second executable portion 2). The information is processed through the module of analyzable factors 26, the artificial intelligence module 25, and the distance tracker module 27 in the display screen controller module 20 so that the information is generated according to the adjusted information. The control information is sent to the processor 51 through the communication module 55. The processor 51 processes the control information and sends to the display screen 52 through the communication module 55. The display screen 52 displays the adjusted size of the first displaying portion 523 and the adjusted size of the second displaying portion 523', wherein when the touch point 521 tapped on the sideline element 31 moves right, left, up or down, the position the sideline element 31 moves accordingly with the position of the touch point 521. Also, when the touch point 521 tapped on the sideline element 31 moves to one of the side edges 5201 of the display screen 52 and then back to a position adjacent to said side edge 5201, the sideline element 31 can be converted to a reservation sideline element 32 and the area between the converted reservation sideline element 32 and said side edge 5201 of the display screen 52 becomes the reservation area 33 while the reservation sideline element 32 becomes a boundary of the reservation area 33.

The sideline module 30 (the third executable portion 3) produces the sideline element 31 to separate one or more touch points 521 and one or more programs. In other words, the sideline element 31 filters gestures along with the module of analyzable factors 26, the artificial intelligence module 25, and/or the distance tracker module 27 as they relate to the program controls operating within the boundaries of the sideline element 31. For example, the pop-up sideline element 37 may have a single touch point 521 to control an opening of a program selection not to be confused with a single touch point 521 on the sideline element 31 to activate the motion of the sideline element 31 as well as a single touch point 521 on the display content 212 of a program to activate the adjuster module 10 (the first executable portion 1) for zooming. Additionally, the sideline elements 31 provide the locations for more than one touch points 521 to operate on the same program at the same time. For example, a program operating a cursor program on a typing program, where the program is zooming and the program is divided by a sideline element 31, all at the same time, without inputting erroneous information to the other programs operating at the same time.

According to the preferred embodiment of the present invention, the user interface displayed on the display screen 52 as shown in FIG. 12A comprises a sideline element 31 and a pop-up sideline element 37 and the user interface display on the display screen 52 as shown in FIG. 12B comprises a reservation sideline element 32 and a pop-up sideline element 37. The sideline element 21 divides the display screen into the first displaying portion 523 and the second displaying portion 523' of the display screen 52, wherein the first displaying portion 523 and the second displaying portion 523' run different programs and are divided by the sideline element 31.

For example, referring to FIG. 12A, a displaying content 212 is displayed in the first displaying portion 523 and a functional program such as a keyboard element program 42 or a detect executable portion 11 (including an adjuster 13, one or more adjuster indicators 14, one or more pressure indicator 15, and one or more numeric indicators 16) and an adjuster interface 21 are displayed in the second displaying portion 523' of the display screen 52. A detect executable portion 11 may also be activated on the displaying portion 523 for controlling and operating the displaying content 212 on the first displaying portion 523. It is worth mentioning that the displaying content 212 in the first displaying portion 523 can be a text file running with a word processing program and the detect executable portion 11 can be replaced by a keyboard element running by the keyboard element program 43 on the second displaying portion 523' for inputting text or editing the text file displayed on the first displaying portion 523. Alternatively, when the game program is running and its displaying content 212 is displayed on the first displaying portion 523, the detect executable portion 11 and the adjuster interface 21 displayed on the second displaying portion 523' can be functioned in form of a game control console for controlling and operating the game program running in the first displaying portion 523. Further, as shown in FIG. 12B, a pop-up displaying portion 523" can be preset to be popped up during an incoming or outgoing call or message or while it is activated by the user. The position and size of such pop-up displaying portion 523" can be preset or simply select the default setting by the user. The display screen 52 is split to provide the pop-up displaying portion 523" by a pop-up sideline element 37 and the first and second displaying portions 523, 523' reduce their sizes accordingly to allow the pop-up displaying portion 523" located between one of the side edges 5201 (such as the left side edge as shown in FIG. 12B) of the display screen 52 and the pop-up sideline element 37. The user may operate the displaying content 212" on the pop-up displaying portion 523" with the touch points 521 of designated gestures.

For example, referring to FIG. 12B, a displaying content 212 is displayed in the first displaying portion 523 which is the whole area of the display screen 52 and a functional program such as a keyboard element program 42 or a detect executable portion 11 (including an adjuster 13, one or more adjuster indicators 14, one or more pressure indicator 15, and one or more numeric indicators 16) and an adjuster interface 21 are also superimposed and displayed in the first displaying portion 523 of the display screen 52. A pop-up displaying content 212" such as a messenger dialog during an incoming or outgoing call or message is displayed in a pop-up displaying portion 523" in a superimposed manner with a predetermined percentage of transparency as shown in FIG. 12B. The overlapping boundary of the pop-up displaying portion 523" and the first and second displaying portion 523, 523' becomes and functions as the pop-up sideline element 37. FIG. 12B also illustrates the reservation area 33 divided by the reservation sideline element 32 which is activated to be horizontally extended at an upper portion of the display screen 52. The reservation area 33 can be used to display desired displaying content or, preferably, a desired portion of the displaying content 212 displayed on the displaying portion 523 so that the user may independently operate and control the portion of the displaying content 212 within the reservation area 33 and the residual portion of the displaying content 212 displayed on the displaying portion 523 via the touch points 521 through the interacting program 42 or other inputting devices through the keyboard element program 43, the gesture and cursor program 44, the scrolling program 46, and etc.

The sideline element 31, the reservation sideline element 32 and the pop-up sideline element 37 are programmed to be displayed with the orientation of the display screen 52 that, for example, when the electronic device 50 is clockwise rotated, the sideline element 31, the reservation sideline element 32 or the pop-up sideline element 37 is clockwise rotated correspondingly, that is the sideline element 31, the reservation sideline element 32 or the pop-up sideline element 37 is rotated from a vertical position to a horizontal position. In addition, the text edit program, any game and gamer controller module as well as the keyboard element program 43 are clockwise rotated and adjusted, and vice versa. When the displaying content 212 is a game content of a game program, an adjuster interface 21 for the game program and the text edit program can be displayed in the first displaying portion 523 of the display screen 52, as illustrated on FIG. 12A. The adjuster interface 21 of the game controller program and the keyboard element program 43 can also be displayed on the lower displaying portion 523' of the display screen 52, as illustrated on FIG. 12A, so that the adjuster interface 21 for the game controller program is displayed under the displaying portion 523 of the game. Even the electronic device 50 and the displaying screen 52 thereof is rotated to change its orientation, the displaying portions 523, 523', 523" will be rotated correspondingly to change their locations arranged by the user, for example, the first displaying portion 523 is remained in an upper position, the second displaying portion 523' is remained in a lower position, and the pop-up displaying portion 523" is remained in a left side portion of the display screen 52, i.e. no matter the display screen is in portrait or landscape orientation, so as to provide the user convenience for texting and gaming, to edit program and play the game, the controls/inputting are located always most proximal to the users' body. It is worth mentioning that in the reversal rotation (counterclockwise) of the electronic device 50, the manifestation of the controls/inputting, the keyboard element 32 and the game control 35 continue to be located most proximal to the users' body. When the electronic device 50 is counterclockwise rotated from a vertical position to a horizontal position, the sideline element 31 is rotated from a vertical position to a horizontal position, accordantly and vice versa.

Figure 13A:
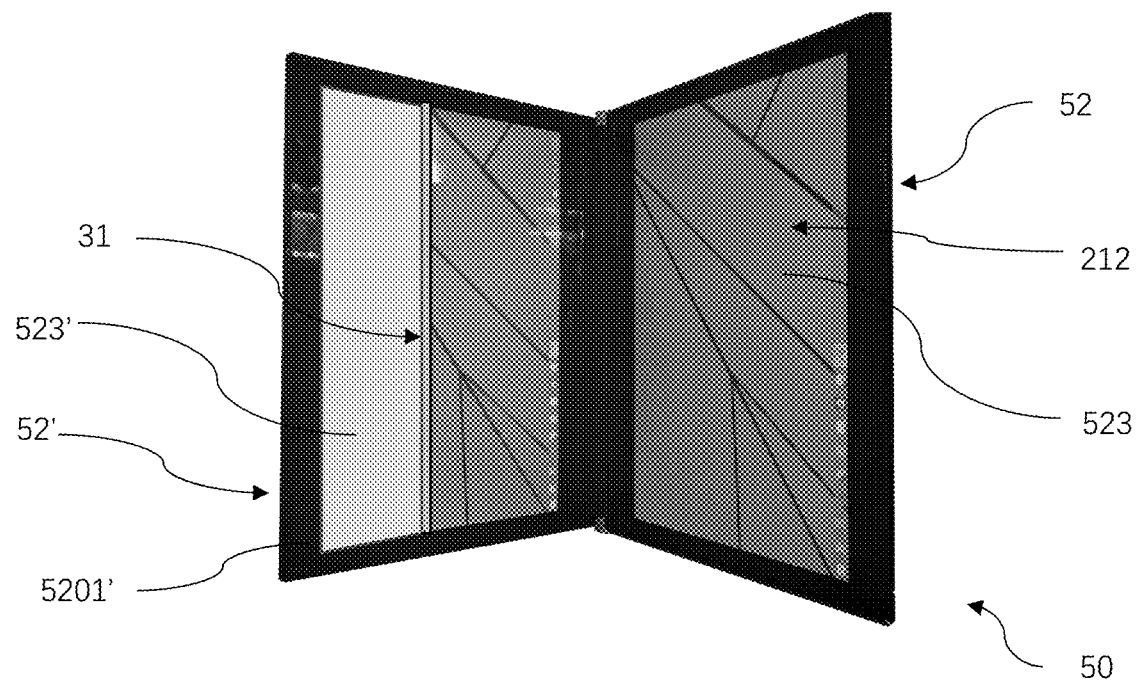
FIGS. 13A to 13B are perspective views of the electronic device with two display screens according to the above preferred embodiment of the present invention.
Figure 13B:
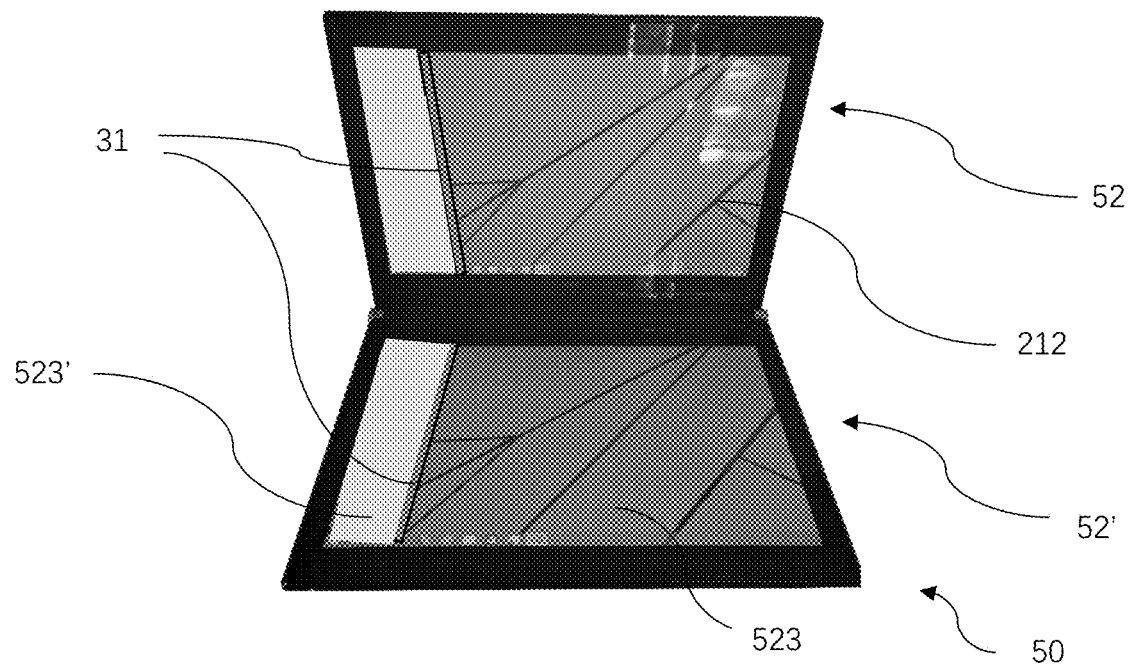

It is important to mention the rotational arrangement is important when one or more display screens 52, 52' are equipped with one electronic device 50. Referring to FIG. 13A, a vertical sideline element 31 is provided on one display screen 52' while a physical vertical separation between the two display screens 52, 52', wherein the two display screen 52, 52' may display a continuous displaying content 212 or different displaying contents 212 and the sideline element 31 divides the display screens 52, 52' to continuously display the displaying content 212 in a first displaying portion 521 and a second displaying portion 521' is provided between the sideline element 31 and the closer side edge 5201' of the display screen 52' having the sideline element 31. When the two display screens 52, 52' and the electronic device 50 is rotated for 90 degrees, the sideline module 30 also detects the two display screens 52, 52' are operating one single sideline element 31 and the sideline element 31 is defaulted to remain in vertical orientation 21 extended continuously across the two display screens 52, 52' as shown in FIG. 13B, wherein the second displaying portion 521' is extended across the two display screens 52, 52' correspondingly while both the two display screens 52, 52' also display the first displaying portion 523. In other words, when the sideline element 31 is generated vertically or horizontally, its orientation can be defaulted to maintain vertically or horizontally regardless of the change of orientation of the display screen 523 or even more than one display screens 52, 52'. It is preferred that the sideline element 31 orientation of vertical or horizontal sideline 21 display are not to be limited with two or more programs on one or more display screen. It is important to understand the sideline not only divides programs, they controls the sizes of all the programs operating on one or more display screens.

As shown in FIGS. 13A and 13B, according to a preferred embodiment, the electronic device 50 is embodied as a foldable screen smart phone, notebook or two tablets having two display screens 52, 52' configured in a foldable manner. As shown in FIG. 13A, the sideline element 31 (as well as the reservation sideline element 32 and/or the pop-up sideline element 37 not shown in FIGS. 13A and 13B) can be activated to provide on one of the display screens 52' to divide the displaying area of the display screen 52' into two displaying portions 523, 523' for displaying two different displaying contents 212 while the other display screen 52 remains to have only one display portion 521 displaying one displaying content 212 or the continuous displaying content 212 with the displaying portion 523 of the display screen 52'. As shown in FIG. 13B, the sideline element 31 (as well as the reservation sideline element 32 and/or the pop-up sideline element 37 not shown in FIGS. 13A and 13B) can be activated to provide and extend on both display screens 52, 52' to divide the displaying area of the display screens 52, 52' into two displaying portions 523, 523' for displaying two different displaying contents 212.

Figure 14:
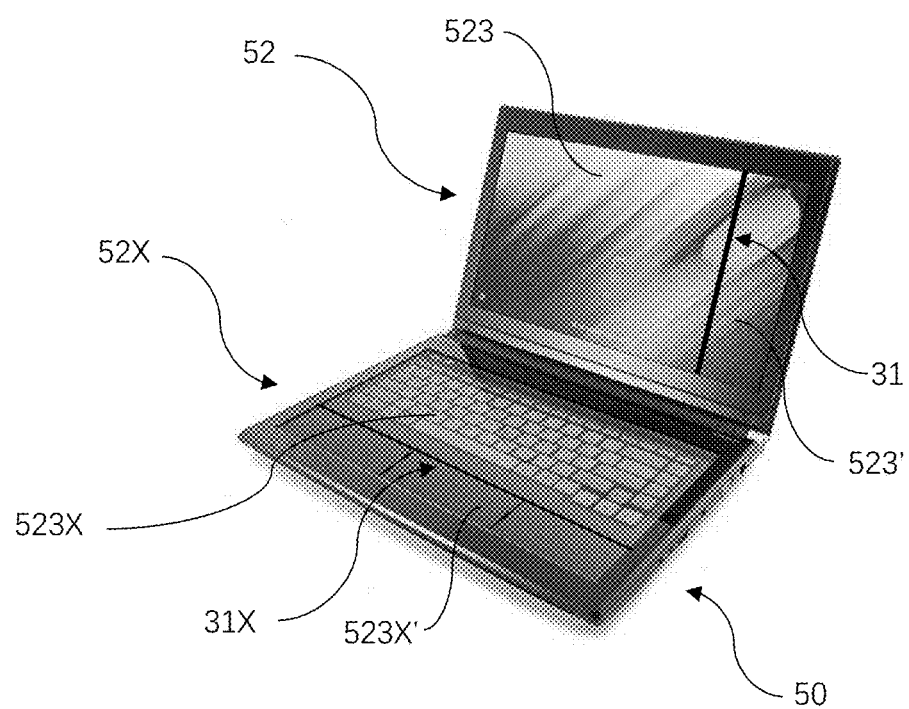
FIG. 14 is a perspective view of the electronic device having a display screen and a control display screen according to the above preferred embodiment of the present invention.

Referring to FIG. 14, the electronic device 50 is embodied to comprise one visual display screen 52 and one control display screen 52X where the display screens 52 is position over the control display screen 52X. The display screen controller module 20 is functioned on both display screens 52, 52X, where the sideline element 31 can be defined as a visual display sideline on the display screen 52 and is position over the control display screen 52X and that a control sideline element 31X can be provided on the control display screen 52X. The sideline element 31 is provided to divide the displaying area of the display screen 52 into four displaying portions 523X, 523X', 523, 523' for visual displaying as described above and the control sideline element 31X provided on the control display screen 52X can divide the control displaying portion 521X, 523X' which is generally for displaying control programs such as keyboard element program 43 and gesture and cursor program 44 to have an additional displaying portion 523X' for displaying different control tool. For example, as shown in FIG. 14, the upper control displaying portion 523X displays a virtual keyboard and the lower control displaying portion 523X' displays a touch pad. Alternatively, for example, the sideline element 31 and the control sideline element 31A can be functioned as a single continuous sideline element extended from the display screen 52 and the control display screen 52X so that the two control displaying portions 523X, 523X' on the control display 52X can be used to display corresponding control programs to control and operate the corresponding displaying portions 523, 523' on the display screen 52, as one vertical sideline element 31 from the control display 52X to the display screen 52.

According to a preferred embodiment, the display screen controller module 20 can configure the sideline module 30 to control the sideline element 31, the reservation sideline element 32, the pop-up sideline element 37, and the control sideline element 31X on the corresponding display screen 52, 52X. Also, the sideline module 30 can configure one or more adjusters 13 to control the respective sideline element 31, the reservation sideline element 32, the pop-up sideline element 37, and/or the control sideline element 31X as sideline adjusters having one or more adjuster interfaces 21 functioning as sideline adjuster interfaces to produce one or more control segments positioned on the respective sideline element 31, the reservation sideline element 32, the pop-up sideline element 37, or the control sideline element 31X on the display screen 52, wherein the sideline module 30 produces any type of sideline element on any display screen vertical horizontal or oblique.

Figure 15A:
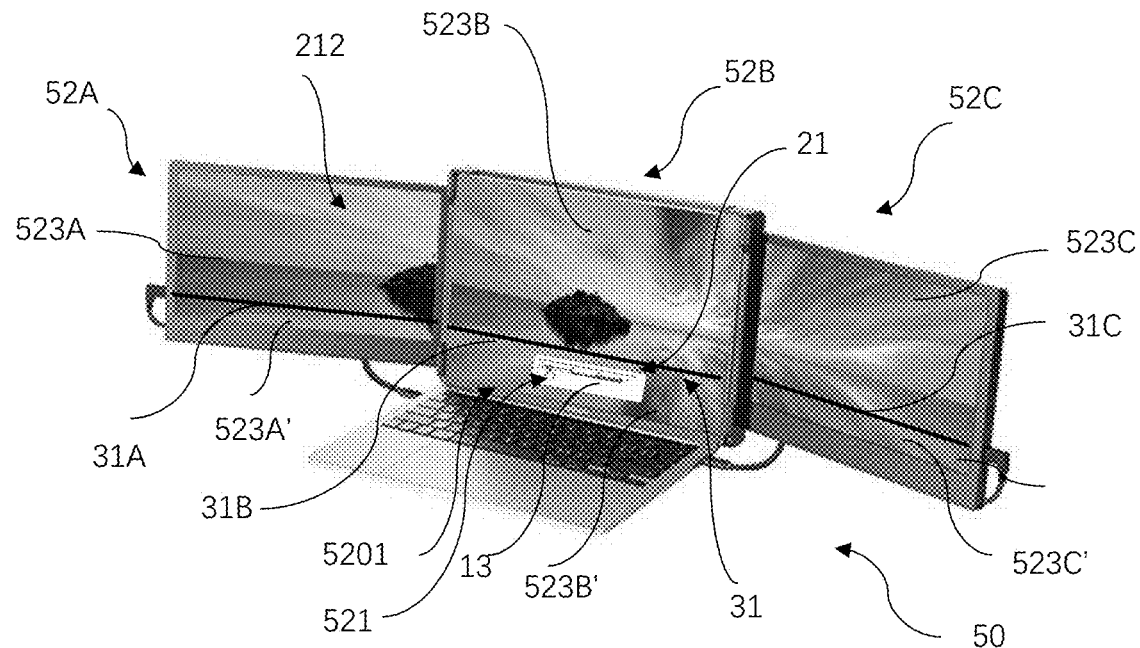
FIGS. 15A to 15B are perspective views illustrating the electronic with three display screens according to the above preferred embodiment of the present invention.
Figure 15B:
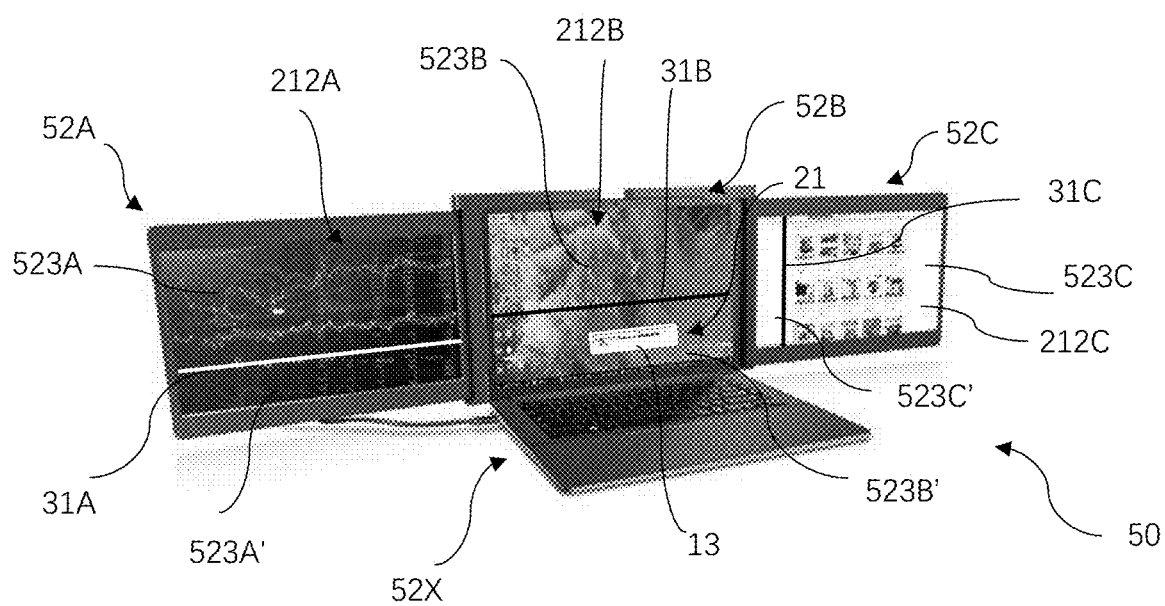

Referring to FIGS. 15A and 15B, the display screen controller module 20 is equipped with the sideline module 30 of the electronic device 50 which comprises more than one individual display screens 52, for example a first display screen 52A, a second display screen 52B, and a third display screen 52C, such that when the user selects to activate one sideline element 31 through a sideline element activation gesture (for example using two fingers touching a bottom side edge 5201 of one of the display screens 52B and moving toward a position from the side edge 5201, a horizontal sideline element as shown in FIG. 15A is generated horizontally at the position where the two fingers stop moving), the sideline element 31 is produced and extended horizontally across a first displaying portion 523A of the first display screen 52A, a second displaying portion 523B of the second display screen 52B and a third displaying portion 523C of the third display screen 52C to form an elongated sideline element 31 extending across the first, second and third displaying portions 523A, 523B, 523C while the first, second and third display screens 52A, 52B, 52C are displaying one single displaying content 212 on the displaying portions 523A, 523B, 523C thereof. The first, second and third display screens 52A, 52B, 52C are divided symmetrically into the first, second and third displaying portions 523A, 523B, 523C and a divided first, second and third displaying portions 523A', 523B', 523C' for displaying different displaying content or an adjuster 13 and an adjuster interface 21 for operating and controlling the entire displaying content 212 on the first, second and third displaying portions 523A, 523B, 523C. The elongated sideline element 31 comprises three sideline element segments 31A, 31B, 31C which are the first sideline element 31A, the second sideline element 31B and the third sideline element 31C provided on the first, second and third display screens 52A, 52B, 52C respectively. In addition, a movement of the elongated sideline element 31 by a gesture through one or more touch points 521 on any sideline element segments 31A, 31B, 31C (i.e. the first, second and third sideline elements) will move the entire elongated sideline element 31 at the same time. For example, when the user uses one finger double tapping on one of the sideline element segments 31A, 31B, 31C and then holding and moving upward away from the bottom side edge 5201, the entire elongated sideline element 31, including the first, second and third sideline elements 31A, 31B, 31C will move up correspondingly and simultaneously, and the first, second and third displaying portions 523A, 523B, 523C reduce their sizes (displaying areas) simultaneously and the divided first, second and third displaying portions 523A', 523B', 523C' correspondingly increase their sizes simultaneously. Accordingly, the user may operate and control the entire displaying content 212 on the first, second and third displaying portions 523A, 523B, 523C with the adjuster 13 and the adjuster interface 21. The user is also free to move the adjuster 13 and the adjuster interface 21 to anywhere on the first, second and third displaying portions 523A, 523A', 523B, 523B', 523C, 523C' by an adjuster and interface moving gesture such as using three fingers forming and holding a triple touch points 521 at the adjuster interface 21 and the adjuster 13. Also, if the user uses two fingers forming a gesture of two touch points 521 on any sideline element segments 31A, 31B, 31C and moving towards the side edge 5201 that defines the corresponding divided displaying portion 523A', 523B' 523C' with the first, second or third sideline element 31A, 31B, 31C, the entire elongated sideline element 31, including the first, second and third sideline elements 31A, 31B, 31C is removed from the first, second and third display screens 52A, 52B, 52C.

It is worth mentioning that the color of the sideline element 31 (including the reservation sideline element 32, the pop-up sideline element 37 and the control sideline element 31X) can be defaulted to change automatically in higher color contrast with the background color of the displaying content 212 on the corresponding displaying portion 523. For example, when a dark color sideline element 31 will change to light color when the background color of the displaying content 212 changes to a dark color, vice versa.

Referring to FIG. 15B, either one of the display screens 52A, 52B, 52C is selected and operated to display a displaying content 212 different from the others, all display screens 52A, 52B, 52C are selected and operated to display different displaying contents 212A, 212B, 212C, or one of the displaying portions 523A, 523B, 523C is selected and operated to have a scale or size different from the other such as enlarging a designated portion of the entire displaying content 212 to be displayed on one displaying portion 523A, 523B or 523C, the first, second and third sideline element segments 31A, 31B, 31C become independent sideline elements 31A, 31B, 31C working and functioning independently on the display screens 52A, 52B, 52C respectively. Therefore, each first, second and third sideline elements 31A, 31B, 31C can be displayed, controlled and operated independently with respect to the first, second and third displaying contents 212A, 212B, 212C on the first, second and third display screens 52A, 52B, 52C respectively. Also, each display screen 52A, 52B, 53B may has its own adjuster 13, adjuster interface 21 and etc. to control its own displaying portion 523 thereon. Each of the first, second and third sideline elements 31A, 31B, 31C divides the corresponding display screens 52A, 52B, 52C to form the divided first, second and third displaying portions 523A', 523B', 523C'.

The different types of sideline element 31, 32, 37, 31X as well as the adjuster 13, the adjuster interface 21, graduation 12, and etc. can be changed in location to different displaying portions 523A, 523B, 523C. For example, the user may simply use two fingers to tap and hold to form a two-fingers touch point 521 on the designated sideline element 31, reservation sideline element 32, pop-up sideline element 37, or control sideline element 31X, or the designated adjuster 13, adjuster interface 21, graduation 120, or etc. and move the new desired position on desired displaying portions 523A, 523A', 523B, 523B', 523C, 523C', as shown in FIG. 15B, and then the moved sideline element 31, 32, 37, 31X or the moved adjuster 13, adjuster interface 21, graduation 120, or other controlling tools can be programmed to function and be operated with respect to the displaying portion 523A, 523A', 523B, 523B', 523C, or 523C' designated by the user.

Also, referring to FIG. 15A, the user may control the entire elongated sideline element 31 on the display screens 52A, 52B, 52C by controlling one of the sideline element segments (e.g. the first, second and third sideline elements) 31A, 31B, 31C on the respective first, second and third display screens 52A, 52B, 52C. The adjuster 13 and the one or more graduations 120 can be generated according to the touch point 521 located at the corresponding first, second or third sideline element 31A, 31B, 31C in the respective display screen 52A, 52B, 52C. An adjuster interface 21 may also be generated on the first, second or third sideline element 31A, 31B, 31C for controlling the entire elongated sideline element 31, such as movement of the entire elongated sideline element 31 on the first, second and third display screens 52A, 52B, 52C simultaneously.

Or, alternatively, referring to FIG. 15B, the adjuster interface 21 generated on the first, second or third sideline element 31A, 31B, 31C can control the respective sideline element 31A, 31B or 31C on the respective first, second or third display screen 52A, 52B or 52C, such as movement of that first, second or third sideline element 31A, 31B or 31C on the respective first, second or third display screen 52A, 52B, 52C.

More specifically, when the display screen controller module 20 receives signals upon detection of the touch point 521 on the respective sideline element 31A, 31B or 31C at the display screen 52A, 52B or 52C, the display screen controller module 20 identifies and determines corresponding command and sends to the processor 51 to execute corresponding action(s). For example, when the display screen controller 22 of the display screen controller module 20 identifies and determines the touch point 521 to be a two-finger touch point, but not a single touch point, that is a command gesture of the two-finger touch point specifically performed on the sideline element 31A, 31B or 31C by the user, and the touch point 521 being held and moved upwards from to an upper position on the respective display screen 52A, 52B or 52C, the display screen controller 22 provides the information to the module of analyzable factors 26, the artificial intelligence module 25, and the distance tracker module 27, which are activated in the display screen controller module 20, and then the sideline module 30 is activated and the entire sideline element 31 as shown in FIG. 15A moves upwards on the display screens 52A, 52B, 52C along with the movement of the two-finger touch point 521 to the new position on the display screens 52A, 52B, 52C, or the sideline module 30 is activated and the respective sideline element 31A, 31B or 31 as shown in FIG. 15B on the respective display screen 52A, 52B or 52C where the touch point 521 detected moves upwards along with the movement of the two-finger touch point 521 to the new position on that display screen 52A, 52B or 52C.

For another example, when the display screen controller 22 of the display screen controller module 20 identifies and determines a touch point 521 being a command gesture performed at the adjuster 13 on the respective display screen 52A, 52B or 52C by the user and the touch point 521 being held and moved towards a direction along the adjuster 13, the display screen controller 22 provides the information to the module of analyzable factors 26, the artificial intelligence module 25, and the distance tracker module 27, which are activated in the display screen controller module 20, and then the sideline module 30 retrieves the location of the touch point 521 and sends the position of the touch point 521 to the adjuster module 10. The adjuster module 10 further acquires the state of the touch point 521 and the state of the respective display screen 52A, 52B or 52C and such information is sent to the processor 51 through the communication module 55 to execute the command corresponding to the touch point 521 detected on the adjuster 13, such as zooming in or zooming out of the displaying content 212A, 212B, 212C on the respective displaying portion 523A, 523B, 523C accordingly. The user may also set up a gesture through touch point 521 to move the location of the adjuster 13, such as a four-finger touch point 521 that the user uses four fingers touching on the currently adjuster 13 provided on the respective display screen 52A, 52B, 52C to perform the four-finger touch point as a gesture to command to move the adjuster 13 on the display screen 52A, 52B, 52C. When the user uses four fingers touching on the adjuster 13 and continuously holding and moving to a desired new position linearly and/or rotatingly on the display screen 52A, 52B, 52C (e.g. moving from one displaying portion 523A, 523B, 523C to another display portion 523A, 523B, 523C and rotating from vertical displacement to horizontal displacement, the adjuster 13 will move along with the four-finger touch point 521 to the new horizontal location on the respective display screen 52A, 52B, 52C wherein the four-finger touch point 521 stops the movement.

Alternatively, from right to left, the user can use a one finger touch point 521 to operate all the gestures for the display portion 523A in the display screen 52 on the display screen 52X. Furthermore, the user may program all the two-finger touch point 521 performed on the display screen 52X to operate all the functions or programs on the display portion 523B of the display screen 52B. Additionally, all the three touch point gestures performed on the display screen 52X may only operate the display portion 523C of display screen 52C, or from left to right (vice versa), etc. Furthermore, all the four finger gestures operate the control display screen 52X.

Figure 16:
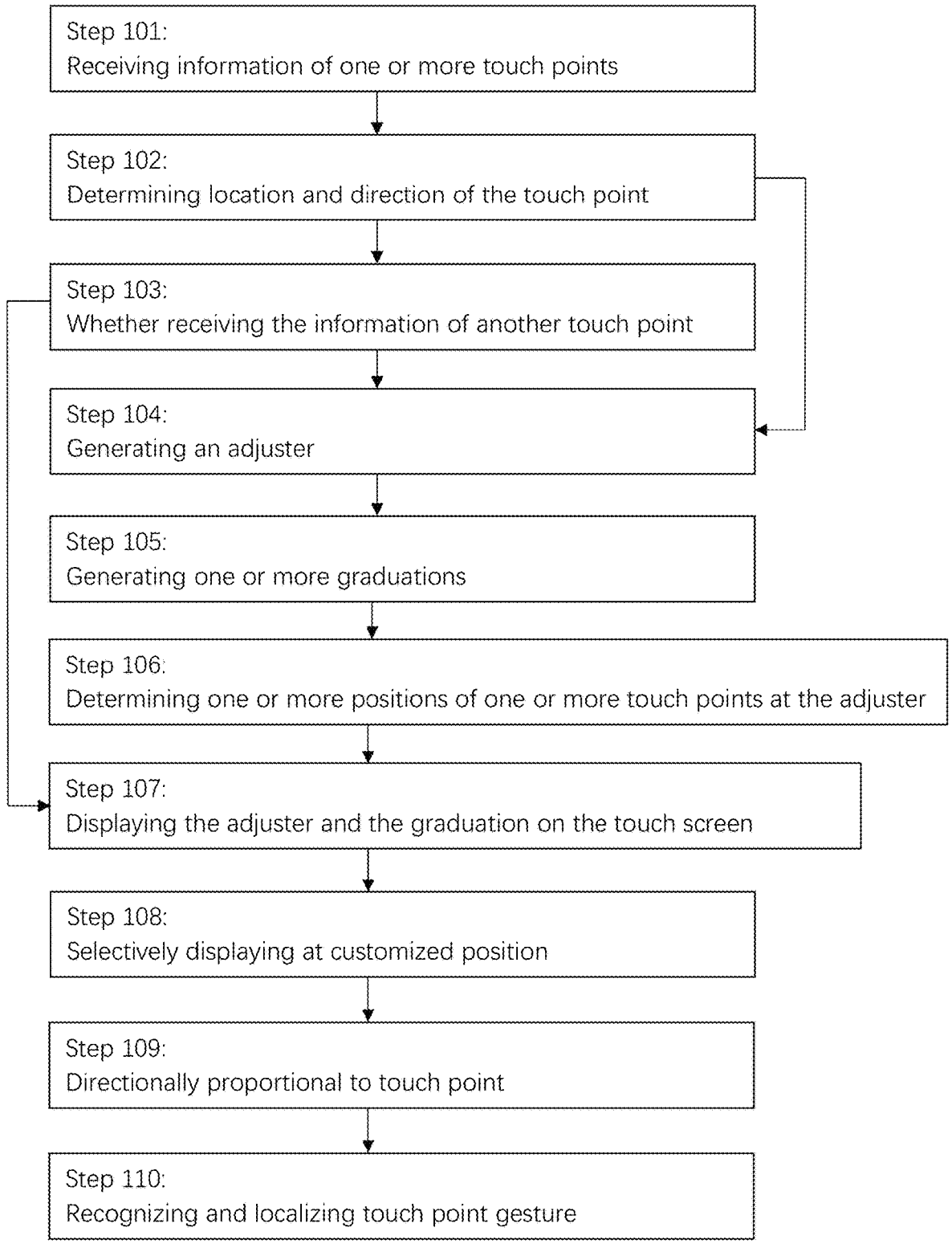
FIG. 16 is a block diagram illustrating a method of generating adjuster according to the above preferred embodiment of the present invention.

Referring to FIG. 16, a method of generating the adjuster 13 according to the preferred embodiment of the present invention is illustrated, which comprises the following steps:

Step 101: Receiving information of a touch point 521. The display screen 52 detects one or more touch points 521, wherein, for example, the touch screen 52 generates a respective touch point 521 at a position of the finger of the user touching the display screen 52 and the adjuster module 10 receives the information of the respective touch point 521 detected and sent from the touch screen 52. The information is analyzed by the module of analyzable factors 26, the artificial intelligence module 25 and the distance tracker module 27 of the display screen control module 20, for movement and direction of each of the one or more respective touch points 521.

Step 102: Determining location and direction of the touch point 521. If the touch point 521 doesn't move, go to step 103. If the touch point 521 is moving, detecting the moving direction of the one or more touch points 521 and sending the moving direction and location of the touch point 521 to the adjuster module 10, and then go to step 104.

Step 103: Whether receiving the information of another touch point 521. If the adjuster module 10 receives the information of another touch point 521, go to step 104; if not, go to step 107.

Figure 17:
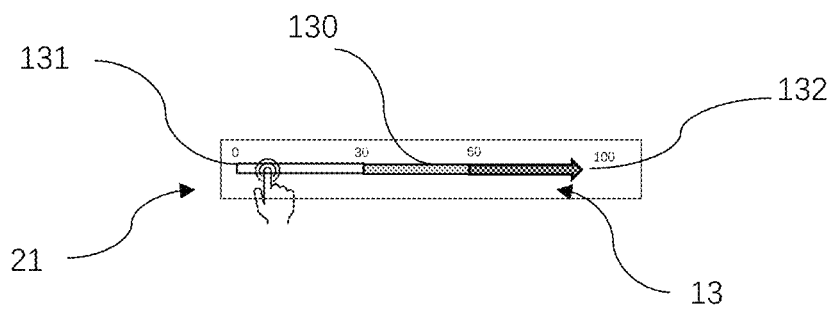
FIG. 17 is a schematic view of the adjuster interface with the adjuster according to the above preferred embodiment of the present invention.

Step 104: Generating an adjuster 13. The adjuster module 10 generates an adjuster 13 according to the position and the moving direction of the touch point 521 detected by the display screen controller module 20. The adjuster module 10 adjusts the size of the display of one or more programs in one or more display screens 52 with an adjuster 13 and an adjuster interface 21 to control the display proportions. The adjuster 13 comprises an adjuster body 130, minimum end 131 and a maximum end 132 as shown in FIG. 17. The minimum end 131 and the maximum end 132 are located at the two end of the adjuster body 130 respectively that can be an arrow mark or a watermark with a timely display and customizable from right to left, left to right, up or down, down or up, and etc. A touch point 521 is able to move from the minimum end 131 to the maximum end 132 along the adjuster body 130. Through the movement of the touch point 521 along the adjuster 13, the displaying content 212 displayed in the display screen 52 responds according to the moving direction and position of the touch point 521 (and the sign language gesture or the imagining gesture as described below), for examples, enlarging the displaying content 212 or moving the displaying content 212 according to proportion of the touch point 521 moved from the minimum end 131 towards the maximum end 132. It is important to mention that direction of each of the one or more touch points 521 provides a desire function and position of the respective one or more touch points 521 and a degree of the desire function.

Step 105: Generating one or more graduations 120 for the adjuster 13. The graduation 120 is a means to inform the user of the available degree in the desire function and to inform the user of the current degree with the current position of the respective touch point 521. The adjuster module 10 generates the one or more graduations 120 according to the current state of the displaying content 212 or program function, the parameters of the touch screen 52, the preset proportion and the adjuster 13. The graduation 120 is attached on the adjuster 13 to show the scale of operation such as zooming in/out for adjusting the displaying content 212. Through the graduation 120, the user understands the scale of the current displaying content 212 that is able to be zooming in or zooming out.

Please further referring to FIGS. 3 to 4D, the adjuster module 10 generates a graduation indicator 14 and or a numeric indicator 16 according to the current state of the displaying content, the parameters of the display screen 52 and the preset proportion of the touch point 521 on the adjuster 13 indicating on the adjuster indicator 14 through the use of the adjuster interface 21 on the adjuster 13. The graduation 120 is provided on the adjuster 13 to show the moving scale of the displaying content 212. Through the graduation 120, the user understands the various available distance for display and the current distance of one or more displaying contents 212 of one or more programs on one or more display screens 52 for one or more program functions. The scales provide a customize percentage through the adjuster 13. Where the finger of the user requires significant less physical demands to move a displaying content 212 in the display screen 52 in relation to the size of the physical display screen 52 and or the size of the program/document being larger or smaller to the display area of the physical display screen 52, where the user can easy manipulated the size of the displaying content 212 in any medium.

Step 106: Determining one or more positions of one or more touch points 521 at the adjuster 13. The adjuster module 10 determines the one or more positions of the one or more touch points 521 at the adjuster 13 through comparing a current display state of the displaying content 212 and the graduation 120 of the adjuster 13.

For example, if the current display state of the displaying content 212 is in minimum state, the first touch point 521 is arranged to the position at the minimum end 131 of the adjuster 13, the second touch point 521 is arranged to the position between the minimum end 131 and the maximum end 132 of the adjuster 13. If the current display state of the displaying content 212 is in maximum state, the second touch point 521 is arranged to the position of the maximum end 132 of the adjuster 13 and the first touch point 521 is arranged to the position between the minimum end 131 and the position of the second touch point 521. If the current display state of the displaying content 212 is between the minimum state and the maximum state, the first touch point 521 and the second touch point 521 are arranged at the adjuster 11 between the minimum end 131 and the maximum end 132 of the adjuster 13. In addition, the adjuster 13 is arranged to extend through the first and second touch points 521.

Step 107: Displaying the adjuster 13 and the graduation 120 on the touch screen 52. The adjuster 13 is displayed to match the moving direction of the touch point 521. The position of the graduation 120 at the adjuster 13 is arranged to the position of the touch point 521, such that the touch point 521 is moved along the adjuster 13 to control the displaying content 212 to move or to adjust the size of the displaying content 212.

Step 108: Selectively displaying at customized position. Alternatively, the adjuster 13 with the graduation 120, the adjuster indicator 14, the adjuster interface 21, and or the numeric indicator 16 can also be display at any other customized position on the display screen 52, with or without the one or more graduations 120, the one or more adjuster indicators 14, and/or the one or more numeric indicators 16. The adjuster indicator 14 may present on the scale of the graduation 120 of the adjuster 13 with or without displaying the numeric indicators 16. Through the adjuster interface 21, the adjuster module 10 is controlled, where the graduation 120, the adjuster indicator 14, and/or the numeric indicator 16, reflects the current state of control on the displaying contents 212, or the state of the program function on the parameters of the displaying contents 212 divided by one or more sideline elements 31, on one or more display screens 52, proportionally. The graduation 120 is provided on the adjuster 13 to show the scale of zoom in/out for adjusting the displaying content 212. The one or more numeric indicators 16 may also be displayed without the graduation 120, the adjuster indicator 16, or the adjuster 13. The numeric indicator 16 and the adjuster 13 can also be customized anywhere in the display screen 52 as an alternative customizable option. It is worth mentioning that the numeric indicator 16 can provide the user the currents size of the image, therefore the user can decide to enlarge or to diminish the display content 212. The numerical indicator 16 and the adjuster 13 can be customized with desired size, font, color, time, as a watermark, and as a timed pop-up display. Further, the sideline element 31 can sub-divide one or more adjusters 13 accordingly to the display customizable position (associated with zooming) and/or according to the program function of the adjuster 13. For example, the program function of the adjuster 13 for volume or brightness are examples on selected running programs (not associated with zooming), etc.

Step 109: Directionally proportional to touch point. The degree, non-displaying or amount of zooming on the display screen 52 is directionally proportional to the one or more touch points 521 on the adjuster interface 21 of the adjuster 13 and reflected on the graduation 120, by the adjuster indicator 14, and/or on the numeric indicator 16, as the touch point 521 is moved along on the adjuster interface 21 of the adjuster 13 on one or more programs displayed in one or more display screens 52.

Step 110: Recognizing and localizing touch point gesture. Alternatively, a gesture of two or more touch points 521, can be recognized and localized by the module of analyzable factors 26, the artificial intelligence 25, and the distance tracker module 27 of the display screen control module 20, so as for the adjuster module 10 to generate adjuster 13, the graduation 120, the adjuster indicator 14, and/or the numeric indicator 16 which are all customizable on one or more programs in one or more display screens 52. Where the gesture has been pre-programmed to display one or more display contents 212 of one or more programs on one or more display screen 52, specifically, and/or in close proximity to the degree of the pre-program of the gesture of the two or more touch points 521 without additional physical movement from the two or more touch points 521, based on the degree/distance of separation between every two touch points 521.

The method of generating the adjuster 13 can be proceeded based on a sideline element 31 according to the preferred embodiment of the present invention, comprising the following steps:

Step 201: Receiving the information of a touch point 521. The touch screen 52 detects a user using a finger to touch the touch screen 52. The touch screen 52 generates a touch point

521 at a position of the finger of the user touching the touch screen 52. The adjuster module 10 receives the information of the touch point 521 sent from the touch screen 52. The touch screen controller 40 analyzes the information of the touch point 521 to identify which touch screen 52 sends the information of the touch point 521. In other words, the information of the touch point 521 includes which touch screen 52 generated the touch point 521 and the position of the touch point 521.

Step 202: Determining whether the touch point 521 is located at the control touch screen 52X. If the touch point 521 is located at the control touch screen 52X, go to step 203:

Step 203: Determining whether the touch point 521 is located at a displaying sideline element 31 or a controlling sideline element such as reservation sideline element 32 or pop-up sideline element 37. If the touch point 521G is located at the displaying sideline element 31, go to 204. If one or more touch points 521 are located at both the displaying sideline element 31 and the controlling sideline element, go to 205. If the touch point 521 is located at the controlling sideline element, go to 206.

Step 204: Moving the displaying sideline element 31 according to the moving direction of the touch point 521.

Step 205: Moving the displaying sideline element 31 and the controlling sideline element according to the moving direction of the one or more touch points 521.

Step 206: Moving the controlling sideline element according to the moving direction of the touch point 521.

The electronic device 50 can be configured to have the program dictionary 45 that may include a gesture dictionary to pair in the interacting module 40 with one or more gestures, from the gesture dictionary, with a program from the program dictionary 45. Where the pair information is provided to the processor 51 by the communication module 55. Also, the display screen 52 displays the pair information and is where the user performance personal customization of the selected gesture for pairing with a program. In this Step 108, the performed information is recorded and compared to the selected touch points 521 and/or to the complexity of the two or more touch points 521 selected. After the customization is performed, the one or more touch points 521 of gesture (including the sign language gestures, hand/finger software detection programs, and/or the imagining gestures as described below) are analyzed by the module of analyzable factors 26, the artificial intelligence 25, and the distance tracker 27. The program and performed gesture, are then send to the adjuster module 10, and the sideline module 20 accordantly. Once the pair information is confirmed, it is sent to the processor 51 via the communication module 55, where the communication module 55 sends the pair information as a gesture command for the storage device 53 for record and at the same time the gesture information is received on the display screen 52 to generate a response.

It is worth mentioning that the electronic device 50 may be configured with one or more display screens 52, on or mores sidelines elements 31, one or more programs, and one or more adjusters 13 on one or more displaying portions 523, with one or more gestures for generation of one or more functions base on one or more touch points 521 according to the preferred embodiment of the present invention. According to the preferred embodiment of the present invention, a gesture generation method base on a sideline element 31 is illustrated, which comprises a step of:

Receiving the information of one or more touch points 521 at the same time or in a timely manner. An information for splitting one or more programs by one or more sideline elements 31 on one or more display screens 52 with one or more touch points 521 is sent to the module of analyzable factors 26, the artificial intelligence 25 and the distance tracker module 27 in the display screen controller module 20, wherein the information is collectively acquired from to the adjuster module 10, the sideline module 30, and the interacting module 40. The display screen controller module 20 confirms the information and then send to the processer 51 through the communication module 55, wherein the processor 51 sends the information to be displayed on the display screen 52. Additionally, the information is shared between the storage device 53, the power supply 54, and the input device 56 on the electronic device 50, wherein the information may be uploaded to the server processer 101, shared with the server storage device 103, the server communication module 105, the server power supply 104, and lastly sent to the server screen 102.

For example, the display screen 52 is configured to be operated through one or more touch points 521 from one or more executable portions 1, 2, 3, 4 divided by one or more sideline elements 31 and, as shown in FIG. 14, can be controlled by one or more control display screens 52X divided by one or more sideline elements 31X with one or more touch points 521 controlling one or more programs. The keyboard element program 43 is configured for typing on the control display screen 52, the operating area program 401 is configured for superimposing the gesture and cursor program 44 in the control display screen 52X to control the gesture and cursor program 44 on the display screen 52. The program operated through the control display screen 52X can control the program in the display screen 52. Additionally, the program can be superimposed by the state-off program 48 programs where the entire selected program is locked in the area border by the adjacent sideline elements 31, where the user can physical hold, grab, manipulated or handle the display screen surface area without accidental inputting erroneous information.

Additionally, the programs can be switched on the display screen 52 only and maintain the ergonomic desire control in the program in the control display screen 52X. Where the display program in the display screen 52 can be color code on the sideline element 31 with the corresponding control program in the control display screen 52X for orientation arrangement.

It is important to mention that all the programs to be operated and displayed on the one or more display screens 52 and/or control display screen 52X are interchangeable, scalable, customizable and are in the program list dictionary 45 where all the electable touch points 521 are provided in the gesture list dictionary 402, wherein both programs are in the interactive module 40 and both programs are required to be pair with each other, wherein once it is paired, the gestures are operational at the same time or in a timely manner on one or more split programs in one or more display screens 52.

It is appreciated that, according to the preferred embodiment of the present invention, the display screen 52 may be a LCD or LED monitor, a touch screen or a projection screen displaying through projecting device such as projector, optical display device, augmented reality display device, goggle headset, AR/MR/XR/VR headset or glasses, and etc. For example, an augmented reality display allows a user to view their surroundings as well as projected images, wherein the projected images can be overlaid on the real world perceived by the user. In a normal set-up, a transparent display screen may be provided in front of a user so that they can continue to see the physical world and the display screen can include a typically glass waveguide and a projector provided to one side, wherein light from the projector is coupled into the waveguide by an input diffraction grating and the projected light is totally internally reflected within the waveguide. Then, the light is coupled out of the waveguide by an output diffraction grating so that it can be viewed by the wearer.

The adjuster 13, the adjuster interface 21, the sideline element 31, the reservation sideline element 32 and the pop-up sideline element 37 of the present invention are especially practical and useful to the display screen 52 embodied as projection screen as mentioned above that does not have a physical boundary like the monitor or touch screen. For example, to operate a touch screen, the physical width and height of the touch screen at least provide a reference border to the user's fingers to touch and operate as a relatively proportional reference. However, to the displaying content 212 projected from the projecting device, the images are projected in front of the eyes of the user and may not have any boundary. Although motion sensors can be provided to detect the movement of the user's hands and fingers so as to detect the touch points 521 operation as described above, the amount of the movement of the user's finger fails to provide any reference to the proportion of the touch point operation. Therefore, the adjuster 13, the adjuster interface 21, the sideline element 31, the reservation sideline element 32 and the pop-up sideline element 37 displayed in the projection screen type display screen 52 in the present invention significantly allow the user to operate and control the electronic device 50 through the projection screen type display screen 52 precisely with scale and proportion references.

Figure 18:
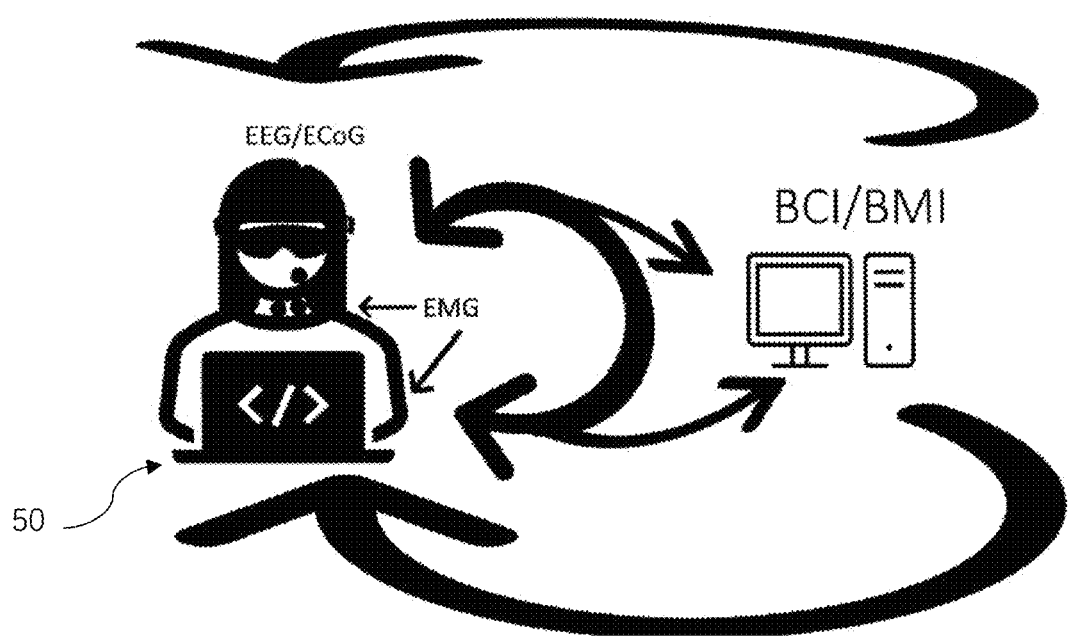
FIG. 18 is a schematic view illustrating the incorporation of the EMG and EEG/ECoG with BCI/BMI of the electronic device according to the above preferred embodiment of the present invention.

It is worth to mention that, referring to FIG. 18, in principle, any type of neurological impulse signal could be used to operate with Brain Computer Interface (BCI) systems, like signals from an Electroencephalogram (EEG), Magnetoencephalography (MEG), Electrocorticography (ECoG), any Brain Implants (Intracortical Microelectrodes), and etc. For example, time-trigger EEG or ECoG response amplitudes and latencies, power within specific EEG or ECoG frequency bands or firing rates of individuals cortical neurons. Additionally, upper and lower extremities neuromuscular signals can be utilized, wherein the signal acquisition from Electromyography (EMG), Acceleromyography (AMG), Mechanomyography (MMG), and etc. are converted into digital control signals. In other words, the sensors on a (AR/MR/XR/VR) headset are the means for acquiring the signal and measuring the signal of the brain in relation to signal acquisition on the head/scalp through the (EEG), or by the sensors (ECoG) in the skull, or by the sensor (neural implant) in the brain, or any type of signal measurement using a particular sensor modality. The EcoG is not limited to 1,024 or 2,048 sensors or any lessor grade grids like 256 sensors or less, in fact the invention is not limited to less than 2,048 sensors.

If the brain signal acquisition is formulated from (EEG/ECoG) the same way, the same way the (EMG) signal acquisition can be formulated from neuromuscular electrical signals on any extremities from the arms, neck or legs with a dermis connector sensor modality for signal acquisition, wherein the acquisition of signs for the (EEG/ECoG) and/or for the (EEG) are amplified or reduced to levels appropriate for electronic processing, including filters for removing electrical noises and for operational through the BCI apparatus or any other similar device, independent or built-in, within the electronic device 50. Also, all signal acquisitions required mentioned above are for the "Feature Extraction" of the processes of analyzing the digital signals. In other words, to differentiate relevant signals characteristics (type of signal and features in the signals, in relation to the final intent) from a biological content and to express them in a compressed form suitable for translation into output commands. Additionally, the resulting signals are then delivered to the "Feature Translation" algorithm, for example the artificial intelligence module 25, which converts the signal features into the appropriated commands for the electronic device 50 (Device Output). In other words, the "Feature Translation" algorithm provides the translation for the digital functions of the (Device Output) such as letters selections, cursors control, gestures selection pairing program and/or program function, sideline element movement, and etc., wherein the electronic device 50 provides feedback to the user, thereby providing a close loop arrangement. It is important to mention that the (BCI/BMI) can be operated as an accessory to the electronic device 50, or in combination with the artificial intelligence module 25 in the electronic device 50 or built-in within the electronic device 50 in combination with the processors 51 or independent without the processors 51 through the cloud sever 100.

Furthermore, the brain signals (EcoG, EEG), the extremity signals of Electromyography (EMG) and the verbal commands can be used in combination or independently for controlling digital electronic devices 50. The user may position the electrons on the anterior portion of the neck for the signal acquisition of the neuromuscular system in relation to speaking with or without voice commands. Furthermore, the type of signal acquisitions (EEG, EcoG, EMG) can be from a healthy body part and/or from an injured body part, such as a brain lesion and/or without a brain lesion.

The significant difference in the present invention is the interoperability of utilizing any neurological signal from a human body, wherein one or more signal acquisitions are measurable from the production of one or more gestures performed or from an imagining gesture, including verbal command or an intended vocalization from a healthy human body and/or from a less than optimal human body. The teachings include method and arrangement for interoperability with various types of signal acquisition unique to the individual from the neuromuscular signals and/or from the brain signals, wherein the signal acquisition is processed and converted to signals that are used for inputting digital or robotic commands corresponding to an electronic device 50. Through the use of physical device like the (BCI), equipped with the electronic device 50 wirely or wireless, or through a built-in device within the electronic device 50, wherein the computing functions for the conversion of the signal acquisition to the digital base signal are operated online or through the cloud server 100.

The present invention provides a wireless or wirelly electrical signal acquisition for operating electronic devices 50 through the use of any signal acquisition, like Brain Computer Interface devices, or other similar devices at least consisting of four sequential components: (1) signal acquisition, (2) feature extraction, (3) feature translation, and (4) device output. These 4 components are controlled by an operating protocol that defines the onset and timing of operation, the details of signal processing, the nature of the device commands, and the oversight of performance. Furthermore, the signal is pairing with a performed gesture and/or paired with an intent gesture, wherein either algorithm system performance can be provided from the electronic device 50 and or from the (BCI) algorithm system or any similar like artificial intelligence 25 computing system online or through the cloud server 100, wirely or wirelessly, through the internet or through the server communication module 105, wherein signal acquisitions for any body part are used as in any traditional Brain Computer Interface (BCI) system. The present invention further provides that the signal acquisition is paired with the gesture and the gesture is paired with a program. Additionally, the signal acquisition can also be paired or not paired with a program or a gesture, and the gesture can be performed or an imaging gesture. An algorithm system incorporated in the electronic device 50 is also capable of anticipating the user next action point without the user producing a performed gesture or and imaging gesture, where the information is acquired from data of past performances including any or all performed or not performed gesture with or without paired signal acquisition. Where the commands are controlled and generated by the electronic devices 50 and are operated to be displayed through one or more display screens 52, divided by one or more sideline elements, through the usage of one or more processors 51, operational online, or in a cloud server 100 having a computing processing system with or without the processors 51 in the electronic device 50.

The Brain Computer Interface system is equipped with a built-in algorithm system, attachable or detachable to the electronic device 50, with wired or wireless interface with the analyzable factor module 26 and the artificial intelligence module 25 of the electronic device 50 for the signal acquisition of gestures and/or verbal commands. In other words, any type of human electrical impulse recording during a movement, or an imagine movement, for a physical gesture, a verbal command, a verbal intent, any physical movement, or intended command. Accordingly, in the present invention, the interoperability of Brain Computer Interface (BCI) system or the like can be used for inputting on any electronic devices 50 at the same time or in a timely manner on one or more programs divided by the sideline element 31 on the display screen 52.

The operation of the program of the artificial intelligence module 25 in the electronic devices 50 can be implemented in multiple ways as being interfaced with the Brain Computer Interface (BCI) own algorithm system, or as two independent artificial intelligence modules 25 working together with one for the gesture touch point 521 in the electronic device 50 and the other for the signal acquisition of the imaging gesture or the performed gesture, for the function of the (BCI) to serve in the function of translating and recognizing the desire performed gesture or the imagining gesture, including the performed verbal command or the imagine verbal command, for any form of computerize equipment operations or mechanical robotic machinery interface with the electronic device 50, operating within the usage of the (BCI/BMI) system through a separate device, through a built-in system or through an interoperability of the selected operations in the internet and or the cloud server 100.

Furthermore, the present invention provides a system of pairing verbal command with a program or a program function response, through the use of a system like the Brain Computer Interface system with one or more signal acquisitions paired with selected programs or program functions. It is worth mentioning that the verbal function can have more than one words for the desire command to generate the desire response, in the performed vocalization or in the imagine vocalization through the usage of (EEG, EcoG, EMG) signal acquisition for the (BCI), performed within the processors of an electronic device 50, a Brain Computer Interface (BCI), or without processors in the electronic device 50, wherein the signal acquisition information is transmitted to the cloud server 100 and converted to the digital data base for the purpose of operating one or more electronic devices 50, as mentioned in the present invention.

Alternatively, the verbal commands operation system can also come from an electromyography (EMG) signal acquisition from the neck voice track muscular system, wherein the signals acquisition are paired with a selected program or program function in a Brain Computer Interface like devices for operating the electronic device 50. In this system the signal acquisition is acquired with audible or without audible vocalization of the verbal command. In other words, the system is not dependent on the audio software to recognize the command. The signal acquisition will require similar processing as earlier mention, for the Brain Computer Interface (BCI) system, the major advantage in this system is that the signal acquisition for operating the device is not sound dependent, in other words it will also operating in a noisy environment or without the user producing a audible vocalization. The problem with traditional voice activation programs for verbal commands they require a clean audible sound without noise pollution and in most cases proper enunciation of the selected language, otherwise the verbal command is misunderstood or is non-functional.

Furthermore, Electrooculogram (EOG) signal acquisition for eye movement or the electroretinogram signal acquisition for visual stimuli, these signals can also be process in the same manner as the other signal acquisition where processed for the Brain Computer Interface (BCI) devices. Again, the signal acquisition is paired with a selected program or program function, independent or in combination with other signal acquisition paired with other programs or program function, or not paired to the same program, or not paired to a program function. Wherein any signal from the human body can be used to paired with said programs or programs functions, through the use of a Brain Computer Interface like device, in addition to the gesture pairing with programs or programs functions in the electronic devices 50, also mention earlier in this invention. The invention teaches the interoperability of signal acquisitions, softwares and hardwares computing systems, etc.

Figure 19:
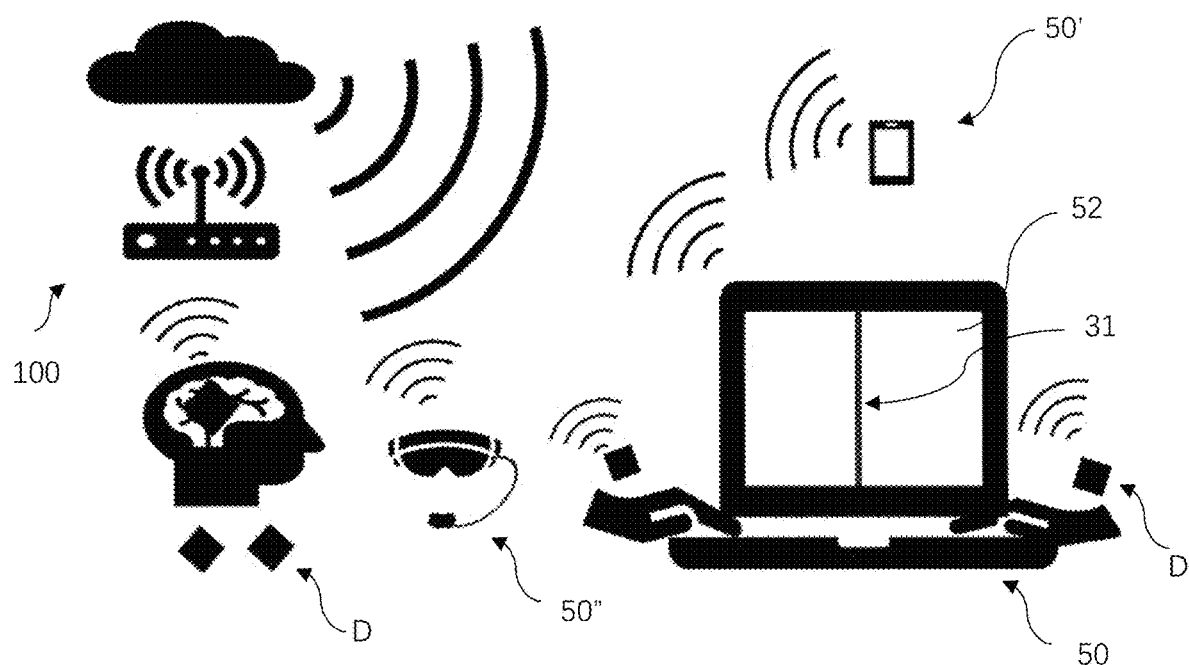
FIG. 19 is a schematic view illustrating the interoperability of performed and imagined signal acquisition on various electronic devices for operating through the internet and/or cloud servers, with or without a processor, according to the above preferred embodiment of the present invention.

Referring to FIG. 19, the interoperability of performed and imagine signal acquisition on the electronic device 50, 50', 50" like a headset, laptop, smartphone where the signal acquisition is delivered and acquired by the electronic device 50, at the same time or in a timely manner in a close loop system, wirely or wireless, through the internet or through the cloud server 100, wherein the signals are interdependent on one or more electronic devices 50, 50', 50" for operating the one or more electronic devices 50, 50', 50". It is worth mentioning that the diamond icons D means sensor transmitting wireless or wired information where the cloud server 100 utilizing the information. In addition, the smartphone type electronic device 50" can provide the user the ability to download a verification APP. Thereby, communal devices will not require the user to provide needlessly repetitive information, including the user gesture selections and program selections for the present invention or any part in the present invention. Alternatively, the user selects the degree of information willing to share with non-personal electronic devices 50. For example, a personal electronic device 50, 50', 50" will have a robust security system to prevent unwanted usage from uninvited individuals, wherein the gestures, the program selections, where any (signal acquisition) verifications are analyzed for the type of gesture performed or imagine, with or without the touch point 521, with or without infrared base gestures with or without electromagnetic sensors on one or more electronic devices 50, 50', 50" with one or more physical display screens 52 of the notebook computer type electronic device 50 or smartphone type electronic device 50' or virtual (non-physical) display screen 52 through one or more projecting devices 50" such as AR/VR/MR/XR goggle and being operated by an operation device such as control console, laptop, tablet, smartphone, or etc.

To individual consumers, who have physical limitation or incapable due to physical fatigue, medical conditions, or lack of interests, may not willing to perform body motions or verbal vocalizations currently required to operate haptic animation surrogate technology in the Virtual Reality environment. According to the preferred embodiment of the present invention, such users have the option to operate in a simulated environment, with or without full body wearables inputting sensors. In other words, the present invention significantly delivers exponentially more inputting flexible options for operating programs, in a more convenient approach to the user selection of electrodes utilization for the desire signal acquisition for operating 2-Dimensions display, 3-Dimensions display, and 4-Dimensional display in the electronic device 50. The touch point gestures paired program is able to be operated in combination with the signal acquisition head electrodes or skull implants, electromagnetic sensors, infrared based technology, where the user selects the desire wearables inputting system without interference from the none selected inputting system, and that all inputting systems may also operated together, through the internet, the internet of things (JOT), quantum computer or the cloud server 100.

It is worth mentioning that the smartphone type electronic device 50' may also provide the computing power for the AR/VR/MR/XR, just like Brain Computer Interface systems and, furthermore, may acquiring selected signals, receiving selected signals, delivering selected signals and/or processing selected signals from all the signal acquisitions delivered to the smartphone type electronic device 50', to generate a digital response in a close loop system within the AR/VR/MR/XR apparatus or in the display screen 52. In other words, the smartphone type electronic device 50' like any other stationary or portable computer may have a compatible attachable, detachable, or built-in amplified that can receive (EMG,EEG,ECoG) signals from the user where the signals are processed by the smartphone type electronic device 50' in the same process as in a Brain Computer Interface. Alternatively, the smartphone type electronic device 50', with or without a signal amplifier, may receive a signal acquisition from the user or the process digital signal from the internet, cloud server 100, or from quantum computing device after that signal acquisition has been processed. For example, the smartphone type electronic device 50' may receive the signal acquisition, and then the smartphone type electronic device 50' is the transmission source for delivering the signal acquisition information to the cloud server base Brain Computer Interface program, for the processing of that signal in the cloud server 100, to a digital base signal and back to the smartphone type electronic device 50' in a transceiver like simulation.

It is also worth mentioning that the laptop type electronic device 50 may also provide the computing power for the AR/VR/MR/XR apparatus (electronic device) 50", just like Brain Computer Interface systems and, furthermore, may acquiring selected signals, receiving selected signals, delivering selected signals, and/or processing selected signals from all the signals acquisitions delivered to the laptop type electronic device 50, to generate a digital response in a close loop system within the virtual display screen 52 of the AR/VR/MR/XR apparatus 50" and/or in the physical display screen 52 of the laptop type electronic device 50 or smartphone type electronic device 50'. In other words, the laptop type electronic device 50 like any other stationary or portable computer may have a compatible attachable, detachable, or built-in amplified means that can receive (EMG, EEG,ECoG) signals from the user, wirely, wirelessly or remotely, where the signals are processed by the laptop type electronic device 50 in the same process as in a Brain Computer Interface. Alternatively, the smartphone type electronic device 50', with or without a signal amplifier, may receive the signal acquisition from the user and from the cloud server 100 as process digital signal, or from quantum computing device, after that original signal acquisition has been processed. For example, the laptop type electronic device 50 may first receive the signal acquisition, where the laptop type electronic device 50 is the transmission source for delivering the signal acquisition information to the cloud server base Brain Computer Interface program of the cloud server 100, for the processing of the original signal acquisition into the digital base signal and that, once the digital base signal is produced, that signal is returned back to the laptop type electronic device 50 in a transceiver like simulation to generate a response on the display screen 52.

Figure 20:
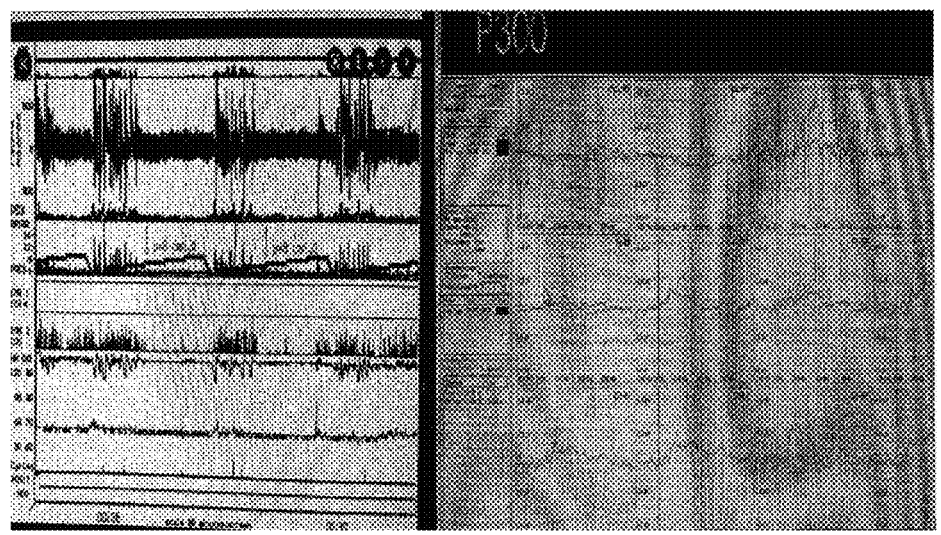
FIG. 20 is a diagram illustrating various neurological impulses in a signal acquisition created by human body, being divided by the sideline element for multitasking operations on the same device at the same time in a timely manner, according to the above preferred embodiment of the present invention.

FIG. 20 illustrates various neurological impulses in a signal acquisition created by the human body. It is appreciated that these human neurological impulses are unique to each individual and are created while an action is imagined or an action is physically performed. It is an Electromyography (EMG) and the Electrocorticography (ECoG), wherein the sideline element 31 may separate the selected signals acquisition in used. Where a dual signal acquisition system can be used for security purpose to ensure and to verify the intended individual is operating the personal electronic device 50 thereof, or the individual is the correct user guest for the electronic device 50. The illustration in FIG. 20 is an example of any electrical impulses from any biological source that can be used for the security system and in the operations of a Brain Computer Interface system or similar and future devices. Through the gestures performed by the user, the action of vocalization commands, and the continuous repetition of the neurological impulses, a verbal command program 404 and the artificial intelligence module 25 in the Brain Computer Interface or in the electronic device 50 are provided multiple analyzable inputting information able to operate independently, or in combination scalable and customizable on the electronic devices 50 with a Brain Computer Interface (BCI) attachable or detachable or without a physical Brain Computer Device (BCI). Once the signals are programed and operated, the user will have quicker interaction time in the electronic device 50 reducing workload, though the usage of a Brain Computer Interface (BCI) or with any other digital operational computing process.

Furthermore, the algorithm in the BCI or in the electronic device 50 independent or simultaneously is capable to utilize the electrical impulse signals of the brain in conjunction with the electrical impulse signals from the extremities wherein both signal acquisitions can be operational during the operations and compliments with each other as a security system. For example, when the user is turning on the programs in the electronic device 50, or wants to open a selected program requiring verification, for the appropriate user, the combination of the brain signals and extremities signs verifies the user, in either the non-physical intent (imagine) gestures and or in the physical performed gestures, considering an authorize user wherein the (EMG) and the (EEG/ECoG) signals are recognized and analyzed by the algorithm system as appropriate for the correct gesture perform or gesture intent/imagine. This is an example of a robust security system for any electrical security system and/or operations of the one or more electronic devices 50, wherein both signals authenticate the user. In the event the brain signal and the extremity signal acquisition are not compatible with past programmed signals acquisition from either (EMG) and/or the (EEG/ECoG) the electronic device 50 or any other electrical security system or any computing devices using this type of security system, the electronic device 50 will not operate. The cause of the non-operation can be due to wrong user, wrong gesture (intent or performed) or wrong gesture performed or imagine. For example, when the user produces or imagines the wrong gesture for the desire program, the wrong (EMG) and (EEG/ECoG) signal acquisition are not recognized. The system recognizes signal acquisition from stored and programmed signals in the past, the non-compatible signal imagined or performed are not stored and they are not recognized and thus would not be paired with the gesture as well as the program. Such non-compatible signal acquisition will not generate a response nor operate any program of any electronic device 50. In other words, the system will only recognize the gesture that the user pairing with a selected program performed or imagined from the brain signal or the extremity signals paired with the physical moments or the imaging gesture. In another example, a combination system for user gestures and for verification can include several gestures sequentially performed physically or non-physically (imaging gestures).

For example, in a combination pattern for a security process with unlimited gestures, one out of three signal acquisitions is not a performed gesture, that one signal acquisition is an imaginary signal acquisition, wherein it also requires the corrected gesture imagine. In other words, it is not physically performed or physically vocalized. All signal acquisitions have a selected order regardless of the process whether or not the signal acquisition came from a physically performed gesture or from an imaging gesture. In this system, the imagining gestures are only known by the user and the (BCI) signal processing system, cameras and viewers do not recognize the imagining gesture nor the order of the imagining gesture in relation to the combination of performed gestures and imagining gestures, when both the performed and imagined are used as the combination for a security process of any computer-readable program code. Additionally, the sideline element 31 can provide the user the separation for operations of multiple programs with the (EMG) and the (EEG/ECoG), in relation to multiple sensors delivering the signal acquisitions, manually or automatically, within the program and for designated programs. In other words, through the sideline element 31, the user can operate multiple programs, multiple computer languages, multiple displays, multiple window programs, at the same time or in a timely manner, on any two more displaying contents 212 separated by one or more sideline elements 31. The user is able to perform a physical gesture or an imagining gesture separated by a sideline element 31, where the gesture is paired with the program or program function, wherein the signal acquisition for the gesture is also paired with the selected gesture and the selected program or selected program function to generate a close loop response on the electronic device 50 or robotic apparatus.

It is worth mentioning that all physical or imagine signal acquisitions from an EEG, EcoG and/or EMG are paired with their corresponding gestures, and vice versa that they may not be paired with their corresponding gestures. For example, the signal acquisition can be paired with two different programs, one from the performed vertical gesture and the other from the imagine vertical gesture. Having two different programs for one gesture is possible when utilizing one or more interoperability systems because, in the electronic device 50, the display screen 52 can be configured to recognize the performed vertical gesture through the display screen controller module 20. Also, to the imagining vertical gesture, neither the electronic device 50 nor the display screen 52 may recognize the imagining vertical gesture to generate a response, and thus the signal acquisition of the EMG, or on the EEG/ECoG can be paired with a different program or program function in relation to the same performed vertical gesture such that even there is no touch point 521 detected on the display screen 52, the module of analyzable factor(s) 26 and the artificial Intelligence module 25 of the electronic device 50 may still be activated with the paired imaging gesture. It is appreciated that the imagine signal acquisition from the EMG or from the EEG/ECoG is fully operational and, therefore, the signal acquisition for the Brain Computer Interface (BCI) can generate the imagining vertical gesture from the EMG or from the EEG/ECoG type of signal acquisition from the Brain Computer Interface and respond in the electronic device 50 and the displaying contents 212 on display screen 52. Furthermore, in this example, when utilizing the EMG or the EEG/ECoG, the users may also have multiple signal acquisition (EMG/EEG/ECoG) operating at the same time in a timely manner, for example one from the EEG, the other from the EMG, each paired with a different program or program function that where not selected for pairing with a performed gesture, etc.

The artificial Intelligence module 25 provided in the electronic device 50, the Brain Computer Interface or the cloud server 100 can be activated by all the signal acquisitions. Furthermore, the signal acquisition can be provided by an attachable (BCI), detachable (BCI) system or a built-in (BCI) system in the electronic device 50, wherein the processor 51 can be physically built in the electronic device 50 or the computing can be performed through the server processor 10 of the cloud server 100.

It is worth mentioning that the electronic device 50 can process all the information coming and going to the AR/VR/MR/XR apparatus, with or without any sign acquisition from a (BCI) device, wherein the close loop process can be any combination of the Brain Computer Interface (BCI) device and the electronic device 50, with or without the AR/VR/MR/XR apparatus, or a Brain Computer Interface (BCI) in the electronic device 50 and the AR/VR/MR/XR apparatus.

The signal acquisition (EMG) from a physical gesture can be performed and paired with a selected program or program function, and to also have the same (EMG) imagining non-physical (gesture) signal acquisition paired with a different pre-selected program or program function. Furthermore, the same signal acquisition being imagined or performed may be paired with the same program or program function. This method provides the user to have a more robust security system with a performed gesture and an imagining gesture rather than just having one portion for pairing the signal acquisitions with a program or program function through the usage of (EMG) signal acquisition Brain Computer Interface.

The signal acquisition (EEG/ECoG) from a non-physical gesture can be performed and paired with a selected program or program function. The same (EEG/ECoG) imagining non-physical (gesture) can produce different selected signal acquisition one form the EEG while the other from the EcoG for operating different programs or program functions. Furthermore, the same signal acquisition imagined or performed may be paired with the same program or program function. This method provides the user to have more than one options for pairing signal acquisitions with programs or program functions through the usage of (EEG/ECoG) signal acquisition.

The signals acquisition from the (EMG) and from the (EEG/EcoG) may be paired with the same program and program function. When both signal acquisitions are coming from more than one inputting system like the BCI with EMG or lithe BCI with EEG/EcoG at the same time, they can be complimented with each other without interference as a form of a robust security system. Additionally, the signal acquisition from the (EMG) can be paired with a selected program function and the signal acquisitions from the (EEG/EcoG) can be paired with a different program function where both signal acquisitions generated two responses at the same time. It is appreciated that the (EMG) signal acquisition may produce a selected program while the (EEG/EcoG) signal acquisition produces a different program function on the same program one the same gesture at the same time, as a form of multitasking.

Accordingly, the present invention discloses several inputting means, at least including a first means is the touch point gesture, a second means is the touch point gesture incorporated with the module of analyzable factors 26 and the artificial Intelligence module 25 on the display screen 52 of the electronic device 50, a third means is the infrared camera sign-language gesture reader, a fourth hand/finger software detection program, and the fifth means is the signal acquisition of the (EMG, EcoG, EMG) of the (BCI) device, which can be performed or imagining gesture for operating, a combination or independently of the touch point gesture and the imagine signal acquisition. The hand/finger software detection program, without the infrared camera sign-language gesture can be operated or a combination of the touch point gesture and the infrared camera sign language gesture reader and the (EMG, EcoG, EMG) signal acquisition. The electronic device 50 may also be capable of incorporating the touch point gesture with the infrared camera for infrared sign-language gesture reading without any (EMG) signal acquisition for the (BCI) for operation.

In addition, for the gesture pairing for the selected program or program function, there are multiple options for the user's individualized gesture, including the gesture of one or more touch points 521 on the display screen 52 or control display screen 52X detected in the electronic device 50 and the gesture from the infrared camera and/or from the EMG or from the EEG/ECoG. In other words, the same gesture can have been paired with different programs or programs functions. Further, multiple inputting means may identify the same gesture at the same time for a robust security system. In addition, with the combinations of inputting means, the user can select the desire gesture for the selected combination of inputting means. With redundant inputting means recognition of the same gesture, the user can select different programming for the same gesture from one of the other redundant inputting means, as the means for multitasking to generate two or more responses at the same time or in a timely manner.

For example, the present invention provides multiple inputting apparatus with the most compatible ergonomic delivery convenient and portable, for example the electronic device 50, the infrared camera sign language gesture reader together with the (BCI) for the EMG and or for the EEG/ECoG, wherein each inputting option can have at less one different option of pairing a gesture with a program or program function. Furthermore, each gesture can be performed or imagined for the Brain Computer Interface (BCI) system. Additionally, multiple other inputting devices can have gesture interoperability for pairing with a program or a program function in the electronic device 50. The invention teach one or more Brain Computer Interface (BCI) system for each signal acquisition, one for the (EMG), and the other for (EEG) and the other for the (ECoG) or for other desire signal acquisition for other biological signals requiring the function of a Brain Computer Interface system or similar devices. It is possible for one Brain Computer Interface device to alternate between signal acquisition just like a remote server may provide alternating digital signal corresponding to the gesture and the user selection. Each signal acquisition is processed by the Brain Computer Interface (BCI), wherein the Brain Computer Interface computing can come from the cloud or the internet. The Brain Computer Interface device can come from an attachable adjacent device or from a Built-in Brain Computer Interface within the electronic device 50. Through the electronic device 50, the physical size of traditional Brain Computer Interface device can be reduced. The electronic device 50 can be the control source for signal acquisition in real time, wherein the harvesting for any signal acquisition can be done through the electronic device 50 with an attachable or build-in Brain Computer Interface (BCI) with available options for automatically or manually calibrating the energy and frequency on the wirely or wireless electrodes sensors for acquiring adequate signal acquisition for gathering the signal acquisition to operate with any "Brain Computer Interface" (BCI) device, thereby any remote Brain Computer Interface computing system can receive and process remote signals of (EMG, EEG/ECoG) through the internet, or the cloud server 100 in private or public manner.

It should be noted that the gestures according to the present invention are not limited to the gestures performed by physical finger(s) touching on the display screen 52 to generate the one or more touch points 521, but also referring to gestures preformed with the EMG, or with the EEG/EcoG. Any neurological impulses performed by body movement or imagine can function as a gesture including verbal commands with respect to the gestures. It is appreciated that a structural and non-structural tactile system with motion sensors, motion cameras, hand/finger software detection program and/or infrared cameras detector can be operated independently or together collectively for natural optimization of multitasking, wherein multiple programs or program functions are generated and operated in a desire systematic processes. In other words, the user can select the pairing of a gesture with a program or program function for each individual inputting devices, and that not all inputting devices have the same pairing of the gesture with the same program or program function. Furthermore, some inputting devices will not recognize the gesture thereby not generating a response. Some inputting devices will recognize the same gesture and have the same pairing for the selected program or program function, so that it provides the selected programs and program functions a robust security and the desire operational precision for selected gestures.

It is worth further mentioning that the pairing can be operated between the one or more touch points 521 of gesture and a program or program function, between the sign language gesture (infrared system) and a program or program function, and/or between the imagining gesture (Brain Computer Interface) and a program or program function.

Hand gloves are an optional tool in relation to multitasking. The goal is to deliver a wearable optimization for gesture production and utilization on the display screen 52 or without a physical structure, an imagine or as a form of sign language gesture. The glove provides additional verification of gestures with light, tactile and thermal delivery where the infrared camera and the display screen 52 receive the information together or independently. Additionally, the power source of the glove can be incorporated with the (EMG) device. In other words, both the (EMG) and the glove may have separate power supply and or may share the same power supply. The glove can be made of a flexible fiber optic mesh of various size or of one size with stretching capacity to fit all sizes.

It is appreciated that the fiber optic mesh is a branching intertwine elongated structure running along the user's hand as a flat, circular, square or any other shape continuous tubing structure from above the wrist, with or without the (EMG) sensor and power supply. It is worth mentioning that, alternatively, the fiber optic mesh is a transparent web like structure beneath or above a glove with pores like medium surface. Optical fiber lines and the micro light electrical tape or line do not reduce light emitting with any joint flexion while continuously conducting light. Furthermore, it is possible for heat transfer through a micro light Emission source with or without optical fiber lines when it is in close proximity with human skin that allows thermal warming to the user while increasing the gesture verification thorough the infrared camera and without reducing sign language gesture performance, that is the usage of a grid multiplexed gesture.

According to the present invention, gesture for generating touch points 521 would be tactile gesture, verbal/audio software program, camera for motion control, infrared detection, hand/finger software detection program processes of interoperability operating on 2-Dimensional, 3-Dimensional, 4-Dimensions and non-structural sensory control systems to interface and operated multitasking in 2-Dimensional, 3-Dimensional, and 4-Dimensional display programs independently or in conjunction with each other, and with other imputing systems, and etc.

Figure 12C:
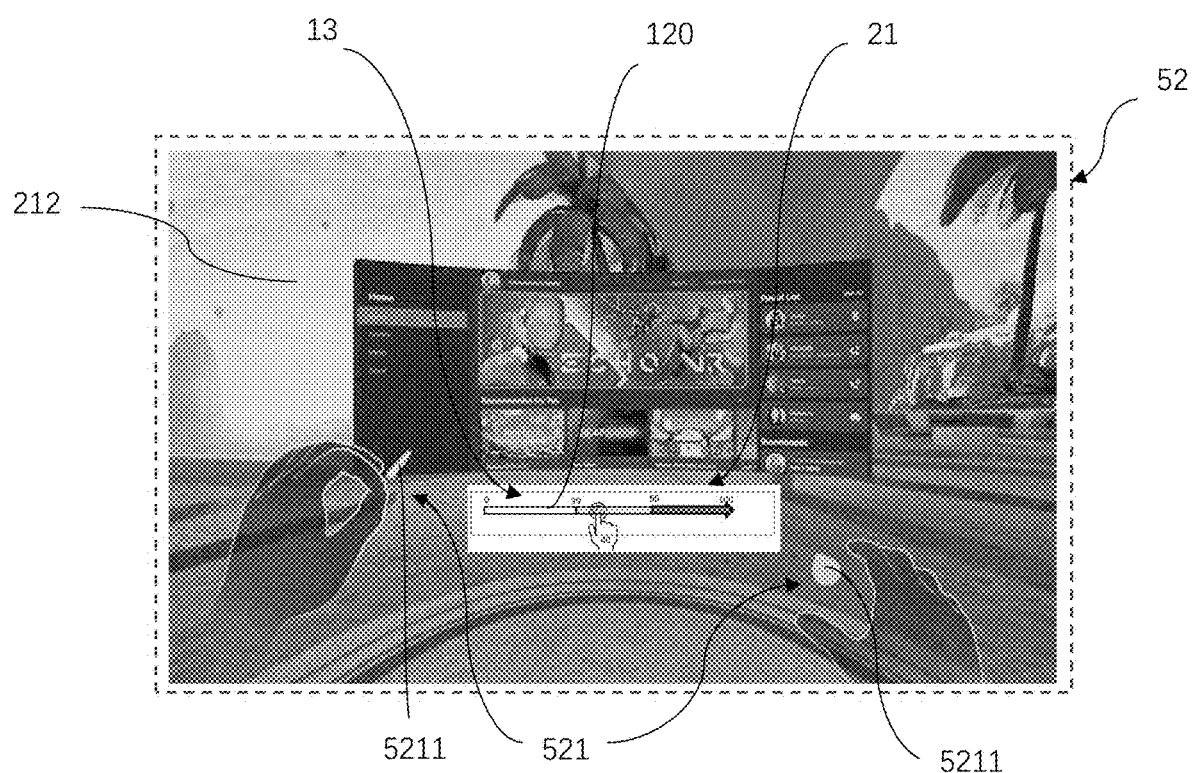

Considering verbal commands in a noisy environment without the Brain Computer Interface, verbal commands may loss its function. Therefore, voice commands with (BCI) allow the user to continue operating the electronic device 50 without affecting the inputting capabilities. The touch point 521, according to the present invention, does not limit to a finger touching on a touch screen type display screen 52, but also includes a physical finger of the user or a virtual operation finger tool 5211 of a performed or imagining gesture of the user that is detected in a touching action with respect to the virtual type display screen 521 as shown in FIG. 12C, wherein the display screen 521 may refer to projecting display screen 521 projected from the projecting device in front of the user's eyes.

Therefore, in the Step 101 of the method of generating the adjuster 13, the display screen 52 may also detects one or more touch points 521 and the projecting display screen 521 generates a responsive performed or imagining touch point 521, with or without tactile, at a position of the touching action of the finger or virtual operation finger tool 5211 with respect to the virtual type display screen 52, proportional to a location of the displaying portion 523 of the display screen 52, the display program and the display medium, and the adjuster module 10 receives the information of the respective touch point 521, the sign language gesture, the imagining gesture performed or imagined detected and sent from the touch screen 52, the infrared camera for sign language gesture and/or the Brain Computer Interface for the imagining gestures.

In addition, receiving information from the infrared camera from the user's finger thermo-heat (sign language gesture), with or without a glove or sleeve sensors, with or without the hand/finger software detection program. The touch screen 52 or display medium generates a respective touch point 521 displaying at a position in relation to the display screen 52 in relation to the finger's thermos-heat with or without a glove or sleeve sensors, and then the adjuster module 10 receives the information of the infrared gesture location detected and sent from the infrared camera and/or from the gloves or sleeves sensors. The information is analyzed by the module of the analyzable factor 26, the artificial intelligence module 25 and the distance tracker module 27 of the display screen control module 20, for function, movement and direction of each of the one or more sign language performed gestures.

Furthermore, the receiving information from the Brain Computer Interface (BCI) system is initiated by a signal acquisition from an imagining gesture. The display screen 52 receives one or more imagining gestures, wherein, for example, the touch screen 52 generates a respective touch point 521 at a position of the display screen 52, and the adjuster module 10 receives the information of the imagine gesture detected sent from the Brain Computer Interface (BCI), wherein the information is analyzed by the module of analyzable factors 26, the artificial intelligence module 25 and the distance tracker module 27 of the display screen control module 20 or in the Brain Computer Interface for functioning, movement and direction of each of the one or more imagining gestures.

In the Step 102, in addition to the touch point 521, if the sign language and/or imagining gesture doesn't move, go to step 103. If the sign language gesture and/or the imagining gesture is moving, detecting the moving direction of the sign language and/or imagining gesture, thereby sending the moving direction and location of the sign language and/or the imagining gesture to the adjuster module 10, and then go to step 104.

In the Step 103, the another touch point 521 can be from the infrared camera, the hand/finger software detection program, and/or the Brain Computer Interface.

In the Step 105, the sign language gestures and the imagining gestures also require significant less physical demands.

In the Step 109, the sign language gesture can be proportionally tracked by the infrared camera and/or hand/finger software detection program. Further, the imagining gesture can produce signal acquisition variants for various adjusters 13, sideline element 31, including selected numbers of the numeric indicators 16.

In the Step 110, the touch point gesture also includes the sign language gesture and/or one or more imagining gestures which can also recognized and localized by the module of the analyzable factors 26, the artificial intelligence 25, and the distance tracker module 27 of the display screen control module 20 after the information is provided by the infrared camera. Hand/finger software detection program, and/or the Brain Computer Interface so as for the adjuster module 10 to generate the adjuster 13, the graduation(s) 120, the adjuster indicator 14, and/or the numeric indicator 16 which are all customizable on the one or more program in the one or more display screens 52 or display medium, wherein the gesture has been pre-programmed to display one or more display contents 212 of one or more programs on one or more display screen 52, specifically for the pre-program gesture of the desire program or function, without additional physical movements.

Figure 21A:
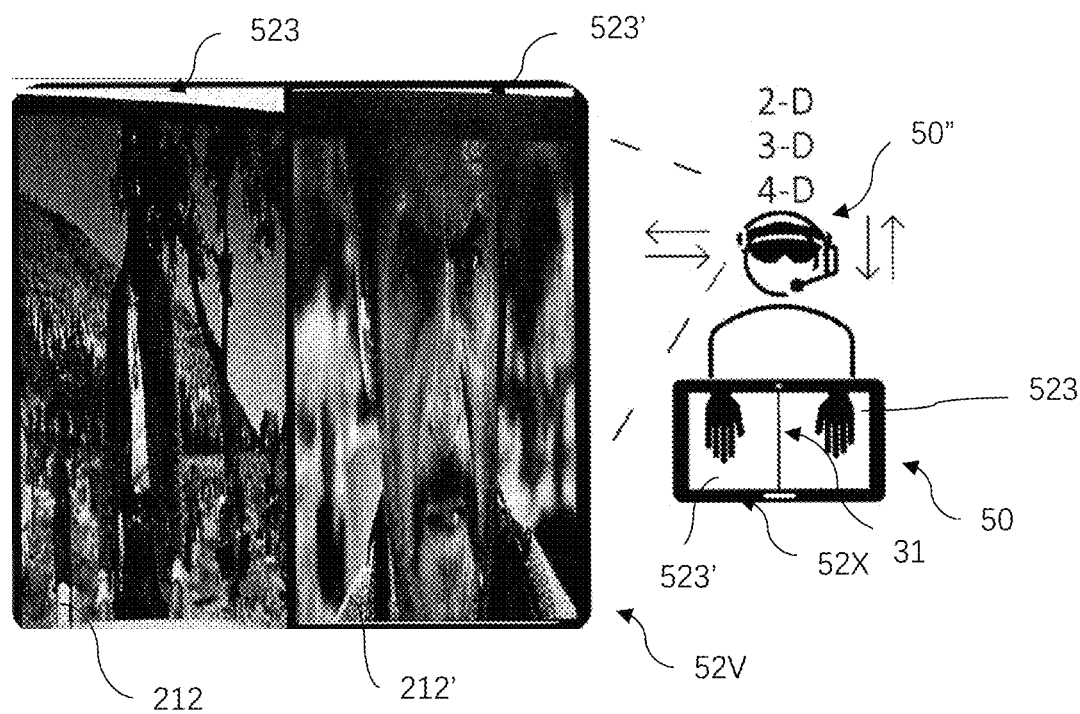
FIG. 21A is a schematic view illustrating two displaying contents displaying in two displaying portions in responsive to sideline gesture for operating one or more VR/MR/XR/VR apparatuses according to the above preferred embodiment of the present invention.

Referring to FIG. 21A, the user may simply perform a sideline gesture, such as triple tap, or imagining a triple tap, on the control display screen 52X of an electronic device 50 as an operating and controlling apparatus to generate a sideline touch point information which is recognized by the display screen controller module 20 (second executable portion 2) and sent to the sideline module 30 (third executable portion 3) to generate the sideline element 31 to split both the control display screen 52X and the virtual display screen 52V projected by the headset 50" in front of the user's eyes (as shown in the left side screen of the FIG. 21A) into two displaying portions 523, 523'. Then, when an operating gesture is operated by the user on each of the two displaying portions 523, 523' of the control display screen 52X, the touch point information detected by the display screen controller module 20 is sent the adjuster module 10 to generate an adjuster 13 on the respective displaying portion 523 or 523' of the virtual display screen 52V for adjustment operating of the display content 212, 212' on that displaying portion 523, 523' according to the touch points 521 produced by the touching gesture of the user. It is worth mentioning that gesture produced by any single touch point 521 or a combination of touch points 521 can be pre-programed as mentioned earlier to be paired with the gesture and cursor program 44 to generate a division between two or more programs in the one or more display screens 52, 52V.

Figure 21B:
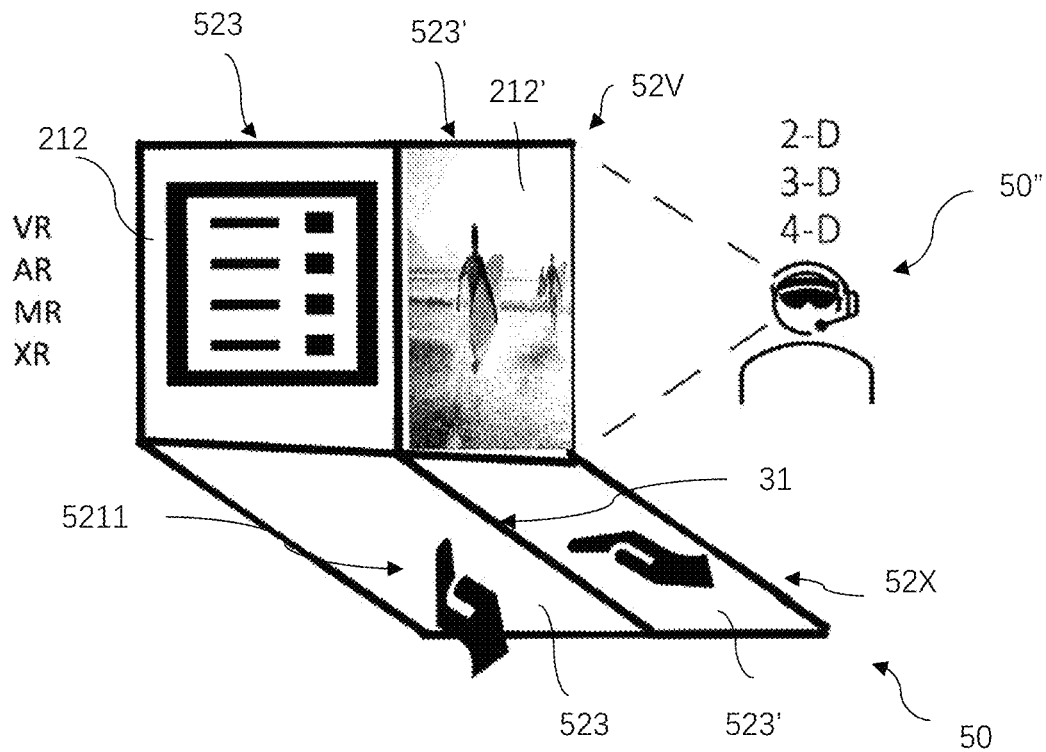
FIG. 21B is a schematic view illustrating multiple sideline arrangement operating the VR/MR/XR/VR apparatus through a physical display screen and/or through a non-physical display medium according to the above preferred embodiment of the present invention.

The touch point information provided to the adjuster module 10, the sideline module 30 and the interactive module 40 are analyzable touch points 521, with the option of being produced in more than one way on the display screen 52, 52V, wherein the display screen controller module 20 activates the module of analyzable factors 26 for distinguishing pressure, thickness, time, acceleration, direction, distance, angle, interruptions, size, one hands or both hands, and/or location from one or more touch points 521, wherein the information is further reviewed and learned by the artificial intelligence module 25 to differentiate from past, current and for future touch points selections. In other words, the operating gestures according to the present invention can generate Augmented Reality, Virtual Reality, Extended Reality, and Mix Reality and control said displays. For example, any of the module of analyzable factors 26, like the pressure of the one or more fingers, the movement of one or more fingers and the time duration of gesture are differentiations from the Augmented Reality, Virtual Reality, Extended Reality, and Mix Reality. Furthermore, the 2-Dimensional touch point 521 can also be divided by the sideline module 30 for the 3-Dimension and for the 4-Dimension Augmented Reality (AR), Mix Reality (MR), Extended Reality (XR) and Virtual Reality (VR) to interchange information for the adjuster module 10, the controller module 20, the sideline module 30 and the interactive module 40 for verification of the selected gesture and control of the selected programs or program function in the electronic device 50 on the display screen 52 and the virtual display screens 52V, as illustrated in FIG. 21B. Furthermore, the artificial intelligence module 25 may understand similar or identical gestures performed or imagined and can generate different responses according to the type of program operating in the Augmented Reality, Virtual Reality, Extended Reality, and/or Mix Reality.

The present invention discloses a process for the user to operate programs, avatars, surrogates, or emoji, and etc., in the display screen 52, such as a 2-Dimensions display screen 52 or a 3-Dimensional gesture holographic apparatus, as a process to multitask on various operation systems (OS) such as Windows programs, Microsoft operations, Apple iOS, iPadOS, watchOS, macOS, tvOS, Google Android, and/or etc. with or without the sideline module 30.

As shown in FIGS. 21A and 21B, the gestures are also customizable and controllable with verbal functions. Therefore, the user is able to work, party and engage more efficiently in the 2-Dimensional control display screen 52X, while observing the program in a 3-Dimensions or 4-Dimensions environments through the virtual display screen 52V. FIG. 21A illustrates the user operating on an independent control display screen 52X of the electronic device 50 and viewing the displaying contents 212, 212' through the virtual display screen 52V through the VR/AR/MR/XR apparatus such as the goggle headset 50" worn on the user's head. FIG. 21B illustrates that the control display screen 52X is also a virtual displaying content viewing through the goggle headset 50" for the user is able to operate via gestures detected by the infrared camera from the user's finger thermo-heat (sign language gesture), with or without a glove or sleeve sensors, the virtual operation finger tool 5211, or the imagining gesture performed or imagined by the Brain Computer Interface. In other words, the present invention provides means for the user's performing or imagining gestures without having to physically perform the display posture and/or vocalization during a communication posture and verbal generated display in the simulated world.

Referring to FIGS. 21A and 21B, the electronic device 50 is configured to allow the user to operate the sideline module 30 on the control display screen 52X to produce the sideline element 31 splitting the control display screen 52X into two or more displaying portions 523, 523' to separate two or more programs operating in the two or more displaying portions 523, 523' respectively. Of course, two independent display screens 52 can be configured to be used for operating two programs respectively, wherein the two display screens 52 can be physically separated and are interconnected, interchangeable and interfaced with the Virtual Reality, Augmented Reality, Mixed Reality and/or Extended Reality apparatus, such as the headset 50". In other words, the control display screen 52X can be functioned as a full touch screen inputting control for digital displays and to control the Virtual Reality (VR), Augmented Reality (AR), Mixed Reality (MR), Extended Reality (XR) apparatus as well as the VR/AR/MR/ER displaying contents 212, 212' on the virtual display screen 52V. Furthermore, the user controls the 2-Dimensional, the 3-Dimensional and or the 4-Dimensional virtual display screen 52V independently or in combination through the use of gestures and verbal commands divided by the sideline element 31. For example, the sideline element 31 can be divided into one portion of the display screen 52X to operate a 2-Dimension program and another portion of the display screen 52X to operate a 3-Dimension program at the same time or in a timely manner. Through the gestures and the verbal commands of the user, the user can control two or more display screens 52X or two or more displaying portions 523, 523' of the display screen 52X with both hands to perform gestures and verbal commands or independently operated each display screen 52X or each displaying portion 523, 523' with the gestures and the verbal commands.

It is worth further mentioning that the headset 50" for the Augmented Reality, Virtual Reality, Mix Reality, or Extended Reality can have electromagnetic sensor inputting system to provide real time head motion tracking, specially for time sensitive gestures in addition to sign language gesture or gesture base controls performed or imagined with the (BCI) systems. The performed head motions (gestures) electromagnetic sensor is operated within the X, Y, and Z coordinates for the orientation of the yaw, pitch, and roll. According to the present invention, AC electromagnetic solid-state sensors for measuring both the position and the orientation natively can be used as the means for additional gestures, with or without verbal commands, with or without eyeball control cameras system, and with or without retinal control camera system within the headset 50" for the Augmented Reality, Virtual Reality, Extended Reality or Mix Reality.

In other words, the system for gesture and displaying sideline operation of the present invention understands the touch point 521 for the gesture and cursor program 44 and the display screen 52 generates and controls the selected program, wherein the verbal command can operate the right and left click, when the user pairs verbal commands with gestures respectively. This is a novel approach to manual control and verbal control operating at the same time on the display screen 52 or control display screen 52X. Furthermore, any neuromuscular impulse like voice control can also operate the Brain Computer Interface (BCI) through the signal acquisition of (EMG, EcoG, EMG) signals.

According to the preferred embodiment of the present invention, multiple options of operating various programs in the one or more electronic devices 50 through the gestures on at least one display screen 52 is provided, wherein each of the display screens 52 interfaces with the one or more electronic devices 50 and/or interacts with other electronic devices 50 having at least a processor 51 or through the processor 101 of the cloud server 100. Digital systems with computer usable medium having computer-readable program code can be embodied in the medium to perform executable operations, wherein the computer-readable program code comprises at least one processor or without a processor, such that the user can operate visual responses to 4-Dimensions, 3-Dimensions and/or in 2-Dimensions through the inputting of voice commands and/or touch point gestures imagined or performed. In other words, the user can perform a gesture and control said gesture for the movement and operation of the program. For example, the user can produce a gesture through the touch point 521 for the virtual mouse, wherein the user can verbalize right click or left click while the user is manipulating the gesture and cursor program 44 throughout movements with the touch point gesture originally provided on the touch screen type display screen 52 and operate the right and left click controls thought verbal commands program 77. The same process or similar processes can be accomplished for other programs such as the sideline module 30, the numeric indicator 16, the keyboard element program 43, the state-of program 48, and etc.

The interactive module 40 of the electronic device 50 may also provide the verbal command program 404 which can be a voice command program like Siri, wherein the user can make the command for "adjuster" and the programs response operability to the user's verbal command in relation to the touch point 521 for the location on the display screen 52. Also, through the combination of the touch point 521 and the verbal command, the adjuster 13 is generated to interface the desire command at the desire location or for the desire programs. In another example, the system understands the gesture for the gesture and cursor program 44 that the display screen 52 generates and controls the selected program correspondingly, wherein the verbal command can operate the right and left click while the user also pairs verbal commands with gestures. In other words, the manual control and the verbal control can be operated at the same time or in a timely manner on the display screen 52.

For example, as shown in FIG. 4A, when the user's one or more fingers perform a gesture, such as touching on the touch screen type display screen 52X, one or more touch points 521 are detected on the display screen 52 and the display screen control module 20 acquires the touch point information, wherein the module of analyzable factors 26 and the artificial intelligence module 25 provide the gesture information to the processor 51, and then the adjuster module 10, the interactive module 40 and the sideline module 30 receive the gesture information.

Similarly, as shown in FIGS. 21A and 21B, when the artificial intelligence module 25 recognizes the gesture information is a voice dependent gesture, the verbal command program 404 of the interactive module 40 is activated. In other words, the touch point gesture is localized on the display screen 52 and the verbal command module 404 generates the user selection based on one or more locations of the one or more touch points 521 that are identified by the display screen controller module 20. For example, the user may speak out for an "adjuster" 13, or a number, such that the verbal command program 404 is recognized by the artificial intelligence module 25 and provides the information to the server processor 101 or the processor 51 of the electronic device 50. Thereby, the verbal command program 404 generates an adjuster 13 accordingly at the location of the touch point gesture. Similarly, if the user speaks out for an "sideline" 31, or a number, the verbal command program 404 is recognized by the artificial intelligence module 25 and provides the information to the server processor server 101 or the processor 51 of the electronic device 50. Thereby, the verbal command program 404 generates a sideline element 31 accordingly at the location of the touch point gesture.

In view of above the interoperability of the touch point gesture on the display screen 52 incorporated with the verbal commands program 404 is illustrated that is an example of precision and scalable control options for multitasking with two or more imputing programs in one or more electronic devices 50. In other words, a combination for inputting can be used for any desire program in any location of the display screen 52 including in the VR/AR/MR/XR apparatus.

The present invention may further equip with an arrangement of operating gestures for controlling the moments and verbal functions of simulated characters, without the user conducting any body movement or any verbal function. In other words, the gestures are controlling the display audio and animation. Gestures provide the user the ability to increase productivity and tolerate demanding long work hours, as well as to reduce physical demand and vocal demands. For example, a corporation may train its customers and employees to operate gestures when communicating via the VR/AR/MR/XR apparatus. Therefore, the consumer will get the same visual experience and the same auditory experience with a live customer service employee through the VR/AR/MR/XR apparatus, wherein the employee does not need to vocalize most of the words in the communication nor does he or she need to perform all the displayed body postures or body language that are displayed during the communication.

Referring to FIG. 21B, considering all the optional programs and functions mentioned above are generated by a gesture, a verbal common, and a headset with motion control, wherein the user can produce a gesture or a verbal command for the visual display shot, clip, or animation, of an avatar or surrogate. Also, the user can control any type of frame like, long shot, a medium shot, a close-up shot, or extreme close up, and etc., or the level of the angle of the frame eye level angle, high angle or low angle, including the degree of lighting from low key lighting to the high key lighting and any degree in between. When the user gets closer to the display screen 52 with the VR headset 50", the virtual reality headset 50" senses the change in motion and display the frame program for the location of the headset 50" accordingly. For example, if the user moves the headset 50" away from the display screen 52, the long shot frame is generated. Similarly, when the headset 50" is moved closer to the electronic device 52, the extreme close up shot is generate. A headset motion control may be interfaced with the electronic device 50. In addition, for example, the bending of the neck with the headset 50" may operate the lighting, wherein the bending the neck to the left may generate a low key lighting, bending the neck to the right may generate a high key lighting, and the positioning the headset 50" in neutral may generate natural white balance. Certainly, the user may further select various programs to be operated with the headset 50".

Figure 22:
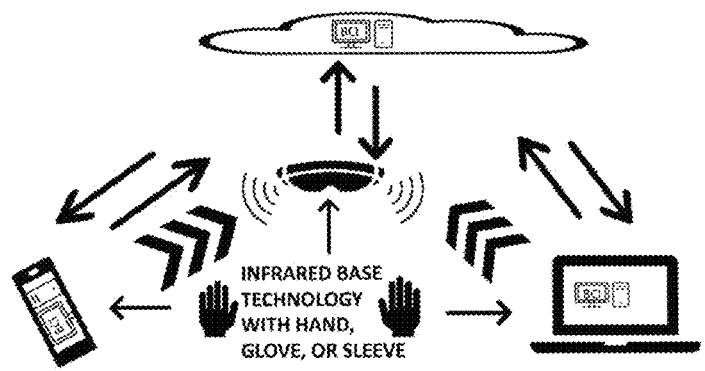
FIG. 22 is a schematic view illustrating multiple inputting devices equipped with camera operating software and infrared and finger detection programs in the internet and/or cloud operating VR/MR/XR/VR devices with or without the brain computer interface according to the above preferred embodiment of the present invention.

Referring to FIG. 22, human hands are able to be equipped as a powerless and multiplexed infrared light source for gesture pairing with programs and program functions for controlling various electronic devices 50 (such as smartphone, laptop, AR/VR/MR/XR apparatus, and etc.). In other words, the multiplexed infrared light source can be equipped as the gestures in relation to operating functions in an electronic device 50, wherein the multiplexed infrared light source system will not interfere with the analyzation of the one or more touch points 521 on the display screen 52, nor with the signal acquisition from the Brain Computer Interface, and etc. In addition, the interoperability for operating the VR/AR/MR/XR headset 50" through the one or more electronic devices 50 with or without infrared base cameras, with or without glove or sleeve, with or without hand/finger software detection program, and with or without Brain Computer Interface system. For example, the interoperability between the infrared base control system and the inputting system of the display screen 52 with or without the performed or imagined touch point 521. That is the present invention is capable of operating a plurality of electronic devices 50 independently and collectively with multiple inputting systems.

Alternatively, the hands can be equipped with a powerless infrared light source. The human fingers are natural Infrared emitters due to the thermal emission from the hands, especially in an emitting or receiving infrared base encryption/decryption system for reflection based information encryption/decryption. The human hand not only can serve as a single integrated infrared light source but also can serve as a multiplexed infrared light source due to its unique composition. Each hand has five fingers, each of which can serve as an independent infrared light source and can be controlled and grouped at will, allowing for gestures production and interpretation.

The human hand can also be equipped with one or more powerless light sources for infrared-based encryption/decryption. In other words, the encryption/decryption mechanism that relies on infrared reflection can be used for complex signal recognition. The intensity distribution of the thermal radiation from a typical hand at normal body temperature, and the infrared peak of the human hand is well within the atmospheric transmission window, as well as the detection range of the infrared detectors, that are able to illuminate structurally designed gratings. Such design may generate infrared diffraction patterns by different gesture.

For example, the infrared alphabet based on hand-grating interaction (IA-HG) and the three-finger alphabet (TFA) inputting systems are referenced. Also, the direct capture and recognition of gestures can be performed by thermal or infrared camera imaging process. It is worth mentioning that, according to the present invention, the gestures are not limited to three finger gestures. In other words, the infrared light source gesture from the hands may be recognized and analyzed by the electronic device 50 with or without touch points 521 produced on the display screen 52. Furthermore, the infrared gestures inputting system is based on the five fingers of each hand operating with the Brain Computer Interface for performed or imagined infrared gestures to control the electronic device 50 with or without a physical touch screen 52. Additionally, the hand/finger software detection program is able to increase the accuracy of gestures, through the camera, internet of things, the internet or cloud servers.

Figure 23:
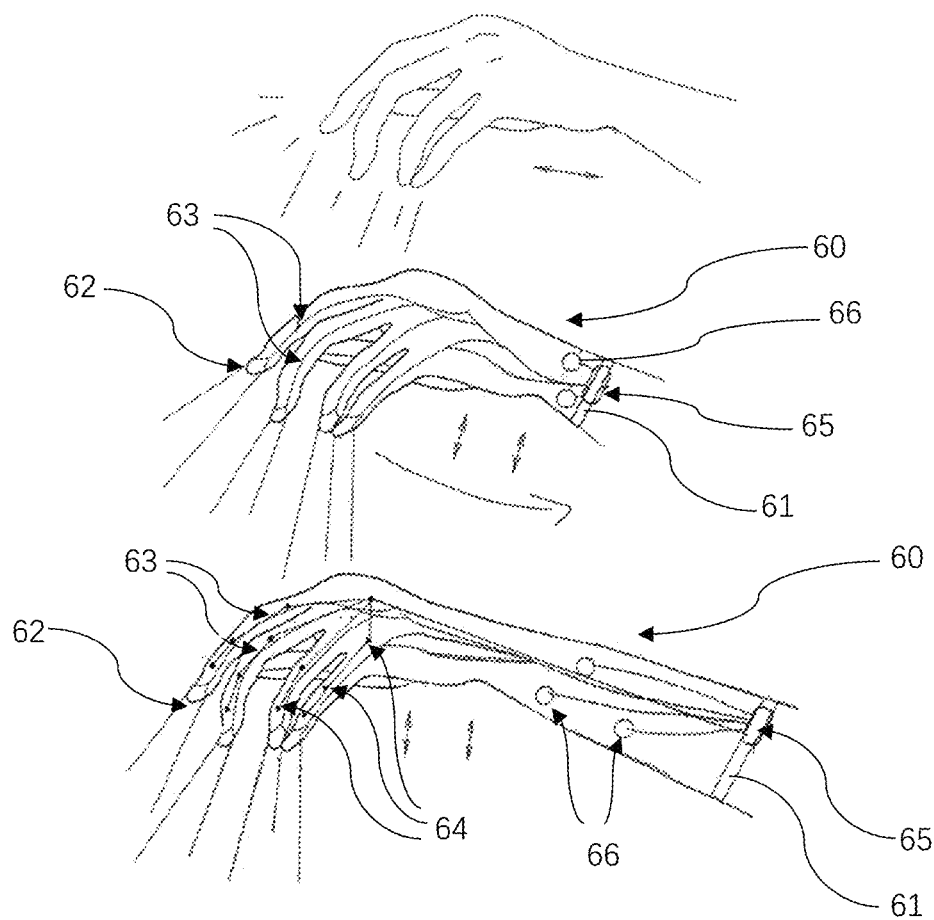
FIG. 23 is a schematic view illustrating hands and fingers operating through the hand and finger software detection program and/or through the infrared camera sign language program without a glove or sleeve or with a transparent mesh glove and/or sleeve with the fiber optic enhancement, the motion sensor and/or the (EMG) sensors according to the above preferred embodiment of the present invention.
Figure 23A:
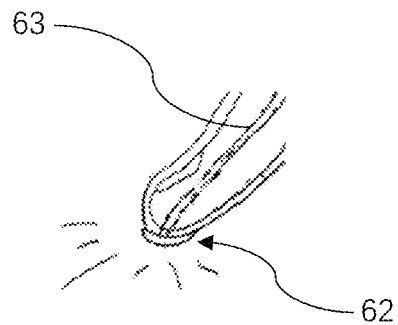
FIG. 23A is a schematic view illustrating the transparent soft gel lens for tactile support, with or without fiber optics and micro light source for operating the display screen, infrared camera, camera finger software detection in sign language, or tactile operations according to the above preferred embodiment of the present invention.

Referring to FIGS. 23 and 23A, a hand cover 60 such as a glove or a sleeve configured to be worn on a hand of a user is an optional gesture tool in relation to multitasking. The goal is to deliver a wearable for optimization for gesture decryption and utilization on a physical display screen 52 or on a virtual display screen 52V with performed gestures or imagining gestures as a form of sign-language gesture. The hand cover 60 comprises at least one or more multiplexed infrared light source 61 at a distance for verification of gestures with infrared camera, one or more transparent optic lenses support 62 such as tactile soft gel lenses provided at tips of the fingers respectively for comfort pressure support from continuous inputting, and a plurality of elongated fiber optic element 63 extended between the at least one light source 61 such as infrared light source and the transparent optic soft gel lens support 62. The transparent optic soft gel lens support 62 magnifies the infrared intensity distribution with the micro light element 67 from the light source 61 and also transmitted through the fiber optic elements 63. It is important to mention that the light source 61 has different adaptations for the fiber optic element 63 and the micro light element 67, with the fiber optic element 63, the light is emitted by the light sources 61, and with the micro light element 67, the light source 61 is the electrical control to deliver energy to the micro light element 67. Alternatively, the hand cover 60 is equipped with a micro light element 67, with or without the fiber optic elements 63, wherein the micro light element 67 can deliver thermal energy directly and indirectly to the user and to the infrared camera on any electronic device 50. It is worth mentioning that both the fiber optic element 63 and the micro light element 67 can work together or separately and both provide transillumination of the fingers (infrared emissions) for the infrared camera. The hand cover 60 may further comprise one or more electrodes (EMG) sensors 66, distributed proximal to the wrist and the forearm, wirelessly or when wired acquiring the powered from the power source 65, which is configured in such a manner that the electronic device 50 receives the information together or independently in relation to the electrode (EMG) sensors 66 (signal acquisition) and the infrared lighting camera decryption. Additionally, the electrode (EMG) sensors 66 are able to be relocated throughout the body part with or without adhesive made of hypoallergenic material.

It is worth mentioning that the power source 65 can power directly or indirectly the light source 61, the fiber optic elements 63, the micro light element 67, and the electromagnetic sensor 64. Alternatively, the light source 61 or the power source 65 can provide the user the customized options for the type of inputting for the glove or sleeve. Additionally, all the wire connections may directly connect to the power source 65 or the light source 61, or may be a combination between the light source 61 and the power source 65. Furthermore, the light source 61 or the power source 65 may be equipped with the manual or automatic amplifier to deliver the signal acquisition from the electrode (EMG) sensor 66. It is possible if the electro (EMG) sensor 66 is wireless, the power source 65 and the amplifier are build-in the electro (EMG) sensor 66.

The inputting system of the electromagnetic sensor 64 provides real time finger and hand tracking, especially for time sensitive gestures in sign language base decryption or in touch point controls, including (BCI) systems for the performed gesture that require X, Y, and Z coordinates for the orientation of the yaw, pitch, and roll. According to the preferred embodiment of the present invention, the AC electromagnetic sensors 64 as a solid-state for measuring both the position and the orientation natively. The electromagnetic sensors 64 have various shapes and various electromagnetic waves distinguishably programed for each phalanges including the hand. The electromagnetic sensors 64 can work adjacent with fiber optics elements 63 because the fiber optic elements 63 are immune and impervious to electromagnetic sensors 64 waves. With the fiber optic elements 63 and the electromagnetic sensor 64, the combination of the fiber optic elements 63 provides the user infrared multiplexed light source, allowing the infrared base control system to identify the gestures at a significant distance without the performed gesture getting lost within the environment distribution of the thermal radiation from the background of the ambient temperature. The electromagnetic sensors 64 provide the gestures the X, Y, and Z orientation to further enhance the gesture recognition with or without the transparent optic soft gel lens 62 transillumination magnification connection at the tips of the fingers. It is worth mentioning that the one or more transparent optic soft gel lenses 62 of said glove or sleeve 60 are capable of activating the touch screen 52 in the electronic device 50 for gesture operations and recognition by the module of analyzable factors 26 and by the artificial Intelligence module 25 for operating said AR/VR/XR/MR visual display screen 52V including the display screen 52 of any electronic device 50.

Figure 24:
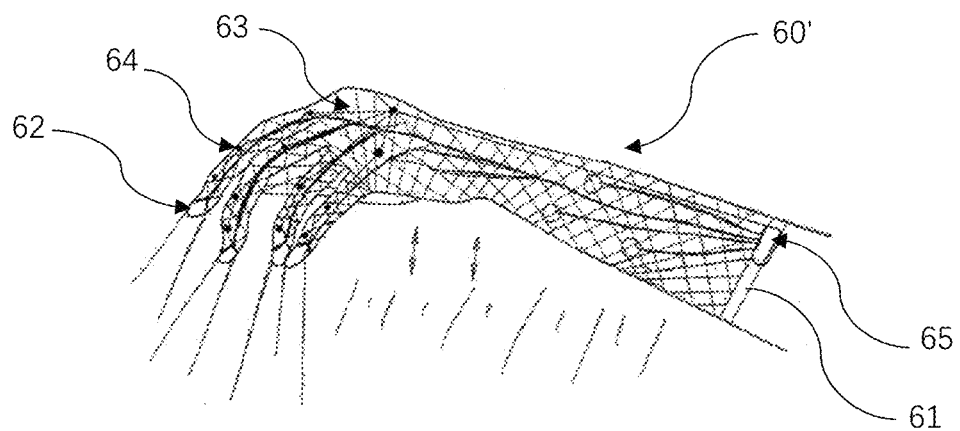
FIG. 24 is a schematic view illustrating the transparent mesh material for the glove or the sleeve where the mesh supports the various inputting systems according to the above preferred embodiment of the present invention.

Alternatively, referring to FIG. 24, the fiber optic elements 63 can be positioned above or below a flexible mesh type hand cover 60' that is a branching intertwine elongated structure running along the user hand or arm as a glove or a sleeve, wherein the fiber optic elements 63 are extended within, above or below as flat, circular, square or any other shape with a continuous interconnected tubular structure, originating above the wrist or the sleeve, with or without the electrode (EMG) sensor 64 and power source 65 wirelessly or wirely. It is worth mentioning that, alternatively, the distribution of the fiber optic elements 63 is transparent within the web like structure beneath or above a porous medium as a glove or as a sleeve. In addition, the fiber optic elements 63 is excellent in light (wavelength) transmission which is customizable and able to be distributed with any joint flexion. The hand cover 60 can be made of any flexible medium material, such as hypoallergenic flexible rubber, nylon, polymer, silk, and etc., while mesh of various sizes and thickness or of one size with stretching capacity for fitting all sizes. It is worth mentioning that the hand cover 60 provides the support over the electrode (EMG) sensors 66 for the proper (skin contact) to acquire the signal acquisition needed by the Brian Computer Interface (BCI).

Figure 25:
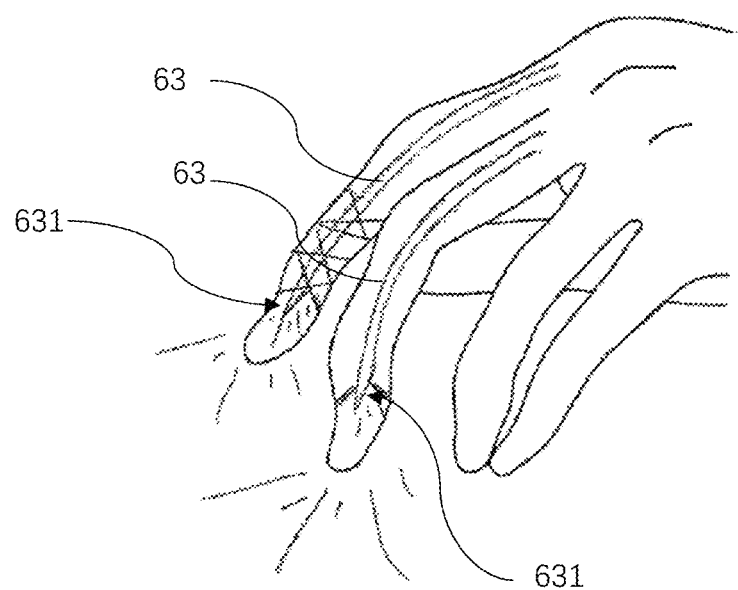
FIG. 25 is a schematic view illustrating the positioning of the light source and the fiber optic in relation to the finger and the mesh used to produce the glove or sleeve for various inputting systems according to the above preferred embodiment of the present invention.
Figure 25A:
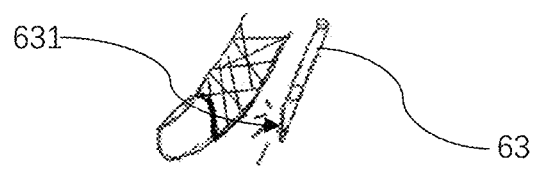
FIG. 25A is a schematic view illustrating the light source and fiber optic over the mesh material or under the mesh material on the proximal tip of the finger, with or without the soft gel transparent lens on the distal tip of the finger, according to the above preferred embodiment of the present invention.

Referring to FIGS. 25 and 25A, Whether the fiber optic glove or the fiber optic sleeve are used as the hand cover 60, all the branching of the fiber optic elements 63 and positioning for the micro light element 67 are preferred to be congregated at the ends near the finger tips of the user's hand with or without the optic lens 62, wherein an end of each of the fiber optic elements 63 is cut with an angle to form an inclined light emitting end 631 so as to further increase a surface area of the light emitting end 631 of the optic fiber element 63 while in contact with the user skin for the magnification of a humans hand as an infrared light source. Additionally, the micro light element 67 can be positioned to have contact with the skin directly or indirectly. Also, the micro light element 67 may be connected with an extension of the fiber optic element 63, wherein the fiber optic element 63 makes contact with the skin, as illustrated in FIG. 25A. This is in contrast to FIG. 23A that both the fiber optic element 63 and the micro light element 67 are connected to the transparent optic soft gel lens 62.

It is worth mentioning that the fiber optic elements 63 of the present invention are utilized to transmit infrared light, wherein the fiber optic elements 63 are not limited to one light wavelength or type or material, etc. The fiber optic elements 63 are capable of working for transmitting light with various wavelengths such as UV light, visible wavelength blue, green, red light and infrared light onto the skin. The brightness of the fiber optic element 63 can be customized and the type of wavelength can be controlled to transmit light with one or more wavelengths at the same time on the same display medium. In other words, infrared light is not the only type of light source for decryption in a sign-language base gesture. Furthermore, the optic lens 62 positioned at the tip of the finger can be made of a soft gel optic material as a physical barrier for tactile finger tip comfort during typing. Alternatively, the fiber optic elements 63 and micro light element 67 extended through the glove or the sleeve medium originating from to the wrist/forearm and terminated at the finger tip or at the transparent optic soft gel lens 62 adjacent to the distal phalanx fat region hyponychium (finger pulp).

Also, the glove/sleeve type hand cover 60 equipped with fiber optic elements 63 and the electrode (EMG) sensor 64 64 to form a glove/sleeve fiber optic system that allows the user to operate gestures at a further distance in relation to the infrared camera and/or the IA-HG (TFA) system, wherein the ambient temperature may distort the human natural infrared delivery of gesture commands on any infrared base system. As mentioned above, such glove/sleeve fiber optic system can deliver more direct infrared light to any infrared operational system while it is not limited to one type of fiber optic, for example Clearcurve and Durafiber nylon fibers, and etc.

Regarding the computing capacity processing from the electronic device 50, the BIC processing system, the infrared camera processing system, and the AR/MR/XR/VR processing system, the hand finger software detection program and any other software operations are preferably processed through the electronic device 50, received by the electronic device 50, delivered by the electronic device 50 to the cloud server 100 through the internet, attached to the electronic device 50, interfaced with the electronic device 50, and displayed on the display screen 52 while being controlled by the performed or imagining gestures. Furthermore, the user may select the control system with one or more signal acquisitions, such the EEG, EMG or ECoG for the Brain Computer Interface system. In other words, the user can perform or imagine a gesture from any of the signal acquisition, even though the user may be connected to more than one different signal acquisition electrodes while utilizing the Brain Computer Interface and operating the AR/MR/VR/XR headset or the display screen 52 of the electronic device 50. The user can also select a specific program with any type of signal acquisition to operate with the BCI system. For example, the user can select to only operate the Mix Reality (MR) through the EEG sensor signal acquisition on the headset with the Brain Computer Interface. The same is true for the ECoG wherein the user produces a gesture to turn off the EEG for the Brain Computer Interface control system, and turn on the ECoG sensory signal acquisition for the Brain Computer Interface control system in the Virtual Reality (VR) headset to operate selected programs. The same is true for the EMG wherein the user produces a gesture to turn off the EEG and/or the ECoG control system in the headset, wherein the Brain Computer Interface with the EMG signal acquisition control system is turned on and the Brain Computer Interface with the EEG and or ECoG is not operated for the Augmented Reality (AR) programs. It is worth further mentioning that, in this example, neither signal acquisition from the EMG, EEG or ECoG interferes with each other to operate in a Brain Computer Interface system. Furthermore, either the EMG, EEG or ECoG signal acquisition will require one Brain Computer Interface system for each different sign acquisition. It is understood that none of the Brain Computer Interface computing system is required to be physical present as attachable or detachable hardware for the processing of the close loop function between the AR/VR/MR/XR apparatus and the any other electronic device 50. Once the signal acquisition is acquired by the electronic device 50, the electronic device 50 can send the signal acquisition to the cloud where the Brain Computer Interface servers in the cloud returning a digital signal to the electronic device 50 that sends the signal acquisition or generates a response in the AR/VR/MR/XR apparatus and interfaced with the electronic device 50. The electronic device 50 can receive the signal acquisition from the EMG, EEG and/or ECoG electrodes wirely or wirelessly. The electronic device 50 can also process one or more selected signal acquisitions with a built-in (BCI) software or through an attachable Brain Computer Interface system, or neither thereby the electronic device sends the signal acquisition to the cloud server 100 where one or more signal acquisitions are processed back to the electronic device 50 or to the AR/VR/MR/XR apparatus to generate a response in a close loop operational control system.

The electronic device 50, such as tablet, laptop or computer, can be the computing source for the AR/VR/MR/XR apparatus that receives the initial digital sample after the signal has been amplified and past through a low-pass fielder. The electronic device 50 may then activate the built-in (BCI) software application or a download permissible version of the (BCI) software program. Alternatively, the electronic device 50 may also deliver the information to the cloud (BCI) server 100 through internet for the computing and to generate a response in the electronic device 50, the AR/VR/MR/XR apparatus, or in the display screen 52. The electronic device 50, such as tablet, laptop or computer, may have all the software capacities for each type of the Brain Computer Interface so as to reduce the EEG/ECoG and EMG weight requirements for operating the Brain Computer Interface. The wearable AR,VR,MR,XR apparatus may only consist of the power source, a differential amplifier and the transmission source therein, providing the least weight capacity. An independent device may be attached or built in the tablet, laptop or computer type electronic device 50 that can provide the digital information such as a USB. Furthermore, the electronic device 50 may or may not further amplify the signal and/or pass the signal through a low-pass filter for the process of converting the signal into digital samples. The same is true for the wearable EMG signal acquisition within the gloves or sleeves with the power source, the differential amplifier and the transmission source to deliver the signal to a separate device attached or built in to the electronic device 50 such as tablet, laptop, computer, or to deliver via a portable USB to further amplify the signal where the signals are passed through a low-pass filter (aliasing) for the processes of converting the signal into digital samples. In the last step of converting the signal to a digital sample, the signal acquisition can be delivered to a separate attachable or remote device for converting the signal to a digital sample as the means for reducing the weight capacity on the total wearable sensor equipment in the EEG, ECoG, or EMG system in relation to BCI interoperability wearables.

Further, the display screen 52 of any electronic device 50 can interface for delivering the most interchangeable, interoperable and wearable biometrics systems to control any digital program. Through the interface between the electronic device 50, the display screen 52 and the AR/VR/MR/XR headset system. The system of the present invention may operate more than one signal acquisition at the same time, wherein the user may have the EEG, ECoG and EMG electrodes at the same time with the least weight capacity because the user will only have the electrodes, the differential amplifier, the transceiver, and the power supply as wearable electrodes for signal acquisition. All the other computing processes for the BCI will come from the electronic device 50, an attachable BCI, online or cloud base servers. The infrared technology, with the infrared camera on the electronic device 50 for processing and decryption of gestures, with or without tactile touch points 521 on the display screen 52, is an innovative form of operating two controlling programs with the least amount of wearable equipment.

In addition, the infrared programing with or without the hand cover 60 does not interfere with any of the signal acquisition required by the Brain Computer Interface inputting system, the electromagnetic sensor inputting system and/or the fiber optic light source inputting system. In other words, the user can have multiple control systems at the same time with the least weight capacity for operating one or more programs at the same time in the electronic device 50, with or without the touch points 521 on the display screen 52 and the computing processors. Furthermore, the sideline element 31 can be displayed on the projecting virtual display screen 52V of the AR/VR/MR/XR apparatus, providing additional more organization and arrangement for multiple displays contents 212 for multitasking in 2-Dimension, in 3-Dimension or in 4-Dimension at the same time or in a timely manner. In other words, the sideline element 31 separates 2-Dimension programs from other 2-dimension programs and/or from 3-Dimension programs, and etc.

In view of above, the present invention provides a systematic interface organization for multiple control options with or without touch points 521 on the physical display screen 52 or in a non-physical virtual display medium with or without the sideline element 31 to alternate back-and-forth between display contents 212 without having to interchange control inputting systems equipment, during the process of operations of the electronic devices 50. Every inputting device can be operated together at the same time or in a timely manner and the user can stop any inputting device during the operations of the BCI system, the fiber optic system, the infrared system, and the electromagnetic sensor system.

The electromagnetic sensor inputting system provides real time finger and hand tracking, especially for time sensitive gestures in sign language base decryption or in base controls of the touch point 521, including (BCI) systems for the performed gesture that required X, Y, and Z coordinates for the orientation of the yaw, pitch, and roll. According to the present invention, AC solid-state type electromagnetic sensors 64 are utilized for measuring both the position and the orientation natively. This is an additional inputting system for gestures that doesn't requires to correct data due to drift. The electromagnetic sensors 64 having various shapes and with various electromagnetic waves distinguishably programed for each phalanges including the hand(s). The wave type electromagnetic sensors 64 can work adjacent with fiber optics because fiber optics are immune and impervious to electromagnetic waves. In a combination of the fiber optic 63 and electromagnetic sensor 64, the fiber optic 63 provides the user infrared multiplexed light source intensity for allowing the infrared base control system to identify the gestures at a significant distance without the performed gesture getting lost within the environment distribution of the thermal radiation from the background of the ambient temperature, and at the same time the electromagnetic sensors 64 provide the gestures the X, Y, and Z orientation to further enhance the gesture recognition with or without the soft gel lens connection at the tip of the fingers, and at the same time provide direct and indirect thermal heat to the user finger tips. It is worth mentioning that the plastic soft gel lens 62 of the glove or sleeve are capable of activating the one or more touch screens 52 in the electronic device 50 for gesture operations and recognition by the module of analyzable factors 26 and by the artificial Intelligence module 25 for operating said AR/VR/XR/MR visual display including the display screen 52 of any electronic device 50.

The order, position and arrangement of one or more inputting systems may work together with or without a glove or sleeve. Alternatively, all inputting systems can operate with one glove or with one sleeve, on either hand. The fiber optic element 63 and the micro light element 67 of the glove or sleeve can have various locations over the skin of the fingers and hands, including a first location distal from the distal interphalangeal (DIP) joint, a second location proximal from the distal interphalangeal (DIP) joint and a third location distal from the metacarpophalangeal (MCP) joint of each finger in relation to the human hand/finger anatomy. The fiber optics 63 equipped in the present invention are preferred to be flexible and produced as straight elongated structures providing the glove or sleeve a natural anatomical position for the finger joints. Therefore, the fiber optics 63 significantly assist with the extension of the finger joints as it delivers infrared red light from the light source 61. Another type inputting system, with or without a glove or sleeve, in or on the glove/sleeves, may be utilized including electromagnetic sensors located above the skin bellow each finger joint, including the metacarpophalangeal (MCP) joint. The electromagnetic sensor 64 can also be positioned over the skin in the posterior region of the metacarpal bones. The one or more electromagnetic sensors 64 are in use at the same time with the X, Y, and Z orientation dimensional space in relation to the performed gestures. The electromagnetic sensor 64 may be positioned adjacent and/or proximal to the fiber optic 63 along the finger and hand. Lastly, as shown in FIG. 23, the electrode (EMG) sensors 66 are positioned most proximal to the opening of the glove also the electrode (EMG) sensors 66 may be positioned proximal to the wrist along anywhere on the volar, dorsal, radial or ulnar surface area of the wrist or forearm as the means for placement and reposition of the electrode (EMG) sensors 66 for optimum location for EMG signal acquisition on a glove or sleeve.

It is worth mentioning that the fiber optic infrared system can work alone, with or with a glove or sleeve, the signal acquisition of the EMG electrodes 66 can also work alone with or without a glove or sleeve and the electromagnetic sensors 64 can also work alone with or without glove or sleeve independently with other inputting systems and without interference. The infrared light is adapted for operating the gestures without a glove or sleeve and utilizing the natural human hand as a powerless infrared light source for infrared base inputting systems. The fiber optics 3 with infrared light with a glove or with a sleeve enable the infrared base inputting systems to be operated when the user is at a distance or within extreme weather/climate. In other words, too hot where the hand gestures blend with the warm environment, or too cold where the gestures are not recognized because the cold environment has produce vassal constriction in the users hand/fingers. Thereby, both the hot and the cold environment severely reduce performance of the infrared base inputting systems. The EMG signal acquisition for utilization of performed gestures or imagining gestures is optimization. The electromagnetic sensors 64 are not interfering with the fiber optics 63 of the infrared base system and providing the X, Y, and Z orientation for gestures operation in the non-physical (stimulated or virtual) medium such as projecting display screen 52 or with the physical display screen 52. The material of the glove or sleeve is preferably a washable translucent thin pores mesh stocking like, elastic fibers or rubber material hypoallergenic with a second glove or sleeve cover for the cold weather. The inputting systems of the present invention can be operated together or independently with a glove or a sleeve on the display screen 52 and/or for operating the AR,VR,MR,XR apparatuses.

Furthermore, a haptic system can be incorporated into the above mentioned inputting systems. The haptic system alone is inheriting and limiting in relation to work-flow and, as the sensory components, further improving in the haptic system, it will become more limiting. For example, imagining a haptic sensory for a stabbing pain, the user will be overcome with that sensation of pain and that will render the user powerless unable to concentrate on anything else. The haptic system without interoperability for multitasking does not improve the user's physical environment for work, academically, professional, or in the labor force. The haptic sensory is more for specific moments, for the entertainment, and not for day to day work. The electronic device 50 with interoperability and multiple interface control systems will never lose their value, like the display screen 52 in the present invention with multiple control options for continuous work may surpass any future system with a single inputting system.

Furthermore, continuous repetitive actions prolong without tactile counter surface become a source of fatigue and may develop an injury. Tactile counter surface provides sensory, proprioception and sensory stimulation. Lack of sensory stimulation may lead to a reduction of endorphins that is not health for prolonged wellness. Haptic inventions without tactile counter pressure surface area are not suitable for prolong utilization, and contribution to the reduction of quality of life by decreasing ergonomics optimization.

Diminish sensory proprioception will decrease environmental sensory awareness and increase the possibilities for accidental injuries (slip and falls). According to the preferred embodiment of the present invention not one single type of inputting system will provide the complete operation product for prolong day to day work force, and that the system mimics the human body in relation to alternating different inputting systems to produce the desire physical activity. For example, the human body is masterful in activating different muscles for producing the similar physical task, naturally (muscle memory), subconsciously or consciously, the human body will activate multiple different muscle groups to perform the similar task in the event the user is injured, fatigue, or physical limitations. In the same way, the organization and arrangement for more than one inputting system to operate the electronic device 50 for prolong utilization in a robust, convenient, customizable and flexible approach to complete the desire task.

Figure 26:
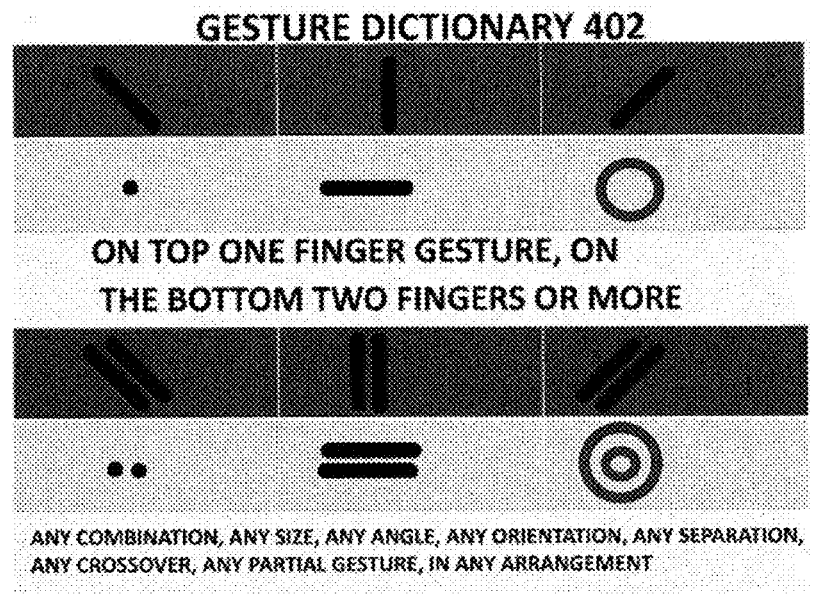
FIG. 26 is a chart diagram illustrating the method and various options the user has for creating gestures in the gesture dictionary, with one or more touch points (fingers), according to the above preferred embodiment of the present invention.

As shown in FIG. 26, various gestures type and variants available to the user in the gesture dictionary 402 is illustrated as example, wherein the user has various options for creating gestures in the gesture dictionary, with one or more touch points (fingers), where the fingers generate a traceable outline analyzed by the module of analyzable factors 26 for any combination, any size, any angle, any orientation, any separation, any crossover, any arrangement, any length, and any partial performance of the above mention touch point characteristics for any gesture. It is not limited to one hand, one control system or one display screen 52. The user may perform a gesture selected from the gesture dictionary 402 to interface with the interactive module 40 and pair-up with the multiple control programs available in the electronic devices 50 for controlling and operating on 2-Dimension, 3-Dimension or 4-dimension, such as the infrared base control programs like the signal acquisition base Brain Computer Interface programs or through the display screen 52. A touch point gesture is the gesture to be performed would produce one or more touch points 521. Certainly, the gesture can be any gesture combination, with any gesture separation, of any gesture size, any gesture angle, any gesture orientation, any gesture crossover, any gesture arrangement. The program of the gesture dictionary 402 provides a running list of all the programs paired with each specific gesture while the artificial intelligence module 25 informs the user of any repeated gestures for the electronic device, the Brain Computer Interface, and/or the infrared base control. For example, the user may have a gesture for the Home Screen or for displaying multiple programs from which he or she can select. According to the preferred embodiment of the present invention, a paired gesture can be provided for scaling the number of gesture variants for efficiency. Additionally, the BCI system along with the artificial intelligence module 25 are configured to learn the signals from the fiber optic system, the hand/finger gesture software detection program, from the electromagnetic sensor system for improvement recognition and from the gestures independently or in combination for operating on the one or more electronic devices 50.

Referring to FIGS. 27-30, most electronic devices 50 are incorporated with verbal control systems, wherein the audio is an existing option for engaging with the user. The user may also designate numbers, word and/or phrase when speaking to input verbal commands for selected programs. Pairing a touch point gesture with a verbal command program 404 is another form of two digital existing programs interoperability for controlling and operating the one or more electronic devices 50. When the selected gesture is paired with other programs in the verbal command program 404, the user can verbalize, perform, and/or imagine a gesture to generate the desire response, at the desire location. When the gesture is paired with the verbal command program 404, the gesture continues to be analyzed by the module of analyzable factors 26 and by the artificial intelligence module 25 for operating the gesture in the same process according to the present invention. The user's words may or may not be transmitted or be recorded, wherein the spoken words may operate independently or collectively with the performed or imagining gesture to produce a response. Furthermore, the ear pieces and/or headsets may also interface with the display screen 52 for the delivery of additional inputting information in the one or more electronic devices 50. The customization, arrangement and organization of gestures pairing with the verbal command program 404 are interchangeable. The verbal command program 404 may have different customizable touch point gestures to be paired with different voice command in the verbal command program 404, and may be performed like any of the verbal command program like "SIRI".

For example, as shown in FIG. 4A, when the user makes contact with the touch screen type display screen 52 to produce the one or more touch points 521 on the display screen 52, the display screen control module 20 acquires the information, the module of analyzable factors 26 and the artificial intelligence module 25 provide the information which is received in the adjuster module 10, the interactive module 40 and the sideline module 30, wherein the gesture is recognized by the artificial intelligence module 25 as a voice dependent gesture and the one or more touch points 521 produced by the gesture are localized and require the verbal command program 404 to generate a final response. For example, the user speaks out the word "adjuster" or a number, the verbal command is recognized by the artificial intelligence module 25 and the information is provided to the server processor 101 and/or the processor 51 in the electronic device 50. Thereby, the verbal response is generated accordingly to the verbal command of the adjuster 13 at the location of the touch point 521. It is worth mentioning that the same process or similar process can be accomplished for other programs for operation of the sideline element 31 and the numeric indicator 16, the keyboard element program 43, the state-of program 48, and etc. The electronic device 52 may also have voice recording or voice command programs like "Siri", wherein the user can make the command for "adjuster" and the programs response operability to the user's voice command in relation to the touch point 52 at the location on the display screen 52 for any program.

Figure 27:
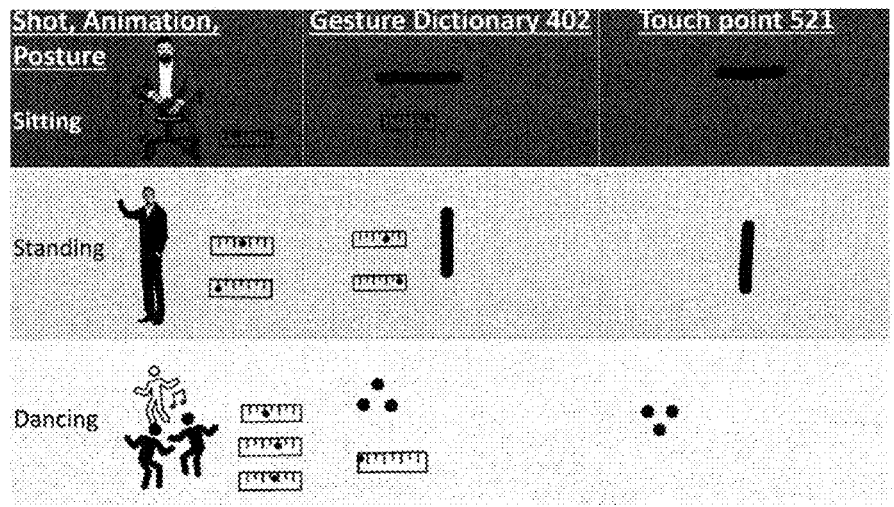
FIG. 27 is a chart diagram illustrating an animation posture list program according to the above preferred embodiment of the present invention.

FIG. 27 illustrates an animation posture list program, wherein the first vertical column shows the selected shots, frame, clip, or skit, (animation posture) and the middle column shows the selected gestures from the gesture dictionary, while both columns contain adjuster interface 21 for customization. In the last column, the user performs the paired gesture and is recorded and learned by the artificial intelligence module 25. It is important to mention that the columns are separated by the sideline element and/or a window program for the selected program function, as illustrated on FIGS. 27-30.

Figure 28:
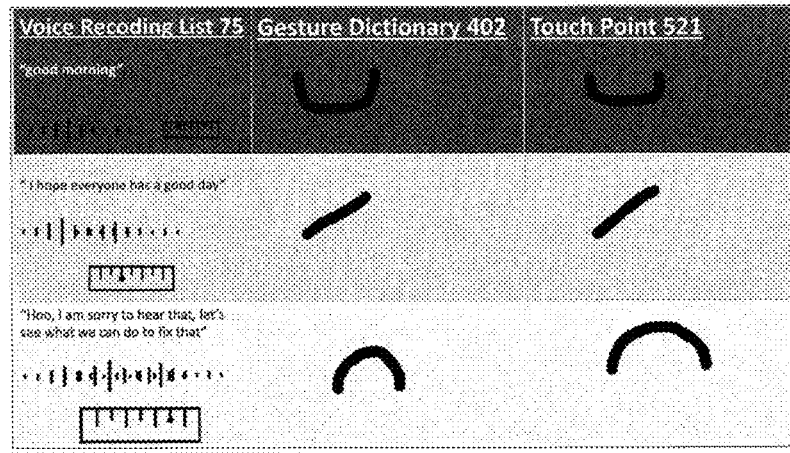
FIG. 28 is a chart diagram illustrating a voice recording list program according to the above preferred embodiment of the present invention.

FIG. 28 illustrates a voice recording list program, wherein the first vertical column shows the selected word, sentence or phrase (voice recording), the middle column shows the selected gestures from the gesture dictionary both columns contained adjuster interface for customization, and the last column shows the user performs the paired gesture and is recorded and learned by the artificial intelligence module 25.

Figure 29:
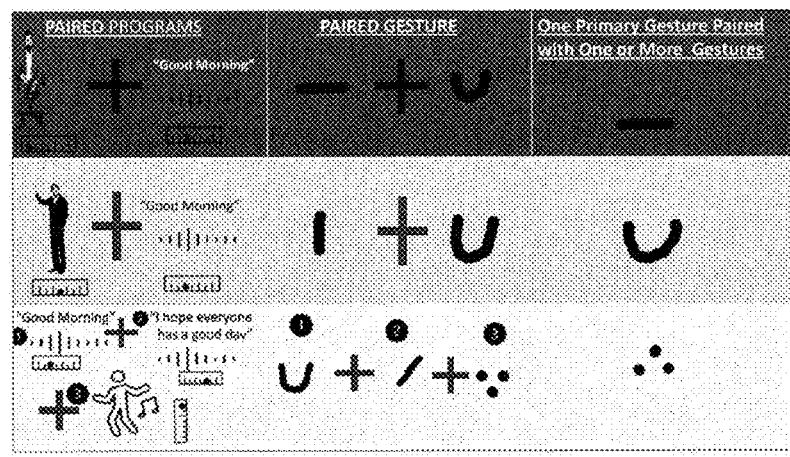
FIG. 29 is a chart diagram illustrating a paired program list according to the above preferred embodiment of the present invention.

FIG. 29 illustrates a paired program list where the first vertical column shows the selected shots, frame, clip, or skit, (animation posture) and the word, sentence or phrase (voice recording) and the middle column shows the two or more selected gestures from the gesture dictionary for their corresponding function, while both columns contained adjuster interface for customization. In the last column, the user performs the primary gesture and is recorded and learned by the artificial intelligence module 25.

Figure 30:
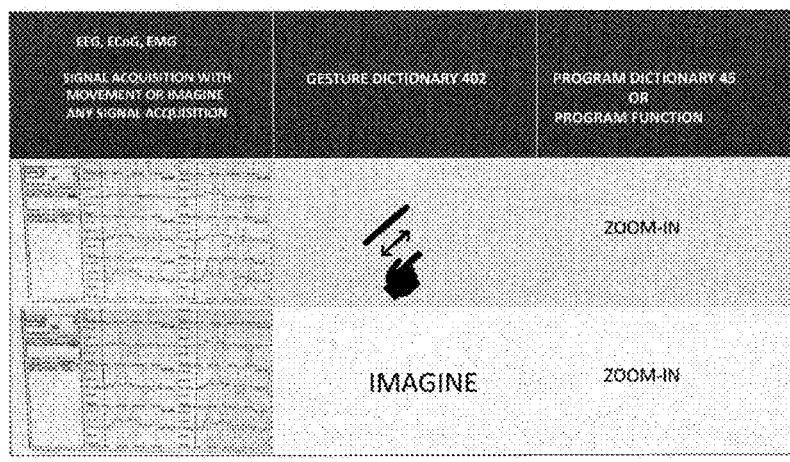
FIG. 30 is a chart diagram illustrating inputting options for gesture pairing with their corresponding sign acquisition when performed or imagined to generate a selected response according to the above preferred embodiment of the present invention.

FIG. 30 illustrates inputting options for gesture pairing with their corresponding sign acquisition when performed or imagined to generate a selected response. The first column represents the signal acquisition the type (EMG, EEG, EcoG). The second column is the signal acquisition paired with the performed gesture or an imagine gesture. The third column is the type of program from the program dictionary, paired with the selected performed or imagining gesture. Notice a program function can have performed and/or an imagining gestures at the same time with the same signal acquisition to produce the same program or program function, this is an example of a robust security system for that program or program function.

Referring to FIG. 27, an animation posture list 76 is illustrated, wherein the user can also pair a performed or imagining gesture with other verbal command programs for controlling an animation posture or animation functions from the animation posture list 76. In other words, when the selected verbal command, the performed gesture or the imagining gesture are paired with a program in the animation posture list 76, the user through the vocalization, imagining or performed gesture generates the selected customized animation, shot, frame, clip or skit on one or more display screens 52, wherein the artificial intelligence module 25 recognizes the verbal commands, the performed gesture or the imagining gesture in on one or more display screens 52, on one or more display projection mediums, in any electronic device 50.

Referring to FIG. 28 a voice recording list 75 is illustrated, wherein the operators' words are pre-recorded to become audible when a specific gesture is performed. In other words when a gesture is paired with a pre-recorded word, phrase, sentence, statement or story, the pre-recording becomes audible to any party selected for communicating. Also, a performed or imagining gesture may deliver during voice recording during, before or after, any operating program, wherein the recorded words may also be overwritten by the operator through the use of the performed or imagining gesture, like when using a (walkie talkie). In other words, the operator performs the gesture to speak, as a speaker control, like the handheld walkie-talkie. When the selected gesture is performed by the user and the user's voice is transmitted to other individuals, avatars, surrogates, in 4-dimension, in 3-dimension or in 2-dimension of the electronic device 50 in real time or in a timely manner.

Referring to FIG. 29, the paring gesture program 78 is illustrated, wherein individual gestures are arranged in a left to right order with or without verbalization from the verbal commands program 404. The arrangement of two or more performed or imagining gestures are organize, like morse code in a telegram, wherein different customizable performed or imagining gestures are joined with multiple other different gestures, wherein the gestures are performed or imagined and the responses of each gesture are generated in the chronological order left to right according to the order of the gestures, wherein the gestures may come from the animation posture list 76 and/or from the voice recording list 75. In the paring gesture program 78, the user is provided with the tools to join one or more touch point gestures from the program of the animation posture list 76 from the voice recording list 75. It is worth mentioning that the gestures from the voice recording list 75 and the gestures from the animation posture list 76 have been pre-programed and paired with a program corresponding the program function for each individual program, before any of the selected gestures can be joined in the pairing gesture program 78. Furthermore, in the pairing gesture program 78, gestures from the animation posture list 76 and from the voice recording list 75 can be rearranged, interchangeable, added or removed. In other words, the gestures are customized to deliver the desire animation from the animation posture list 76 with or without verbalization from the voice recording list 75, in a pre-selected order, as illustrated in FIG. 29. It is important to mention that the goal of the paring gesture program 78 is to reduce demanding physical activities. Therefore, the user does not need to performing or imaging every gesture from the voice recording list 75 or from the animation posture list 76, in the order most desire. Once the two or more gestures are organized in the sequence preselected, the user can designate a gesture as the primary gesture. When the user performs or imagines the primary gesture, the entire chain of gestures from the voice recording list 75 or from the animation posture list 76 are generated according to the pre-selected order in the paring gesture program 78, thereby creating a customized animation, shot, frame, clip or skit with verbalization or without verbalization or vice versa.

FIGS. 27-29 illustrate various gestures pairing with designated functions/programs, wherein the voice recording list 75 is for the pre-recording of various audio, text and or emojis with various lengths, interchangeability, customization from the gesture dictionary 402. The animation posture list 76 is for the pairing of one shot, frame or animation program with one or more gestures from the gesture dictionary 402. The pairing of gestures with selected functions takes place in a pairing gesture program, wherein two or more gestures can have more than one function/program organizations. The adjuster 13 with the adjuster interface 21 provide the timing, volume, brightness and all the scalable controls for the editing function/programs in the final display, and etc., wherein the gesture responses are generated at the same time or in a timely manner, in the order the user produces two or more gestures for the selected function/program paired with the order of the selected gesture in the pairing gesture program.

Further, one or more gestures can be designated as a primary gesture even if the gestures are incorporated within the program of the voice recording list 75 or the program of the animation posture list 76 in any particular order within the pairing gesture program 78. The one or more paired gestures can be selected as the primary gesture to eliminate the task of producing multiple gestures and to eliminate having to remember the sequence of gestures for a created customized animation, shot, frame, clip or skit with verbalization or without verbalization or vice versa. Also, the primary gesture can be a verbalize, number, symbol or another gesture not replicated. The module of analyzable factors 26 and the artificial intelligence module 25 can safeguard the user from duplicated gestures and notify the user of replications. For example, a half circular/parabola 2-Dimensional (U shape) gesture is produced on the display screen 52 and the program of the voice recording list 75 recognizes the gesture. For, example, a U-shape gesture is paired with the voice recording list 75 to transmit "good morning" and/or text "good morning", as a preprogram voice recording or text greeting. In an alternative example, a long body shot or frame is displayed on the display screen 52 when the user produces a vertical gesture where an animation posture list recognizes the gesture. FIG. 29 illustrates the pairing of two or more gestures taking place as an example while FIG. 28 illustrates the voice recording list and FIG. 27 illustrates the animation posture list. The user may select one or more gestures from the voice recording list 75 and/or from the animation posture list 76. Then, the user arranges the gestures in a desired order to display the functions/programs accordingly to the order selected with the gestures. The gestures in the gestures dictionary 402 can be edited in both the animation posture list 76 and the voice recording list 75 as shown in FIG. 28 and in the voice recording list 75 as shown in FIG. 27 with the adjuster 13 for selected additional functions to create the final display with audio and animation.

An alternative example for pairing the gestures is that the user must first open the page to the pairing gesture program 78 where past gesture combinations are provided with their corresponding programs and are provided for reference and for editing the frame, audio, shot or animation. The user may also open-up multiple programs, like the program of the voice recording list 75 or the program of the animation posture list 76 through the sideline element 31, at the same time or in an orderly manner divided by the sideline element 31. Where each gesture is paired with a specific function according to each program in the program of the animation posture list 76 or in the program of the voice recording list 75. Then after the user completes the selection for the desire program function the user selects the gestures to use from the voice recording list 75 and/or the animation posture list 76, the desired functions may be reviewed and edited with the adjuster 13 for every animation and audio, timing speed, volume, and etc. The final display program contains the expression and verbal tones to display in the 2-Dimensions, 3-Dimension and 4-Dimensional digital environment, wherein the full displays are reflections of the user's own expression and style of greeting, or any other customized animation or action frame as desired, as illustrated in FIG. 29. The electronic device 50 can be independently operated or utilize in-combination with other programs, for example the verbal commands programs 404, motion controls and/or neurological electrical impulses with the Brain Computer Interface (BDI), hand/finger gesture software detection program or any other non-interfering inputting system, in a scalable manner, etc.

The customized shot, clip, frame and or animation may also be paired with selected gesture. The vocal auditory function for the user to select specific pre-recorded verbal phrase, line, statements, linguistics, such as "good morning", "I hope everyone has a good day", or "welcome everyone and good morning" preset in the gesture shot, clip, scrip and digital video system program are paired with each individual gesture designation. Furthermore, one primary gesture can be designated as the primary gesture and the programming will provide vocal auditory function for the user to select specific pre-recorded verbal phrase, line, statements, linguistics, such as "good morning", "I hope everyone has a good day", or "welcome everyone and good morning", and etc., wherein both the voice recording list 75 and the posture animation list are scalable.

Furthermore, the same type of gesture pairing can be applied to text communication, wherein preselected text phrases or words are paired with one or more gestures to be transmitted to other individuals, avatars, surrogates, in 4-dimension, 3-dimension or 2-dimension electronic device 50 when the user performs the desire gesture for the desired wording. Additionally, vocalized words can be converted into a text format and transmitted to other individuals, avatars, surrogates, in 4-dimension, 3-dimension or 2-dimension electronic device 50.

Referring to FIG. 28, an example of portion of the gesture dictionary is illustrated, wherein the operating gestures can be predesignated from the gesture dictionary 402 of the system such that the gestures are recognized by the artificial intelligence module 25 and the information is sent to the interactive module 40, wherein the interactive module 40 displays the pairing gesture program and all its functions. In addition, each operating gesture can be predesignated to any customized gesture within the system and/or customizable by the owner of the electronic device 50, so as to facilitate the operation and control of the one or more digital programs. The prerecording, editing, interruption and cutting of a 2-Dimensional, 3-Dimensions and or 4-Dimensions digital display with or without verbal response provide the user with the control over the visual and audio elements for a customizing a shot, frame, and or audio. Gestures provided the users an innovative way to interact within the system and/or any electronic device 50, as the means to operate within the digital simulation environment.

An arrangement of operating gestures is provided for controlling the moments and verbal functions of simulated characters, without the user doing the body movements, or saying the verbal functions. In other words, the gestures are controlling the display and the audio. Gestures provide the user the ability to increase productivity, endurance, to reduce physical demand, and vocal demands on the operator. For example, corporations may train their customers and employees to operate gestures when communicating in virtual reality (VR). Therefore, the consumers will get the same visual experience and the same auditory experience with a live customer employee in virtual reality (VR), wherein the employee dose not need to vocalize most of the words in the communication nor does he or she need to perform all the displayed body postures or body language during the communication.

In the digital environment both engaging display and the response display are important for the complete communication. For example, when a user is greeting someone, the user can select and perform a pre-recorded digital posture shot for greeting someone in the digital environment or someone else in another digital program in one or more electronic devices 50, wherein the greeting shot is composed of a digital program action animation, from start to finish with or without audio elements. This will constitute an engaging display. Alternatively, a pre-recorded digital response program may also be intertwined with digital posture response with or without audio element in the shot used for secondary responses. For example, "Thank you for asking" or "I am great can you please help me" represents a response display. Now, considering in both the engaging display or in the response display, the user can select the framing for the action with a long shot, a medium shot, a close-up shot, or an extreme close-up shot through the gesture, the adjuster interface 21, the adjuster 13, or a verbal command program.

It should be noted that 2-Dimensions, 3-Dimensions, and 4-Dimensional motions and movements can be controlled with 2-Dimensional gesture interface controls, wherein the user can have various selections of body movement, facial expression, and audio including accent, tone and articulation, with visual display. Considering a user will have the option and capacity to interact in a simulated digital environment with the least effort, through the 2-Dimensional display screen 52 with the operation with one or more touch points 521, the user can select a gestures and perform a combination of gestures with a complete pattern of sequential gesture with the adjuster interface 21 to interact with other characters, avatars, emojis, and more important to control personalized avatar, surrogate, characters, emoji, and any like digital animation. FIGS. 26 to 28 illustrate the same process of pairing gesture as with programs, wherein the user can have scalable cut and paste animation shots, clips, and or audio list for controlling any programs like, avatar and or surrogate programs and or functions. Furthermore, the gestures, for any programs, are interchangeable.

The gesture with the adjuster 13 will provide the users the frame and the angels of the frame the digital visual display and responding display as they are intended to be seen and heard by others. The gesture generates the frame selected while the adjuster 13 and the adjuster interface 21 control the frame angle. For example, eye level angle (more personal equal) to other avatar or surrogate eye level with others digital displays, high angle to show smaller from the other avatar or surrogate as a sign of (weakness), and low angle to show over other avatar or surrogate as a sing of (strength from above). In conjunction, the gestures will provide high key lighting (open effect) or low key lighting (suspicion effect). Preferably, all the optional programs and function mentioned may be generated by a gesture and/or a verbal common that can link with an adjuster interface 21 through the adjuster 13, wherein the user can control any type of frame like, a long shot, a medium shot, a close-up shot, and etc, or the level of the angle of the frame eye level angle, high angle or low angle, including the degree of lighting from low key lighting to high key lighting and any degree in between, with verbal commands.

For example, when a user is attending a virtual reality (VR) shop, simulated interactive programs are recorded through the usage of wearables sensory devices and the user is able to produce various facial and body language interaction in the simulated environment, wherein the recordings are sale to the user and the user can cut and paste them onto his or her personal electronic device 50. For example, the hand posture, the body language, the dancing style, the clothings and the facial expressions are interchangeable while the programs provide vocal verbal function for the user to select a specific pre-recorded audio, such as "good morning", "I hope everyone has a good day", "welcome everyone and good morning", or etc. The selected gesture is paired with the shots, frame and/or animation in the posture animation list, and that gesture is paired with another gesture from the voice recording list 75, to give the animation frame audio. Therefore, the user pairs two or more gestures based on the function while the gestures are paired with in relation to the function the gestures are paired with.

FIGS. 27-28 illustrate the gesture pairing, the (U/parabola) shape gesture corresponding with the "good morning" recording in the voice recording list 75. Additionally, the horizontal shape gesture is paired with the sitting posture/animation in the animation posture list. The user may pair two or more gestures together in a customizable order with a selected arrangement in the pairing gestures program, as shown in FIG. 28. Furthermore, the adjuster 13 and the adjuster interface 21 provide the user the tools to edit the animation speed, timing, audio, and etc. The user may also control other digital function at the same time by vocalizing the command through the verbal command program 404.

FIGS. 21A to 29 illustrate the complexity of touch point gestures, verbal command, EMG, BCI, head motion controls, and retinal control system working together or independently. Furthermore, the sideline module 30 is configured to be operable with the operation systems of Windows and Apple for separating programs and program functions, such as providing the sideline element 31 for dividing two or more programs and providing organization and arrangement with all kinds of inputting controls. For example, at any location where the user touches the display screen 52, the display screen controller module 20 (the second executive portion 2) receives the information the touch point 521 is analyzed by the module analyzable factors 26 and the artificial intelligence module 25. Then, the information is sent to the processor 51 and the communication module 55 is configured to send the information to the first, to the third, and to the fourth executive portions 1, 3, 4, wherein the gesture is recognized by the interactive module 40 as a paired verbal command program and the touch point 521 is recognized by the third executive portion 5 which is activated for generating the sideline element 31. Alternatively, once the user says "sideline" the adjuster module 10 is activated to display a sideline element 31 while the gesture has been paired with the verbal command program 404. Furthermore, other multiple inputting control programs can be paired the same way. In one example, a motion head control program can be paired with a gesture. In another example, the user may produce a gesture for the sideline element 31 and the user may rotatably move a head of the sideline element 31 to a desired location so as for relocating of the sideline element 31 with or without the adjuster 13. In addition, the verbal command programs 404 can be configured to control the directions or locations of the sideline element 31 or any other program.

For example, the user may produce the touch point gesture for the posture display of the avatar or surrogate and then the user speaks a verbal command, such as "eye level", selected from the gesture dictionary 402 to activate the verbal command program 404. Accordingly, the electronic device 50 generates an eye level digital display among other avatar and or surrogates in the electronic device 50. Alternatively, the control of the frame can also be operated in relation to the location of the headset 50", wherein the headset angle is leaning forward or backward. The furthermost forward lean with the headset 50" generates the extreme close-up and the furthermost backward lean with the headset 50" generates the long shot, wherein multiple interchangeable gestures are paired and operated with other independent or codependent programs like the verbal commands programs 404 for independently turning on the volume of the contents on the display screen 52 or in combination with where the user wants to display a close shot on the display screen 52. In other words, the verbal commands programs 404 and other programs can oscillate with the user's gesture requests and verbal requests in real time.

Alternatively, referencing FIGS. 21A and 21B, all the optional programs and functions can be generated by a gesture, a verbal comment and a headset 50" with a motion controller, where the user may produce a gesture or a verbal command for the visual display shot, frame, clip, or animation of an avatar or surrogate. The user can control any type of frame, such as a long shot, a medium shot, a close-up shot, an extreme close up, and etc., or the level of the angle of the frame eye level angle, high angle or low angle, including the degree of lighting from low key lighting to the high key lighting and any degree in between. When the user gets closer to the display screen 52 with the virtual reality devices headset 50", the virtual reality headset 50" senses the change in motion and displays the frame program for the location of the headset 50" correspondingly. For example, if the user moves the headset 50" away from the display screen 52, the long shot frame is generated, and when the headset 50" moves closer to the electronic device 52 the extreme close up shot is generate. The headset motion control is interfaced with the electronic device 50. Also, the bending of the neck with the headset 50" operates the lighting, for example bending the neck to the left can generate a reduced low key lighting, bending the neck to the right can generate a high key lighting, and positioning the headset 50" in neutral can generate a neutral white balance. It is worth further mentioning that, according to the present invention, the user may select the programs to be operated with the headset 50".

The customer service industry would appreciate the gesture organization and operations for verbal customization and posture display according to the present invention because corporations will have the full control of their company images and promoting their brand while providing a live operator. The employees preselect the verbal and postural options during communications with the customers in the Virtual Reality environment. The user is able to speak independently from the pre-program gestures and voice gesture controls, wherein a selected gesture can provide the user the physical control at any time for any type of preprogram verbal response or verbal recording and therefore the user is able to personally vocalize at will. In other words, the user may project a natural flow during the oral communication process without the customer noticing any changes in the flow of the communication, even in the most complex dialogues. Employee's posture display is as important to companies as verbal communication is in customer service that body language and posture displace can be controlled in the Virtual Reality through the use of gestures by the user. For example, a straight vertical gesture can be paired with a shot, a clip or a frame for standing up or for stay up. Likewise, a horizontal gesture can be used for sitting posture shot, clip or frame. Additionally, the posture programs with the verbal recordings can be copyrighted for employees in a specific industry where the brand name and logo are not allowed to copy in the simulated world and are specific to a company brand. The employees operating the avatar and or surrogate will have preselected posture and verbal displays from the employer to ensure the company's name brand is not tarnished, with poor vocalization and or appearances by the customer service employees in the 2-Dimension, 3-Dimension and or 4-Dimension environment.

The user is not discouraged from utilizing wearable sensor electrodes throughout his or her body for interfacing with the electronic devices 50, with a partial or complete bodysuit. In contrast, the present invention provides a more convenient approach, ergonomically for communicating, socialization and operating in the virtual world. According to the preferred embodiment of the present invention, the user can operate the performed or imagine gestures for controlling, with or without utilizing sensor wearables throughout an event. Current technology requires a bodysuit with multiple sensors and multiple cameras, this can be physical demanding from the extra weight from the bodysuit sensors, and from the require motion to controls the program with the cameras. For example, a user in a virtual world simulation of a zoo with a complete bodysuit sensor wearable is physically required to perform walking in order for the program to continuously display all the digital animals available for display. If the operator stops moving, the program will not understand he wants to keep seeing the animal display in the virtual reality without all the body motions. In other words, if the operator stops, the digital display becomes focused on providing the animation for the location where he stopped at. The operator is forced to maintain the physical walking activity in order to complete the observation of all the animals in the virtual reality zoo. Considering this virtual reality programs, they are not practical nor convenient for day-to-day socialization, communication or work.

In view of above, the present invention substantially allows operating the movements and postures displays with gestures and verbal controls, wherein the gestures, the verbal controls and the animation controls can be paired with each other in the pairing gesture program 78. Where the animation posture programs 76, the gestures from the gesture dictionary 402 and the voice recording list 75 are scalable. Additionally, the user can perform a touch point 521 gesture to speak live whenever he or she wants, thereby providing the user the full control of communicating in a natural flow.

While the ability to multitask in Brain Computer Interfaces devices is currently not an option with the Brain Computer Interface alone, the present invention provides multitasking with sidelines (including the sideline element 31, the reservation sideline element 32, and the pop-up sideline elements 37), verbal commands, neurological electrical impulses signals, electromagnetic sensors, infrared control, and gestures performed or imagined on one or more display screens 52 of one or more electronic devices 50 with or without the use of processor 51 in the electronic device, through the internet or through cloud servers 100. Furthermore, the present invention provides the arrangement and organizational process when linked with other technologies like eyeball motion control in the Virtual Reality, in the Augmented Reality, in the Mix Reality and in the Extended Reality through the usage of all kinds of headset 50" such as googles or waveguide glasses devices. The present invention further provides interoperability for operating electronic devices 50 with current and future inputting systems, without deviating from the current technology.

For example, preferably, all the operational options in the sideline module 30 are able to be operated through the BCI with the EEG/EcoG and the electronic device 50 combination, or the BCI with the EMG and the electronic device 50 combination, or through both mention combinations at the same time or in a timely manner as a robust security system and to increase precision control.

In addition, the artificial intelligence module 25 of the present invention is arranged to recognize the operational gestures as they relate to the 2-Dimensional programs, 3-Dimensional and or 4-Dimensional program in the electronic devices 50. Furthermore, the user does not have a need to alternate back and forth with bulky wearables sensors to operate a 2-Dimensional program while at the same time or in a timely manner operating 3-Dimensional programs divided or not divided by the sideline element 31. In other words, the same 2-Dimensional gestures in the 2-Dimensional program or in the 4-Dimensional program can have similar functions, or can have totally different functions, the artificial intelligence module 25 is configured to anticipate and the module of analyzable factors 26 in the electronic device 50 is configured to analyze the performance and recognize the computer language and/or the digital operations.

Infrared control system and hand finger software detection programs on the physical type display screen 52 of the electronic device 50 and/or on virtual type display screen 52 or display medium of the AR/MR/VR/XR apparatus may work together or independent as the means to further analyze the gestures being performed by the user and to analyze gestures with or without a physical touch surface. For example, the infrared control system on the VR/MR/AR/XR apparatus can be activated with a gesture and turn-off with a different gesture, providing ongoing gesture pairing programming together or independent of the electronic device 50, with or without the Brain Computer Interface system and the electromagnetic sensor orientation, as mentioned above.

According to the present invention, the one or more electronic devices 50 can be controlled and operated with different gestures that are paired with selected programs or program functions. The Brain Computer Interface/Brain Machine Interface signal acquisition can be accomplished by performed or imagining gestures paired with corresponding program or program function. Also, the retinal motion control, the infrared control system and the verbal command system are paired with corresponding program or program function. Each inputting system can have independent gestures paired with different programs or program functions. For example, a vertical gesture can be paired with a program or program function within the 2-Dimension program of the display screen 52 and the same vertical gesture may generate a different response in the 3-Dimension program divided by the sideline element 31. Furthermore, the same gesture can be recognized with a paired program in the Brain Computer Interface system of the EMG or EEG/ECOG and that the same gesture may not be recognized in the inputting system of the electromagnetic sensors 64 or in the infrared base inputting system for that particular program. The artificial intelligence module recognizes when an inputting system is intentionally program for a specific response in a specific program and/or not in every available program.

The artificial intelligence module 25 may not recognize gestures from none functioning inputting system performed or imagined. In other words, the pairing of programs or programs functions with a gesture or any other inputting system can have redundant inputting options or not. For example, the Brain Computer Interface may not be programed with the gesture of vertical touch point 521. A physically performed gesture or an imagining gesture may be paired with a different program in a different inputting system. In other words, the display screen 52 of the electronic device 50 is working together with the Brain Computer Interface, where the touch points gestures can have their own pairing with selected programs or program functions and, at the same time, any signal acquisition may also be paired with selected programs during physically performed or imagined. Also, not all programs need to be paired with the touch point gestures. In other words, the gesture is performed on the display screen 52 but not due to the touch point 521 on the display screen 52, the response is produced on the display screen 52 because of the imagined or performed gesture sending a signal acquisition from the EEG, EcoG, and or EMG, independent or together with the infrared camera system, or from the hand finger software detection program within the display screen 52 of the electronic device 50.

Alternatively, multiple inputting systems can recognize and verify the imagined or performed gesture to generate a response. In addition, each inputting system can have dedicated gestures paired with a selected programs or program function, in each independent inputting system. The more inputting systems are merged the more programs or program functions that can be paired with the specific gestures. The more inputting systems are used, the more programs pairing capacity increases the number of programs that each gesture can be paired with, so as for allowing multitasking capacity and for multiple operations at the same time or in a timely manner. In an alternative example, the same vertical gesture is recognized by the Brain Computer Interface to produce a different response when the signal acquisition is produced by the performed gesture or by the imagining gesture. In another example, the same vertical gesture is recognized by the Brain Computer Interface to produce a different response when the signal acquisition comes from the EMG vs the EEG or the ECoG electrodes.

When the display of a selected program or program function is paired with an imagining or performed gesture, the module of analyzable factors 26 and the artificial intelligence module 25 may recognize the performed touch point 521 on the display screen 52, wherein the gesture (signal acquisition) information may or may not be provided to the artificial intelligence module 25 in the Brain Computer Interface (BCI) of the electronic device 50. Alternatively, the recognition of the artificial intelligence module 25 of the gestures may come from an attachable Brain Computer Interface device or from a built-in Brain Computer Interface system within the interface of the cloud servers with the electronic device 50. Alternatively, any inputting operation may require a touch point 521 and a signal acquisition from the (EEG, ECoG, EMG) or any other inputting system to generate a response. Alternatively, when the signal acquisition is the only desire inputting system for pairing with a selected program or program function, there may be other inputting systems with the same gesture paired with the same program or program function being turned off. Furthermore, the infrared system and hand finger software detection program can be turned on or off selectively to recognize gestures and to provide an additional pairing option for programs and program functions. For example, the same vertical gesture can perform two or more different functions at the same time when inputting with two or more imputing devices. Alternatively, the same vertical gesture can be paired with two or more different functions, for example, the first one from touch point gesture, a second one from the Brain Computer Interface when the gesture being performed or imagined, a third one from the infrared control system sign language, a fourth one from the electromagnetic sensor 64, and a fifth from the hand finger software detection program in the physical computer, in the (AR/MR/XR/VR), or in a projection medium.

FIG. 30 illustrates the availability for one program to have more than one way of inputting gesture to generate the same response. Likewise, a gesture can be programed with two different programs, one imagining gesture and the other performed gesture. Vice versa, any signal acquisition can be paired with one or more programs according to the gesture and the type of gesture inputting system. Additionally, other imputing system without a touch point 521 (gesture) can be paired together with any of the touch point inputting systems described in the invention, for a more robust security system. For example, a verbal command program 404 (non-gesture inputting system) can be paired with a gesture base inputting system to be performed at the same time or in a timely manner. It is worth mentioning that the infrared base camera can be gesture dependent, the display screed 52 can be gesture dependent, the hand/finger software program can be gesture dependent, the (AR/MR/XR/VR) screens 52V can be gesture dependent, the glove and sleeve 60 apparatus can be gesture dependent, the electromagnetic sensor 64 can be gesture dependent, the transparent optic soft gel lens 62 can be gesture dependent, the fiber optic element 63 can be gesture dependent, the micro light element 67 can be gesture dependent, the (EEG, ECoG, EMG) signal acquisition performed or imagined can be gesture dependent, the Brain Computer Interface can preferably be gesture dependent, the electronic device 50 can be gesture dependent, and the display medium light projection non-physical holograms can be gesture dependent. In other words, any gesture imputing system mentioned in the invention can be paired with each and other (non-gesture inputting systems) for a more robust security system and scalable interoperability.

The artificial intelligence module 25 is arranged to recognize the current operation in 2-Dimension, 3-Dimension or 4-Dimension. The gestures may have the same pairing for the selected programs or program functions in each dimension. Alternatively, the gestures may have different gestures pairing for selected programs and programs functions in each selected dimension. Furthermore, each inputting system may or may not have the same gesture pairing for selected programs and program functions.

It is worth mentioning that 4-Dimensional (time and space) like tesseract will become more uncomplicated concepts in the digital environment, just like time playing a role in our physical world. Time in the 4-Dimensional programs will have a bigger roll in the simulated world. Through the simulated world, students, researchers and the general public may have access to better conceptualize the 4-Dimension and other higher dimensions. The simulated world will provide humans the digital display to further conceptualize other higher dimension and therefore give us a better understanding of our own physical world as it relates to higher dimensions. In the 4-dimension, the user will be able to operate non-touch physical controls, wherein the gestures, sign language and verbal commands are imagined or performed and are time dependent or not, just like in the 2-Dimension imputing controls.

For interfacing operability with multiple inputting device software and hardware, the user can operate within the simulated environment and, for example, produce a shot, frame, and/or animation. In other words, the user can cut and paste characteristic, linguistics previously performed animation and customize said frames and where the users' activities are copied, transferred or deleted by the user. For example, the user can edit a smile of the avatar and make personal customization changes to his or her own personal avatar, within set regulations.

Reactive programming is a design paradigm that relies on asynchronous programming logic to handle real-time immediate updates to otherwise static content. It is possible and will increase user imputing device options and gestures for efficiency as it relates to the interoperability of multitasking for any of the corresponding embodiments. Furthermore, responsive programming can be operated for any of the selected programs with more than one gesture, with one or more imputing devices. It is noted that both programming options are ideal for improving the work flow and not one system can replace the other.

According to the present invention, the Big Data is not limited to the applications of the reactive programing, the responsive programming, the first executable portion 1, the second executable portion 2, the third executable portion 3, and the fourth executable portion 4 with processors (internet) or without processor (cloud base computing) to enable organization in developing, deploying, operating and managing the Big Data infrastructure.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system for gesture operation on one or more display screens of one or more electronic devices, wherein each of the one or more display screens is configured to be operated by one or more gestures, the system comprising:

a computer useable medium, which is a server configured to operate the one or more electronic devices, comprising at least one server processor, at least one server storage device and at least one server communication module, configured to have computer-readable program code to perform executable operations of a first executable portion, a second executable portion, a third executable portion, and a fourth executable portion and to communicatively connect with the one or more electronic devices, the first executable portion being operable to generate and manage one or more sideline elements and one or more adjusters to provide one or more adjusting operations for controlling one or more displaying contents corresponding to one or more programs on the one or more display screens, and controlling and customizing the one or more gestures, one or more programs and the one or more sideline elements, wherein each of the one or more gestures produces one or more touch points to operate the one or more programs divided by the one or more sideline elements, the second executable portion being operable to analyze one or more touch point information of the one or more touch points and retrieving one or more display screen information from the one or more display screens to control the one or more adjusters generated based on the one or more touch point information for displaying on the one or more display screens, wherein the second executable portion is configured to analyze the one or more touch point information selected from a group consisting of location, pressure, a thickness, acceleration, time, direction of each of the one or more touch points, right or left hand, angle, size, and interruptions, according to the one or more touch points detected on the one or more display screens, the third executable portion being operable to designate the one or more sideline elements on the one or more display screens, the one or more sideline elements dividing the one or more display screens into two or more displaying portions to organize two or more programs on the two or more displaying portions of the one or more display screen for displaying two or more displaying contents of the two or more programs respectively while the two or more programs are being controlled and running on the displaying portions respectively at the same time, wherein when one or more touch points operable by the first executable portion are positioned at the one or more sideline elements, the one or more adjusters are generated at the one or more sideline elements for controlling movement of the one or more sideline elements on the one or more display screens, the fourth executable portion being configured for designating the one or more programs on one or more interacting portions on the one or more display screens, wherein the one or more interacting portions interact with the one or more programs displayed on the one or more display screens, wherein when the one or more interacting portions are activated, the one or more interacting portions are superimposed or displayed on the one or more display screens according to one or more positions of the one or more touch points acquired from the second executable portion, wherein the fourth executable portion is operable to designate the one or more programs on one or more interacting portions on the one or more display screens, includes a gesture dictionary for selection from one or more gesture options with one or more touch point information of the one or more touch point, wherein gesture dictionary is arranged for customizing a gesture operation with a function of a program of the one or more programs for the one or more touch points, wherein each of the gestures is selected from the gesture dictionary and matched with a selected function of the program to enable a user to control the program by implementing the function of the program through the gesture, wherein the one or more display screens are interacted with the first executable portion to adjust displaying contents on the one or more displaying portions of the one or more display screens and the third executable portion to provide the sideline elements for the user on the one or more displaying portions of the one or more display screens, wherein the gesture operation on the one or more display screen with the gestures selected from the gesture dictionary and paired with the one or more programs of one or more electronic devices is arranged for operating the one or more programs on the one or more displaying portions on the one or more display screens, wherein the one or more display screens are interacted with the second executable portion for analyzing the touch points of the gestures on the one or more displaying portions of the one or more display screens and the one or more display screens are interacted with the third executable portion to provide the sideline elements available for the user on the one or more displaying portions of the one or more display screens, wherein the third executable portion further provides one or more reservation areas on the one or more display screens and generates one or more pop-up sideline elements for providing immediate superimposed alerts and computer menu options on the one or more reservation areas, wherein the one or more pop-up sideline elements and the one or more programs are acquired from an available menu program option from the fourth executive portion while the third executable portion controls a customization of the one or more pop-up sideline elements providing the alerts and the computer menu options displaying while superimposed of the one or more program, wherein the second executable portion is configured to generate one or more adjuster interfaces on the one or more display screens based on the one or more touch point information for controlling on the one or more display screens, wherein the first executable portion is configured to analyze the one or more touch point information, retrieve the one or more touch point information from the one or more display screens and from one or more interacting portions, and display the one or more adjusters generated based on the one or more touch point information for displaying on the one or more display screens, wherein the first executable portion further allows the one or more touch points to be moved within the one or more sideline elements containing the one or more adjusters for adjusting on the one or more sideline elements to split the one or more programs according to the one or more gestures, wherein the one or more adjusters are generated for customizing the one or more gestures and the one or more sideline elements, depending on time as a function of the one or more programs on the one or more display screens, and allowing the one or more touch points to be moved along the one or more adjuster interfaces for adjusting one or more time-dependent contents corresponding to the one or more programs on the one or more display screens, wherein the second executable portion is operable to allow the one or more touch points to be moved along the one or more adjuster interfaces for controlling the one or more sideline elements corresponding to the one or more programs from the fourth executable portion on the one or more display screens, wherein the first executable portion is operable to generate one or more graduations with respect to the one or more adjusters respectively for indicating a total range in divided levels of the one or more displaying contents displayed in the one or more display portions respectively, wherein the one or more graduations are attached corresponding to the one or more adjusters, such that an available adjustable state of each of the displaying contents is displayed corresponding to the one or more programs on the one or more display screen, wherein the first executable portion is further operable to generate one or more reservation sideline elements dividing the one or more reservation areas provided by the third executable portion on the one or more display screens, wherein each of the one or more graduations, on the corresponding adjuster, provides a precise guide for controlling the one or more displaying contents, the one or more split programs, the one or more sideline elements, the one or more reservation sideline elements, the one or more reservation areas, and a time frame of each of the one or more program on the one or more display screen.

2. The system, as recited in claim 1, wherein the one or more adjusters and the one or more graduations are generated by the first executable portion according to an operation information of the one or more touch points, wherein the one or more adjusters and the one or more graduations are sent to the second executable portion which is operable to generate the one or more adjuster interfaces according to the one or more adjusters and the one or more graduations, wherein in each of the one or more adjuster interfaces, each of the one or more adjusters is arranged to a position that is adapted for operation, wherein the one or more adjuster interfaces are sent to a processor of each of the one or more electronic devices, which configures the one or more display screens to display the one or more adjuster interfaces in the one or more display screens, allowing the user to interact with the one or more electronic devices through a gesture control on each of the one or more adjuster interfaces.

3. The system, as recited in claim 2, wherein the one or more gradations generated by the first executable portion is arranged for indicating a state of a time and speed provided in a module of analyzable factors of the second executable portion, wherein the one or more graduations are attached along one or more bodies of the one or more adjusters respectively so as to illustrate a current state of a time dependent program of the one or more programs for each time dependent content of the one or more displaying contents corresponding to the one or more programs on the one or more display screens.

4. The system, as recited in claim 3, wherein the one or more graduations generated by the first executable portion is also arranged for indicating a location of controls for the one or more sideline elements to move the one or more sideline elements accordantly, wherein the one or more adjusters are located along the one or more sideline elements respectively to provide controls on the one or more sideline elements displayed in correspondence to the one or more programs on the one or more display screens.

5. The system, as recited in claim 4, wherein the one or more graduations generated by the first executable portion is arranged for indicating a state of each of the one or more displaying contents respectively, wherein at least one adjuster indicator is provided on each of the one or more graduations to notify, on each of the one or more graduations, a level the user is currently manual controlling, corresponding to the one or more adjusters, a current state of a viewing field, a sideline location, and a time editing on the one or more programs on the one or more display screens.

\* \* \* \* \*